July 7, 1964 W. S. GUBELMANN 3,140,045
DIVIDING MECHANISM
Original Filed Nov. 6, 1950 46 Sheets-Sheet 2

INVENTOR.

July 7, 1964
W. S. GUBELMANN
3,140,045
DIVIDING MECHANISM
Original Filed Nov. 6, 1950
46 Sheets-Sheet 5
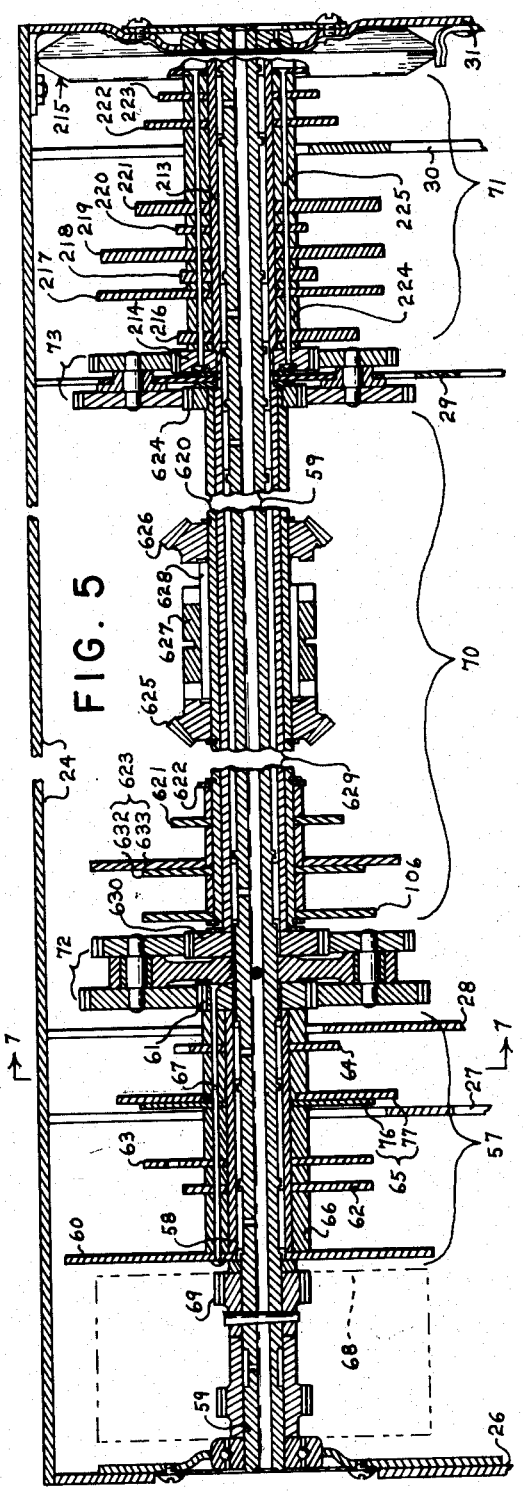
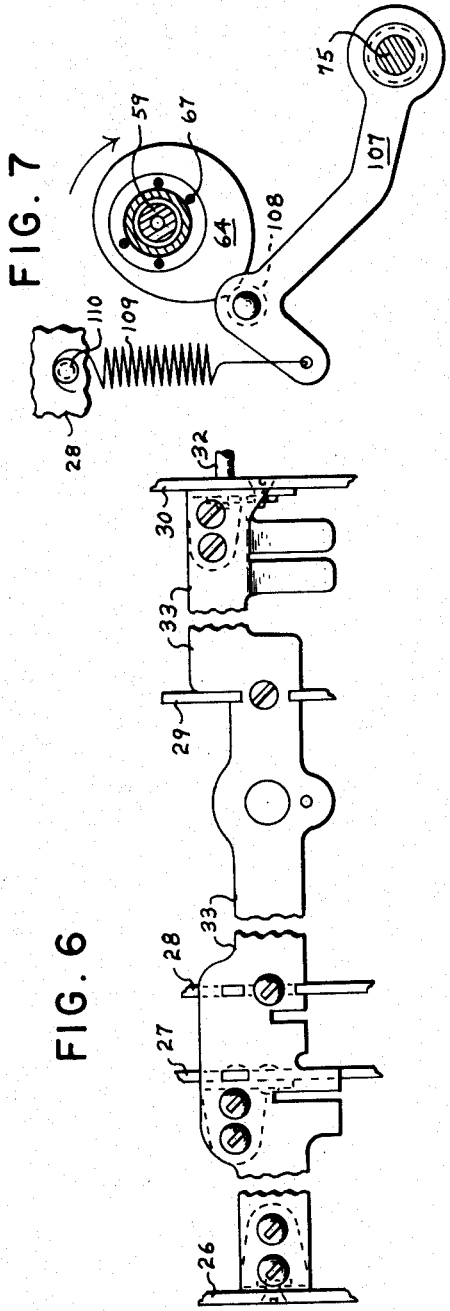
INVENTOR.
William J. Gubelmann, deceased
by Walter S. Gubelmann, executor
BY
Burgess, Ryan & Hicks
Attys

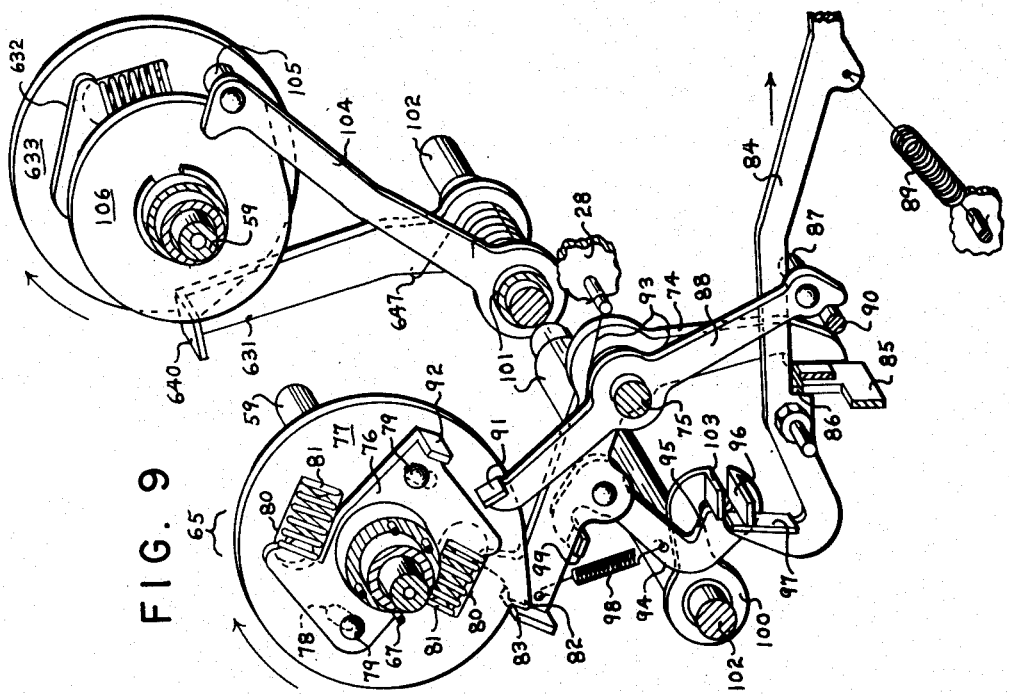

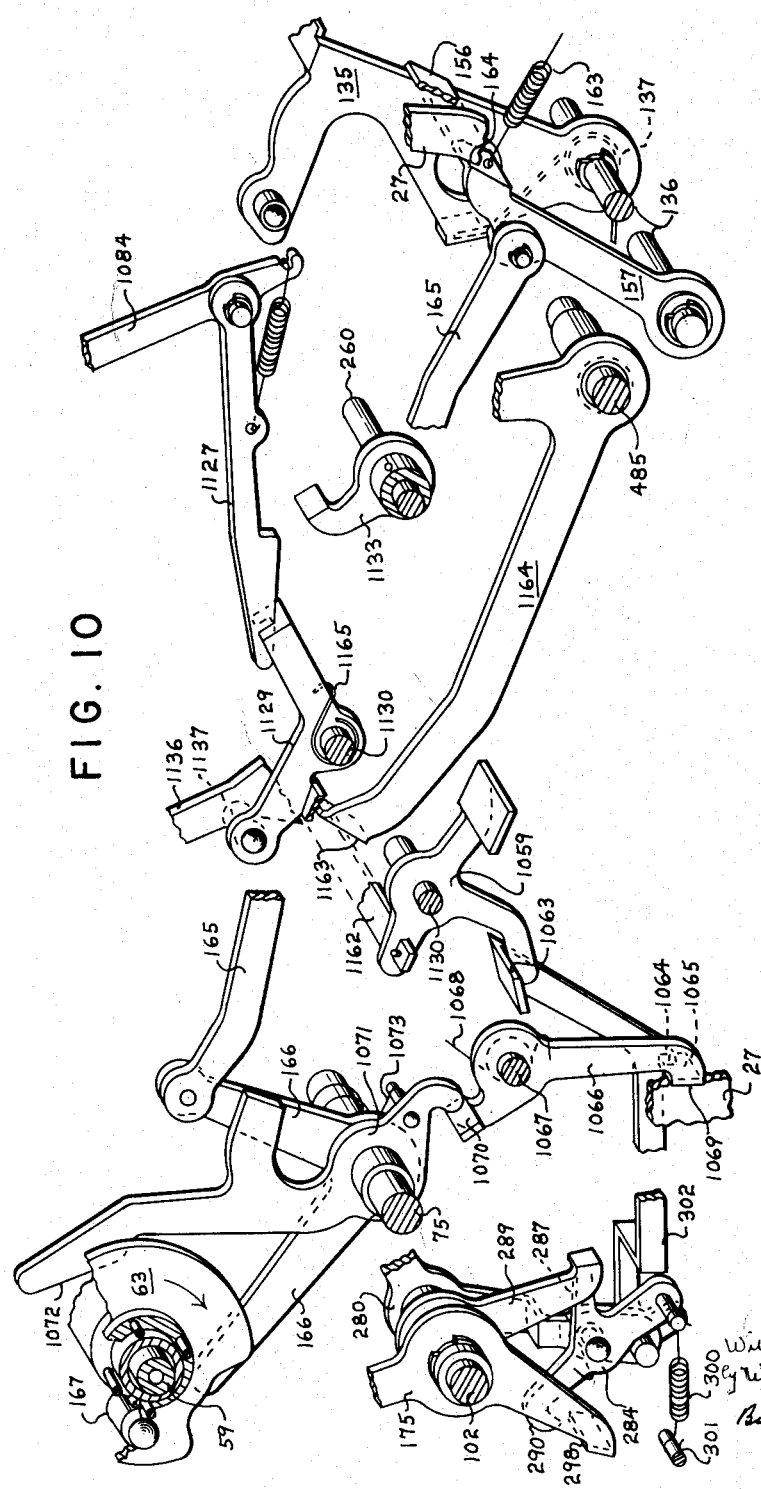

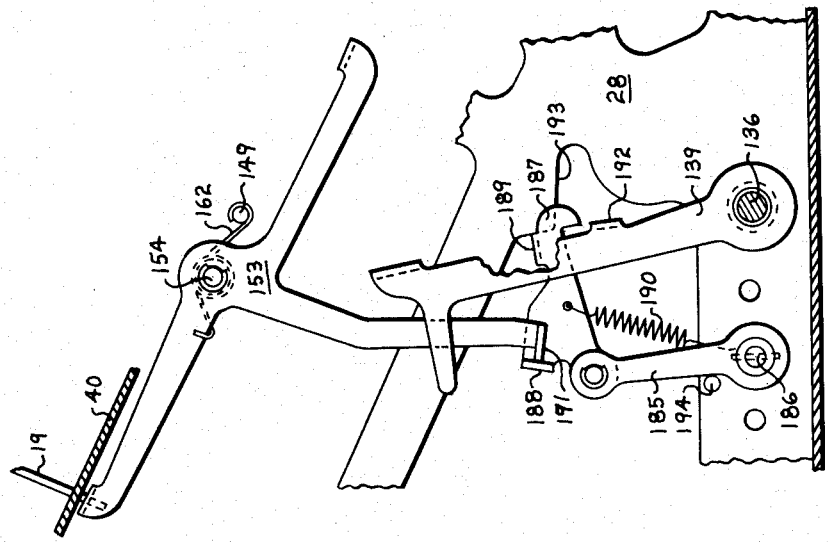
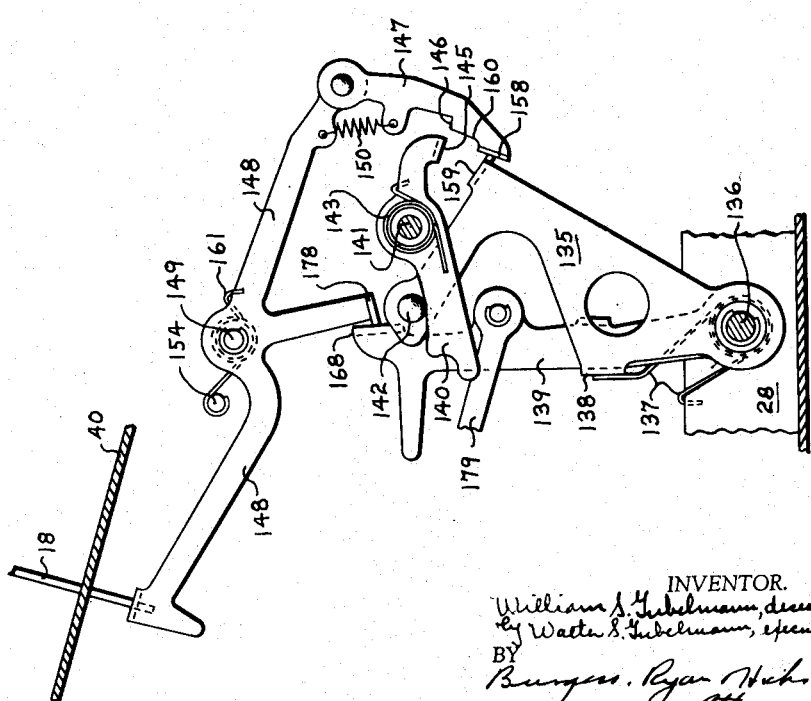

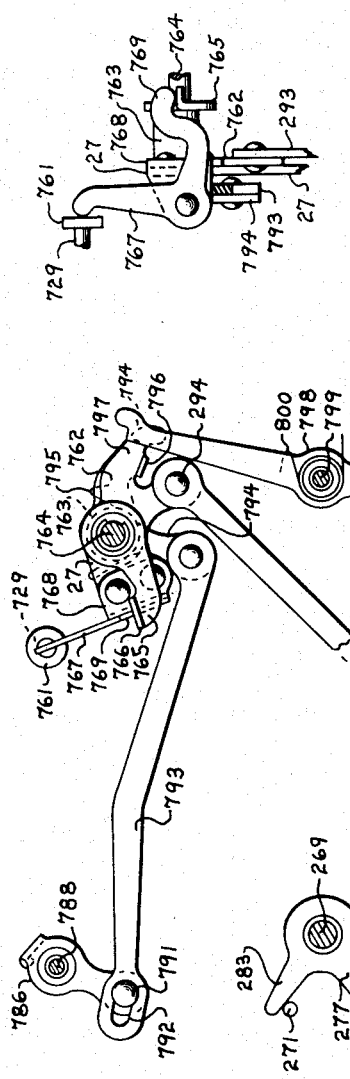
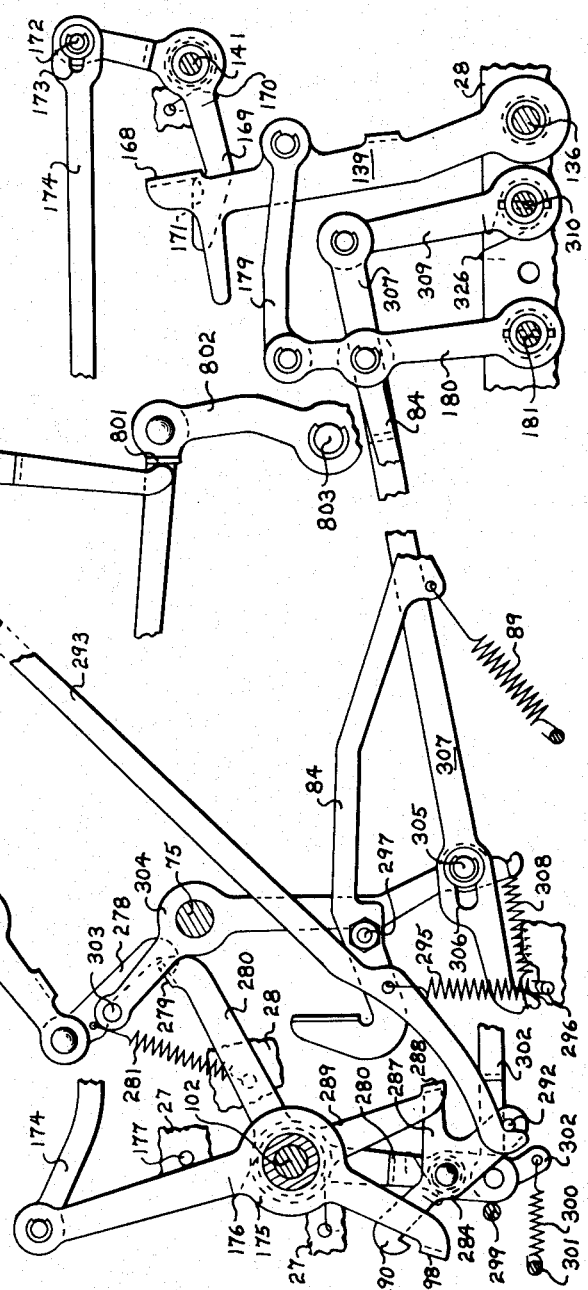
FIG. 13a
FIG. 13

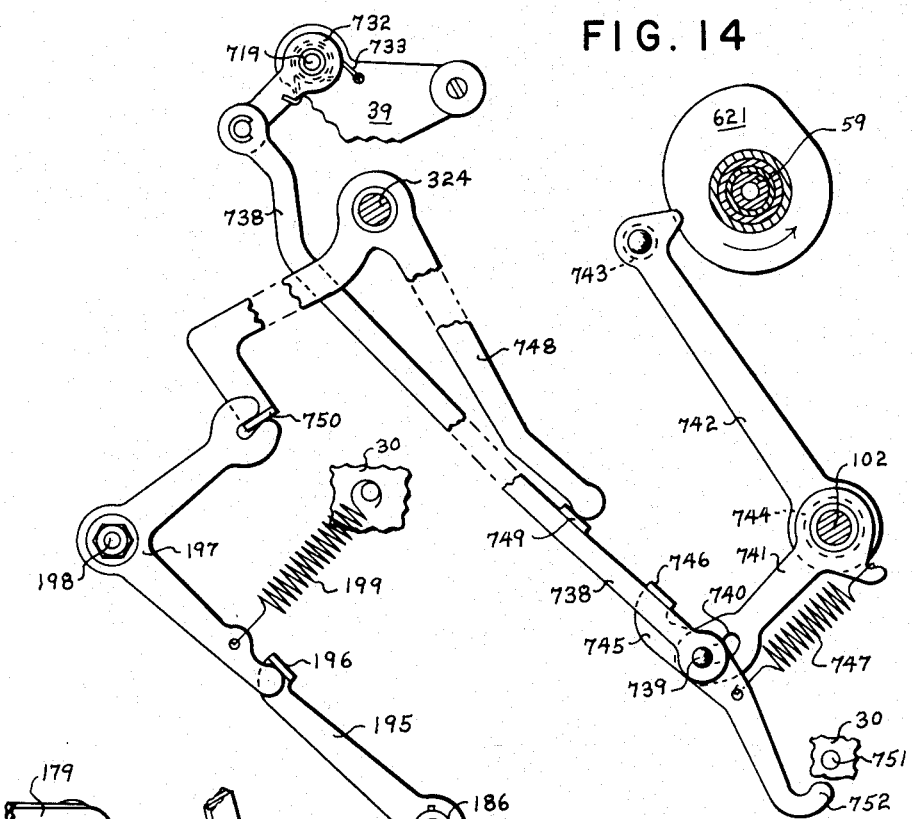
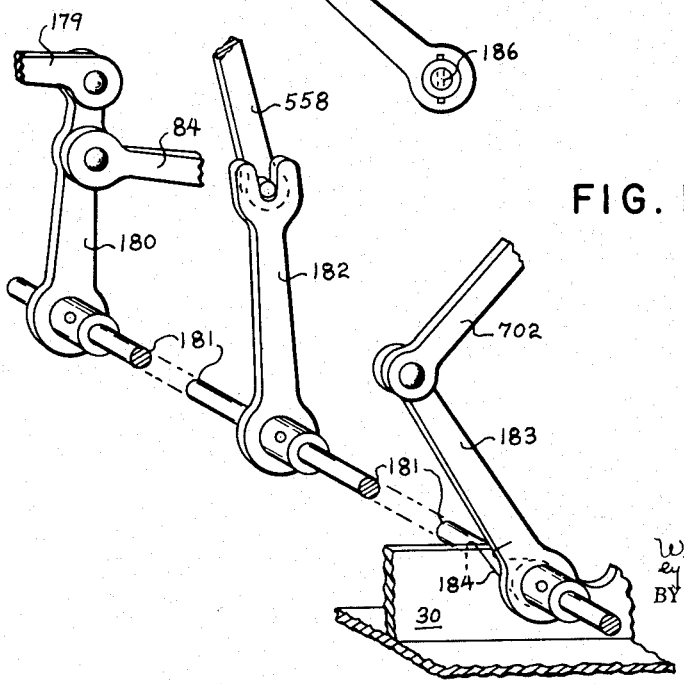
FIG. 14
FIG. 15

July 7, 1964   W. S. GUBELMANN   3,140,045
DIVIDING MECHANISM
Original Filed Nov. 6, 1950   46 Sheets-Sheet 15

INVENTOR.
William S. Gubelmann, deceased
by Walter S. Gubelmann, executor
BY
Burgess, Ryan & Hicks
Attys.

July 7, 1964   W. S. GUBELMANN   3,140,045
DIVIDING MECHANISM

Original Filed Nov. 6, 1950   46 Sheets-Sheet 16

INVENTOR.
William S. Gubelmann, deceased
by Walter S. Gubelmann, executor
BY
Burgess, Ryan Hicks
Attys.

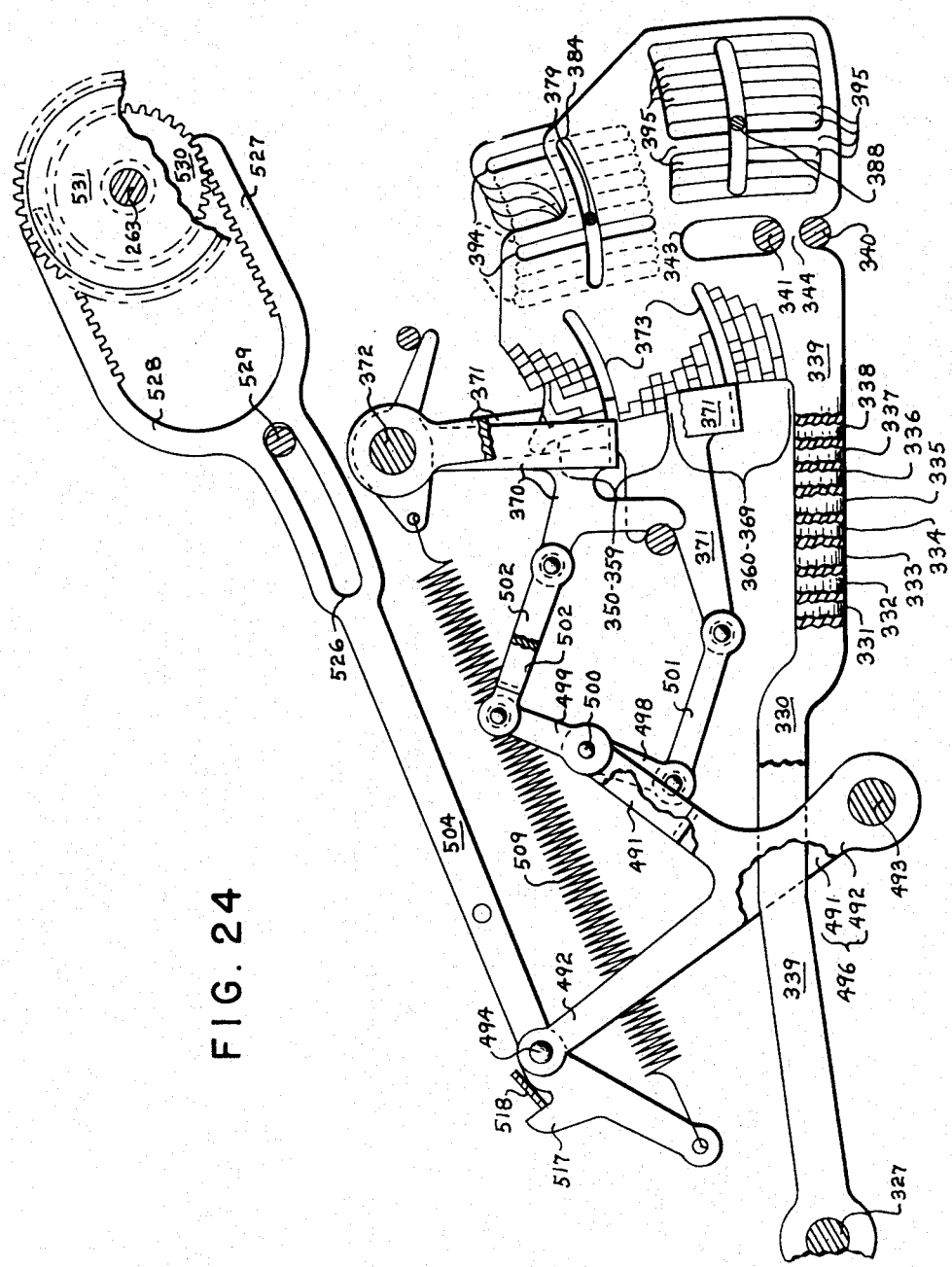

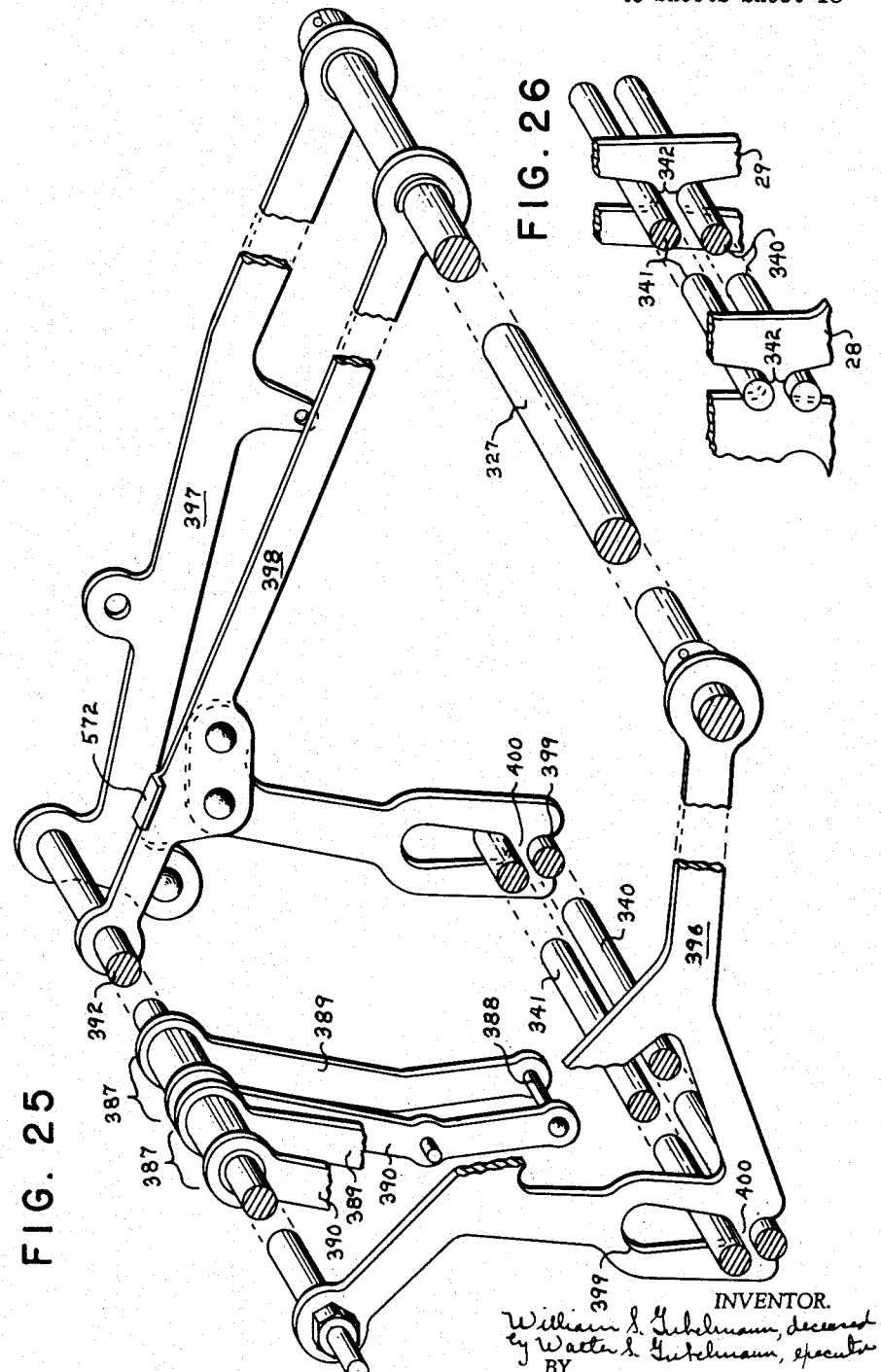

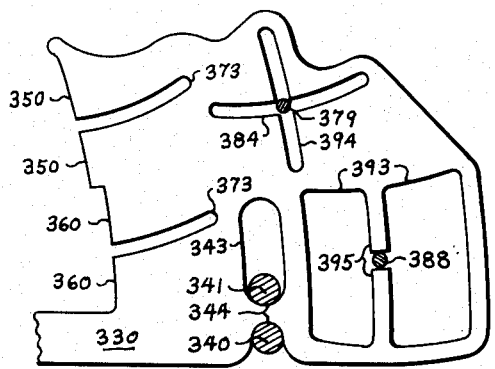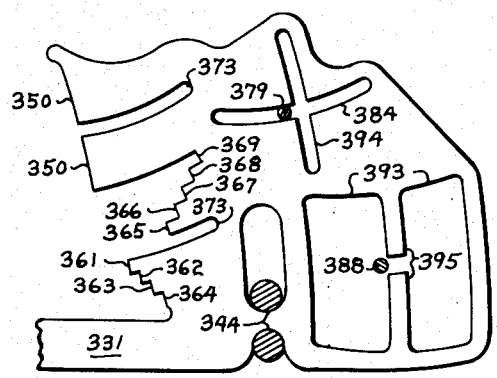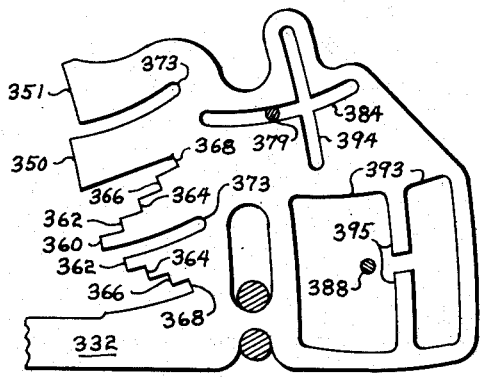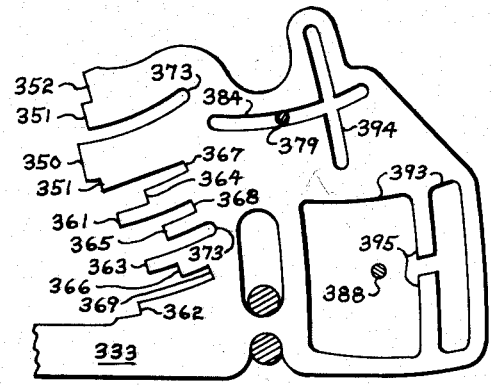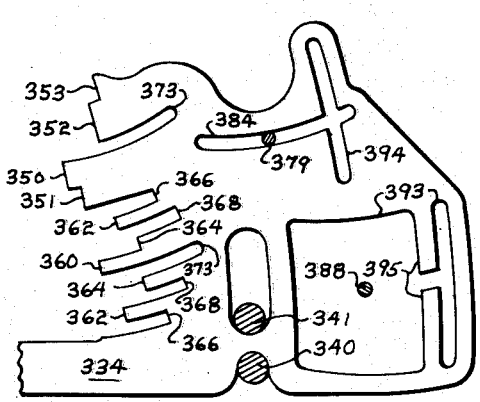
FIG. 27

July 7, 1964 W. S. GUBELMANN 3,140,045
DIVIDING MECHANISM
Original Filed Nov. 6, 1950 46 Sheets-Sheet 21

INVENTOR
William S. Gubelmann, deceased
by Walter S. Gubelmann, executor
Burger, Ryan & Hicks
attys.

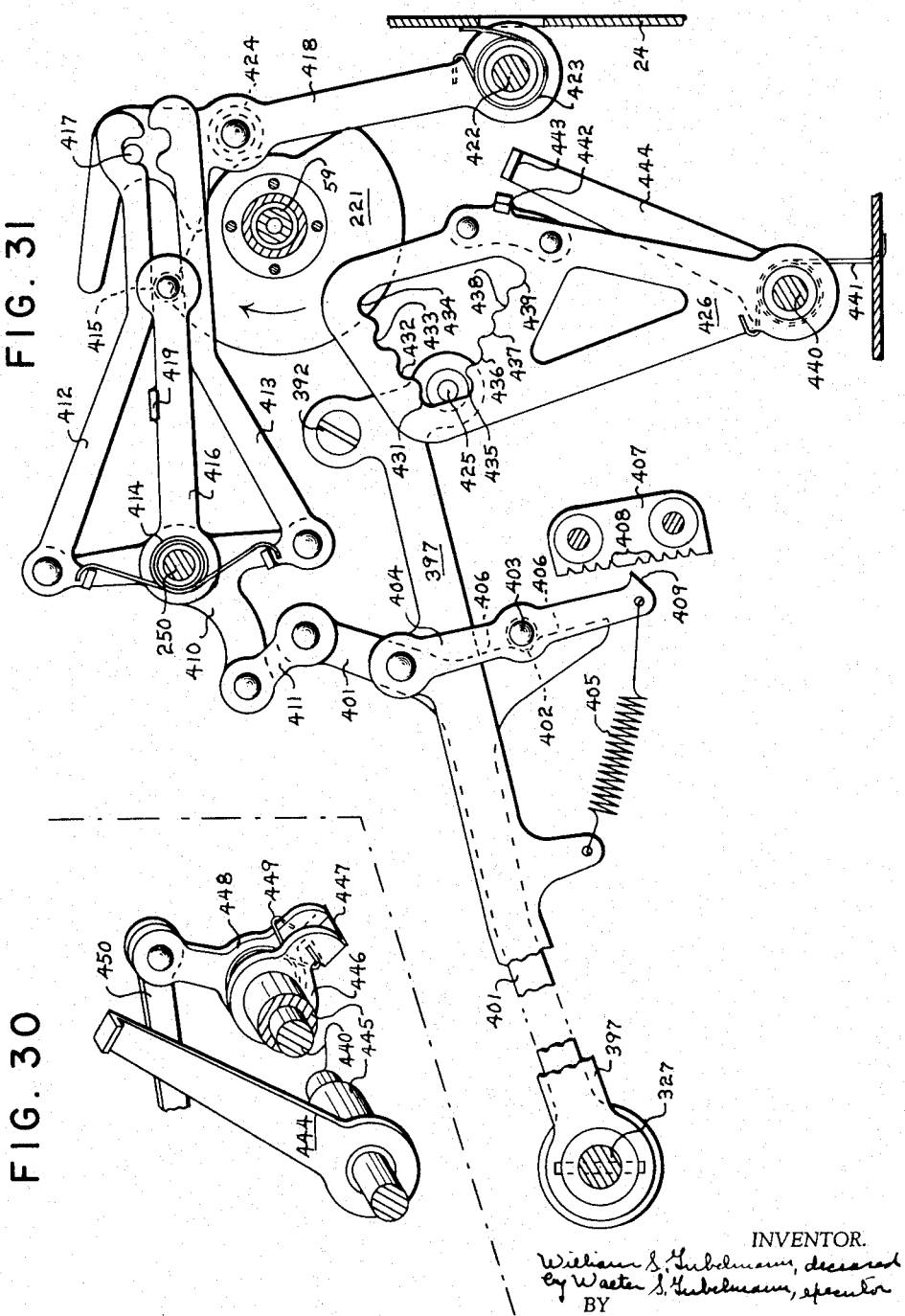

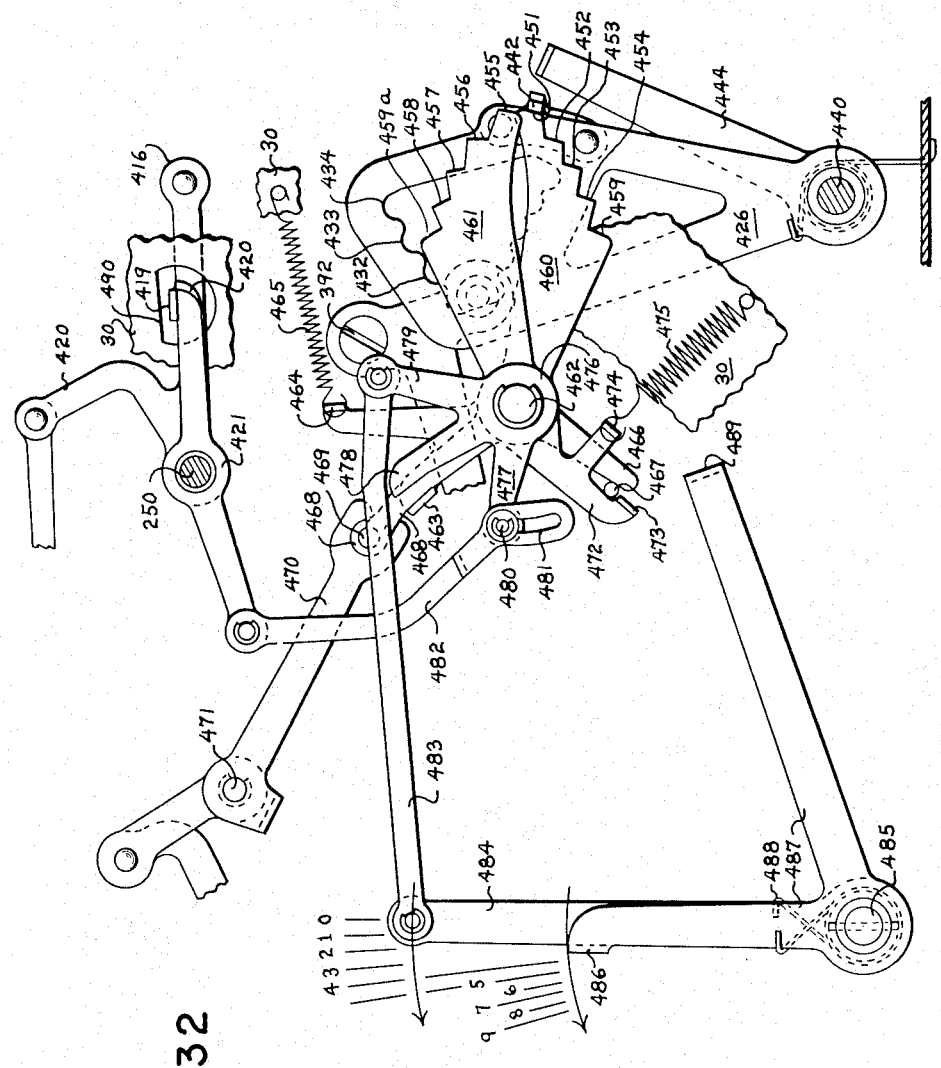

July 7, 1964 W. S. GUBELMANN 3,140,045
DIVIDING MECHANISM
Original Filed Nov. 6, 1950 46 Sheets-Sheet 24
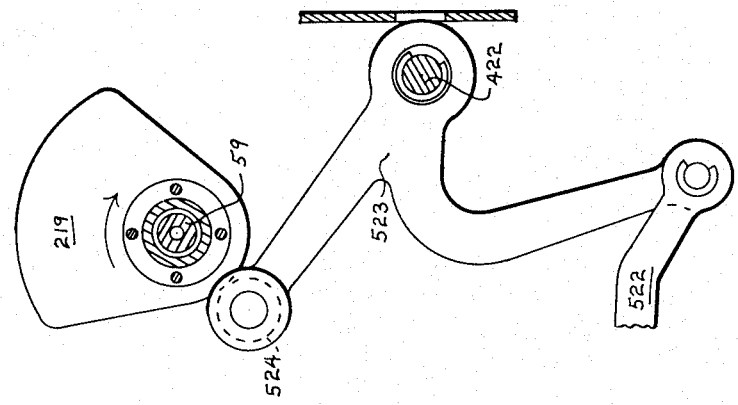
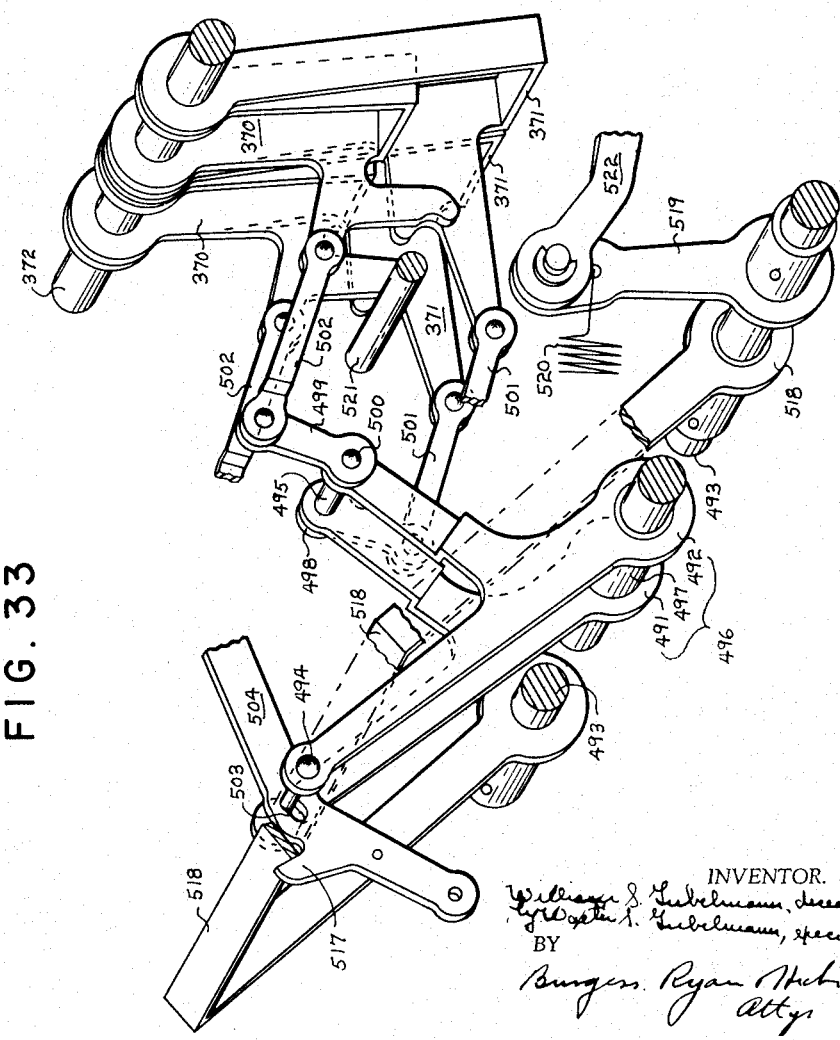
INVENTOR.

July 7, 1964 W. S. GUBELMANN 3,140,045
DIVIDING MECHANISM
Original Filed Nov. 6, 1950 46 Sheets-Sheet 25

INVENTOR.
William S. Gubelmann, deceased
by Walter S. Gubelmann, executor
BY
Burgess, Ryan & Hicks
Attys.

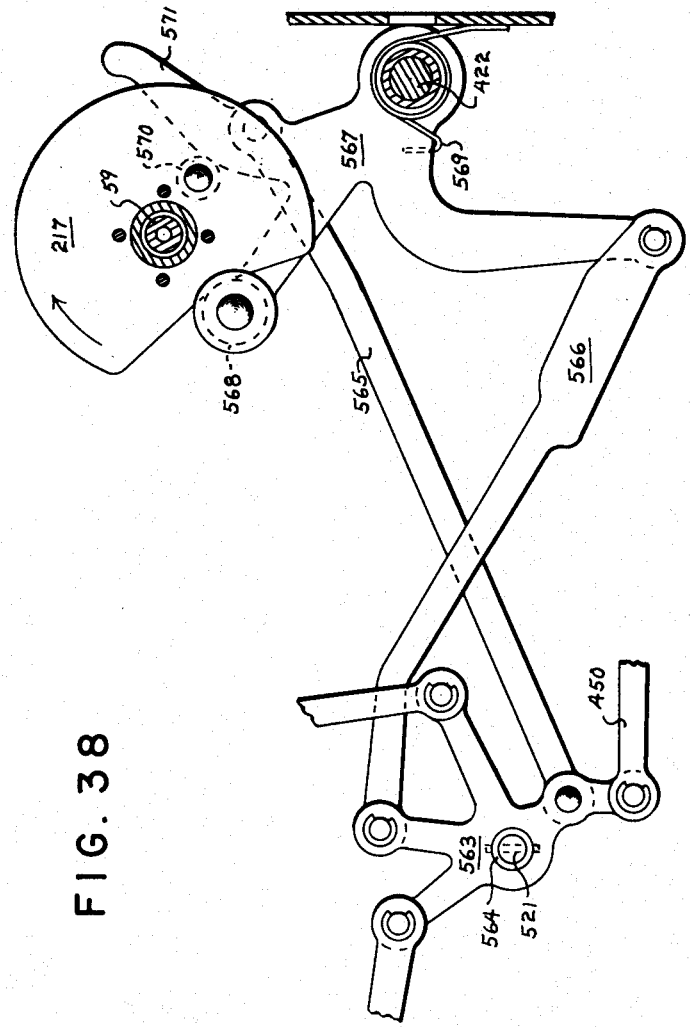

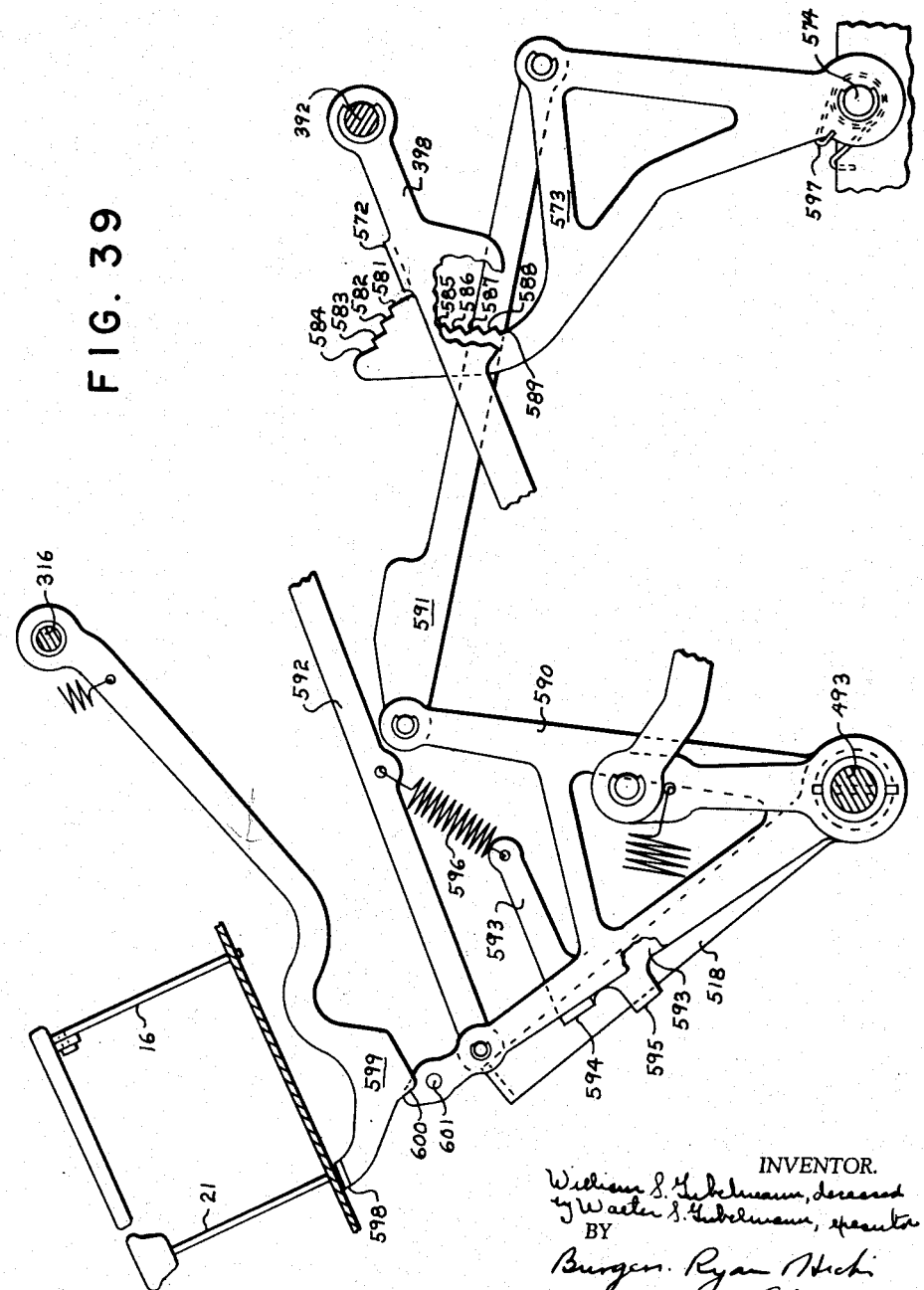

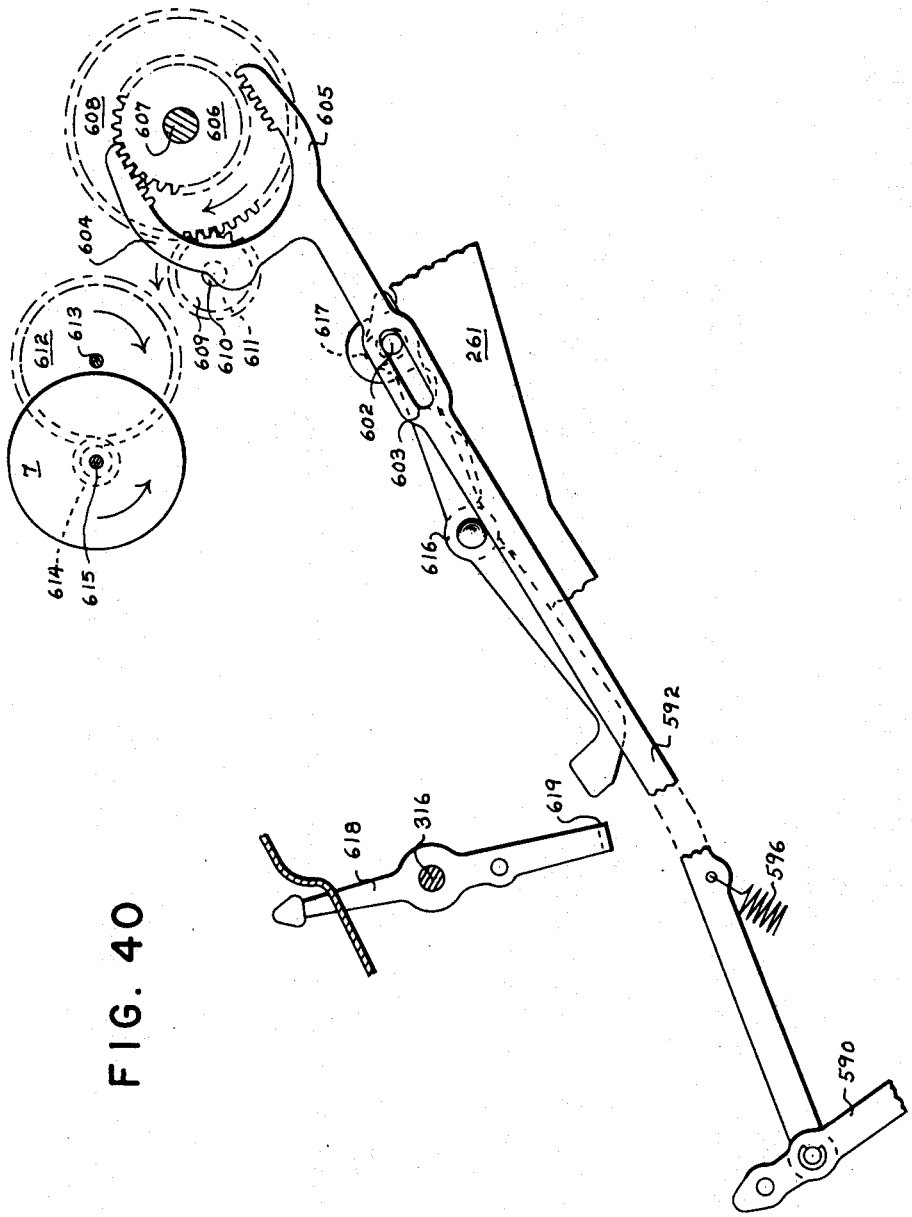

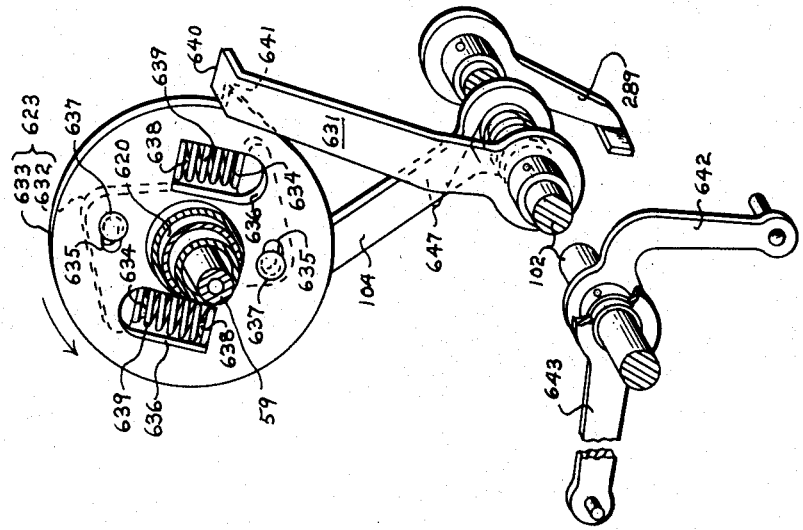
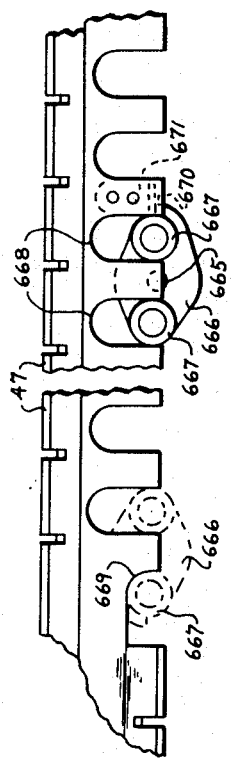
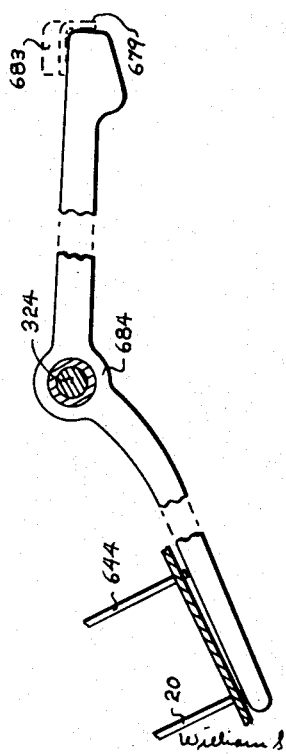

July 7, 1964

W. S. GUBELMANN 3,140,045

DIVIDING MECHANISM

Original Filed Nov. 6, 1950

INVENTOR.
William S. Gubelmann, deceased
by Walter S. Gubelmann, executor
BY
Burgess, Ryan & Hicks
Attys.

July 7, 1964  W. S. GUBELMANN  3,140,045
DIVIDING MECHANISM

Original Filed Nov. 6, 1950  46 Sheets-Sheet 31

INVENTOR.
William S. Gubelmann, deceased
By Walter S. Gubelmann, executor
BY
Burgess, Ryan & Hicks
Attys.

July 7, 1964  W. S. GUBELMANN  3,140,045
DIVIDING MECHANISM

Original Filed Nov. 6, 1950  46 Sheets-Sheet 32

INVENTOR.
William S. Gubelmann, deceased
by Walter S. Gubelmann, executor
BY
Burgess, Ryan Hicks
Attys.

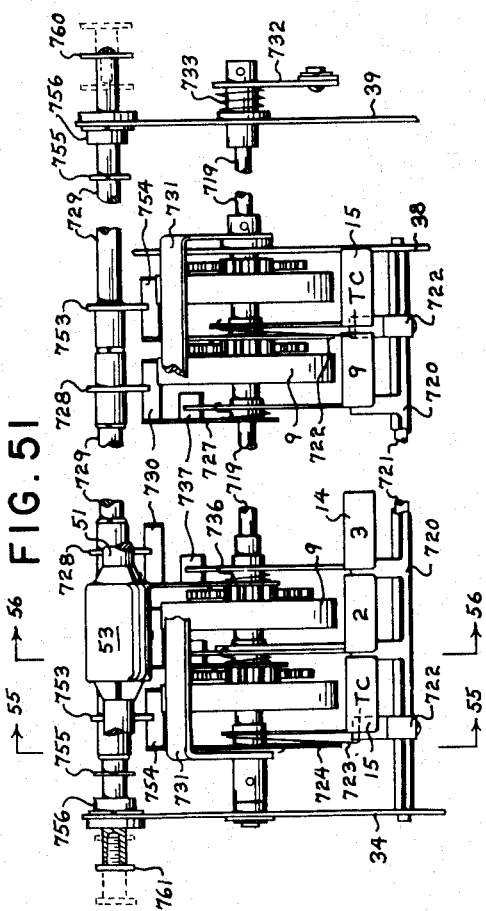

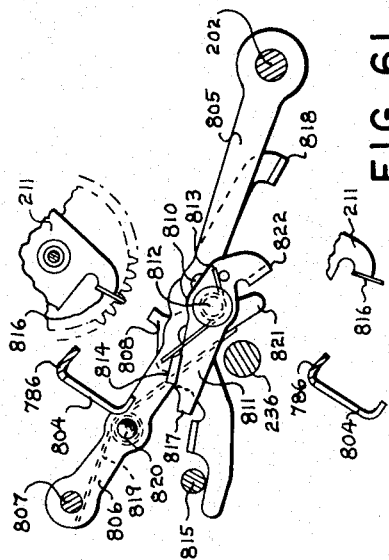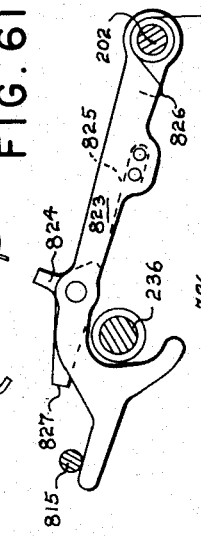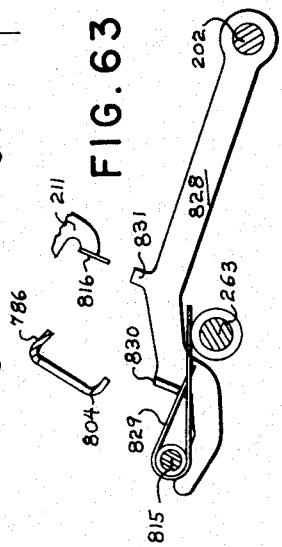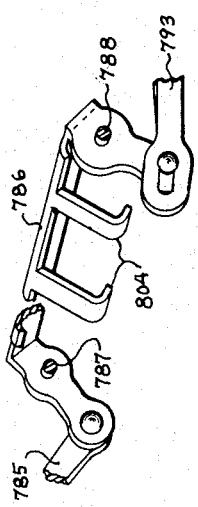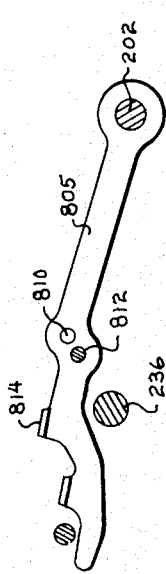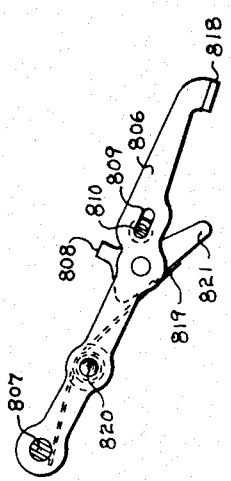

July 7, 1964 W. S. GUBELMANN 3,140,045
DIVIDING MECHANISM
Original Filed Nov. 6, 1950 46 Sheets-Sheet 36
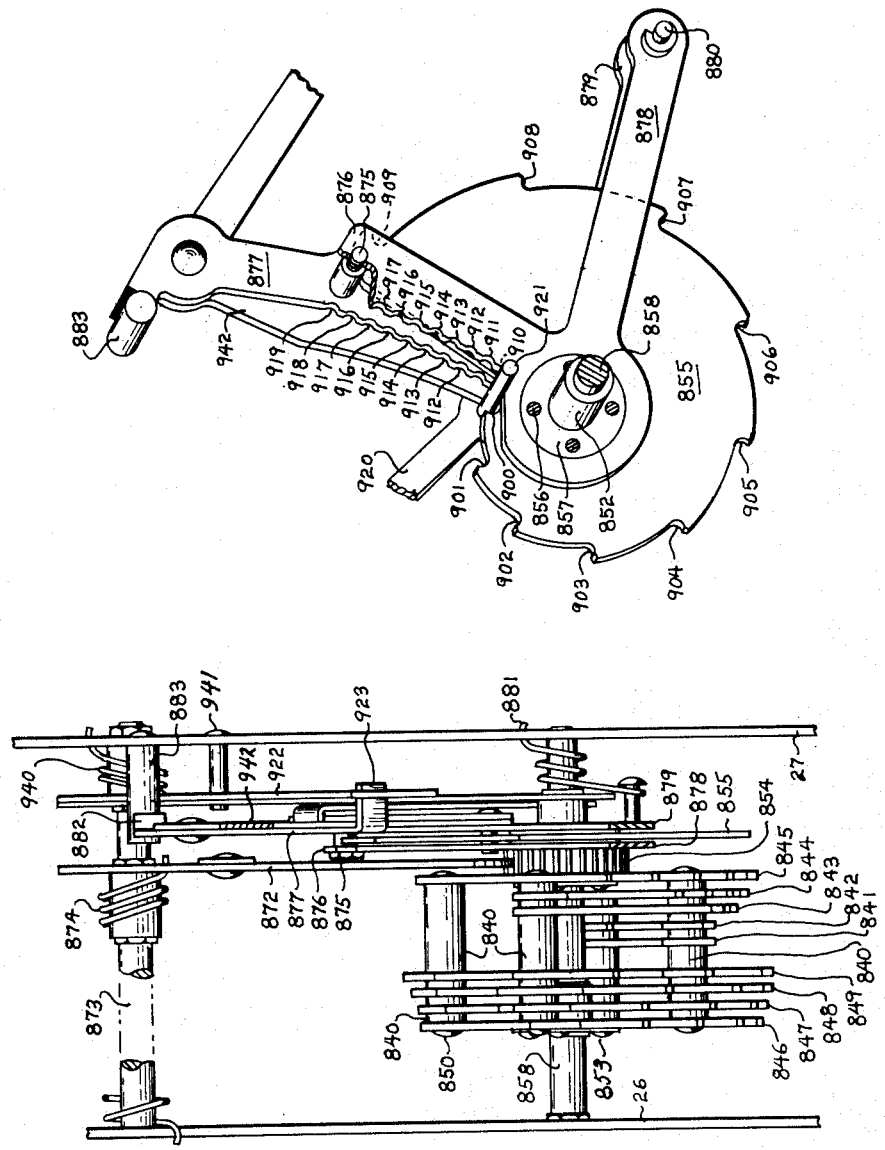
INVENTOR.
William S. Gubelmann, deceased
by Walter S. Gubelmann, executor
BY
Burgess, Ryan and Hicks
Attys.

July 7, 1964 W. S. GUBELMANN 3,140,045
DIVIDING MECHANISM
Original Filed Nov. 6, 1950 46 Sheets-Sheet 37

INVENTOR.
William S. Gubelmann, deceased
by Walter S. Gubelmann, executor
BY
Burgess, Ryan & Hicks
Attys

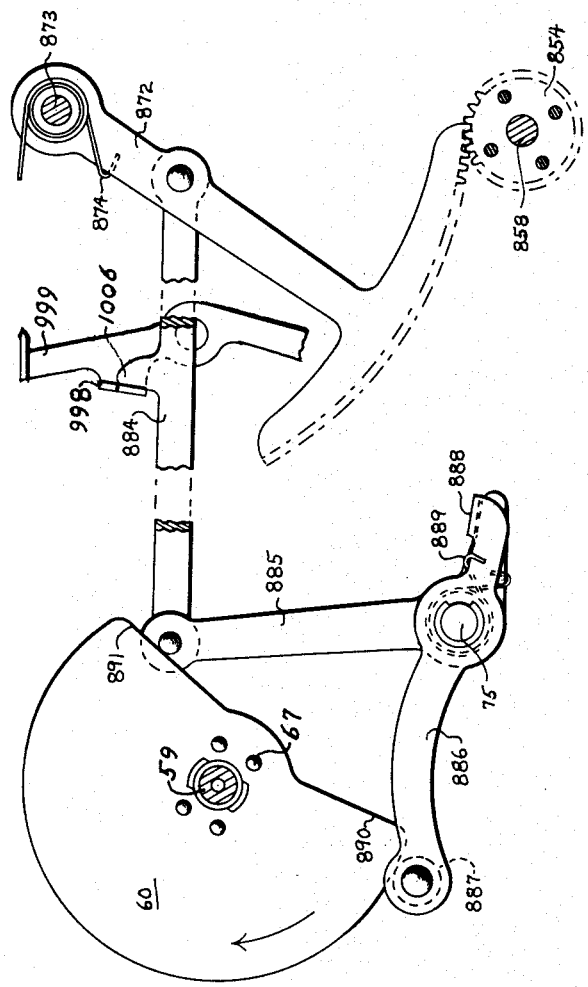

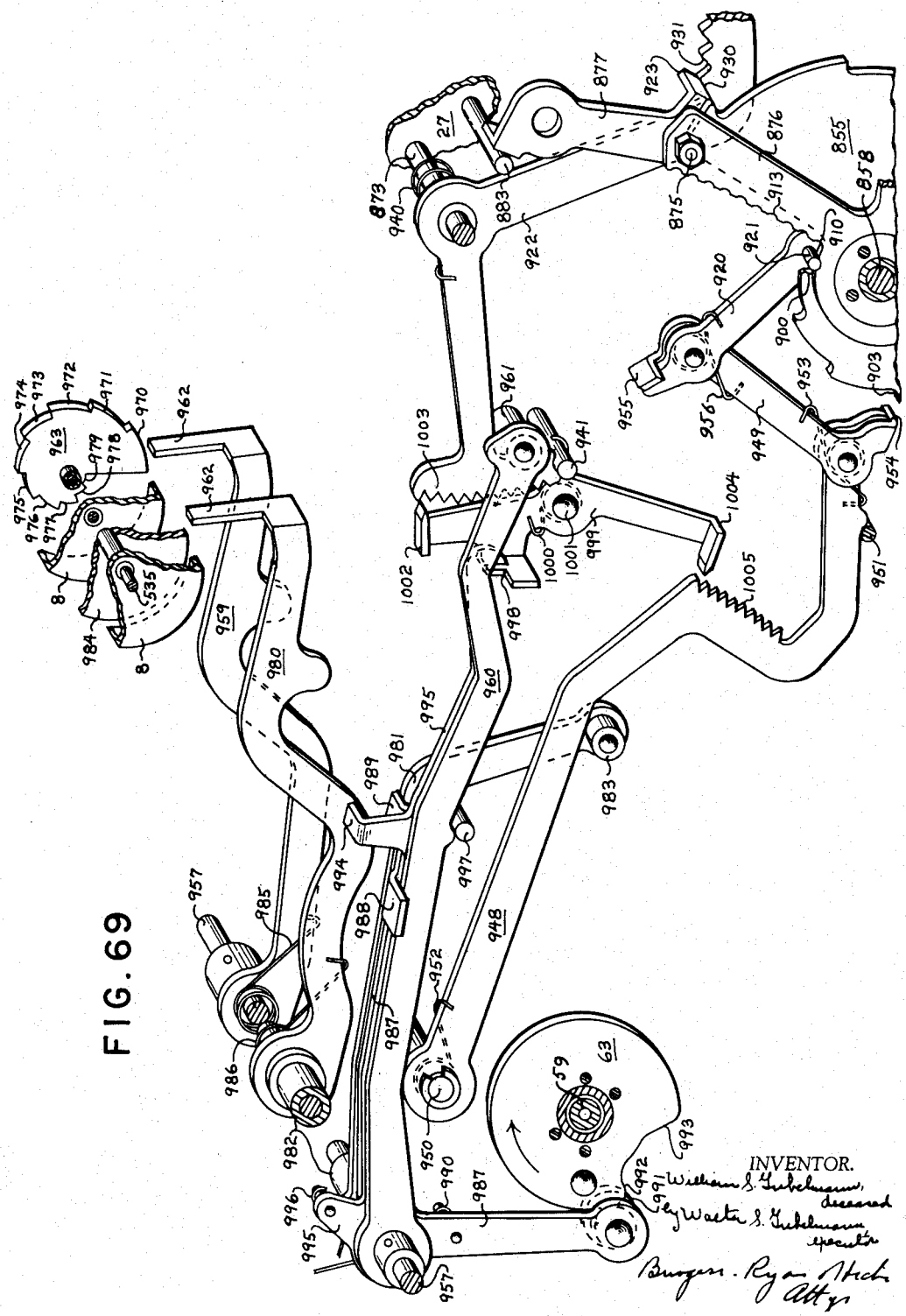

July 7, 1964   W. S. GUBELMANN   3,140,045
DIVIDING MECHANISM
Original Filed Nov. 6, 1950   46 Sheets-Sheet 41
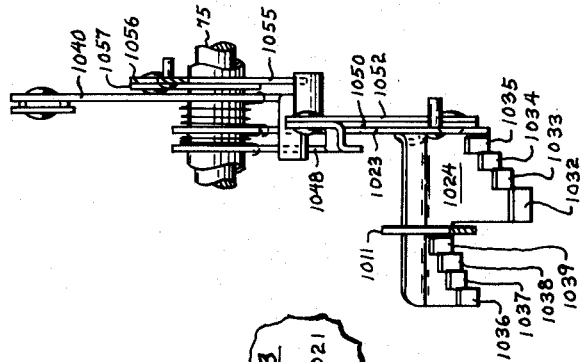
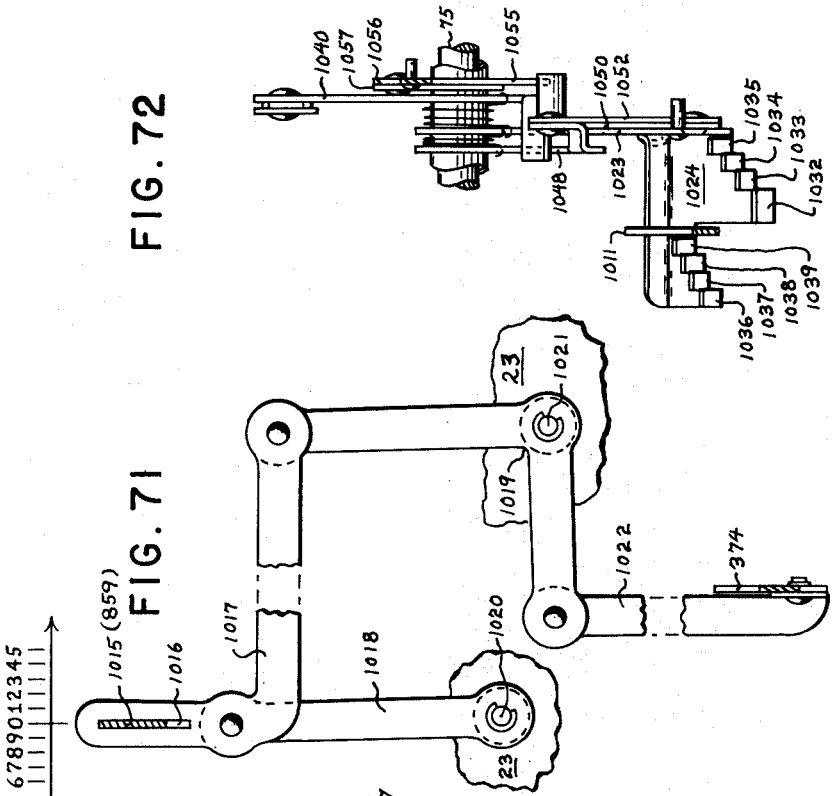
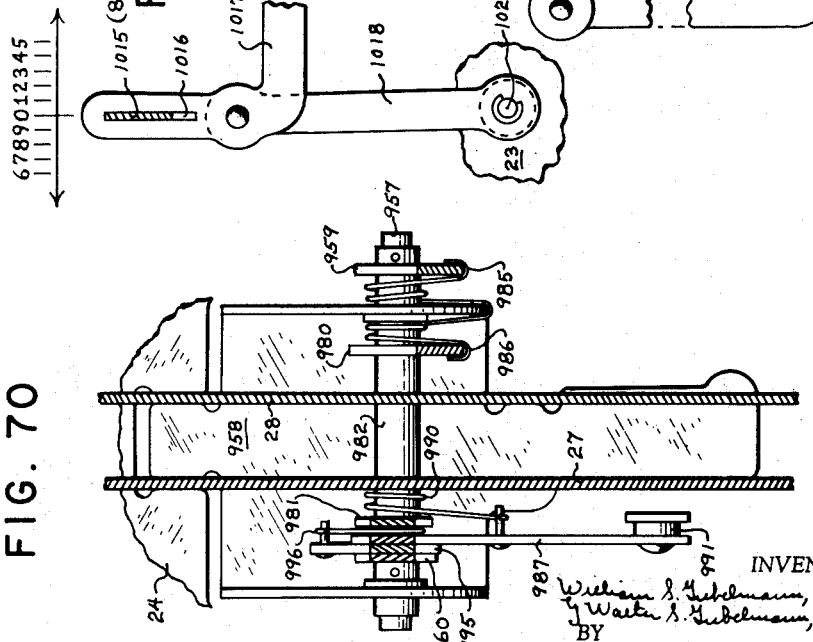
INVENTOR.
William S. Gubelmann, deceased
by Walter S. Gubelmann, executor
BY
Burgess, Ryan & Hicks
Attys July 7, 1964    W. S. GUBELMANN    3,140,045
DIVIDING MECHANISM Original Filed Nov. 6, 1950    46 Sheets-Sheet 43

INVENTOR.
William S. Gubelmann, deceased
by Walter S. Gubelmann, executor
BY
Burgess, Ryan & Hicks
Attys July 7, 1964  W. S. GUBELMANN  3,140,045
DIVIDING MECHANISM Original Filed Nov. 6, 1950  46 Sheets—Sheet 46

3,140,045
DIVIDING MECHANISM
William S. Gubelmann, deceased, late of Convent, N.J., by Walter S. Gubelmann, executor, Oyster Bay, N.Y., assignor to Realty & Industrial Corporation, Morristown, N.J., a corporation of Delaware
Continuation of application Ser. No. 67,441, Nov. 4, 1960, which is a division of application Ser. No. 194,237, Nov. 6, 1950, now Patent No. 2,969,177, dated Jan. 24, 1961. This application Jan. 22, 1962, Ser. No. 168,596
82 Claims. (Cl. 235—63)

This invention relates to improvements in calculating machines, and dividing devices for deriving quotients.

The present application is a continuation of copending application, Serial No. 67,441, filed November 4, 1960, now abandoned, which in turn is a division of the parent application, Serial No. 194,273, filed November 6, 1950, by William S. Gubelmann for Partial Product Calculating Machine, now Patent No. 2,969,177 to which reference may be had for a complete disclosure of a calculating machine in which the present invention is embodied.

Heretofore, several different principles have been utilized for obtaining quotients automatically, including repeated subtraction and logarithmic conversions. By the subtraction principle, a quotient digit is obtained by successively subtracting the divisor preferably from the highest order of the dividend until an overdraft occurs. The overdraft is then corrected as well as the counter which is provided for accumulating the number of subtractions performed, and this corrected number is the quotient digit. By the logarithmic principle, a quotient digit is estimated by converting the highest orders of the dividend and of the divisor into logarithmic values, subtracting the divisor logarithmic value from that of the dividend and converting the remainder to its numerical value, the trial quotient value. Then this value is entered into multiplication with the divisor and the resulting product is subtracted from the dividend.

In the present invention, the method for deriving a quotient value is analogous with the well known mental procedure in "long division." Predetermined quotient values are provided, and selection of a value is made automatically in accordance with the highest orders of the dividend and the highest order of the divisor. This selected value is the trial quotient value which is then entered automatically into multiplication with the divisor, and the resulting product is subtracted from the dividend.

An object of the invention is to provide a novel and improved calculating machine in which there are a number of predetermined division elements with sensable surface portions for affording quotients and an extensible sensing element movable into sensing contact with said surface portions, the arrangement being such that the extent of travel by the sensing element is indicative of the quotient involved.

Another object of the invention is to provide a novel and improved calculating machine in which there are a number of predetermined division elements supported for movement together as a unit, each division element being formed with a series of differentially located sensable portions representing quotients, there being a sensing device movable into alignment with any one of the division elements and extensible into sensing contact with a sensable portion thereon, and including control means for regulating the movement of the sensing device into alignment with any determined division element.

Still another object of the invention is to provide a novel and improved dividing device for obtaining quotients, means being included for setting up a dividend, and cooperating structural elements for accomplishing division directly in a manner analogous to long division, so as to avoid resort to either repeated subtraction or logarithmic principles.

Still a further object of the invention is to provide a novel and improved calculating machine in which there is a quotient device including a number of individually different division plates all secured together and rotatably supported as an array on a shaft for movement together about its axis, so that by turning the unit from a rest position, any desired portion of any plate may be brought into a position for being sensed by an extensible sensing element movable into alignment with the desired plate and toward the surface portion of the plate from a neutral position, there being individual plates for representing each divisor and formed with distinct consecutively arranged stepped radially differential sensable peripheral surface portions, each surface portion having equiangular sectors equal in number to the divisor value of the plate, the sectors representing dividends and the surface portions each representing a different integer from zero to nine, each integer being the common quotient of the dividend value of each sector in the related respective surface portion divided by the divisor value of the related plate means.

Another object of the invention is to provide a calculating machine in which there is an assembly array of division plates each representing a different divisor and comprising predetermined quotient representing surface portions, said plates being supported for rotatable positioning, and including plate sensing device and means operable on depression of a divisor key on the keyboard of the machine, before any calculation operation is commenced, for automatically selecting the plate related to the depressed key by moving the plate sensing device into alignment with that plate, the sensing device normally occupying an intermediate neutral location, so that any necessary aligning movement of the sensing device is substantially reduced to a minimum, thus expediting the set-up of the machine for division operation.

A further object of the invention is to provide a novel and improved dividing machine in which there are representations of predetermined quotients, a multiorder dividend storage device, a multiorder divisor set-up device, selection mechanisms controlled by the two highest orders of the dividend storage device and the highest order of the divisor set-up device for selecting the quotient representation pertinent to the numerical values in the involved orders of the dividend and divisor, and including a multiplying device for automatically multiplying the entire divisor by the selected trial quotient and subtracting the product from the dividend in the storage device in each successive cycle of operations, somewhat similar to "long division" procedure.

Another object of the invention is to provide a novel dividing machine in which there is mechanism that selects each trial quotient digit from a number of predetermined quotient digits, then subtracts the product of the divisor and the selected trial quotient from the dividend and registers the resulting quotient digit.

A further object of the invention is to provide a dividing machine in which there is mechanism that selects each trial quotient digit from predetermined quotient digits, subtracts the product of the divisor and the seleceted trial quotient digit from the dividend, detects an overdraft whenever a said product is greater than the dividend, corrects the remainder and the incorrect trial quotient, and registers the correct quotient digit.

Still a further object of the invention is to provide a novel and improved dividing machine in which a different plate element is provided for each division digit one to nine inclusive with each plate element having sensale, differentially arranged representations for quotient digits zero to nine inclusive which result from dividing the respective divisor digit into dividends from zero to a number which is at least nine-fold the value of the divisor digit, there being also a sensing element which is movable into contact with any of the representations, the extent of sensing movement of the sensing element from an initial or rest position being indicative of the quotient value.

An object of the invention is to provide a novel and improved dividing machine in which a number of different plate elements are provided, one for each divisor digit one to nine inclusive, with each plate element having sensable, differentially arranged representations for quotient digits zero to nine inclusive, which result from dividing the respective divisor digit into dividends from zero to a number not exceeding the sum of nine added to the product of tenfold the respective divisor digit, the machine also including a sensing element movable into contact with any of said representations, the extent of movement from its initial position being indicative of the respective quotient value.

Another object of the invention is to provide a novel and improved dividing machine in which a number of rotatable plate elements are provided, one for each divisor digit one to nine inclusive, each plate element having sensable representations or peripheral surface portions for quotient digits zero to nine inclusive, which are the result of dividing the respective divisor digit into dividends from zero to a number not exceeding the sum of nine added to the product of tenfold the respective divisor digit, the representations being located differentially radially relative to the axis of its respective plate element for representing the quotients, and being arranged differentially angularly according to the involved dividend values, an ordinally shiftable multiorder dividend storage device, rotating mechanism controlled by the two highest orders to the dividend storage device associated therewith in successive cycles of operation for rotating the plate elements according to the value in the respective controlling orders to set up the related representation on each plate, and a sensing element movable selectively into alignment with the plate element corresponding to the value of the digit in the highest order of the divisor, said sensing element also being movable into contact with the set-up representation on the selected plate element, the extent of sensing contact movement being proportionally related to the trial quotient value resulting from the dividend and divisor values in the involved orders.

Still a further object of the invention is to provide a novel and improved calculating machine in which there are a number of predetermined sensable quotient representations, an ordinally shiftable multiorder dividend storage means, multiorder divisor set up means, selection mechanism controllable by the two highest orders of the storage device and the highest order of the set-up means for selecting and setting up the quotient representation pertinent to the values in the involved orders of the dividend and divisor, the machine also including a sensing element movable for sensing the selected set up representation, trial quotient set up means which is movable stepwise by said sensing means through as many steps as the value of the trial quotient, multiplying means controlled by said divisor set up means and said trail quotient set up means for multiplying the set-up divisor by the trial quotient and substracting the product from the dividend in the dividend storage means, escapement means comprising a normally operable first detent engaging said trial quotient set-up means for holding said trial quotient set-up means at any one of its position for values one to nine and a normally inoperable second detent engageable with said trial quotient set-up means, actuating means operable by the multiplying means subsequent to reduction of the dividend for actuating said first detent to release said trial quotient set-up means to return to its rest position, there being also overdraft sensing means operable responsive to an overdraft in said dividend storage means for rendering said second detent means operable together with said first detent means by said actuating means, said detents being so arranged that conjoint actuation thereof effects a single step return movement of said trial quotient means whereupon said multiplying means is conditioned to multiply the divisor by a trial quotient reduced by "1," subsequent correction of the dividend.

Another object of the invention is to provide a novel and improved quotient device in which there is a number of different division plates one for each divisor digit one to nine, said plates being juxtaposed axially along a shaft for being individually sensable, said plates being secured together and mounted on the shaft for rotation as a unit, each plate having ten sensable surface portions arranged differentially radially for representing integers zero to nine, each surface portion comprising equiangular sectors equal in number to the divisor value of the respective plate and representing dividends from zero to a number not exceeding the sum of nine added to the product of tenfold the divisor value of the respective plate, the integer value of a surface portion being the common quotient for the division of each of the respective sector values by the divisor value of the respective plate.

The above and other objects and advantages of the invention will be more readily understood upon reference to the following disclosure. It will be apparent, however, that those skilled in the art will be enabled to apply the teachings of this disclosure to various modifications as intended to be covered by the scope of the appended claims. The specification is directed to an exemplary embodiment of the invention illustrated in the accompanying drawings wherein:

FIGURE 5 is a fragmentary cross section view of the power train, showing principally the drive shaft, the dividing, carriage shifting and multiplying power units, and differentials for entraining the power units with the drive shaft;

FIGURE 6 is a fragmentary top view of a transverse frame member in FIGURE 3;

FIGURE 7 is a left side elevation of the division power unit governor as seen on plane 7—7 of FIGURE 5;

FIGURE 8 is a fragmentary perspective view of the locking mechanism for the divide keys, controlled by the carriage and highest order bank of factor keys;

FIGURE 9 is a fragmentary perspective view, illustrating the division power unit stop-start mechanism, part of the division conditioning mechanism and part of the carriage power unit, all in rest position;

FIGURE 10 is a fragmentary perspective view showing parts of the division conditioning mechanism, of the division power unit and of the shift and the multiplying initiating mechanisms, all in rest position;

FIGURE 11 is a fragmentary detail view of parts of the division conditioning mechanism of FIGURE 4 in operated position;

FIGURE 12 is a fragmentary detail view of parts of the division conditioning mechanism of FIGURE 4 in rest position;

Figure 1:
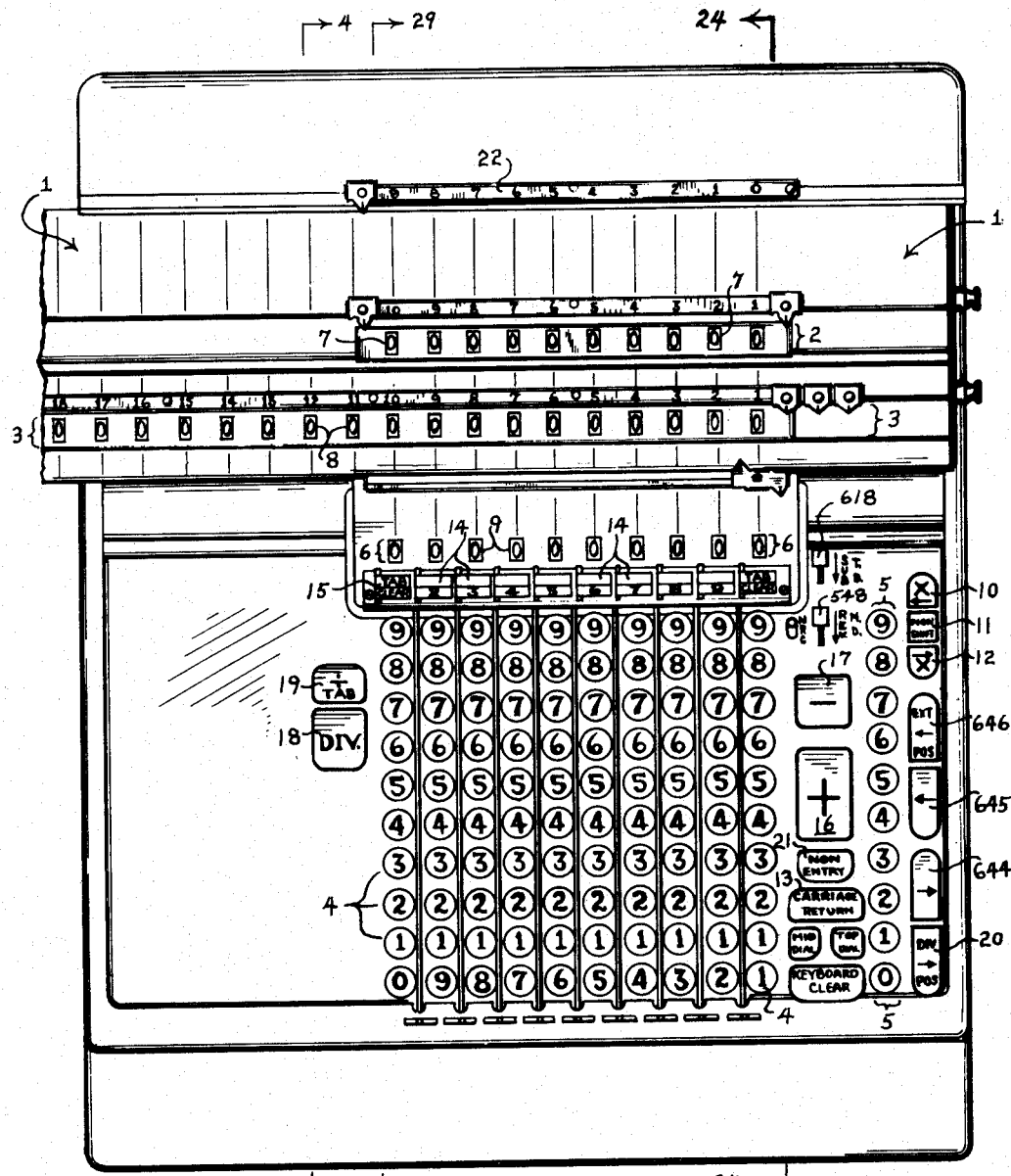
FIGURE 1 is a top face view of a calculating machine embodying the invention, the carriage being shown in fragment and in its leftmost position.
Figure 4:
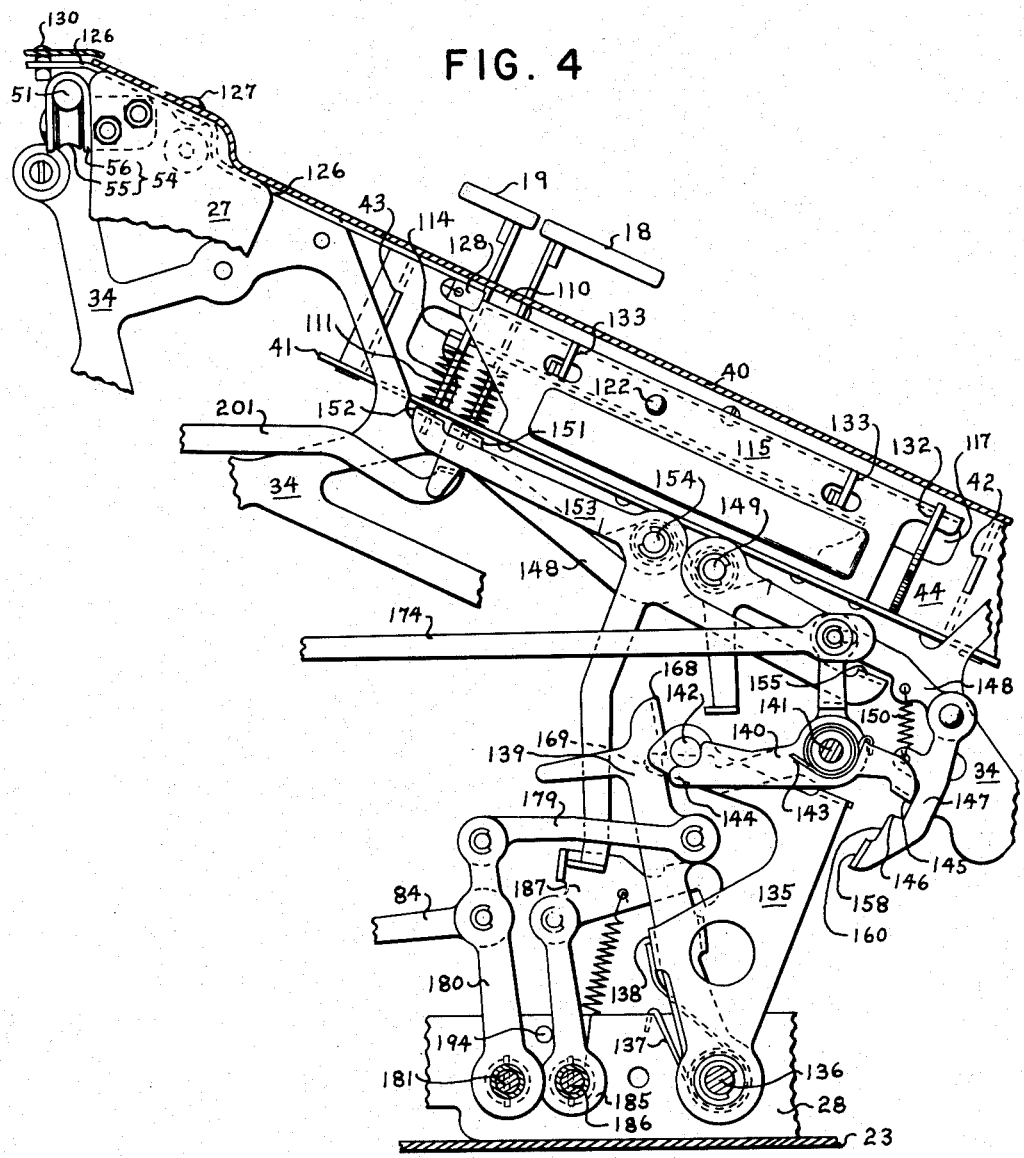
FIGURE 4 is a fragmentary left side elevation taken substantially on line 4—4 of FIGURE 1, showing principally one of the carriage mountings of FIGURE 3, keyboard frame members, divide keys and parts of the division conditioning mechanism in normal position, and omitting other parts for clarity.
Figure 16:
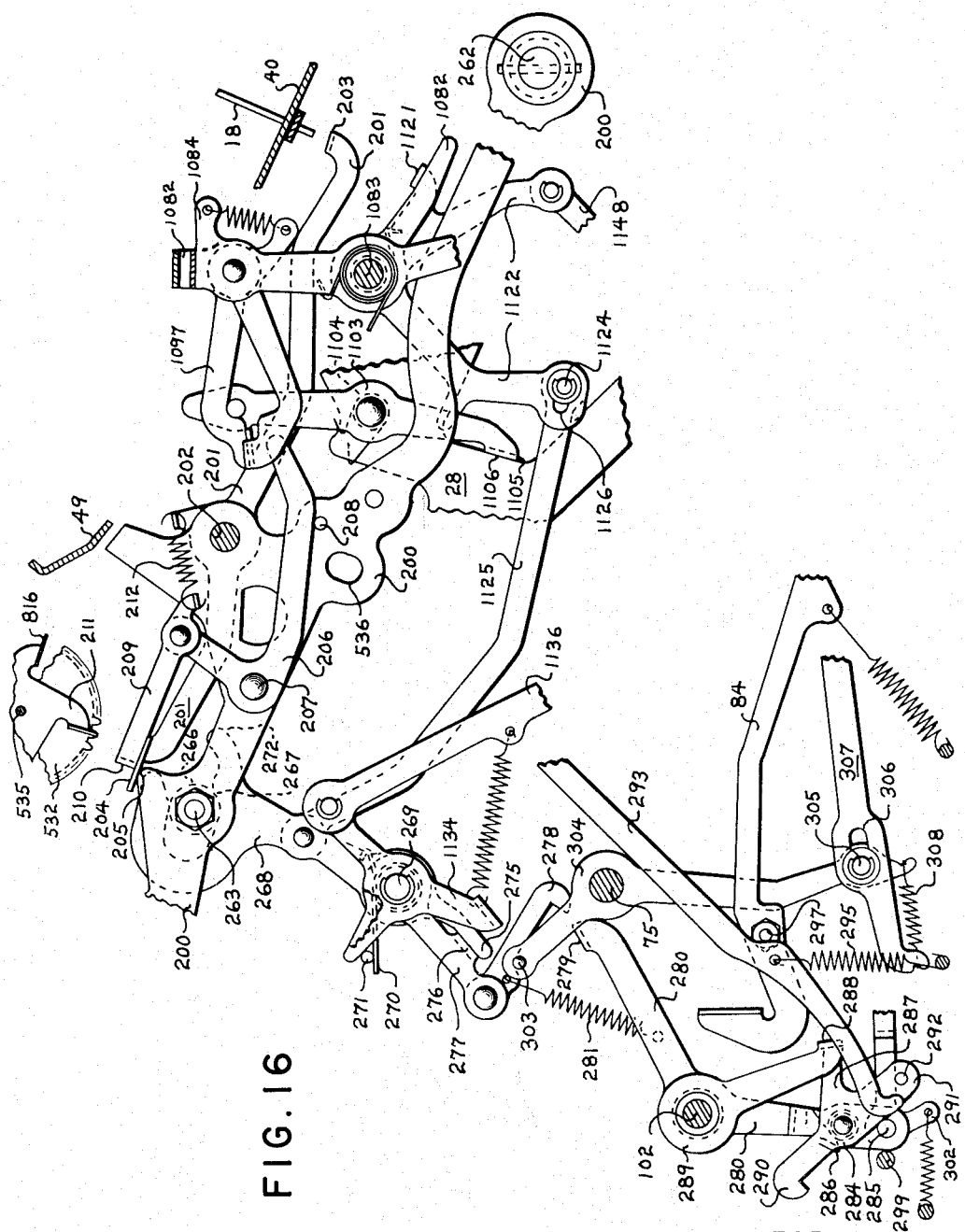
Figure 17:
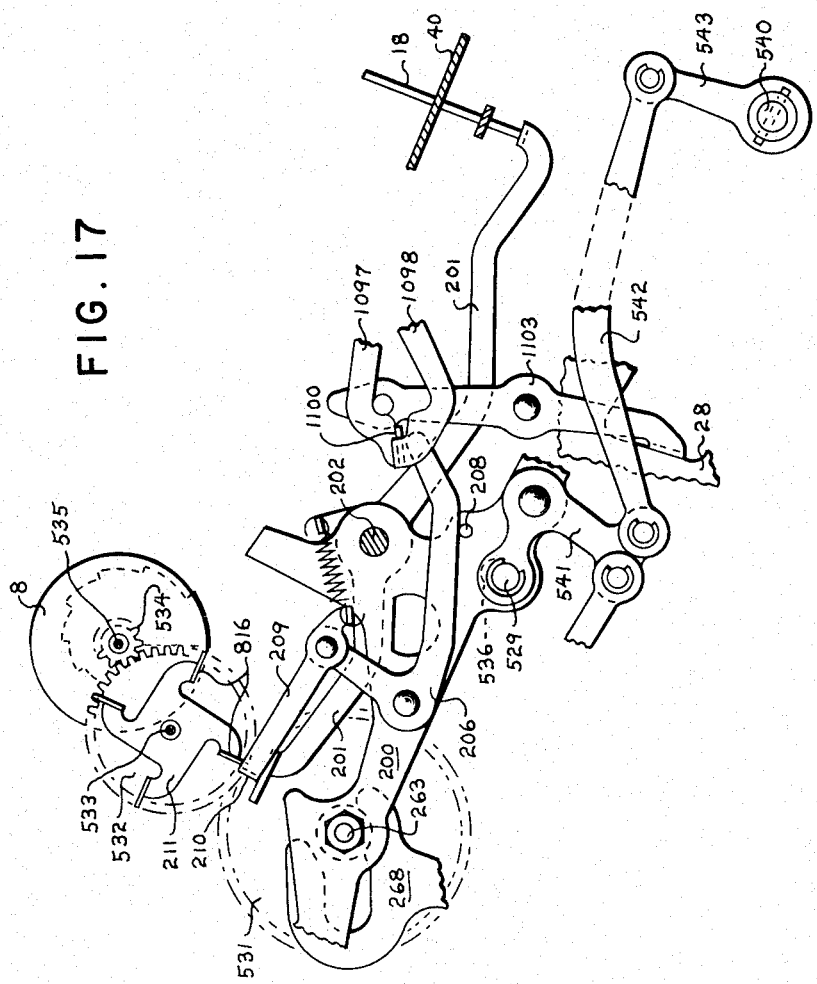
Figure 18:
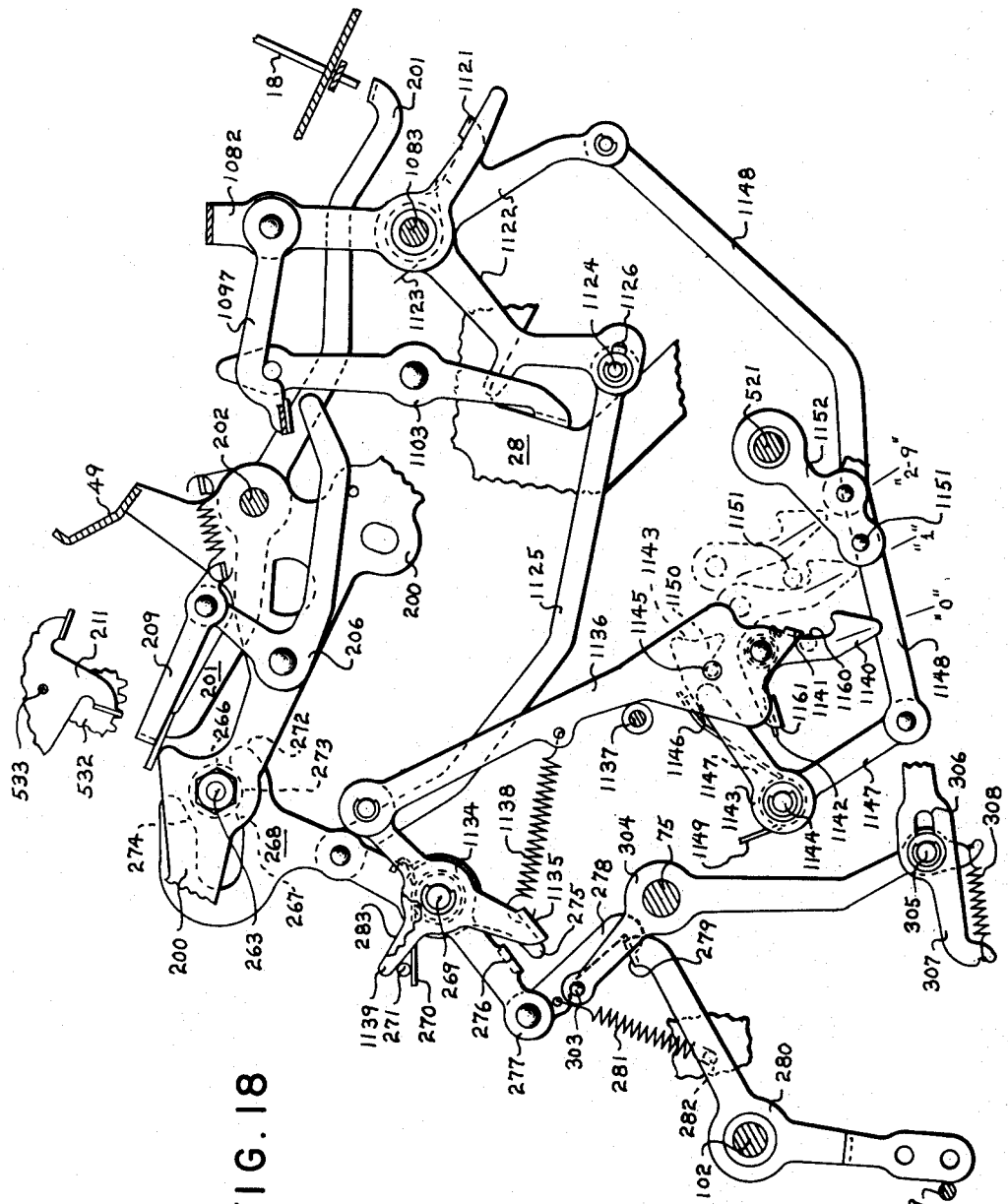
Figure 19:
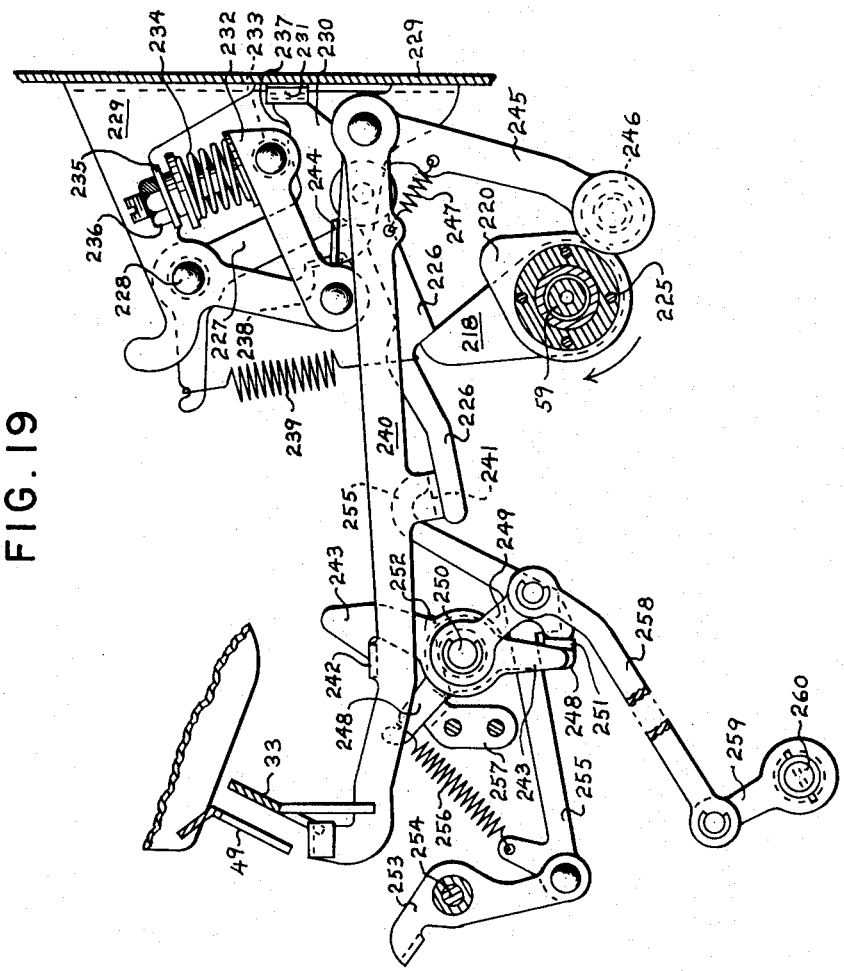
Figure 20:
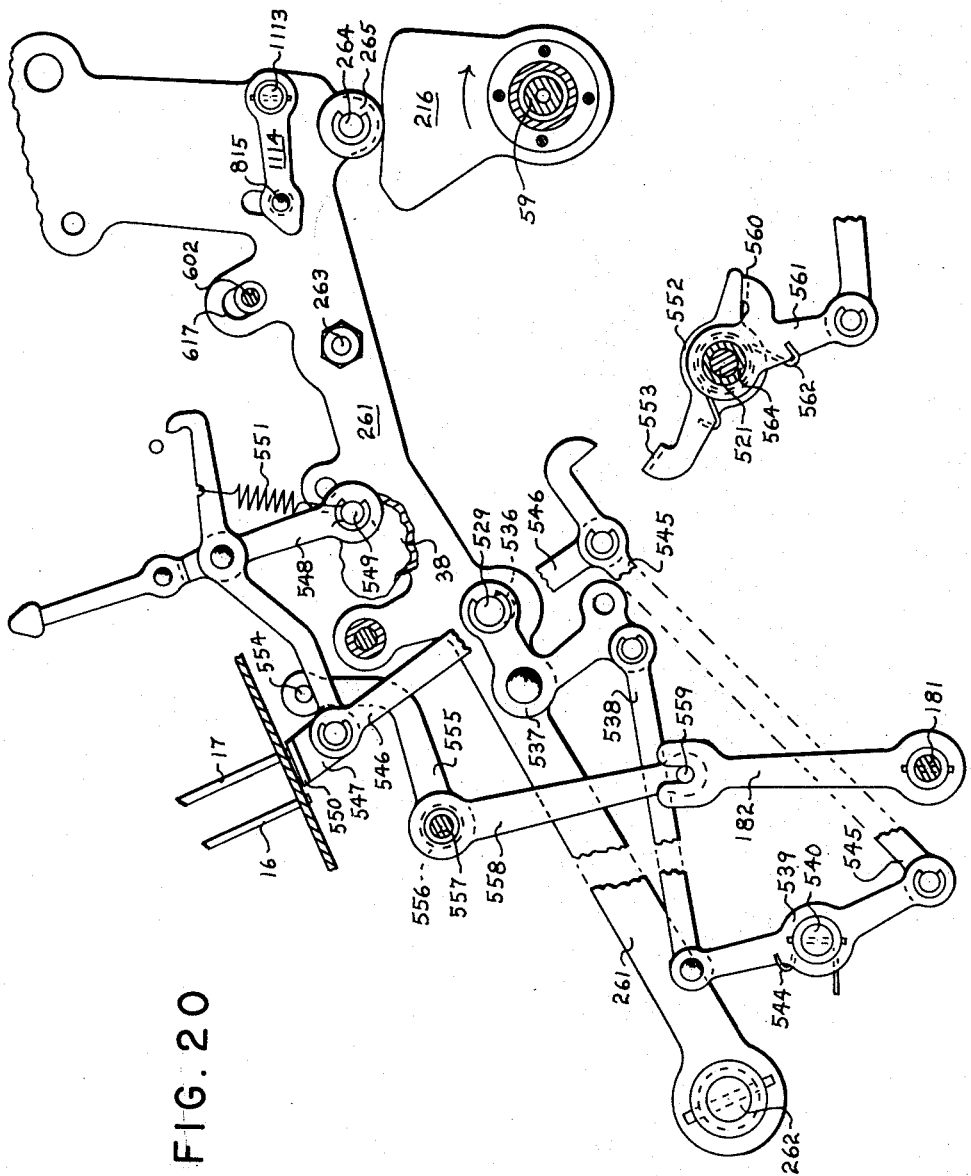
Figure 21:
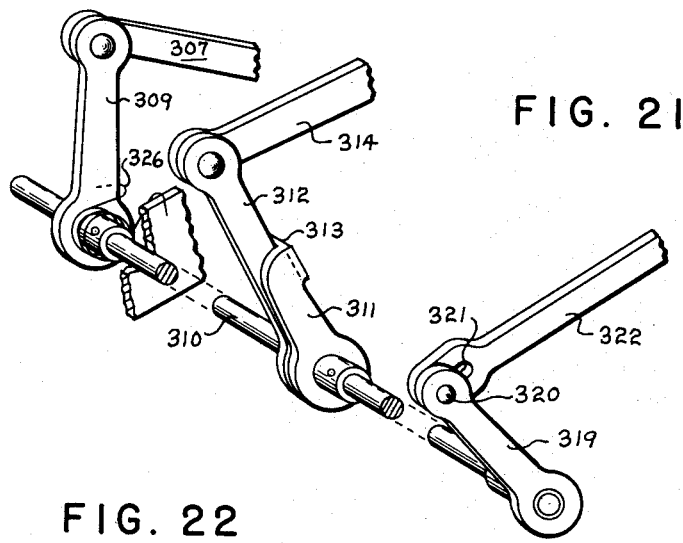
Figure 22:
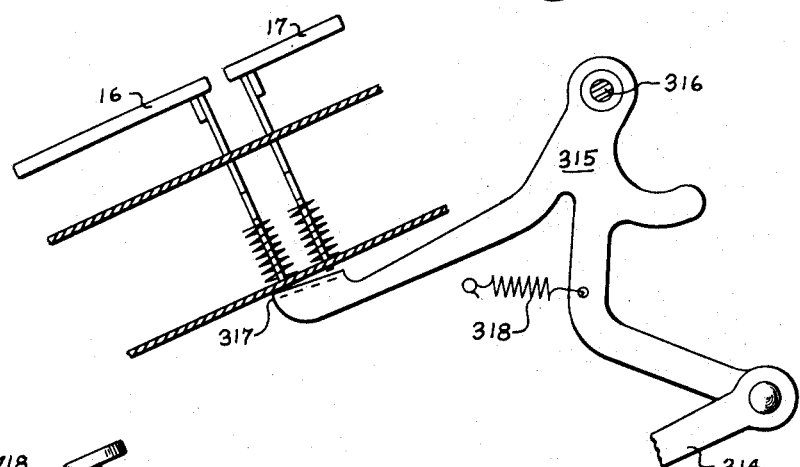
Figure 23:
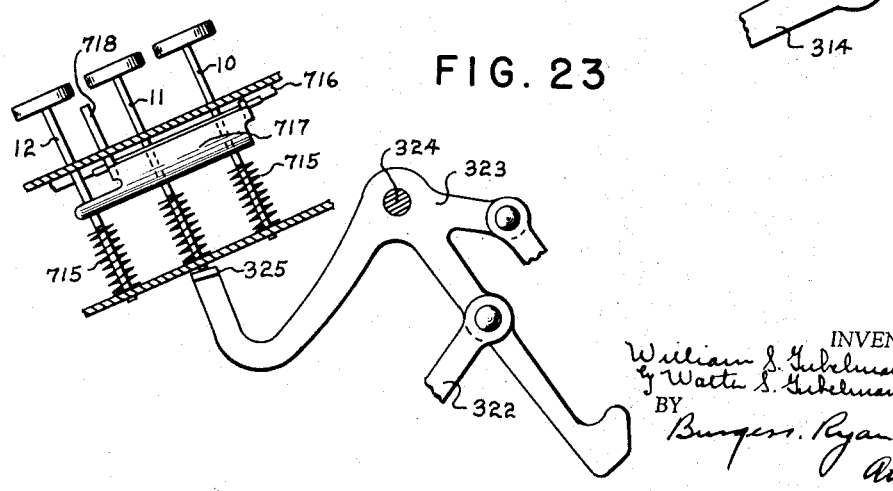
Figure 28:
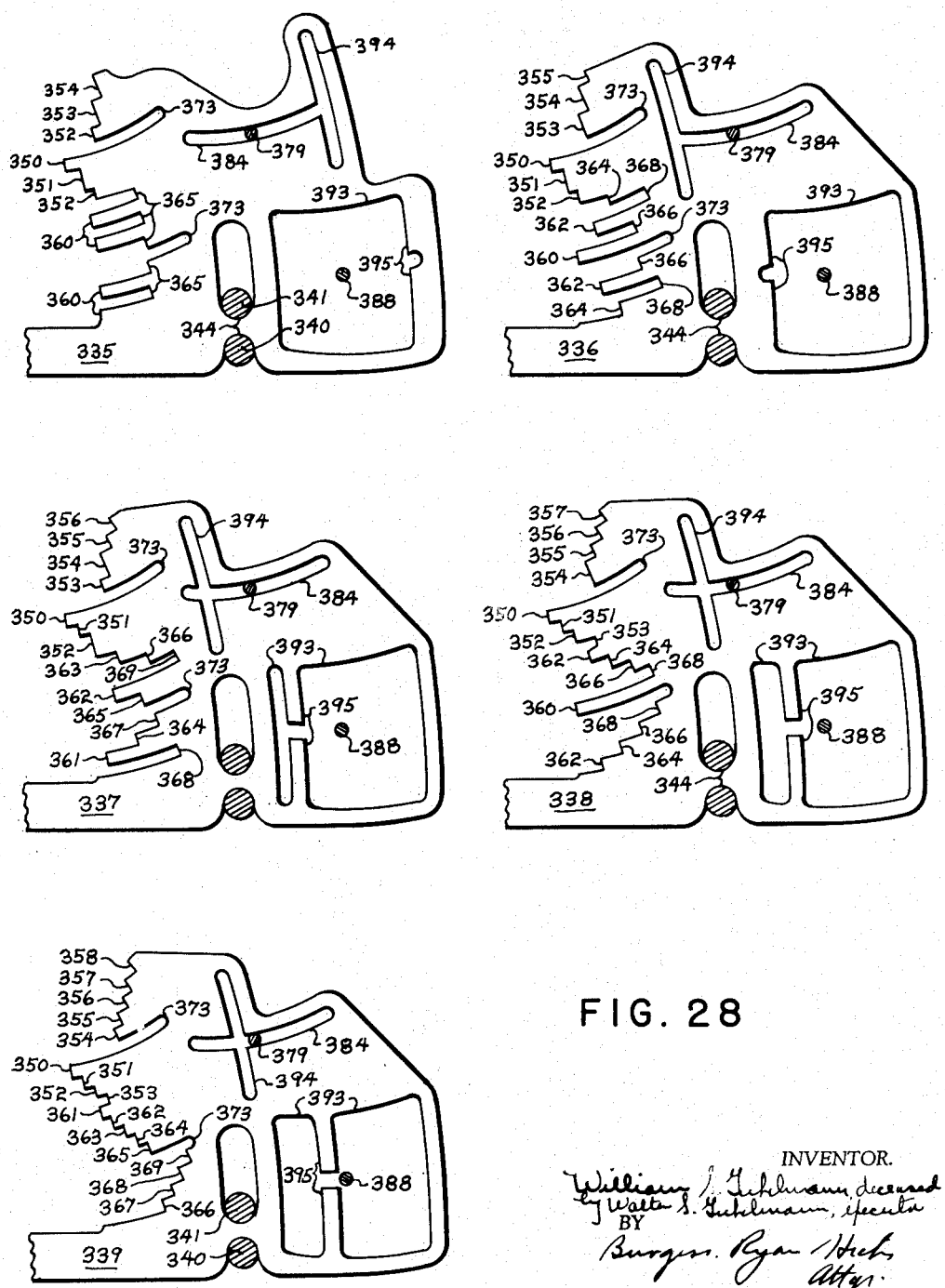
Figure 29:
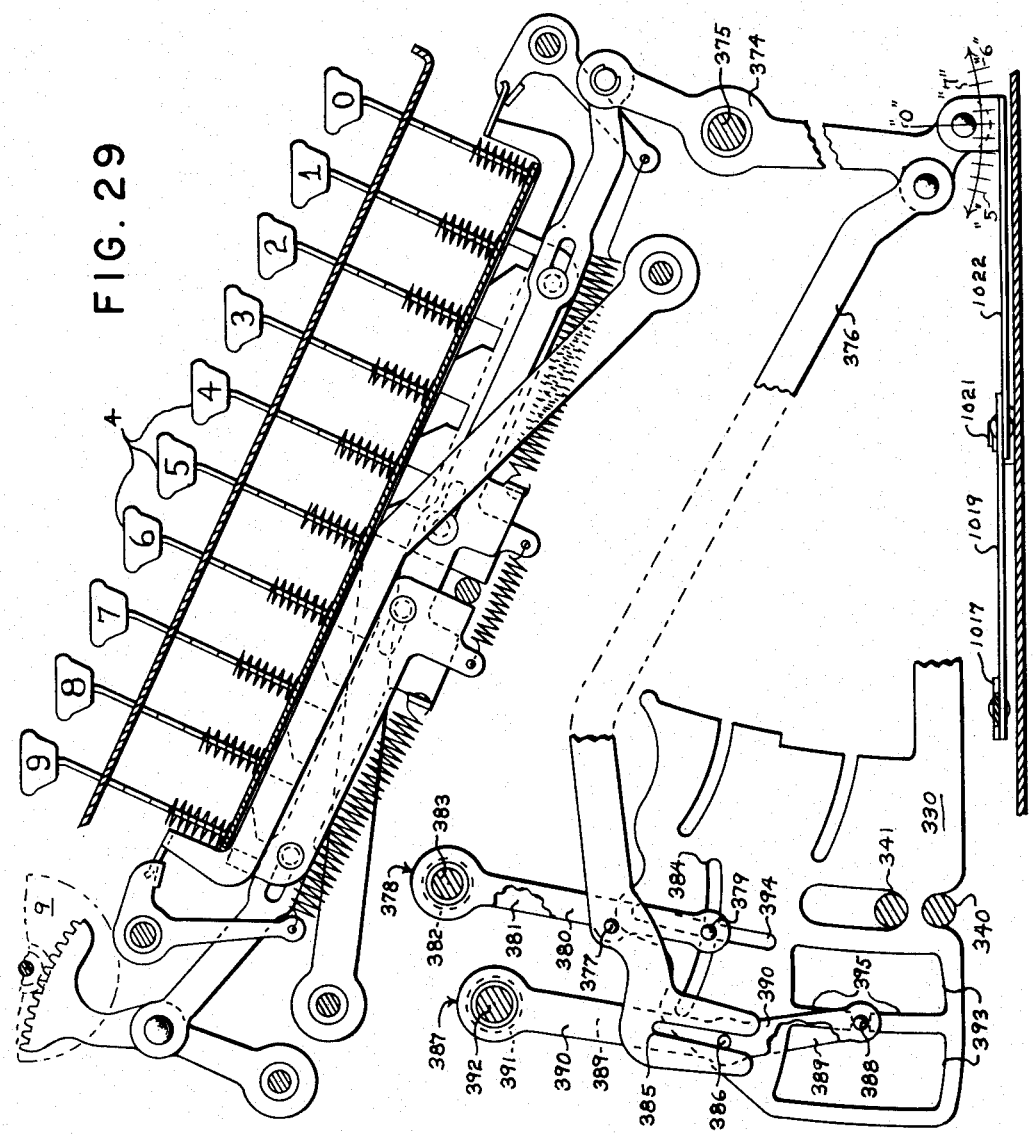
Figure 35:
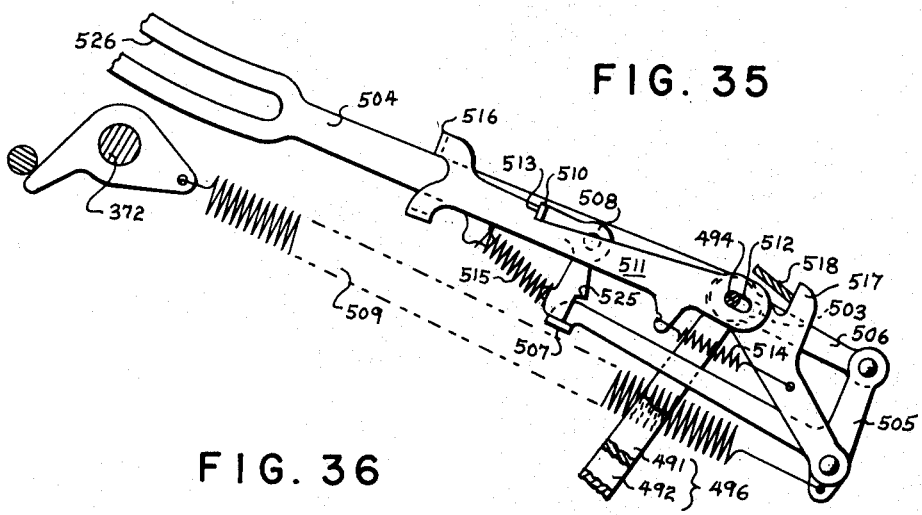
Figure 36:
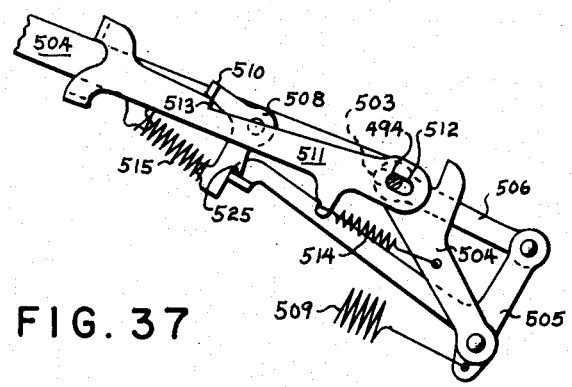
Figure 37:
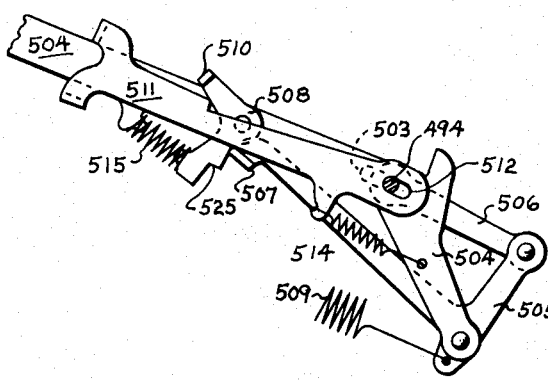
Figure 45:
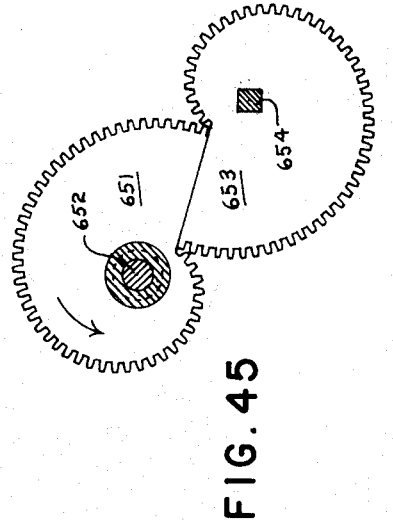
Figure 46:
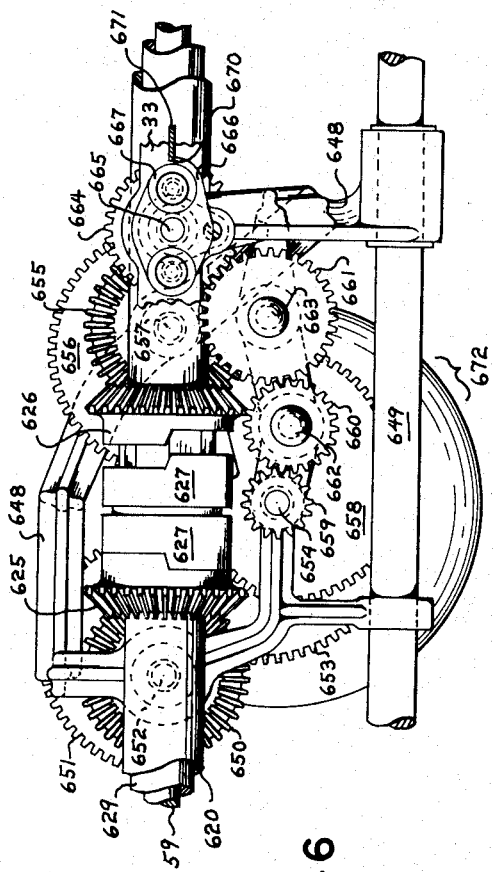
Figure 44:
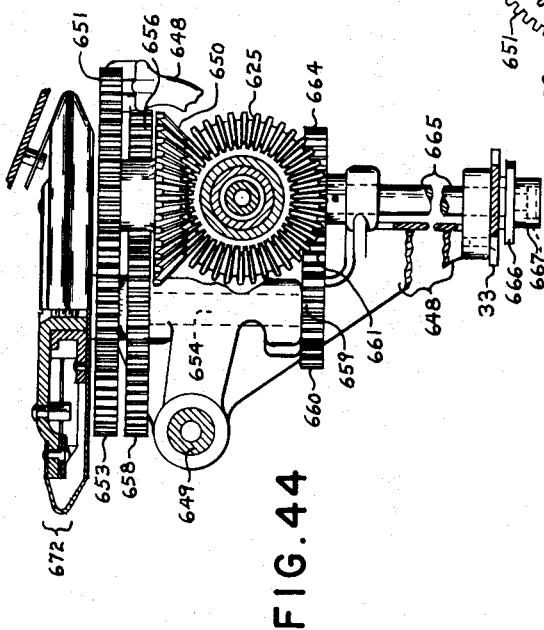
Figure 47:
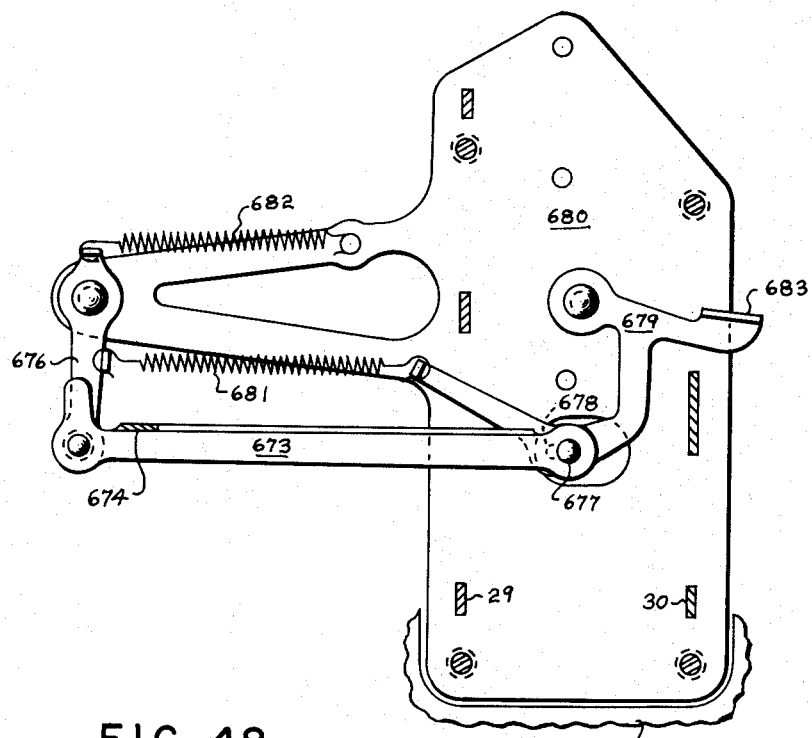
Figure 48:
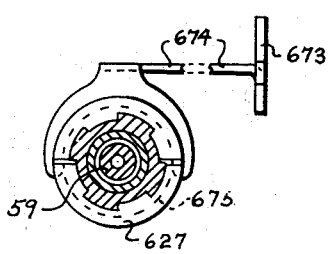
Figure 49:
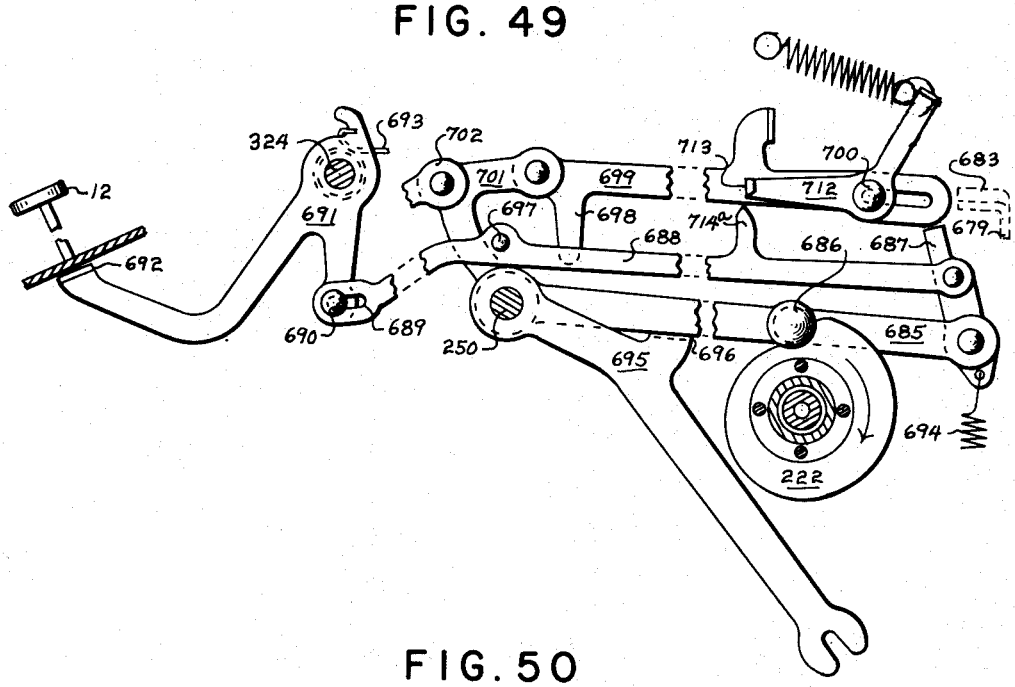
Figure 50:
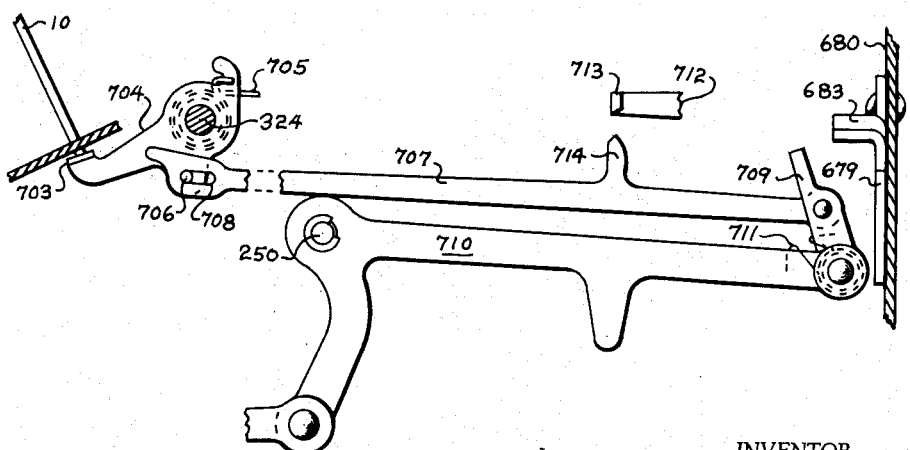
Figure 57:
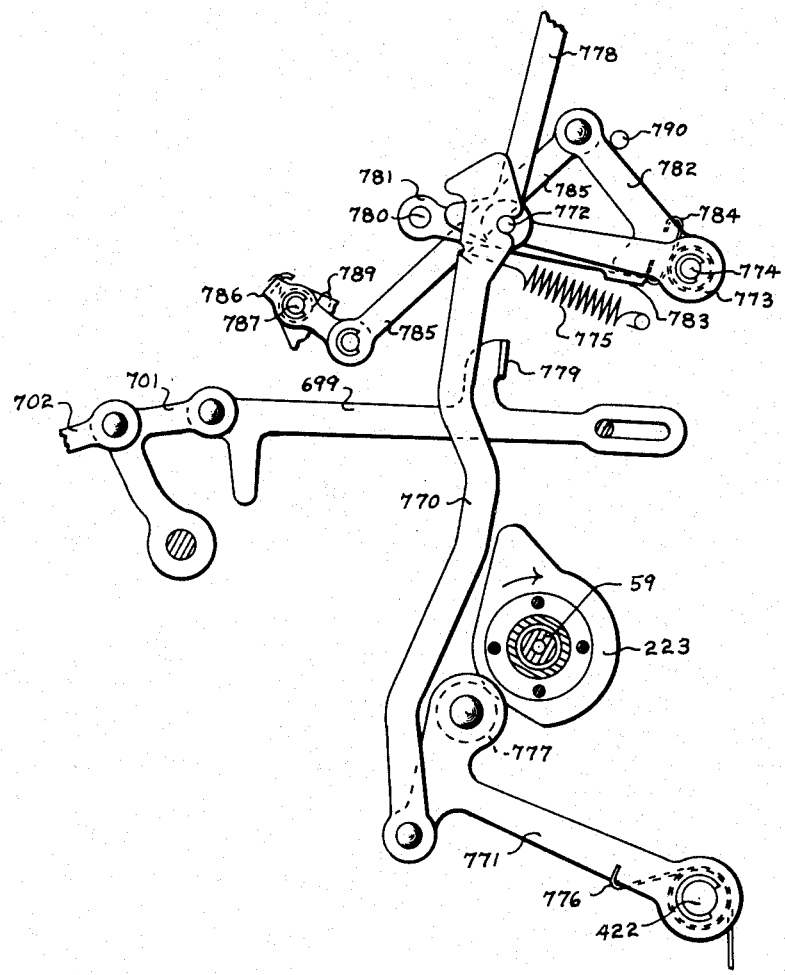
Figure 66:
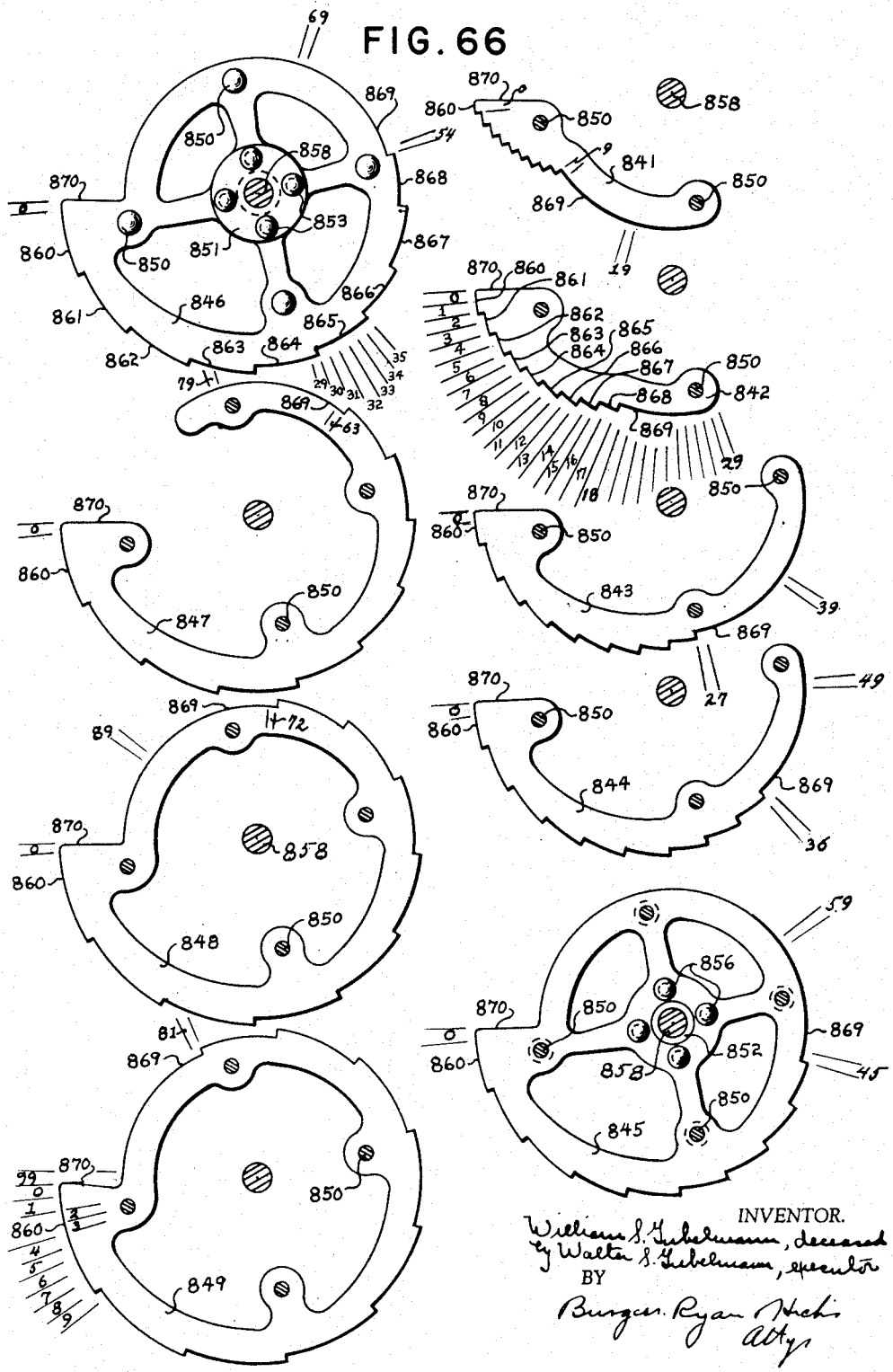
Figure 67:
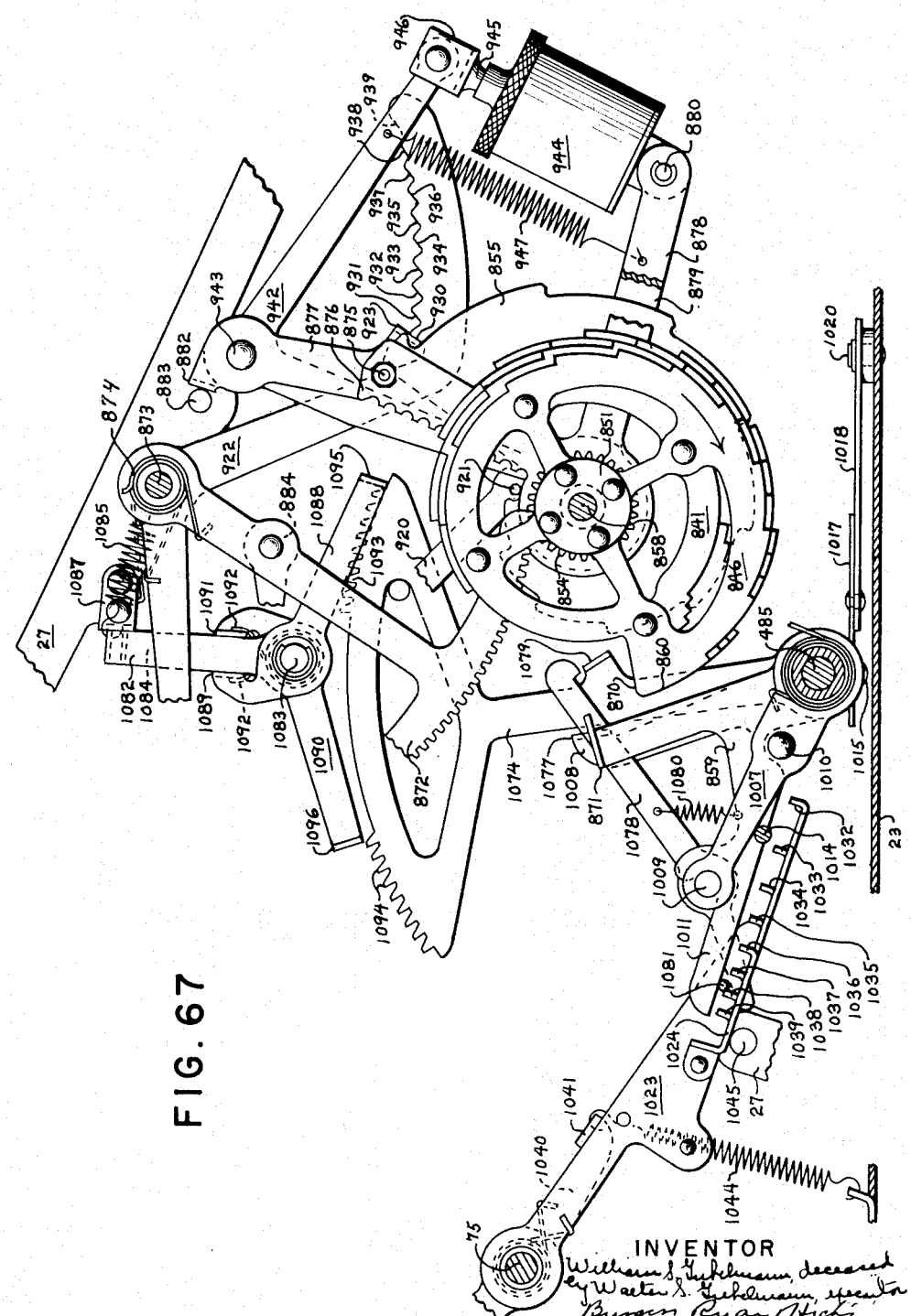
Figure 73:
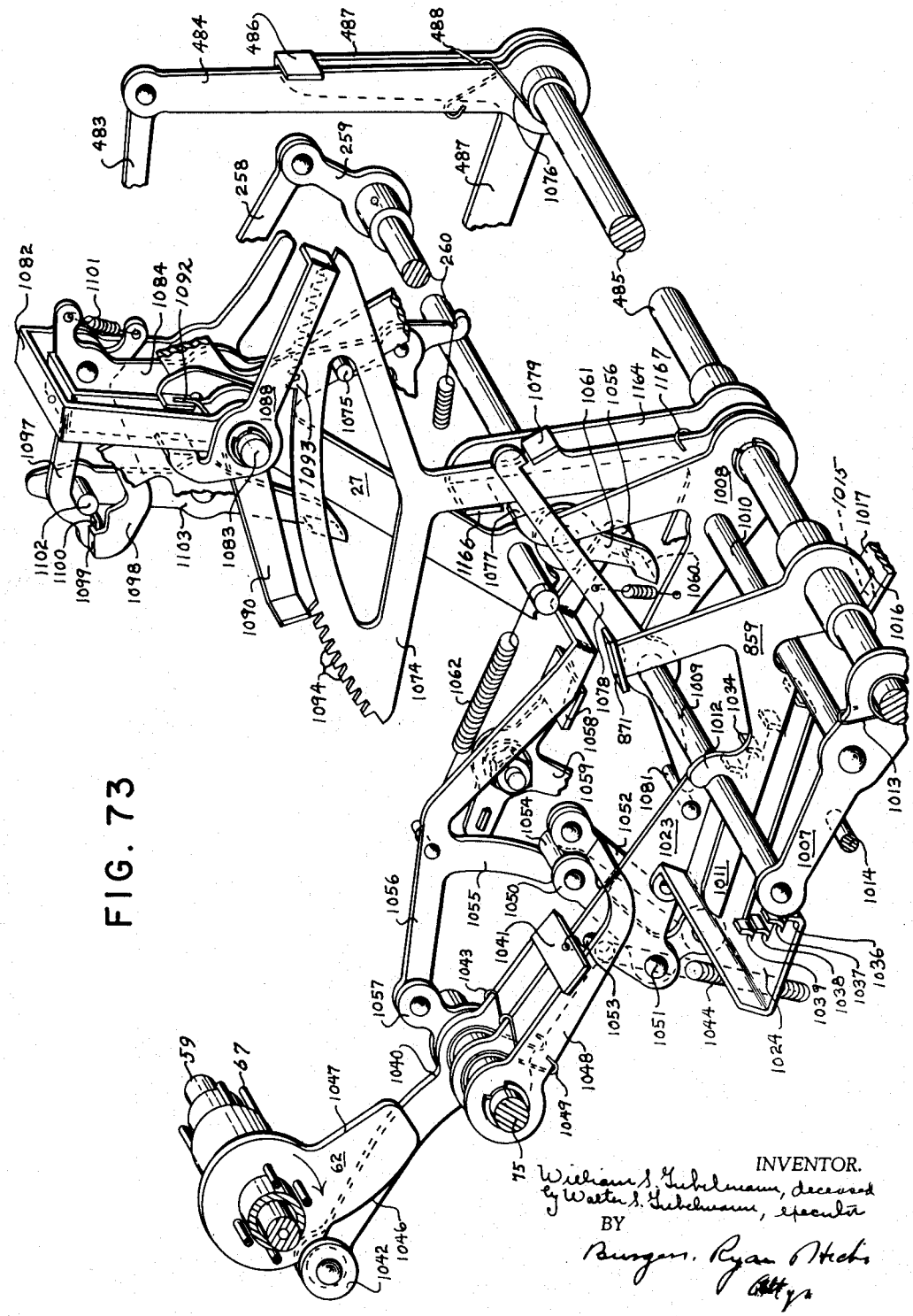
Figure 74:
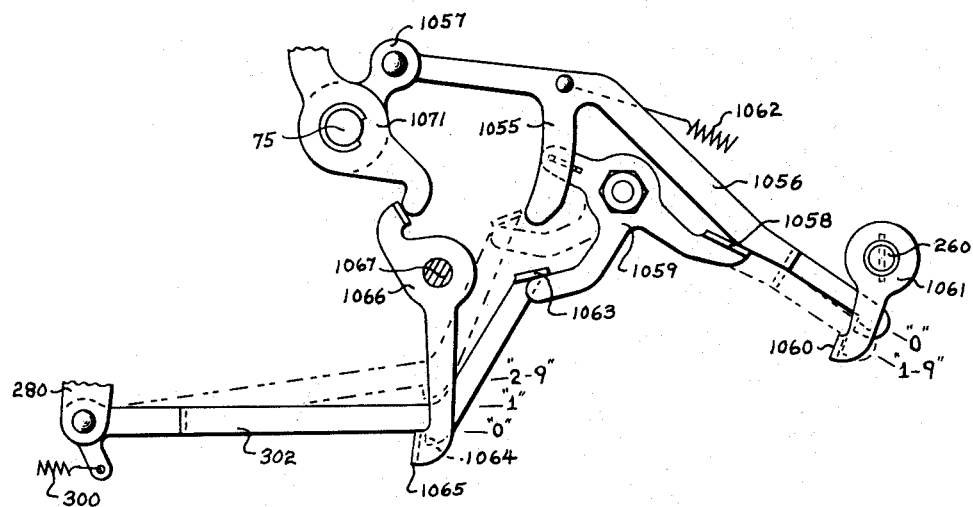
Figure 75:
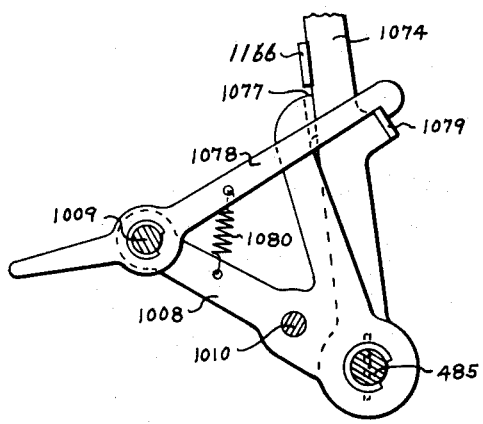
Figure 76:
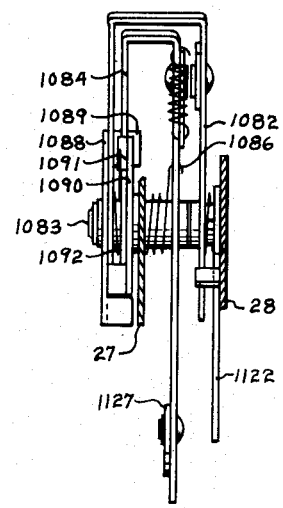
Figure 77:
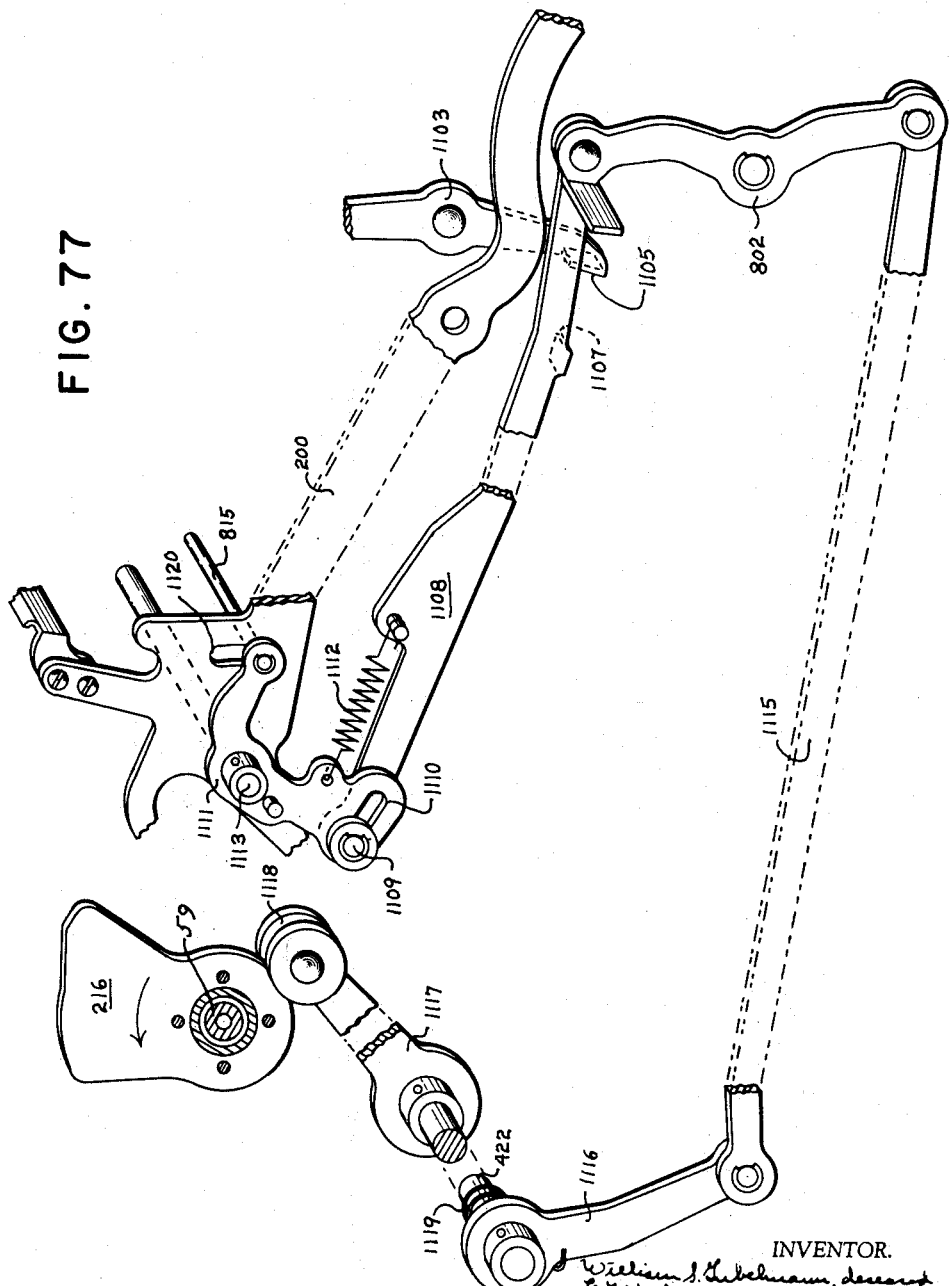
Figure 78:
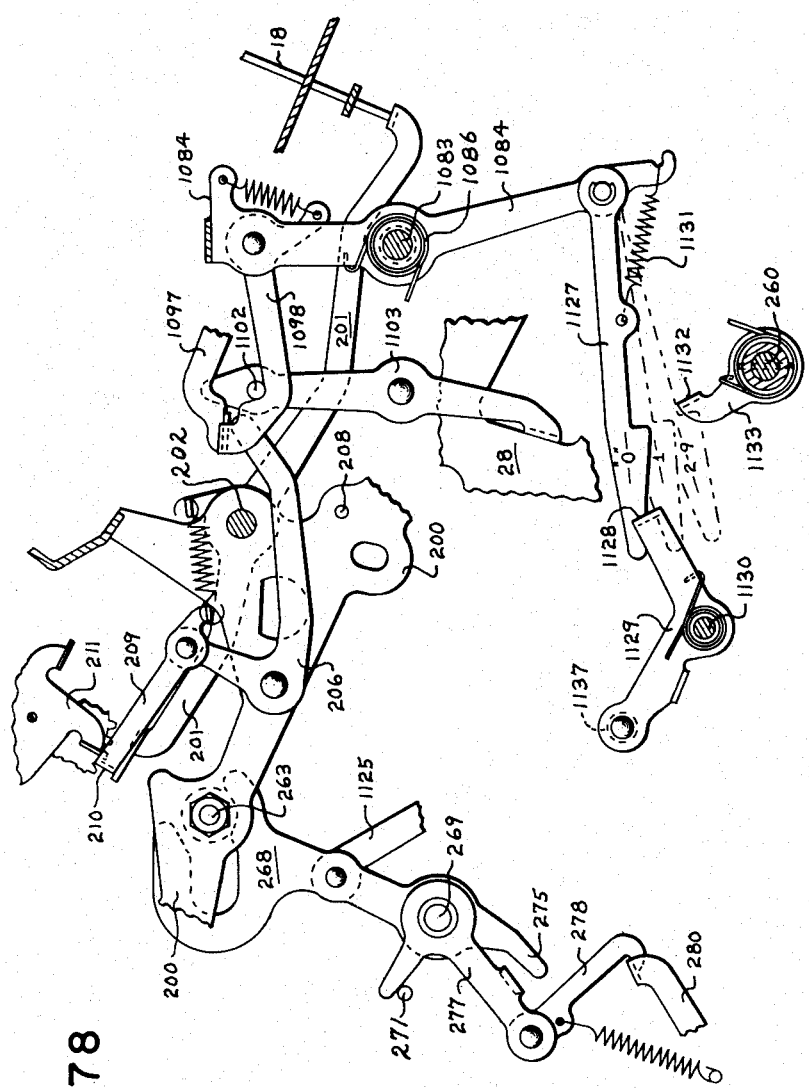
Figure 79:
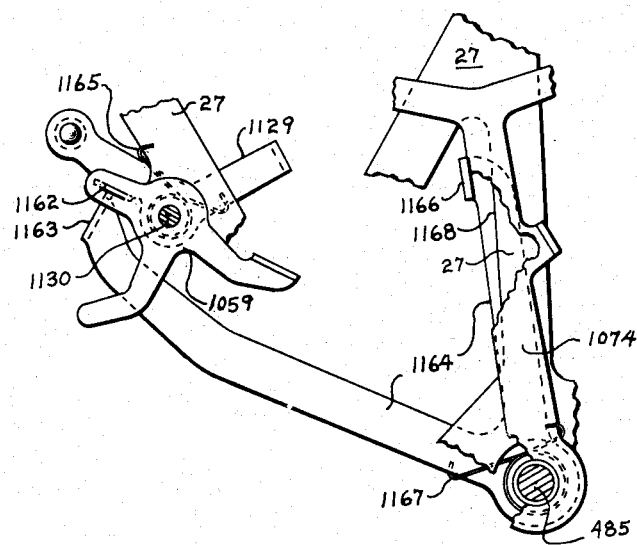
Figure 80:
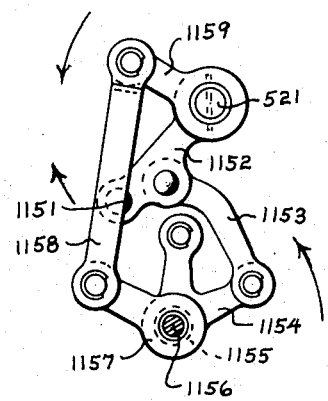

FIGURE 13 is a fragmentary left side elevation illustrating parts of the division conditioning mechanism of FIGURE 4 in operated position, parts of the manually operable mechanism for disabling automatic shift initiation in operated position but which is rendered ineffective by the division conditioning mechanism, parts of the automatic shift initiating mechanism of FIGURE 10 in normal position, and showing the division terminating mechanism in effective position;

FIGURE 13a is a fragmentary end face view showing parts of the division terminating mechanism illustrated in FIGURE 13;

FIGURE 14 is a fragmentary right side elevation of parts of the tabulating mechanism and of the division conditioning mechanism associated therewith;

FIGURE 15 is a fragmentary perspective of parts of the division conditioning mechanism in several sections of the machine;

FIGURE 16 is a fragmentary left side elevation showing part of the support device for the entry and carry mechanisms in rest position, the automatic shift initiating mechanism of FIGURE 13 disabled, parts of the shift disabling mechanism of FIGURE 13 in operated effective position, part of the division terminating mechanism of FIGURE 13 in ineffective position, part of the division conditioning mechanism of FIGURE 13 in rest position, and showing the overdraft sensing mechanism in rest position;

FIGURE 17 is a fragmentary left side elevation showing the support device of FIGURE 16 in elevated position and the overdraft sensing mechanism of FIGURE 16 in effective position in response to divide key operation;

FIGURE 18 is a fragmentary left side elevation illustrating the support device in elevated position as in FIGURE 17 but with the overdraft sensing mechanism in ineffective rest position, and showing actuating mechanisms effective during normal multiplying and at times during overdraft operations for the automatic shift initiating mechanism of FIGURE 13;

FIGURE 19 is a right side elevation of the multiplying power unit stop-start mechanism;

FIGURE 20 is a fragmentary right side elevation of a part of the support device for the entry and carry mechanisms, and of the control mechanism (all in rest position) operatable manually and by the division conditioning mechanism for rendering operable the mechanism for setting the product entry and carry mechanisms for subtractive operations;

FIGURE 21 is a fragmentary perspective view showing actuating members for the automatic shift disabling mechanism of FIGURE 13;

FIGURE 22 is a right side elevation showing one of the actuating members of FIGURE 21, which is responsive to operation of the add and subtract keys;

FIGURE 23 is a right side elevation of the left and right direction shift set up keys, of the non-shift set up key, and of the actuating member of FIGURE 21 responsive to the non-shift key;

FIGURE 24 is a fragmentary right side elevation taken generally on plane 24—24 of FIGURE 1, showing the group of ten multiplication elements, the product sensing mechanism and the entry mechanism, and omitting other parts for clarity;

FIGURE 25 is a fragmentary perspective view of the multiplier shaft bail, and of the rest position holding rods for the bail;

FIGURE 26 is a fragmentary perspective view of the positive stops for the holding rods of FIGURE 25;

FIGURE 27 is a fragmentary sectional elevation separately illustrating each of the multiplication elements in FIGURE 24 for multiplicand values 0 to 4 inclusive;

FIGURE 28 is a fragmentary sectional elevation separately illustrating each of the multiplication elements of FIGURE 24 for multiplicand values 5 to 9 inclusive;

FIGURE 29 is a fragmentary left side elevation taken generally on plane 29—29 of FIGURE 1 and showing the highest order bank of factor keys, the multiplication element selecting and blocking (for non-selected elements) mechanism, the 0 multiplication element, parts of the setting mechanism for the quotient device, and omitting other parts for clarity;

FIGURE 30 is a fragmentary perspective view showing parts of the actuator for the positive multiplier stop device;

FIGURE 31 is a fragmentary right side elevation showing the positive multiplier stop device, and the actuating mechanism for the multiplier shaft bail of FIGURE 29;

FIGURE 32 is a fragmentary right side elevation showing the set-up stop mechanism for the positive multiplier stop device, the set-up stop mechanism being responsive to multiplier key and quotient sensing mechanism actuation, and the change direction mechanism for the multiplier shaft bail actuator of FIGURE 31;

FIGURE 33 is a fragmentary perspective of the product sensing members of two adjacent orders, and of parts of the actuating mechanism for the entry and carry mechanisms;

FIGURE 34 is a fragmentary right side elevation of other parts of the actuating mechanism shown in FIGURE 33;

FIGURE 35 is a fragmentary left side elevation of the entry and carry mechanisms of an order in rest position;

FIGURE 36 is a fragmentary left side view of the entry and carry mechanisms of FIGURE 35 in operated position for a carry of "1";

FIGURE 37 is a fragmentary left side view of the entry and carry mechanisms of FIGURE 36 in operated position for the second carry of "1" in one cycle of operations;

FIGURE 38 is a fragmentary right side elevation of the actuating mechanism for the actuator of FIGURE 30 for the positive multiplier stop device, for the subtractive operations mechanism of FIGURE 20, and for the overdraft controlled automatic shift initiating actuating mechanism of FIGURE 18;

FIGURE 39 is a fragmentary right side elevation of the multiplier entry mechanism and of manually settable blocking device therefor;

FIGURE 40 is a fragmentary right side elevation of part of the multiplier entry mechanism and of the manually operable device for effecting subtractive entry of multipliers;

FIGURE 41 is a fragmentary view of the carriage shift feed bar and of the shift mechanism members cooperating therewith, the relation between the bar and the shift mechanism members being shown in full lines as when the carriage is in its leftmost position, and the phantom illustration of the shift mechanism members shown the relation of the bar to the members when the carriage is in its rightmost position;

FIGURE 42 is a perspective view of the carriage power unit stop-start mechanism;

FIGURE 43 is a right side view of manually operable device for effecting change of direction of carriage shift;

FIGURE 44 is a fragmentary left view of the carriage shifting mechanism;

FIGURE 45 is a face view of a pair of gears in FIGURE 44;

FIGURE 46 is a face view of the shifting mechanism in FIGURE 44;

FIGURE 47 is a fragmentary elevation of the change direction mechanism for the shift mechanism;

FIGURE 48 is a right view of a member of the shift mechanism shown in FIGURE 47, and of the change shift member in FIGURE 46 cooperating therewith:

FIGURE 49 is a fragmentary right elevation of manually and automatically operable set up mechanism for setting the change shift mechanism of FIGURE 47, and of the division conditioning mechanism member for disabling the set up mechanism;

FIGURE 50 is a fragmentary right elevation of another manually operable set up mechanism for setting the change shift mechanism of FIGURE 47;

FIGURE 51 is a fragmentary top view of the tabulation mechanism;

FIGURE 52 is a cross section view of the carriage borne compressible cylinder of FIGURE 51 in normal position;

FIGURE 53 is a cross section view of the cylinder of FIGURE 52 in compressed state;

FIGURE 54 is a right view of a bail member and of a stop therefor of the tabulation mechanism in FIGURE 51;

FIGURE 55 is a left elevation taken generally on plane 55—55 of FIGURE 51 showing the left extreme stop member, and the tabulation clear key, and omitting other parts for clarity;

FIGURE 56 is a left elevation taken generally on plane 56—56 of FIGURE 51, showing a tabulation key, the ordinal stop member associated therewith, and omitting other parts for clarity;

FIGURE 57 is a fragmentary right elevation showing actuating mechanism for the eliminated dividend sensing device;

FIGURE 58 is a perspective view of the eliminated dividend sensing device;

FIGURE 59 is a left side view of the eliminated dividend stop set up mechanism for one order of the product register;

FIGURE 60 is a left side view of one of the members of the mechanism shown in FIGURE 59;

FIGURE 61 is a left side view of the highest order eliminated dividend stop set up mechanism;

FIGURE 62 is a left side view of several members of the mechanism shown in FIGURE 59;

FIGURE 63 is a left side view of the lowest order eliminated dividend stop set up device;

FIGURE 64 is a fragmentary end face view of the quotient device;

FIGURE 65 is a perspective view of parts of the quotient device shown in FIGURE 64;

FIGURE 66 is a detail face view of nine division elements included in FIGURE 64;

FIGURE 67 is a fragmentary left elevation of the quotient device shown in FIGURE 64, of the settable dividend stops, of the quotient sensing mechanism, of the setting mechanism for the quotient sensing device, and of the quotient reducing mechanism;

FIGURE 68 is a fragmentary left side elevation of the actuating mechanism for the quotient device of FIGURE 67;

FIGURE 69 is a fragmentary perspective view of the dividend sensing mechanism and of the control mechanism set thereby for the quotient device;

FIGURE 70 is a fragmentary end face view of the dividend sensing mechanism of FIGURE 69, and showing the mounting thereof;

FIGURE 71 is a fragmentary top view of the setting mechanism, shown in part in FIGURES 29 and 67, for the quotient sensing device;

FIGURE 72 is a fragmentary end face view showing the actuating mechanism for the quotient sensing mechanism;

FIGURE 73 is a perspective view of the quotient sensing mechanism, of the actuating mechanism therefor, and of the quotient reducing mechanism;

FIGURE 74 is a fragmentary left side view illustrating parts of the shift and multiplying initiating actuating mechanisms, and of parts of quotient value influenced control mechanism therefor;

FIGURE 75 is a fragmentary left side view of a latching device of the quotient sensing mechanism;

FIGURE 76 is a fragmentary end face view showing the quotient reducing mechanism;

FIGURE 77 is a perspective view showing the actuating mechanism for the quotient reducing mechanism of FIGURE 67, and for eliminated dividend stop set-up mechanism of FIGS. 59, 61 and 63;

FIGURE 78 is a fragmentary left side elevation illustrating the overdraft sensing mechanism of FIGURE 17 in operated position, part of the quotient reducing mechanism of FIGURE 67 set thereby, and also showing the overdraft controlled multiplying initiating actuating device;

FIGURE 79 is a fragmentary left side elevation of the quotient value influenced control mechanism; and FIGURE 80 is a left side view of part of the actuating mechanism of FIGURE 38 for the overdraft controlled shift initiating actuating mechanism of FIGURE 18.

The specification is divided into the following fifteen general topics:
(1) General Description;
(2) Division Power Unit And Stop-Start Means;
(3) Divide Keys And Conditioning Mechanism;
(4) Multiplying Power Unit And Stop-Start Means;
(5) Automatic Shift Initiating Operations;
(6) Multiplying Mechanism And Division Control Thereof;
(7) Entry And Carry Mechanisms;
(8) Carriage Power Unit And Stop-Start Means;
(9) Carriage Traversing Mechanism;
(10) Tabulation;
(11) Termination Of Division Process;
(12) Quotient Device;
(13) Quotient Set Up Controls And Dividend Sensing Means;
(14) Divisor Controlled Quotient Sensing Means; Multiplication Or Carriage Shift Initiation;
(15) Normal Dividend Reduction And Overdraft Operations.

References in the specification to direction such as "forward," "rearward," "leftward," "rightward," etc., are with respect to the machine as viewed in FIG. 1 unless otherwise specified. The directions "downward," "depressed," "upward," "elevated," etc., are with respect to base plate 23, FIG. 4. Direction of turning about an axis is as viewed in the figure then of reference.

(1) GENERAL DESCRIPTION

The machine in which the present invention is embodied is disclosed in detail in the afore mentioned parent application, Serial No. 194,273, filed November 6, 1950, by William S. Gubelmann for Partial Product Calculating Machine, now Patent No. 2,969,177 to which reference may be had for a complete disclosure not otherwise repeated herein. A brief summary of the machine and its operations, however, is presented herewith in order to facilitate understanding of the invention and its interaction with various mechanisms of the machine.

The machine shown in FIG. 1 embodies predetermined partial product and quotient representations in a multiplying and a dividing mechanism respectively; a shiftable carriage 1 which carries accumulator registers 2 and 3; several banks of keys 4 for setting up factors in various arithmetical calculations; a bank of multiplier keys 5, each of which for values 1 to 9 serves to initiate a multiplying cycle of operations; initiating keys for addition, subtraction, division and carriage shift; a tabulating mechanism, and an automatically powered driving mechanism which includes three actuating units for motivating the multiplying, dividing and carriage shifting mechanisms. Hereinafter each actuating unit is referred to respectively as the multiplying, dividing and carriage power unit.

Results and factors of the various computations are indicated in ordinally disposed dials of registers 2, 3 and 6 as follows: Register 2, carried by the carriage, can indicate the multiplier, quotient, or the number of items in addition or subtraction as the case may be and, alternatively, the complement of any of the foregoing. Register 3, also carried by the carriage, can indicate the product, dividend, sum, difference, or such complements thereof as are desired. Stationary register 6 shows for easy reading a currently set-up factor on keys 4. Each register comprises ordinally disposed dials or number wheels as at 7, 8 and 9, the numerals of which are visible through suitable apertures on the respective overlying cover plates.

This machine, commonly known as a "four rules calculator," performs the arithmetical calculations of addition, subtraction, multiplication and division automatically. Multiplication is direct, as distinguished from repeated addition in that the machine multiplies in a manner closely analogous to the operational methods used in mental computations. The multiplying computing mechanism comprises plate means bearing representations of products for digits 0 to 9 multiplied by 1 to 9, and are provided for selection and setup respectively in accordance with the separate digits of the multiplicand and each multiplier digit. The partial products thus obtained are integrated into the final product. Depression of a key 4, value 1 to 9, in a bank selects the plate bearing products of that value times the digits 1 to 9. Each multiplier key 5 for values 1 to 9 serves as an initiatory control for effecting operation of the computing mechanism and exercises a control over the computing mechanism for setting up the multiplicand digit selected plates according to the value of the depressed multiplier key so that the pertinent partial product on each plate is at a sensing position. A cycle of multiplying operations also includes the operation of automatically initiating an ordinal shift of the carriage. Depression of the "0" value key 5 initiates an ordinal shift of the carriage without first having to excite the computing mechanism.

Selectively operable keys 10, 11 and 12 are provided for controlling the direction of shift and non-shift of the carriage, as for multiplication. With key 10 in depressed position, the automatic ordinal shift of the carriage will be leftward, but with key 12 in depressed position instead, the ordinal shift of the carriage will be rightward, as indicated by the arrows on these keys. In each instance the carriage will shift in the opposite direction to a preselected start position with the use of carriage return key 13. With the non-shift key 11 in depressed position the automatically operated shift initiating means is normally disabled.

The tabulating mechanism stops the carriage at an ordinal position by directly blocking operation of the carriage traversing mechanism. The tabulating mechanism is brought into operation automatically each time the carriage shifts to either end position. A similar operation of the tabulating mechanism will also occur at an intermediate ordinal position, as with the use of key 13, provided that preselection of that position is made by depression of an appropriate one of the tabulator keys 14, which are self lockable and are releasable upon depression of a "tab clear" key 15 at either end.

Addition and subtraction calculations are performed by automatically treating the factors thereof as multiplicands and multiplying the factors by "1." Add key 16 and subtract key 17 are in effect "1" value multiplier keys, but the cycles of operations instituted thereby preclude the operation of initiating a shift cycle. The product thus obtained of a subtrahend is registered subtractively by the dials of the register therefor. Selective means is also provided for effecting subtractive registration of other products.

Heretofore, quotients have been derived automatically by repeated subtraction and logarithmic principles. In this machine, division is accomplished directly by structural elements in a manner analogous to the method corresponding to the well known mental procedure in "long division." The mechanism used for a calculation in division includes representations on plate elements of predetermined quotient values for dividends from 0 to 99 divided by divisors 1 to 9, means for selecting a plate element and setting up the same respectively according to the divisor and dividend values, and means for deriving the trial quotient value from the involved representation. The dividing mechanism also makes use of the multiplying mechanism. This means that when a dividend has been set up in register 3 and a divisor has been set up in keys 4, upon actuation of either divide key 18 or 19 the machine automatically selects a quotient value in accordance with the highest order of the divisor and the highest order of the dividend in the first cycle of operations, and of the two highest orders of the dividend reminder in each successive cycle of operations. Each selected quotient value is the "trial quotient" value which is then entered automatically into multiplication with the divisor, and the resulting product is subtracted from the dividend in register 3.

Figure 2:
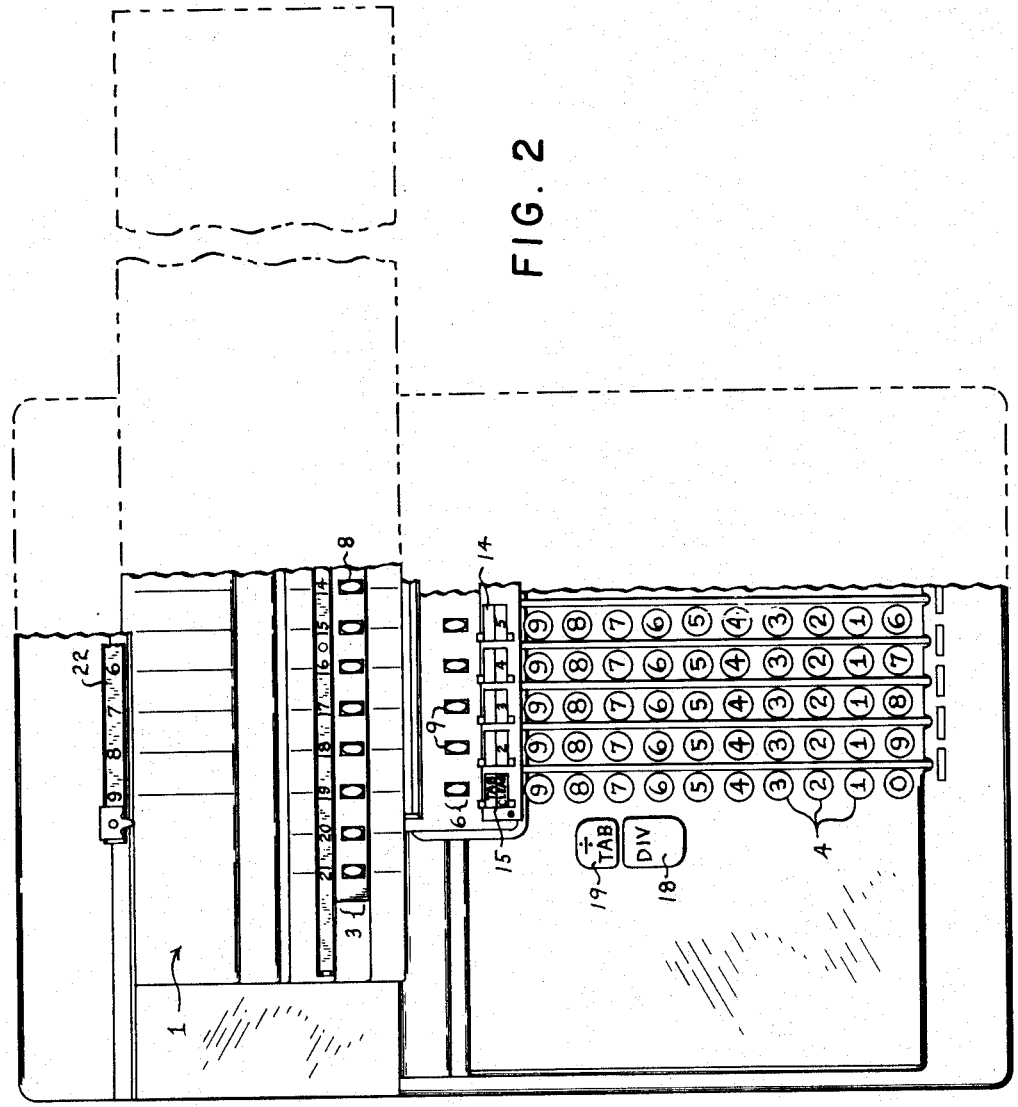
FIGURE 2 is a fragmentary top face view similar to that of FIGURE 1, but showing the carriage in its rightmost position.

Divide key 18 or 19 may be depressed only when the machine is properly set-up for a division computation. The machine is prepared for such a computation as follows:

The carriage is shifted to its rightmost position, as illustrated in FIG. 2, preferably by the depression of extreme shift key 20, FIG. 1. At this rightmost position of carriage 1, FIG. 2, the 19th dial 8 is then in alignment with the leftmost bank of keys 4 to receive a registration therefrom. The dividend is then set up in the multiplicand selecting mechanism by keys 4, preferably with the highest order of the dividend in the leftmost bank of keys 4. With the use of add key 16 (FIG. 1) the dividend is registered in register 3 with the highest order appearing in the 19th order dial 8, FIG. 2, the lower of the two highest order inboard dials. An inboard dial is one which is in engaging relation with the entry and carry mechanism of the main body of the machine. Non-entry key 21 (FIG. 1) is depressed simultaneously with add key 16 whereby registering of the item "1" in register 2 is blocked. The divisor is then set-up in the multiplicand selecting mechanism by keys 4, with the highest order real digit, i.e., a digit other than "0," in the leftmost bank. In addition to making a selection of relative partial products, the depressed key 4 in the leftmost bank also effects selection of quotient representations in the dividing mechanism relative to the value of that key.

Depression of either divide key is normally blocked by key lock means which are rendered ineffective only when both the carriage is in its rightmost position and a real digit key 4 is depressed in the leftmost bank. The key lock mechanism also includes, among others, means for holding a cycling key in operated position until the final phase of the operations instituted thereby are completed, and for preventing actuation of a cycling key while another cycling key is in operated position, and while any factor key 4 is partially depressed.

Operation of either divide key 18 or 19 excites a mechanism which conditions the machine (without upsetting current operational setups that may be incongruous with requirements for division) for subtractive entry of products and for sequential operations of the division, multiplying and carriage traversing mechanisms, the latter to shift the carriage leftward. The conditioning mechanism also initiates the first cycle of operations of the dividing mechanism for the division process. With the use of key 19, the conditioning mechanism also renders the tabulating mechanism effective to cause termination of the division process upon registration of a predetermined number of quotient digits. First, however, the tabulating mechanism must be set by depression of that tabulator key which corresponds with the number of digits desired. With the use of key 18, whether or not a tabulator key selection is made, or with the use of key 19 when a selection is not made, the tabulating mechanism will cause termination of the process only when the ordinal capacity of the machine is reached.

In algebraic division processes the problem is "solved" whenever the dividend is eliminated, i.e., reduced to "0." Sensing means, one for each inboard dial 8, are all movable together and movement is obstructed when a dial 8 is displaced from "0" position, indicating a remainder. Accordingly, turning of all the dials 8 to "0" position enables the sensing means to move, whereupon the sensing means effects termination of the division process automatically, there being no remainder and no reason for continuing the operations. Both the eliminated dividend sensing means and the tabulating mechanism motivate a mechanism which terminates the division process after the final true quotient digit is registered in register 2.

Selection of a trial quotient value is made from representations of quotient values provided for dividend numbers ranging from 0 to 99 divided by divisor digits 1 to 9, both inclusive. The trial quotient first obtained may be an "over-estimation." In that case the mechanism automatically reduces the trial quotient by "1" and makes one or more further attempts to obtain the true quotient. When the true quotient, a single digit, is so obtained, it is registered in register 2. Failures to obtain the true quotient are evidenced by an over-draft from the dividend, which is automatically cancelled out by adding back into register 3 the amount subtracted therefrom, i.e., the product or the divisor times the trial quotient which proved to be too large. In the majority of instances the trial quotient proves to be the true quotient. The need for repeating more than once the attempt to obtain the true quotient integer is relatively infrequent. "Underestimation," i.e., selection of a too small quotient integer, is not possible, due to the positive stop arrangements provided.

The preferred method of carrying out a cycle of operations in a division process in this machine is as follows: The value of the dividend digits in the two highest inboard orders of dials 8 of register 3, FIG. 2, the 20th and 19th dials, is sensed. In the initial cycle, the value in the 20th dial is 0, and in the 19th dial the value is that of the highest order integer of the dividend. In accordance with the sensed dividend value, the significant quotient value representation on the divisor selected plate element is set-up. Then the set-up quotient representation is sensed, and concurrently the multiplier controls in the computing mechanism are adjusted automatically for that trial quotient value. Next, a cycle of operations of the multiplying mechanism is instituted automatically, whereby the product of the divisor factor (the multiplicand) times the trial quotient digit (the multiplier) is subtracted from the dividend in register 3, and the trial quotient is registered in the first inboard order dial 7 of register 2, FIG. 1, the 10th or leftmost dial in the initial phase of the division process, at which time that dial is standing in alignment with the numeral "0" on the decimal marker channel 22.

When subtraction of the product does not result in an overdraft, as would be indicated on register 3, a cycle of operations is instituted automatically for shifting the carriage leftward one step. In the final phase of the shift cycle, operation of the diversion power unit is initiated again, this time automatically, except, however, when the carriage has been shifted to its leftmost position, or to a preselected ordinal position, or whenever the dividend has been eliminated, showing that a solution has been reached. In the event an overdraft occurs, the overdrafting amount and the too large quotient digit entries are withdrawn concurrently from the respective registers 3 and 2. At the same time the dividing mechanism automatically reduces the value of the too large quotient digit by "1" and adjusts the multiplier controls accordingly. The multiplying mechanism is then automatically caused to obtain the product of the divisor factor times the reduced trial quotient value and to reduce the dividend by that product. If the value of a set up trial quotient or of a reduced trial quotient is "0", a shift cycle of operations for shifting the carriage one step leftward is instituted automatically, instead of initiating operation of the multiplying power unit.

Means are also provided for selectively indicating a reference point such as a decimal between adjacent orders of registers 2 and 3 and of the banks of keys 4.

Figure 3:
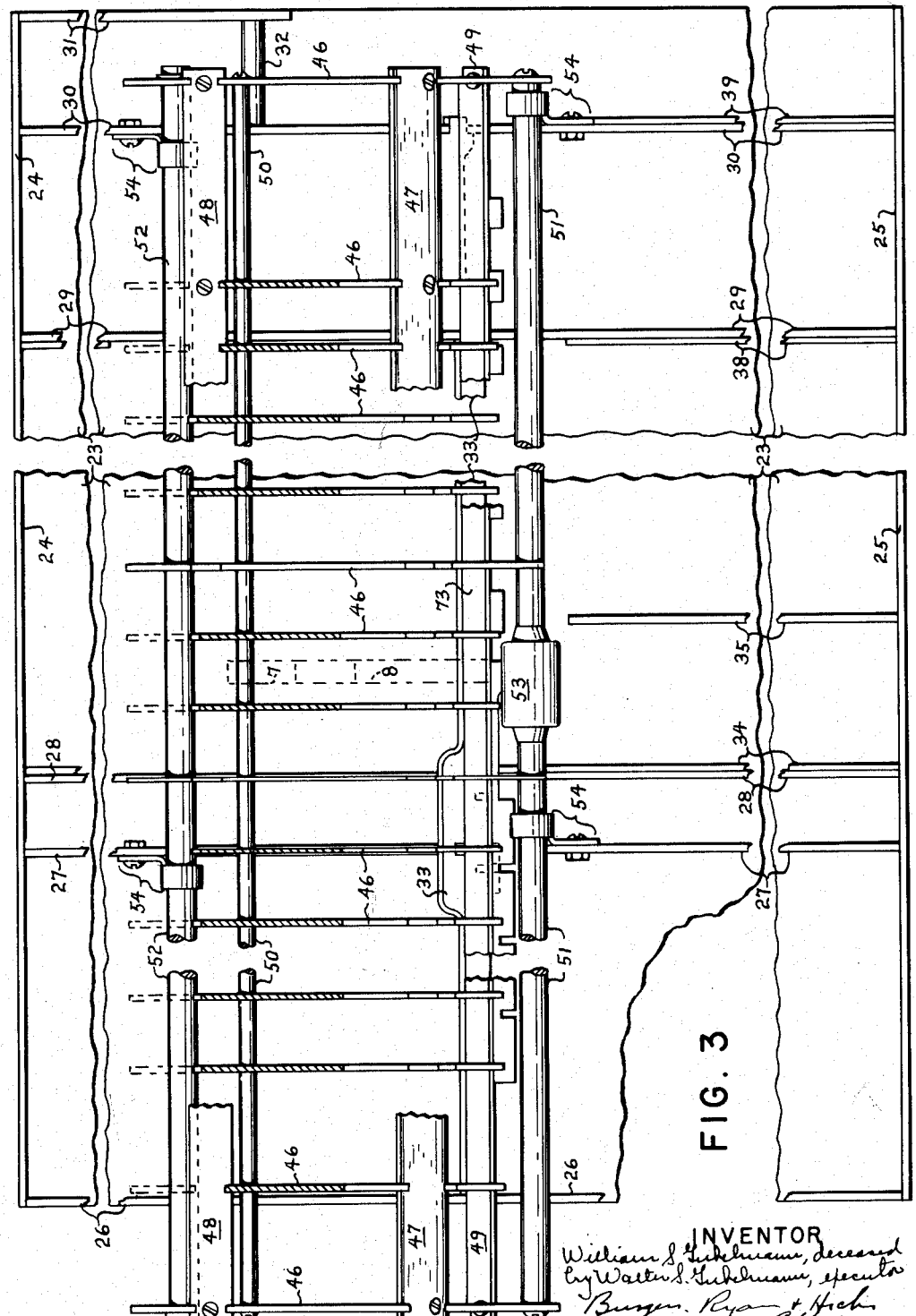
FIGURE 3 is a fragmentary top plan view showing principally frame members of the main body of the machine and of the carriage which is in its leftmost position, and showing the carriage mountings.

The main frame of the machine embodying the invention includes base plate 23 (FIG. 3) to which rear and front plates 24 and 25 are fastened respectively, and plates 26 to 30 inclusive, which extend parallelly between the front and rear plates 25 and 24 and are secured thereto and to base 23. The rightmost plate 31 is a short plate secured to the rear and base plates, and the upper forward end of plate 31 is secured to plate 30 by means of rod 32. A cross member 33 (FIG. 6) is secured to the upper faces of plates 26 to 30, inclusive, for making the frame structure more rigid.

Companion plates 34 to 39 inclusive (FIG. 3) are secured to each other in parallel planes as by shaft sections (not illustrated), the ends of which are formed for screwing one section to the other and for clamping the respective plate therebetween. The unit thus formed is fastened removably to plates 28 and 30 as by bolts which are not shown. This unit supports mechanisms operated by various keys. Another frame unit, which supports the keys and the locking mechanisms therefor, is formed of the following plates: top 40, FIG. 4, bottom 41, front 42, rear 43, and suitable similar side plates 44 and 45 of which only plate 44 is shown. This key board unit may be removably secured to plate 34 and to companion plates 26 (FIG. 3) and 39 in any well known manner.

In this exemplary embodiment, the carriage is formed of 25 vertical frame plates 46 which are secured at spaced points to transverse frame members 47 and 48 and to feed bar 49. Further rigidity is added to the carriage frame by rods 50, 51 and 52 which are secured to several of the plates 46, including the end plates. Generally, vertical plates 46 form ordinal compartments for supporting the 21 dials 8 of the product register and the 10 dials 7 of the multiplier register. In addition to the register mechanisms, each including a dial and several gears in each order, the carriage also carries components of an add-subtract control for register 3, components of clearing and main carry mechanisms, and the carry mechanism for those orders of the product register that may be outboard, i.e., not engageable by the entry and carry mechanism of the main body. Rod 51 has secured thereto a compressible cylinder 53 which actuates the tabulating mechanism at a preselected ordinal position and at each end position. Rods 51 and 52 are also utilized as rails by which the carriage is shiftably supported on four anti-frictional means 54 of which one pair is supported on frame member 27 and the other pair on frame member 30. Each means 54 (FIG. 4) includes a roller 55 rotatably mounted on a bracket 56 which is secured to the frame member. The rails ride on the rollers, and the brackets are formed to embrace the respective rails so as to prevent random removal of the carriage. In the illustration, frame member 27 and rail 51 are shown.

(2) DIVISION POWER UNIT AND STOP-START MEANS

Division power unit 57 (FIG. 5) is formed as follows: A sleeve 58 is rotatably mounted on drive shaft 59, with cam 60 and gear 61 secured respectively to the left and right ends of the sleeve for rotation therewith. Cams 62, 63 and 64 and arrester unit 65 are supported on the sleeve and are suitably spaced axially between cam 60 and gear 61 by annular spacers 66. The cams, spacers, arrester unit and drive gear 61 are secured together as a unit by rod means 67.

Gear 61 may be entrained with any suitable motor means for rotating power unit 57. In one preferred form, as described in the parent application, the motor means represented by 68 is of a type which exerts rotative drive forces at all times on shaft 59. Motor means 68 is entrained with gear 69 which is secured to shaft 59 journaled on the machine frame. The carriage and multiplying power units, 70 and 71, as will be described, are also mounted rotatably on shaft 59, and for driving power units 57, 70 and 71, two differential means 72 and 73 are provided. Differential 72, between division unit 57 and carriage unit 70, is secured to shaft 59 for rotation therewith and is meshed with gear 61, and is sleeve and gear connected with differential means 73 for driving differential 73 and/or the division power unit 57. Differential means 73 is meshed with suitable drive gears of the multiplying and carriage power units for driving one and/or the other.

A stop-start means, as will be described, responsive to manual and automatic control means, is provided for each power unit for initiating and stopping operation of its respective unit. The main operating mechanism is of the type that when all the power units are arrested, motor means 68 and shaft 59 are thereby also arrested, and that upon initiation actuation of any one of said stop-start means for liberation of the related drive unit, the shaft and the motor means are thereupon free to operate for turning the liberated unit. While one power unit is operating, another power unit may also be operated, as when the machine is cycled for division. At such times, during the latter phase of the operation of one power unit, operation of another power unit is started automaticlly for the ensuing appropriate steps of operation, until a solution is reached. In a 360-degree revolution, the cams of division power unit 57 actuate the dividing mechanism for the performance of a single quotient digit computation. Through its gear 61, division power unit 57 is rotated clockwise, as when viewing its arrester unit 65 in FIG. 9. Rotation of the power unit is prevented by its stop-start unit 65 being held by arrester lever 74 pivoted on shaft 75 which is fixed on the machine frame.

Unit 65 is formed of two coaxial members, 76 and 77. Member 76 is secured to the power unit by rods 67. Member 77, rockable relative member 76, is formed with a suitable clearance hole (as seen in FIG. 5) for clearing the rods 67 and with lost motion slots 78 (FIG. 9) in which studs 79 of member 76 are received. The studs 79 are formed so as to prevent axial displacement of the member. A pair of openings 80 are provided at diametrical locations on and through member 77 for receiving in each a coil spring 81, one end of which is seated on member 77 and the other end on member 76. Suitable spring retainer lugs are provided on members 76 and 77, as shown. Springs 81 tend to turn members 76 and 77 oppositely of each other to normal position, as limited by the slot and stud connections between the members. The members are thus held together yieldably for turning together clockwise. When member 77 is arrested, as will be described, member 76 may continue to turn clockwise a limited extent, as allowed by the lost motion connections 78-79. At such times springs 81 are compressed, and their resistance cushion the stopping of the constantly urged power unit. The compressed springs 81 then restore to their original shape to turn the power unit to its stop-start position, as illustrated.

At the stop-start position of member 77, integral lug 82 is against the lateral lug 83 on arrester level 74. In order to initiate operation of the power unit, it is required only to rock the lever counter-clockwise sufficiently to disengage the lugs 82 and 83. To effect stopping of the unit, it is required only to return the lever clockwise so that its lug 83 rides the periphery of member 77 to intercept the lug 82 at the end of a 360-degree revolution. Actuation of lever 74 to start operation of the division power unit for the first trial quotient digit is performed on the forward stroke of member 84 of the division conditioning mechanism is response to operation of a division key as will be described. Thereafter, actuation of the lever to start operation of the power unit for each successive trial quotient digit of the computation is performed automatically by the carriage power unit in the final phase of each shift operation.

The depending arm of lever 74 is formed with a lateral lug 85 which lies in the path of latch 86 formed on the underside of member 84 so that on the forward stroke of the member, latch 86 engages lug 85 and rocks lever 74 counter-clockwise sufficiently to disengage it from arresting unit 65. Forward of latch formation 86, member 84 is supported by a roller 87 on the depending arm of lever 88 which is fulcrumed on shaft 75. Spring 89, fastened to member 84 and to the machine frame, serves to hold the member rearwardly and downwardly in its normal position, as illustrated, and therethrough to hold the lever 88 in its normal position against stud 90 on the machine frame. The upper arm of lever 88 is provided with a lateral tab 91 which lies in the path of clockwise swing of a lateral lug 92 carried by member 76. During the initial phase of the power unit's revolution, lug 92 rocks lever 88 counter-clockwise thereby to elevate member 84 sufficiently to disengage its latch 86 from lug 85. Then torsion spring 93, fastened to lever 74 and to machine frame 28, swings lever 74 clockwise until its lug 83 contacts the periphery of member 77. Thus, the lug is in position to intercept the lug 82 at the completion of a 360-degree revolution of the power unit.

A depending hook 94 is pivoted on the upper arm of arrester lever 74. This hook is formed with a step face 95 and with a lateral lug 96 which lies in the path of vertical lateral lug 97 formed on the upturned rearward end of member 84. Lug 97 is of sufficient vertical length to stand in engaging relation with the lug 96 at all times. Spring 98, fastened to hook 94 and the upper arm of lever 74, influences the hook clockwise and yieldably holds the hook in normal position, in which position its lateral tab 99 is in contact with the under edge of lever 74. Lever 100 is secured to one end of sleeve 101 rotatably mounted on shaft 102 journaled on the machine frame. Lever 100 extends forwardly in the machine and carries a lateral lug 103 on its free end. The other end of sleeve 101 has follower 104 secured thereto. Roller 105 on the free end of the follower overlies the periphery of cam 106 of the carriage power unit. The periphery of cam 106 is such that during the final phase of its clockwise revolution it effects oscillation, clockwise and then counter-clockwise, of follower 104 and the unit formed therewith of sleeve 101 and lever 100. On the forward stroke of member 84 of the conditioning mechanism, its lug 97 rocks hook 94 counter-clockwise so that its step face 95 stands under lug 103 of lever 100. Then on its clockwise stroke during the final phase of each shift operation, lever 100 moves hook 94 downwardly, thereby to rock lever 74 counter-clockwise sufficiently to initiate operation of the division power unit again.

The division power unit never operates more than one revolution at a time, and nearly all of the mechanisms actuated thereby are returned to rest position before the unit completes its 360-degree revolution. Hence, the power unit may tend to complete the final phase of its revolution at accelerated speeds. Accordingly, a governing means of a spring powered type (FIG. 7) is provided for preventing any over-acceleration of the unit. The governor is formed of a follower 107 pivoted on fixed shaft 75, a roller 108 mounted on the free end of the follower 107 and overlying the periphery of cam 64 of the power unit, and a suitably tensioned spring 109 fastened to the follower and stud 110 on the machine frame for urging follower 107 clockwise so as to hold roller 108 in contact with the cam. The arrangement of these parts is such that in the stop-start position of the power unit, spring 109 exerts maximum pressure on cam 64. The contour of the cam is such that during the initial phase of its clockwise revolution, when the work resistance on the power unit is at its maximum, spring biased follower 107 urges the cam to turn clockwise, and that during the latter phase of its revolution, when the work resistance is substantially at its minimum, the cam swings follower 107 counter-clockwise to reload spring 109. Thus the springs aids the power unit during the initial phase of its revolution and during the latter phase of the revolution, the resistance of the spring prevents over-acceleration of the power unit.

(3) DIVIDE KEYS AND CONDITIONING MECHANISM

Two divide keys 18 (FIG. 1) and 19 are provided for initiating division cycling. With key 18 a 10-digit quotient is obtained, and with key 19 a predetermined number of quotient digits may be obtained provided that preselection of a tabulator key 14, corresponding to the number of digits desired, is made. Both divide keys are subject to locking means for preventing their depression when an improper start is attempted. In this embodiment, as in long division procedure, a trial quotient is selected on comparison of multiples of the highest order of the divisor with the highest order of the dividend. Accordingly, at the outset the highest order of the dividend entered into register 3 may, at the most, align ordinally with, but never exceed ordinally, the highest order of the divisor appearing in register 6. In this machine, such a dividend-divisor relationship is achieved by placing the carriage in its right extreme position, as shown in FIG. 2, and then registering the dividend in register 3 and setting up the divisor on keys 4, reading from left to right, with the highest order real digit (1 to 9) in the leftmost bank of the keys. With the carriage so positioned, the highest order of the dividend will not appear in a dial 8 of register 3, which is ordinally higher than the 10th bank of keys 4. In order to assure that the proper dividend-divisor relationship exists, means are provided for blocking depression of either divide key when the carriage is not in its rightmost position and a real divisor digit is not set-up on the highest order bank of keys 4. The divide key locks are also incorporated with an inter-row locking mechanism means to prevent their depression with any other cycling key in the other banks, or to prevent changing of the divisor factor during division cycling.

The shanks of keys 18 and 19 (FIG. 4) are slidable through suitable slots provided on plates 40 and 41. A short bar 110, removably secured to plate 40, extends through suitable elongated slots on the key shanks for limiting the upward and downward strokes of the keys, each of which is provided with a return spring 111. The right profile of each divide key shank is formed with an incline 112 (FIG. 8) and the left profile is formed with a step face 113. Vanes 114 and 115, situated respectively to the right and left of the divide keys, are hinged on plate 41, and each has its upper portion bent over to extend toward the key shanks, with the flange of vane 114 terminating at or about the origin of inclines 112, and of vane 115 underlying step faces 113.

When a divide key is depressed, its incline 112 rocks vane 114 clockwise or rightward and blocks the vane against returning to its normal vertical position while the key is in depressed position. At least one spring restrained lateral member 116 (two are illustrated), slidably supported on the keyboard frame, is in contact with vane 114 so as to be moved rightward thereby. A vane 117, hinged on the base of the keyboard frame, to the left of each bank of keys 4 is pivotally connected to slide member 116. In normal position, each vane 117 stands at a counterclockwise position whereat its bent over upper portion or flange is clear of the left edge of the key shank 4, each of which is formed with step faces 118 and 119 and vertical face 120 therebetween. In response to depression of a divide key, vane 114 slides member 116 rightward to rock the vanes 117 clockwise, under faces 118 of keys 4 not depressed and over faces 119 of keys that are in depressed position, thereby to prevent changing of a divisor factor during division cycling of the machine. If a key 4 is between its normal and depressed positions, vertical face 120 stands in the path of the respective vane 117 to prevent its clockwise movement. Hence slide 116 and vane 114 cannot move and, at such times, vane 114 blocks depression of the divide keys.

Vane 121, hinged on the keyboard frame base left adjacent the leftmost bank of keys 4, is bent over to form a flange which extends to the shanks of the keys for values 1-9, inclusive, the shanks of which are contoured so as to rock vane 121 counter-clockwise when a key is depressed. A rod 122, slidably mounted on vanes 115 and 121, may slide to advance leftward to vane 115, but the head of the rod is formed to block vane 115 from rocking leftward in advance of the rod. Ring 123, mounted in an annular groove on rod 122 for movement therewith, is in contact with vane 121 so that conter-clockwise turning of the vane slides the red leftward. Coil spring 124 on the rod between ring 123 and vane 115 holds the vane yieldably against the rod head and serves, at times, to rock vane 115 counter-clockwise when the rod is moved leftward. If vane 115 is not free to rock counter-clockwise when a key 4 for values 1 to 9 in the leftmost bank is depressed, the rod will merely slide leftward, compressing spring 124. A spring 125 is fastened to vane 115 and the keyboard frame 44 for holding both vanes 115 and 121 in their normal vertical positions as shown. Spring 125 is of lesser tension then spring 124.

Normally, the only time vane 115 may be rocked counter-clockwise in response to operation of vane 121 is when the carriage is at its rightmost position. Lever 126, fulcrumed at 127 on the underside of keyboard plate 40, has a depending lug 128 on its forward arm. Lug 128 stands in the path of counter-clockwise movement of vane 115. Spring 129, of greater tension than spring 124 in compressed state, is fastened to lever 126 and the keyboard frame 44 for yieldably holding the lever in its normal, counter-clockwise position as illustrated. The rearward arm of lever 126 stands in the path of rightward movement of stud 130 on carriage cover plate 131. The relationship between the stud and the lever is such that when the carriage shifts to its rightmost ordinal position, the stud rocks the lever clockwise, out of the path of vane 115. Then, and only then, the vane is free to rock counter-clockwise in response to depression of a real digit key 4 in the 10th, or leftmost bank, as described.

Transverse slide members 132 and 133 are slidably mounted on the keyboard frame and extend through suitable openings or cut-away portions on vane 115, as seen best in FIG. 4. At their left ends, members 132 (FIG. 8) and 133 are formed with upturns for cooperating with vane 115 to effect various locking operations. In normal, or rest, position of the members, their upturns are spaced from vane 115, thus providing lost motion therebetween. Rightward in the machine, members 132 and 133 are connected to other vane means so as to be moved rightward and held in operated position in response to operation of other cycling keys and register clearing keys, as disclosed in the parent application. The actuated member 132 or 133 is returned to normal position when the operated one of the other cycling keys or register clearing keys is returned. If vane 115 is in normal or divide-key locking position when member 132 or 133 is moved rightward, the upturn of the actuated member moves against the vane, thereby to prevent displacement of the vane from that position. If vane 115 is in its counter-clockwise position and a divide key is not depressed, the upturn of a then actuated member 132 or 133 rocks the vane clockwise to its key locking position. Thus, in each case, divide keys 18 and 19 are locked against depression. If a divide key is in operated position, vane 115 is in its counter-clockwise position against the upturns of members 132 and 133, and vertical face 134 of the depressed divide key shank stands in the path of the vane flange to prevent clockwise displacement of vane 115. Therefore members 132, 133 cannot move rightward and the other cycling key actuated vane means connected therewith are prevented from moving, thereby locking the other cycling and clearing keys against depression as disclosed in the parent application. Operation of either divide key 18 or 19 triggers a mechanism which operates to condition the machine for division, initiate the division process and lock the divide key in operated position, as will now be described.

Actuating member 135 (FIG. 4) of the conditioning mechanism is pivotally mounted on shaft 136, fixed on the machine frame, and a tensioned torsion spring 137 is fastened to the machine frame 28 and to lateral lug 138 of member 135 for swinging the member clockwise. Lever 139 pivoted on shaft 136 adjacent the member 135, is normally in contact with lug 138 so as to be rocked clockwise thereby.

Normally, clockwise movement of member 135 is prevented by detent 140 which is pivotally mounted on shaft 141 fixed on the machine frame. A roller 142 mounted on member 135 contacts the end of the rearward arm of detent 140 which therethrough holds member 135 in cocked or normal position, as shown. Torsion spring 143 is fastened to detent 140 and to an adjacent portion of the machine frame not illustrated, for rocking detent 140 clockwise. A short extension 144 on the detent arm underlies roller 142 so as to prevent the detent from swinging clockwise out of engagement from the roller. In order to trigger or release spring tensioned member 135, it is required only to rock detent 140 counter-clockwise sufficiently to disengage it from roller 142. For this purpose, the forward arm of the detent is provided with a lateral lug 145 which lies in the path of step face 146 on depending hook 147 so that elevation of the hook will rock the detent counter-clockwise. Hook 147 is swiveled on the forward arm of lever 148 which is fulcrumed on stud 149 on frame member 34, and spring 150, fastened to the hook and the lever, pulls the hook clockwise against lug 145 to hold hook 147 in position for rocking the detent. The rearward arm of lever 148 carries lateral lug 151 which is received in a suitable notch on the shank of key 18 so that depression of the key will rock the lever counter-clockwise to elevate hook 147, thereby to release or trigger member 135 for its clockwise actuation by spring 137. The shank of divide tabulation key 19 is also notched to receive bent over lug 152 on the rearward arm of lever 153 which is fulcrumed on stud 154 on frame member 34. Thus, depression of key 19 rocks lever 153 counter-clockwise, and the forward arm of the lever carries lateral lug 155 which underlies the adjacent lever 148 so as to rock lever 148 counter-clockwise to also elevate hook 147 in response to the depression of key 19. The arrangement is such that depression of either divide key 18 or 19 elevates hook 147 sufficiently to cause it to disengage detent 140 from roller 142 only after the selected divide key has been depressed sufficiently to render the key-locking mechansim effective for preventing depression of other cycling keys, as explained in connection with FIG. 8.

When triggered, spring influenced member 135 (FIG. 4) swings clockwise until it is arrested by lateral extension 156 (FIG. 10) of lever 157 which will be described later herein. At present, it will suffice to say that member 135 is returned counter-clockwise to normal position by extension 156 during the key instituted revolution of the division power unit, before lever 148 (FIG. 4) and hook 147 are returned to their normal positions.

Elevated hook 147 (FIG. 11) is disengaged from detent 140 on the forward stroke of member 135 in order to render detent 140 effective again for holding member 135 when the member is returned to normal position, as in FIG. 4. In elevated position of hook 147, integral lateral lug 158 (FIG. 11) stands in the path of lug 159 on member 135 so that toward the end of the clockwise stroke of member 135, lug 159 will swing the hook 147 counter-clockwise to unlatch step face 146 from lug 145. In operated position, detent 140 is not in contact with roller 142. However, when hook 147 is unlatched from the detent, the aforementioned spring 143 turns the detent clockwise, against the roller 142. Then lug 145 is displaced downwardly with respect to step face 146 and is in the path of vertical surface 160 on hook 147. Thus, hook 147 connot relatch with lug 145 while member 135 is being returned counter-clockwise to normal position and spring 150 swings hook 147 clockwise until surface 160 contacts lug 145.

Lever 148 is held automatically in operated position, as will be described, until the division process is completed. When lever 148 is returned clockwise to normal position by torsion spring 161 which is fastened thereto and to the stud 154, hook 147 is lowered again to effective position for engaging lug 145, as previously set forth and as may be seen in FIG. 4. Lever 153 (FIG. 12) is also held automatically in operated position, as will be described, during a division process initiated by key 19. At the completion of such a process, lever 153 is returned clockwise to normal position by torsion spring 162 which is fastened to the lever and to stud 149. The normal positions of levers 148 and 153 (FIG. 4) are defined by the limits of the upward strokes respectively of keys 18 and 19 to which the levers are coupled.

Extension 156 (FIG. 10), as previously mentioned, has the dual function of arresting and returning the member 135 counter-clockwise. Lever 157 is pivotally mounted on shaft 136, and integral extension 156 extends through an opening on frame plate 27 so as to stand in the path of the clockwise swing of member 135. Spring 163 is fastened to extension 156 and to the machine frame, for urging the lever 157 clockwise to where its extension contacts surface 164 on plate 27. Surface 164 braces extension 156 for arresting member 135 on its forward stroke. For returning member 135 to normal position, lever 157 is rocked counter-clockwise by the following means: A link 165 is pivotally connected to lever 157 and to the upright arm of bellcrank 166 which is fulcrumed on fixed shaft 75. The other arm of bellcrank 166 extends rearwardly to stand in the path of clockwise swing of roller 167 mounted on cam 63 of the division power unit. The relationship between roller 167 and bellcrank 166 is such that during the final phase of each revolution of the power unit, roller 167 rocks bellcrank 166 counter-clockwise for pulling link 165 rearwardly to swing lever 157 counter-clockwise sufficiently to effect relatching of member 135 with detent 140 (FIG. 4). Hence, member 135 is returned during the initial, i.e., in the divide key instituted, revolution of the power unit. As cam 63 (FIG. 10) completes its revolution, roller 167 moves past the arm of bellcrank 166, whereupon the operated parts 166, 165 and 157 are returned to their normal positions by spring 163. In each of subsequent revolutions of the division power unit during a division process, lever 157 will be oscillated merely against tension of spring 163 without effect, member 135 having been relatched in normal position in the first revolution.

Referring to FIG. 4, it will be recalled that member 135 swins lever 139 clockwise by means of lug 138. Lateral lug 168 of the free end of lever 139 overlies latch member 169 which is fulcrumed on shaft 141 and is tensioned clockwise by torsion spring 170 (FIG. 13) fastened thereto and the machine frame. Member 169 is formed with a step face 171 for latching lug 168, as shown, when lever 139 is swung forward sufficiently to operated position. Thus lever 139 is prevented from returning counter-clockwise when member 135 (FIG. 4) is recocked. Lever 139 is spring returned, as will be described, to normal position against lug 138 of member 135, when latch 169 (FIG. 13) is rocked counter-clockwise sufficiently to disengage from lug 168. Stud 172 on upright arm of latch 169 is received in lost motion slot 173 on the forward end of link 174. This slot-stud connection is such that the slot permits movements of the stud without moving link 174 as when latch 169 snaps to latching position. Rearward, the other end of link 174 is povotally connected to the upright arm of lever 175 which is fulcrumed on shaft 102. Torsion spring 176, fastened to lever 175 and machine frame 27, urges the lever clockwise to normal position against stud 177 on the frame. Lever 175 is rocked counter-clockwise, as will be described, only when the division process is completed, thereby to move link 174 rearwardly to swing latch 169 counter-clockwise sufficiently to disengage it from lever 139.

Key 18 (FIG. 4) is held in depressed or operated position by lever 139 during a division operation instituted by either that key or key 19. Lever 148 (FIG. 11) is provided with a depending arm formed with lateral lug 178 which lies in the path of clockwise movement of lug 168 of lever 139. The relationship between the two lugs is such that in the operated positions of levers 139 and 148, lug 168 is in contact with lug 178 (as shown in FIG. 11) so as to hold lever 148 and the key 18 coupled therewith in their operated positions until the lever 139 is released to return to its normal position.

For performing conditioning operations, lever 139 is connected by link 179 (FIG. 12) to lever 180 which is secured to transverse shaft 181, journaled on the machine frame. The forward end of member 84 is pivoted on lever 180. Hence on the forward stroke of lever 139, lever 180 is rocked clockwise, pulling member 84 forwardly and turning shaft 181 clockwise. As viewed in FIG. 15, such turning of shaft 181 is counter-clockwise. Two levers 182 and 183 are shown secured to shaft 181 at different sections rightward in the machine. As will be described with more particularity, setting of the product entry mechanism for substractive operation of the product or dividend register is performed through lever 182, and the shift direction control is set for shifting the carriage leftward and the eliminated dividend mechanism is rendered operable through lever 183. Torsion springs 184, fastened to lever 183 and to machine frame 30, serves to return the parts 84, 179 to 183 and lever 139 (FIG. 4) to normal or rest position. Previously explained spring 89, FIG. 9, acting on member 84 also aids in returning the parts united with shaft 181, FIG. 15.

Referring to FIG. 9, it will be recalled that on its forward stroke, member 84 rocks arrester lever 74 counter-clockwise to initiate the first cycle of operations of the dividing mechanism in a division process, and that it also swings hook 94 on lever 74 into engagement with lever 100 so that clockwise movement of lever 100, at the end of each ordinal carriage shift operation, will normally initiate the subsequent cycle of operations of the dividing mechanism during that process. Member 84 also renders the division terminating means effective and re-enables the multiplying mechanism operated automatic shift control, if the control is disabled at the time division cycling is started, as will be described.

In response to depression of divide tabulation key 19, FIG. 4, the conditioning mechanism also holds that key in operated position and renders the tabulation mechanism effective to operate the terminating means when the carriage shifts to the ordinal position preselected by the depression of the tabulator key corresponding to the number of quotient digits desired. These conditioning operations are accomplished as follows:

A generally upright lever 185 is secured to transverse shaft 186, journaled on the machine frame. The free end of lever 185 has swiveled thereon a forwardly extending hook 187 (FIG. 12) which carries two lugs, generally vertical lug 188 and horizontal lug 189. Hook 187 is influenced clockwise by spring 190 fastened thereto and to shaft 186. In normal position of key operated lever 153, lug 191 carried on the depending arm of the lever is in contact with vertical lug 188 so as to hold the hook 187 counter-clockwise, disengaged from lug 192 on lever 139. Depression of key 19 rocks lever 153 counter-clockwise, whereupon lug 191 moves forward of lug 188 sufficiently to permit hook 187 to latch onto lug 192 of lever 139 before lever 153 (FIG. 4) actuates lever 148, there being lost motion provided between the lug 155 and lever 148. Then, when member 135 is triggered to swing clockwise, as set forth, hook 187 is pulled forwardly, turning shaft 186 clockwise to render the tabulation mechanism effective, as will be described. The relation between hook 187 (FIG. 12) and lever 153 is such that during the final phase of the hook's forward stroke, its lug 188 contacts lug 191 of the lever. In the initial phase of the hook's forward stroke, before lugs 188 and 191 contact each other again, horizontal lug 189 moves under surface 193 provided on frame 28 for blocking hook 187 from rocking counter-clockwise when lug 188 contacts lug 191. Consequently, hook 187 holds lever 153 and key 19 connected therewith in operated position during a division process.

Lever 185 is spring returned against fixed stud 194 when lever 139 is returned. In a rightward area in the machine, shaft 186 (FIG. 14) has secured thereto a canted lever 195 the free end of which carries lateral lug 196. The extremity of a generally depending arm of bellcrank 197 fulcrumed on fixed shaft 198, is in contact with lug 196 so as to be swung clockwise thereby when lever 195 turns counter-clockwise. Spring 199, fastened to bellcrank 197 and the machine frame, influences the bellcrank counter-clockwise and serves to return parts 195 and 185 (FIG. 12) secured to shaft 186 to normal or rest position. Bellcank 197 (FIG. 14) will be explained further in connection with the tabulating mechanism.

Whenever division cycling is instituted, divide key 18 (FIG. 16) also renders the over-draft mechanism operable. First, however, it is to be understood that bar 200, the left leg of the bail support means for the entry and carry mechanisms of the main body, is elevated, as will be described more fully later, early in each multiplying cycle of operations for engaging the entry and carry mechanisms with the inboard orders of the carriage borne product and multiplier register mechanisms. Referring now to the over-draft mechanism parts actuated by the division key: One arm of lever 201 which is fulcrumed on shaft 202 extends forwardly so that lateral lugs 203 thereon situates in the path of downward movement of the shank of key 18, and the other arm of lever 201 extends rearwardly with integral lateral lug 204 overlying the upper portion of bar 200 at 205. Bellcrank 206, pivotally mounted at 207 on bar 200, has one arm which extends forwardly and normally overlies stud 208 on the bar. The other bellcrank arm, which is generally upright, has member 209 pivoted on its free end. Member 209 extends rearwardly and has a lateral lug 210 formed thereon which rests on the lug 204 and extends rightwardly sufficiently to situate below rotatable member 211 of the highest order inboard product register mechanism. Spring 212 is fastened to lever 201 and to member 209 so as to influence member 209 counter-clockwise to rest on lug 204 of lever 201, and to influence lever 201 counter-clockwise to normally contact bar 200 at 205. Through member 209 spring 212 also influences bellcrank 206 clockwise against the stud 208, all as illustrated. The arrangement is such that when key 18 is moved to operated position, it swings lever 201 clockwise and therethrough moves member 209 upward, toward member 211, and then when bar 200 is elevated, member 209 is carried sufficiently upwardly to place its lug 210 in the path of counter-clockwise turning of member 211 as shown in FIG. 17. The upward movement of member 209 in response only to downward stroking of key 18 or only to elevation of bar 200, the latter state being shown in FIG. 18, is insufficient to place member 209 in the path of member 211, the combined action of the bar and key being necessary, as set forth. Member 211 and actuation thereby of member 209 and of bellcrank 206 will be described more fully later.

(4) MULTIPLYING POWER UNIT AND STOP-START MEANS

Multiplying power units 71, FIG. 5, comprises a sleeve 213 rotatably mounted on journaled shaft 59, a drive gear 214 and a part of speed-responsive governor 215 secured respectively to the left and right ends of the sleeve, and cams 216 and 223, inclusive, mounted on the sleeve between the gear and governor with suitable annular spacers 224 therebetween. Components of the governor, the drive gear, cams and spacers are secured together, for movement as a unit, by rod means 225.

Through its gear 214, unit 71 is rotated clockwise as when viewing its cam 220 in FIG. 19. In a 360-degree revolution, the cams of the multiplying power unit actuate the computing mechanism for obtaining the product of a single digit multiplier times a multiplicand of one or more digits. Cam 218, cooperating with detent 226 of the stop-start mechanism, holds the power unit in its stop-start position, as shown.

Detent 226 is pivotally mounted on the depending arm of bellcrank 227 which is fulcrumed at 228 on bracket 229 fixed to the main frame. The clockwise turning force of cam 218 presses detent 226 and bellcrank 227 rearwardly to where rear extension 230 of the bellcrank is stopped by buffer element 231 of suitable shock absorbing material supported on bracket 229. The buffer element may be adjusted relative the extension by suitable spacers between the buffer element and the bracket. A lever 232 is pivoted on bracket 229 so as to extend rearwardly, generally parallelly with extension 230. On its free end, lever 232 carries a roller 233 which overlies extension 230. A spring 234 is seated on lever 232 and is fastened to lateral lug 235 on bracket 229 by an adjustable screw and lock-nut 236. The upper profile 237 of extension 230 presented to roller 233 is an inclined cam, such that spring 234 rocks bellcrank 227 clockwise against lateral lug 238 on bracket 229, when detent 226 is disengaged from cam 218. Hence, at such times, detent 226 is carried forwardly sufficiently so as to be resettable into the path of turning of cam 218, at a position in advance of the stop-start position of the cam. Then on re-engagement of cam 218 and detent 226, bellcrank 227 is rocked rearwardly, whereupon the inclined cam profile 237 of its extension causes the lever 232 to move counterclockwise, against the tension of spring 234. Thus, the power unit is retarded by the resistance of spring 234 before extension 230 contacts buffer 231.

Spring 239, fastened to detent 226 and to the forwardly extending arm of bellcrank 227, tends to rock the detent clockwise. The relationship between the detent contact surface of cam 218 and the cam contact surface on detent 226 is such that in response to the influence of springs 234 and 239 and the clockwise rotative force of the cam, the detent moves upwardly out of the cam's path when the detent is free to move upwardly. Normally, detent 226 is held in engagement with cam 218 by member 240 which is pivoted on bracket 229. Member 240 extends forwardly in the machine and carries lateral lug 241 which overlies detent 226 and further forward it carries another lug 242 which is latched by a rockable latch 243 so as to prevent clockwise rotation of the member 240 by detent 226. Disengagement of latch 243 from member 240 allows the detent to disengage from the cam. The upward or clockwise swing of member 240 may be limited as by frame member 33 or, in another form, by lateral lug 244 on bellcrank 245 which is pivoted coaxially with member 240 on bracket 229. The depending arm of bellcrank 245 carries roller 246 which at all times rides the periphery of cam 220 under the clockwise influence of spring 247 fastened to the bellcrank and member 240. The profile of cam 220 is such that during the initial phase of its clockwise revolution, it rocks bellcrank 245 counterclockwise sufficiently to effect re-engagement of member 240 with latch 243 and, at the same time, member 240 returns detent 226 into the path of cam 218 for stopping the power unit at the completion of one revolution, as described. In the latter phase of its revolution, cam 220 allows bellcrank 245 to return to normal position, as shown, under the influence of spring 247.

Latch 243 is interposed between bellcrank 248 and lever 249, all pivotally mounted on shaft 250 which is fixed on the machine frame. The depending arm of bellcrank 248 is formed with lateral lug 251 which normally is against the depending arm of latch 243 so that clockwise movement of bellcrank 248 rocks the latch clockwise for disengaging its hooked upper portion from member 240. Torsion spring 252 fastened to bellcrank 248 and latch 243 influences the latch and bellcrank toward each other to normally hold latch 243 against lug 251.

A lever 253, pivotally mounted on shaft 254 which is fixed on the machine frame, has hook 255 pivoted on its depending arm. Hook 255 extends rearwardly between the depending arms of latch 243 and of bellcrank 248, and overlies lug 251 for latching the same. The free end of hook 255 rests on lug 241 of member 240. Spring 256 is fastened to the upper arm of bellcrank 248 and to hook 255 for yieldably holding the bellcrank against stop member 257 secured to the machine frame, and for influencing the hook clockwise and lever 253 counter-clockwise to normal position. As disclosed in the parent application, a positive stop means is provided for the rest or normal position of lever 253, and the lever is rocked clockwise in response to operation of an add, subtract or a multiplier key for values 1 to 9. At such times, hook 255 moves forwardly, engaging lug 251 and therethrough rocking bellcrank 248 clockwise for triggering the multiplying stop-start means as described above.

Lug 251 also stands in the path of clockwise movement of lever 249. Link 258 connects lever 249 to lever 259 which is secured to shaft 260 journaled on the machine frame. Shaft 260, as will be described, is turned counter-clockwise each time a trial quotient other than "0" is obtained. The arrangement is such that lever 249 is then swung clockwise to effect triggering of the multiflying stop-start means.

(5) AUTOMATIC SHIFT INITIATING OPERATIONS

Bar 200, FIG. 16, as previously mentioned herein, is a part of the bail support means for the entry and carry mechanisms. Bar 200 and companion bar 261 (FIG. 20) are secured at their forward ends to shaft 262 journaled on the machine frame, and rearward therefrom transverse shaft 263 is secured to both bars, thus forming a support unit elevatable, i.e., rotatable counter-clockwise about the axis of shaft 262. Stud 264 on bar 261 carries a roller 265 which, in rest or normal position of the support unit, overlies cam 216 of the multiplying power unit. The periphery of the cam is such that in the initial phase of its clockwise revolution it elevates the support unit sufficiently to effect engagement of the entry and carry mechanisms with the inboard dial mechanisms on the carriage, as may be seen in FIG. 17. This support unit is locked automatically in elevated position normally, until the entry and carry operations are completed, during which interval the periphery of cam 216 (FIG. 20) is not in contact with roller 265.

In FIG. 16 bar 200 is shown in the normal position of the support unit with a roller 266 mounted on shaft 263 in contact with stop surface 267 on detent 268 which is pivotally mounted on stud 269 on the machine frame. Torsion spring 270 is fastened to detent 268 and to stud 271 on the machine frame for turning the detent counter-clockwise when the support unit is elevated sufficiently to move roller 266 out of the path of stop surface 267. Finger 272 (FIG. 18) of detent 268 is for limiting the counter-clockwise movement of the detent by contacting roller 266 which is then in the path of finger 272. At this position of detent 268, its surface 273 underlies the roller to hold the said entry and carry mechanism support unit in elevated position.

After entry and carry operations are completed, detent 268 is rocked clockwise, as will be described, for effecting return of the support unit to normal position, thereby disengaging the entry and carry mechanisms from the carriage borne mechanisms. The upper extremity of detent 268 is generally C-shaped, the internal contour 274 of which progressively reduces radially relative to the axis of the detent so that during the initial phase of the clockwise stroke of the detent, cam contour 274 cooperates with roller 266 to positively return the support unit downwardly to normal position again. During the latter phase of the clockwise stroke of detent 268, i.e., after the entry and carry mechanisms are disengaged from the carriage borne mechanisms, normally a shift cycle of operations is initiated by the detent for a one-step movement of the carriage.

The depending arm 275 of detent 268 has in its path (with respect to clockwise movement thereof) lateral lug 276 of depending lever 277, pivoted on stud 269. Hook 278 is pivotally mounted on the free end of lever 277 and is normally latched on lateral lug 279 on one arm of bellcrank 280 for rocking the bellcrank counter-clockwise about shaft 102 on which it is mounted. Spring 281 is fastened to hook 278 and to stud 282 on the machine frame so as to yieldably hold the hook in latched position and lever 277 in rest position with integral finger 283 against fixed stud 271. The arrangement is such that at about the time the entry and carry mechanism support means is returned to rest position by detent 268, FIG. 16, detent arm 275 engages lug 276 for rocking lever 277 clockwise. Through the normally latched hook 278, FIG. 18, bellcrank 280 is then rocked counter-clockwise. Thereafter, detent 268 is returned counter-clockwise by spring 270 as limited by its stop surface 267 contacting roller 266, FIG. 16.

The depending arm of bellcrank 280 has pivoted thereon member 284 which is influenced clockwise, against stud 285 fixed on the depending bellcrank arm, by torsion spring 286 fastened to the member and arm. In this normal position of member 284, integral finger 287 is in contact with lateral lug 288 on lever 289 for rocking the lever counter-clockwise when bellcrank 280 is so moved, as described. Lever 289 is secured to journaled shaft 102 for rotation therewith and the resulting counter-clockwise rotation of shaft 102 operates the carriage shift stop-start means, as will be described.

Member 284 is also formed with hook finger 290 and with a generally depending arm 291 which has stud 292 fixed thereon. A generally depending hook 293, pivoted at 294, FIG. 13, and under generally counter-clockwise influence of spring 295 fastened thereto and to stud 296 on the machine frame, is normally held in a clockwise position, disengaged from stud 292, FIG. 16. Stud 297, extending from the obverse face of member 84 of the conditioning mechanism, normally holds hook 293 disengaged from stud 292 except when the machine is conditioned for division operation. On the forward stroke of member 84, spring 295 swings hook 293 of the terminating mechanism into engagement with stud 292, FIG. 13. Then, as will be described, when the carriage shifts to its rightmost position, or to a preselected ordinal position or when the dividened is reduced to "0," hook 293 is pulled upwardly, thereby to rock member 284 counter-clockwise for disengaging finger 287 from lug 288 of lever 289 and engaging hook finger 290 with lateral lug 298 on the depending arm of lever 175. Consequently, when bellcrank 280 is rocked counter-clockwise, member 284 turns lever 175 counter-clockwise instead of lever 289. Therefore, a shift cycle of operations is not instituted and through operation of lever 175, return of the conditioning mechanism is effected, as described, automatically terminating the dividing operations. Bellcrank 280 is returned to normal position, against fixed stud 299 on the machine frame, by spring 300 which is fastened to stud 301 on the machine frame and member 302, pivotally mounted on the depending arm of bellcrank 280. The member 302 being otherwise restrained against turning clockwise. As will be described later, member 302 is moved forwardly when a "0" trail quotient is obtained, thereby to rock bellcrank 280 for effecting initiation of carriage shift or termination of dividing operations, as the case may be.

Hook 278, normally engaged with bellcrank lug 279, is disengaged therefrom upon depression of add key 16, FIG. 1, subtract key 17, or non-shift key 11, and is re-engaged with the bellcrank lug 279 (FIG. 13) when the depressed key is returned. Both the add and subtract keys are returned automatically, during the final phase of the operations initiated thereby, as disclosed in the parent application, but the non-shift key 11 is returned manually at the descretion of the operator. With hook 278 FIG. 16 disengaged, bellcrank 280 will not be moved when detent 268 is rocked clockwise. Consequently, shift operations are not initiated. In division operations, however, it is required that the carriage shift one step, or that the operations terminate, subsequent the clockwise rocking of detent 268. Accordingly, means are provided for automatically effecting re-engagement of hook 278 with bellcrank lug 279 when the non-shift key is in depressed position and dividing is initiated. Hook 278, FIG. 18, generally overlies stud 303 fixed on the upper arm of lever 304 pivoted on shaft 75. The depending arm of lever 304 carries stud 305 which is received in lost motion slot 306 on the rearward end of link 307 which, as will be described, is moved rearwardly in response to depression of the add, subtract or non-shift key. Spring 308 is fastened to lever 304 and link 307 for yieldably holding one to the other for movement together, with stud 305 against the rearward end of slot 306. Thus, when link 307 is moved rearwardly, lever 304 is normally rocked clockwise sufficiently to swing hook 278 counter-clockwise, disengaging it from bellcrank lug 279 as illustrated in FIG. 16. The afore described stud 297 on member 84 of the conditioning mechanism also extends from the reverse face of the member which, as described, is moved to a forward position for the duration of dividing operations. In the normal position of member 84 and the operated position of lever 304, the depending arm of the lever stands in the path of stud 297 so that on the forward stroke of member 84, FIG. 13, stud 297 will move lever 304 counter-clockwise sufficiently to permit re-engagement of hook 278 with bellcrank lug 279, under the influence of spring 281. At such times, lever 304 is moved against the restraint of spring 308, and link 307 remains in operated position, the stud 305 moving freely in slot 306. If, during division cycling, the non-shift key is depressed inadvertently, link 307 merely moves rearwardly, sliding on stud 305 against the restraint of spring 308, the clockwise movement of lever 304 being blocked by stud 297 on member 84 then in operated position, hence hook 278 remains engaged with bellcrank 280. If the non-shift key is in depressed position when division cycling is completed, spring 308 will swing lever 304 (FIG. 16) to operated position, rendering the non-shift setup effective again.

Referring to FIG. 13, the forward end of link 307 is pivotally mounted on lever 309 which is secured to transverse shaft 310 journaled on the machine frame. As viewed in FIG. 21, shaft 310 is turned clockwise for moving link 307 rearwardly. In a rightward section of the machine, lever 311 is secured to shaft 310, and lever 312, adjacent lever 311, is pivotally mounted on the shaft. Lateral lug 313 on lever 311 stands in the path of clockwise movement of lever 312. Link 314, pivotally mounted on the free end of lever 312, is connected to the depending arm of bellcrank 315 (FIG. 22) which is fulcrumed on shaft 316. Another arm of bellcrank 315 extends forwardly, with lug 317 formed thereon underlying the shanks of add key 16 and subtract key 17 so that depression of either of these keys rocks bellcrank 315 counterclockwise. Thus, through link 314, lever 312 (FIG. 21) is swung clockwise to engage lug 313 and therethrough rock shaft 310 for disabling the automatic shift initiating means, as described. Spring 318, FIG. 22, is fastened to the machine frame and to bellcrank 315 for returning the bellcrank, link 314 and lever 312 to their rest positions, as illustrated, when the depressed key is automatically returned at the completion of operations initiated thereby. Further rightward on shaft 310, FIG. 21, lever 319 is also secured thereto. This lever carries stud 320 which is received in enclosed slot 321 on the forward end of link 322. The other end of link 322 (FIG. 23) is pivoted on the depending arm of bellcrank 323 which is pivotally mounted on shaft 324 supported on the machine frame. Another arm of bellcrank 323 extends forwardly and is formed with lateral lug 325 which underlies the shank of non-shift key 11 so that depression of the key will rock the bellcrank counter-clockwise, and through link 322 and lever 319 (FIG. 21) turn shaft 310 clockwise to disable the automatic shift initiating control, as described. The arrangement is such that when shaft 310 is turned in response to depression of either the add or subtract key, stud 320 moves freely in lost motion slot 321, and that when the non-shift key is depressed, lever 311 swings away from lever 312 which remains in its illustrated rest position. Key 11, FIG. 23, as will be described, is locked automatically in depressed operated position and may be returned as desired. Parts 323, 322, 319, (FIG. 21), 311, 310, 309 and 307 are returned to normal or rest position by torsion spring 326 which is fastened to lever 309 and the machine frame.

(6) MULTIPLYING MECHANISM AND DIVISION CONTROL THEREOF

For each bank of keys 4, FIG. 1, a group of ten multiplication elements 330 to 339, inclusive, FIG. 24, is provided. All of these elements or plate devices are pivotally mounted at their forward ends on journaled shaft 327 for turning in opposite directions from normal or "0" multiplier position. The elements are releasably clamped at their rearward ends in "0" multiplier position by a pair of transverse rods 340 and 341, except during a multiplying cycle of operations. Rods 340 and 341, as described in the parent application, are movable toward each other by toggle means against fixed stops 342 (FIG. 26) on the machine frame, common to the rods at the end portions thereof. Each element or multiplication plate 330–339 (FIG. 24) is formed with a slot 343 generally concentric with its axis, through which slot 343 of all the plates, rods 340 and 341 extend. Each slot 343 has a web 344 intersecting the slot between the rods for receiving directed force from the rods for, at times, holding all the elements at the "0" position. Upon release of toggle pressure early in a multiplying cycle of operations, the rods 340 and 341 are free to swing apart angularly relative to shaft 327. Each multiplication element represents a multiplicand integer 0–9, as indicated by the last digit of the reference numeral therefor, as for example 332 indicates the 2 value plate. Each plate is formed with two sets of stepped stop surfaces or station portions, 350 to 359 inclusive, and 360 to 369 inclusive, disposed angularly with respect to shaft 327 and remote therefrom. The stations of elements 330–334 may be more clearly seen in FIG. 27, and of elements 335–339 in FIG. 28. Stations 350 to 359 (FIG. 24) and 360 to 369 of an element are arranged differentially generally radially with respect to the axis shaft 327 of the plates to represent respectively the tens and units integers (as indicated by the last digit of the reference numeral therefor) of the product of that element value times multipliers 1 to 9.

As will be described herein, upon depression of a key 4 (FIG. 1) for value 1 to 9, the related multiplication plate is selected for being rotated or otherwise moved out of "0" multiplier rest position. If, however, a key 4 in a bank is not depressed, the 0 value multiplication element associated with that bank is automatically selected for said rotation. During a multiplying cycle of operations, the selected element of each group is rotated a predetermined angular extent in accordance with the multiplier digit value, and the other elements not selected are held in their 0 multiplier value positions.

Referring to FIG. 24, a set or pair of generally U-shaped, independently rockable feeler members 370 and 371, shown also in FIG. 33, depend to each group of elements from transverse shaft 372 which is fixed on the machine frame. The ten groups of multiplication elements and the set of feeler members for each group are alike, hence the description of one group of elements and its set of feeler members will also described the others. Member 370 is inset the member 371 and the horizontal portion of each is in transverse relation to the elements. Each member 370 and 371, as will be described, is rocked counter-clockwise until it is stopped by a station on the displaced element. The arrangement is such that member 370 is stopped by a tens station 350–359 and member 371 is stopped by a unit station 360–369 of only the displaced multiplication element. Two slot means 373, one for each feeler member, are so formed on each multiplication element that in "0" position of an element the feeler members 370 and 371 may move freely in their related slots 373 in all the elements not displaced from "0" position to contact a station portion surface on the element displaced from "0" position.

As will be described later herein, the selected element is elevated from "0" position as many steps for multipliers 1 to 4 as the value of the multiplier, and is depressed from "0" position 1, 2, 3, 4 and 5 steps respectively for multipliers "5" to "9," as the case may be. The tens and units stations on each element are arranged accordingly, so that at each displaced position of an element, its tens and unit stations standing in the path of movement of the feeler members 370 and 371 represent the product of the respective multiplier value times the multiplicand value of the element. The relationship between the stations and the related feeler members is such that each station stops its feeler member upon a counter-clockwise swing of as many steps as the value of that station. If, for example, the multiplicand digit of an order is 9 and the multiplier digit is 8, the related element 339, FIG. 28, is selected and then depressed four steps, whereupon tens station 357 and unit station 362 stand to stop respectively feeler 370 (FIG. 24) upon a swing thereof of 7 steps, and feeler 371 upon a swing thereof of 2 steps, from the respective rest position of feelers 370 and 371. Such steps or extents of movements of the feelers, as will be described, operate the related two orders of the product register to indicate the product, which in the above example is 72.

Each bank of keys 4, FIG. 29, actuates an element selecting mechanism associated therewith, similar to the one illustrated, which is described in the afore mentioned parent application. Lever 374 of this mechanism is rockably mounted on shaft 375, fixed on the machine frame, and has the forward end of link 376 pivotally connected to its depending arm. At its other end, link 376 is bifurcated and is pivotally connected as at 377 to rockable lock bail 378 which is formed of a lock rod 379 fastened to the free ends of depending companion levers 380 and 381, secured to the ends of sleeve 382 on shaft 383 fixed to the machine frame. Levers 380 and 381 depend to opposite sides of the related group of multiplication elements of which only a fragment of element 330 is illustrated, the others of the group being omitted for clarity. Each element of the group, however, is formed with a slot 384 which, in rest position of the element is concentric with the axis of bail 378. Slot 384 is for receiving lock rod 379 so as to permit rocking of the bail 378. The furcation on link 376 forms a slot 385 which is generally concentric with the axis of the multiplying elements and in which stud 386 on rockable selector bail 387 is received. Bail 387 is formed of selector rod 388 fastened to the free ends of a pair of depending levers 389 and 390 (as also seen in perspective in FIG. 25) secured to the ends of sleeve 391 on multiplier shaft 392 which, as will be described more fully later, is movable against positive differential stops upwardly and downwardly, depending on the multiplier value. Levers 389 and 390 also depend to opposite sides of the related group of multiplication elements with selector rod 388 passing through suitable opening 393 formed on each of the elements.

In response to depression of a key 4 for values 1 to 5, the selector mechanism rocks lever 374 clockwise from "0" or rest position as many steps as the value of the key depressed, as indicated by the scale superimposed on the depending end of lever 374 for clarity and understanding the construction and operation. In response to keys 4 for values 6, 7, 8 and 9, lever 374 is rocked counter-clockwise from rest position 4, 3, 2 and 1 steps respectively, as indicated by the scale. Accordingly, through link 376, lock bail 378 and selector bail 387 are moved correspondingly from their "0" positions to a different predetermined position rearwardly for each value 1 to 5, and forwardly for each value 6 to 9. Each multiplication element is formed with a slot 394 which is generally concentric with respect to the axis of the element, and which is generally normal to and intersects slot 384. Each element also carries a pair of oppositely oriented lugs 395, or the like, extending toward each other into space 393. The interspace between the ends of the lugs 395 being sufficient only to permit passage of selector rod 388 therebetween when bail 387 is rocked. The radial locations of slot 394 and lugs 395 on an element are individual to that element and to no other element of that group. The relationship between the slots 394, lugs 395 and the respective bails 378 and 387 is such that in each position (other than 0 position) of bail 387 and the corresponding position of bail 378, rod 388 stands between the lugs 395, and rod 379 stands at the intersection of slots 384 and 394 of that element, which represents the value of the depressed key 4 for digit 1 to 9, as the case may be. When none of the keys 4 of a bank is depressed, bail rod 379 stands at the intersection of slots 384 and 394, and bail rod 388 stands between the lugs 395 of the 0 value element 330. Thus, when shaft 392 is elevated or depressed, depending on the multiplier value, selector bail rod 388 engages the lug 395 standing in its path (as illustrated of element 330) and moves the respective multiplication element, with bail stud 386 moving freely in slot 385 of link 376, and with the bail rod 388 not being aligned with any of the lugs 395 of each of the other elements of the group, the bail rod moves freely in opening 393 (see also FIGS. 24 and 28) of each of those other elements of the group. Lock bail rod 379, being aligned with slot 394 of the selected element and displaced in slot 384 from slot 394 of each of the other elements of the group, it permits upward or downward movement only of the selected element and blockingly holds the other elements at normal or "0" position.

Multiplier shaft 392 (FIG. 25) is secured respectively at its left and right end portions to levers 396 and 397 which are fixed to shaft 327 journaled on the machine frame, forming the multiplier bail. A lever 398 is mounted at its ends on the right portion of shaft 392 and shaft 327. Bails 387 and lever 398 are fixed against axial movement along shaft 392, in any suitable manner. Levers 396 and 398 are formed as with slots 399 for allowing said angular movement of rods 340 and 341 which extend therethrough. The levers are also formed with webs 400 which intersect slots 399 for receiving the directed force from the rods for at times holding the multiplier bail in "0" multiplier position correspondingly with the multiplication elements. Lever 398, as will be described, is also utilized as a part in the mechanism for registering multipliers.

The multiplier bail is elevated and depressed by lever 401 is formed with a cam V-notch 402 for receiving stud jacent the bail lever 397. At its rearward portion, lever 401 is formed with a cam V-notch 402 for receiving stud 403 carried by detent 404 which is depended pivotally from lever 397. Detent 404 is tensioned clockwise by spring 405, fastened thereto and to lever 397, to yieldably hold stud 403 in notch 402 sufficiently for elevating and depressing the multiplier shaft-bail (which includes 392) until the bail is stopped at any one of nine predetermined multiplier value positions. When the bail is stopped at such a position, cam notch 402 cooperates with stud 403, for rocking detent 404 counter-clockwise against the tension of spring 405, whereupon stud 403 rides face 406 of lever 401 as the lever completes its stroke. Lock-plate 407, secured to the machine frame, is formed with a series of nine V-notches 408 one for each multiplier position of the conforming V-formation 409 on the free end of detent 404. The arrangement is such that when detent 404 rocks counter-clockwise at a multiplier value position, it fully engages one of the notches 408 to lock the multiplier shaft-bail and the selected multiplication elements carried thereby in the involved multiplier value position, until lever 401 is returned toward initial position sufficiently to again align V-notch 402 with stud 403, whereupon notch 402 allows detent 404 to disengage from the notch 408, under the influence of spring 405. Thus the multiplier shaftbail (including shaft 392) and the displaced multiplication elements are returned again to "0" multiplier or initial position together with lever 401.

A three-arm rockable bellcrank 410 on fixed shaft 250 has a generally horizontal arm which is connected by link 411 to lever 401 so that clockwise and counterclockwise rocking of the bellcrank will respectively elevate and depress lever 401. The upright arm and the depending arm of bellcrank 410 have pivotally mounted thereon respectively hooks 412 and 413 which extend rearwardly. Torsion spring 414 on shaft 250 is fastened to both hooks so as to urge hook 412 clockwise and to urge hook 413 counter-clockwise, each against roller 415 mounted on the free end of lever 416 which is pivoted on shaft 250. Hook 412, is normally latched on stud 417 on rockable follower 418, but when a multiplier 5, 6, 7, 8, or 9 is set up, lever 416 is elevated sufficiently to disengage hook 412 from stud 417 and allow 413 to engage with stud 417 under the influence of spring 414. Lever 416 is elevated or moved counter-clockwise by means of integral lateral lug 419 which overlies an arm of each of the levers 420 (FIG. 32) and 421, pivoted on shaft 250. Lever 420 is rocked counter-clockwise automatically, as described in the parent application, only when a multiplier 5, 6, 7, 8 or 9 is entered by means of the multiplier keys. Lever 421 is rocked counter-clockwise, as will be described later, only when a quotient for values 5 to 9 is entered into a computation. Cam follower 418, FIG. 31, pivoted on transverse shaft 422 carried on the machine frame, is urged counter-clockwise by torsion spring 423, fastened thereto and to the machine frame, so that roller 424 on the follower rides the periphery of cam 221 of the multiplying power unit. The contour of cam 221 is such that during the initial phase of its clockwise revolution, it rocks followr 418 clockwise and then holds the follower in operated position until the final phase of the revolution. Accordingly, which ever hook is latched on stud 417 is moved rearwardly and held there until follower 418 is returned again to initial position. Thus, when hook 412 is latched and so moved, bellcrank 410 is rocked clockwise, and when hook 413 is latched and pulled rearwardly, the bellcrank is rocked counter-clockwise to respectively effect elevation or depression of multiplier shaft 392 to a multiplier value position. In the final phase of its revolution cam 221 allows spring 423 to return follower 418 and, through the hook engaged therewith, bellcrank 410, lever 401, the multiplier bail and the displaced multiplication elements are also returned to normal position, as shown in FIG. 31.

Stud 425 on bail lever 397 extends laterally through an opening on positive stop member 426 between two series of differential stops 431 to 434 and 435 to 439 carried or formed thereon. Stop member 426, pivotally mounted on shaft 440 which is secured to the machine frame, is urged clockwise against stud 425 by torsion spring 441 fastened to the member and the frame. Member 426 may be moved counter-clockwise from its illustrated initial position a maximum of four consecutive steps against positive differential stops (to be described), settable either by the multiplier keys or the quotient sensing mechanism. For moving member 426 counter-clockwise, lateral lug 442 thereon stands in the path of counter-clockwise movement of lug 443 on lever 444 which is secured to one end of sleeve 445 (FIG. 30) on shaft 440. Secured to the other end of sleeve 445 is lever 446, the free end of which carries lateral lug 447 yieldably held in contact with an arm of lever 448 pivoted on shaft 440. Torsion spring 449 is fastened to levers 446 and 448 for holding them together so that, when lever 448 is rocked counter-clockwise automatically by link 450 connected thereto, levers 444 and 446 swing together with lever 448 until member 426 (FIG. 31) is stopped at a predetermined position. Then spring 449 (FIG. 30) yields, allowing lever 448 to complete its fixed stroke. Referring again to FIG. 31, the upper series of stops 431 to 434, inclusive, and the lower series of stops 435 to 439, inclusive, represent respectively the multiplier values 1 to 9, as indicated by the last digit of the reference numeral therefor. The arrangement of these stops is such that in each of the first four of the five positions of member 426, the initial and three successive positions displaced therefrom, an upper and a lower stop stand in the path of stud 425 to stop the multiplier shaft bail upon movement thereof respectively of 1, 2, 3, and 4 steps either upwardly or downwardly from 0 multiplier position, depending on the multiplier value as described hereinbefore. In the fifth position of member 426, its 9 value stop 439 in the lower series stands to stop the multiplier bail upon depression thereof of five steps, the only direction the bail is moved when member 426 is in its fifth position. It is to be noted that no zero value stop for the multiplier bail is provided on member 426, there being no need for such a stop. The multiplying mechanism is not actuated when the multiplier value is "0" in multiplying operations, as described in the parent application, and in dividing operations, as will be described. Hence, at such times, the multiplier bail is never displaced from its "0" or initial position.

Referring to FIG. 32, during adding, subtracting and multiplying computations, the five steps of counter-clockwise movement of member 426 is controlled by stepped stops 451, 452, 453, 454, and 459 carried on the rearward end of stop member 460, pivoted on stud 462 fixed on the machine frame. During division computations, member 426 is controlled by stops 451 to 454 on stop member 460, and by stops 455 to 458 and 459a, inclusive, carried on the rearward end of stop member 461 which is also pivoted on stud 462. Each stop 451 to 454 on 460 and 455 to 459a on 461 during division represents the same value as the last digit of the reference numeral therefor.

Member 460 is formed with lateral lugs 463 and 464 on its generally upright arms. Spring 465 is fastened to the machine frame and to lug 464, for influencing member 460 clockwise to rest position, with its depending integral arm 466 against stud 467 on the machine frame. Lever 468, pivoted on stud 462, normally contacts lug 463 of member 460 for moving member 460 counter-clockwise and carries stud 469 which is embraced by furcated lever 470 rockable on shaft 471 fixed on the machine frame. The arrangement is such that through lever 468, clockwise turning of lever 470 rocks member 460 counter-clockwise. In normal position of 460, its stop 451 stands in the path of lug 442 of member 426 with respect to counter-clockwise turning of member 426. As described in the aforementioned parent application, subsequent operation of either the add key, subtract key, or the 1 or 5 value multiplier key, lever 470 is not rocked, but subsequent operation of the multiplier key for value 2 or 6, 3 or 7, 4 or 8 and 9, lever 470 is rocked clockwise automatically so as to move stop member 460 counter-clockwise, respectively one, two, three and four steps. The arrangement is such that for multiplier values 1 and 5, 2 and 6, 3 and 7, 4 and 8, and 9, stop 451, 452, 453, 454 and 459 respectively stands in the path of lug 442 to limit counter-clockwise movement of member 426 (FIG. 31) so as to respectively align multiplier stops 431 and 435, 432 and 436, 433 and 437, 434 and 438, and 439 with stud 425, as the case may be. Thus, when the multiplier shaft-bail is moved upward or downward, the direction of movement thereof depending on the multiplier key depressed, as explained, stud 425 contacts the stop standing in its path in the selected direction, whereupon the appropriate product stations on the multiplicand selected multiplication elements are setup for sensing.

Referring to FIG. 32, the generally depending arm 472 of stop member 461, is formed with lateral lugs 473 and 474. Return spring 475, fastened to lug 474 and the machine frame, tensions member 461 counter-clockwise and yieldably holds the member in normal, ineffective position with its arm 472 against the stud 467. In this position of member 461, its stops 455 to 459a are out of the path of the counter-clockwise movement of lug 442 of member 426 until a quotient of 5 to 9 inclusive is selected during division operations. Bellcrank 476, pivotally mounted on fixed stud 462, is formed with a generally horizontal arm 477 and two generally vertical arms 478 and 479. Arm 477 carries stud 480 which is received in upright lost motion slot 481 on the depending end of link 482, the other end of which is pivotally connected to an arm of lever 421 of the change-direction mechanism for the multiplier bail actuating means. The arrangement is such that lug 463 of stop member 460 stands in the path of counter-clockwise movement of the arm 478 with lost motion therebetween, and the arm 479 is connected by link 483 to the free end of upright lever 484, pivotally mounted on the transverse shaft 485 which is journaled on the machine frame. Lever 484 is held yieldably to lug 486 on the upright arm of bellcrank 487 by torsion spring 488, fastened to the lever and the bellcrank, so that the lever will move counter-clockwise with the bellcrank until the lever is stopped, at which time spring 488 yields, allowing the bellcrank to continue moving further counter-clockwise, as the case may be. Bellcrank 487 is fixed to journaled shaft 485 and the rearwardly extending arm of the bellcrank has a lateral lug 489, in the counter-clockwise path of which stands lug 473 of stop member 461, there being lost motion provided between the lugs. Lever 484 and bellcrank 487 are illustrated in their rest or "0" quotient value position, in FIG. 32. As will be described later herein, shaft 485 is turned counter-clockwise by the quotient sensing mechanism consecutively one step or angular extent for each quotient value from "1" to "9." Hence, when the quotient is "0," shaft 485 and bellcrank 487 secured thereto are not turned, but for quotient values "1" to "9" inclusive they are turned respectively one to nine steps. The arrangement is such that for quotients "1" to "5," lever 484 turns respectively one to five steps, and through link 483 turns bellcrank 476 step-by-step counter-clockwise. On the first step of movement of bellcrank 476, its arm 478 moves freely up to the lug 463 of stop member 460, but does not turn the member. Thereafter bellcrank 476 turns member 460, step-by-step counter-clockwise when the quotient value is greater than "1." Thus, when the quotient is "1," member 460 is not turned so that the "1" value stop 451 remains in the path of lug 442 to effect set up of the product stations relative to "1," as explained, and when the quotient is "2," "3" or "4," member 460 is turned to respectively place its stop 452, 453, or 454 in the path of lug 442. In response to quotient "4," bellcrank 476 turns four steps, moving its stud 480 from the upper end of slot 481 to the lower end thereof, and bellcrank 487 also turns four steps, moving its lug 489 up to lug 473 of stop member 461. It can be seen then, that upon five steps of movement of bellcranks 487 and 476 for quotient "5," stop member 460 is turned five steps to place its stop 459 in the path of the lug 442 and member 461 is turned one step to place its stop 455 in the path of lug 442, between the lug and stop 459, thus stop 459 has no effect. Also, link 482 is pulled downwardly by stud 480 for turning lever 421 counter-clockwise sufficiently to effect engagement of hook 413 (FIG. 31) with stud 417 and disengagement therefrom of hook 412. This, it will be recalled, causes the actuating means to move the multiplier bail downwardly. To effect this change in direction, as will also be recalled, lever 421 (FIG. 32) acts on lug 419 of member 416. Subsequent completion of the change direction operation, lug 419 contacts stop 490 formed at the opening on frame member 30, through which the lug extends. Thus, as when the quotient is "6," "7," "8" or "9," movement of lever 421, link 482, bellcrank 476, link 483 and lever 484 beyond five steps is blocked. At such times, spring 488 yields, allowing bellcrank 487 to continue turning to effect set up respectively of stops 456, 457, 458 or 459a of member 461. When the quotient is too large, as evidenced by an overdraft from the dividend, bellcrank 487 is returned clockwise automatically, as will be described, one step to effect set up of the next lower value stop on member 461 and/or member 460, and consequently, on member 326. If for example, the too large quotient is "5," the one step return movement of bellcrank 487 allows both stop members, 460 and 461, to be returned one step by their respective springs. Thus, member 461 moves counter-clockwise to the position at which it is shown, and member 460 moves clockwise, placing its stop 454 in the path of lug 442 of member 426. Also, lever 421 is released to effect re-engagement of hook 412 with stud 417 for the normal direction of movement of the multiplier bail for multiplier values 1 to 4 inclusive.

(7) ENTRY AND CARRY MECHANISMS

In the exemplary embodiment, 11 orders of product entry and carry mechanisms are provided, one order for each group of multiplication elements and an overflow order. Since the mechanism of one order is substantially the same as that of the other orders, the description of one order will also describe the other orders. Referring to FIG. 24, companion members 491 and 492, each adjacent a group of multiplication plates or elements on opposite sides at the front portion thereof, are rockably mounted on transverse shaft 493 which is journaled on the machine frame. Members 491 and 492 (FIG. 33) are twin armed at their generally upright free ends and are secured together thereat, by rod 494 at one of the arms and tubular rod or sleeve 495 at the other arm, to form a rockable unit 496. Members 491 and 492 may be secured together still further as at their pivotal ends by a sleeve 497. Crank arms 498 and 499 are secured to the ends of rod 500 rotatable in sleeve 495 and extend in opposite directions. Depending crank arm 498 is connected by link 501 to units feeler member 371 of the respective order, and upright crank arm 499 is connected by offset link 502 to the tens feeler member 370 of the adjacent lower order. The rearward end of link 502 in the first order and of link 501 in the eleventh, i.e., the last, order are secured to suitable stationary or frame members, there being respectively no lower order tens sensing member and no units sensing member in the over-flow order. Unit 496, as will be described, is rocked clockwise, i.e., moved rearwardly, to rock the connected sensing members 370 and 371 rearwardly against the respective set up multiplication elements. The arrangement is such that the unit 496 will move rearwardly until both sensing members are stopped by the set up multiplication elements, the extent of movement of unit 496 being the total steps of movement of both sensing members. Hence unit 496 may move a maximum of 17 steps, as when "19" is multiplied by "9"

$$\begin{array}{r} 19 \\ \times 9 \\ \hline 8\ 1 \\ 9\phantom{\ 1} \\ \hline 17\ 1 \end{array}$$

The unit 496 of the order in which the 1 of "19" is being computed moves a total of 17 steps or extents, 8 steps with sensing member 370 as limited by the tens product station 358 (FIG. 28) of element 339, and 9 steps with sensing member 371 (FIG. 33) as limited by the unit product station 369 (FIG. 27) of element 331.

Referring to FIG. 33 again, rod 494 is passed through elongated slot 503 on rack member 504 for slidably supporting the forward portion of the rack member and for moving the rack member rearwardly. Such movement of rack member 504, as will be described, turns the product dial entrained therewith to register the value of the total of the sensed unit partial product of that order and of the sensed tens partial product of the adjacent lower order. Thus, in the above example, in the order in which unit 496 moves 17 steps, rock member 504 also moves 17 steps, rotating the entrained dial to register "7" and to effect a carry of "1" in the adjacent higher order dial.

The forward end of rock member 504 (FIG. 35) has pivoted thereon bellcrank 505, the generally upright arm of which is connected by link 506 to rod 494 and the rearwardly extending arm of the bellcrank is formed with lateral lug 507 so as to underlie the end of depending arm of bellcrank 508, pivotally mounted on rack member 504. The arrangement is such that clockwise and counter-clockwise turning of bellcrank 505 is normally blocked, with bellcrank 505 holding rack member 504 forwardly with respect to rod 494 so that the rod is against the rearward end of slot 503, as shown. Spring 509 is fastened to shaft 372 and bellcrank 505 so as to exert clockwise turning force on bellcrank 505 and also acts to exert rearward pull on rack member 504 and unit 496. The other arm of bellcrank 508 extends rearwardly and is formed with lateral lug 510 so as to overlie member 511 which, at its forward end, is formed with slot 512 for slidable mounting on rod 494. Stepped stop 513 on member 511 stands in the path of rearward movement of lug 510 for at times preventing the rack member from moving rearwardly of member 511. Spring 514, fastened to member 511 and rack member 504, urges member 511 forwardly and counter-clockwise. As illustrated, in normal position of member 511, the rearward end of its slot 512 is in contact with rod 494. Return spring 515, fastened to bellcrank 508 and rack member 504, urges the bellcrank 508 counter-clockwise to engage member 511 and bellcrank 505, as set forth above. Through bellcrank 508, spring 515 also urges member 511 counter-clockwise so that lateral lug 516 on the free end thereof overlies rack member 504. Parts 505, 506, 508 and 511 and slots 503 and 512 are primarily for carry operations. These parts and slots are not provided in the first order entry mechanism, there being no carry to that order. In the first order, the forward end of spring 509 (FIG. 24) is fastened directly to rack member 504 which is mounted only for turning on rod 494. Each rack member 504 is provided with lug 517 which stands in the path of forward or counter-clockwise movement of bail 518 common to all the rack members. Bail 518 (FIG. 33) and lever 519 are secured to journaled shaft 493. A return spring 520 is fastened to lever 519 and the machine frame for turning bail 518 counter-clockwise for moving rack members 504 forwardly to rest position and loading springs 509, FIG. 35. The forward or return movement of rack member 504 (FIG. 33) is limited by the related feeler members 370 and 371 contacting transverse stop shaft 521 which is supported on the machine frame.

Lever 519 is connected by link 522 to the depending arm of follower 523 (FIG. 34), which is pivotally mounted on shaft 422. Another arm of follower 523 carries roller 524 which rides the periphery of the multiplying power unit cam 219 under influence of spring 520, FIG. 33. The arrangement is such that, subsequent to the set-up of the multiplication elements, cam 219 (FIG. 34) rocks follower 523 counter-clockwise, pulling link 522 rearwardly to rock bail 518 (FIG. 33) clockwise sufficiently to allow rack members 504 to effect entry operations in the entrained dials, as limited by the sensed product stations on the selected, set-up multiplication plates, and by the carry components.

A rack member 504 will move 17 steps when, for example, 19 is multiplied by 9, as explained hereinbefore. If the dial entrained with the rack member moving the 17 steps stands at zero at the start of the operation, the dial will turn through 9–0 (in additive operations) in order to indicate the "7" of the 17. If, however, that dial stands at "9" at the start of the operation, the dial will turn through 9–0 twice during a singly entry stroke of 17 steps of rack member 504, to indicate the "6" of 26, the sum of 9+17. Each time an inboard dial turns through carry position, i.e., 9 to 0 or 0 to 9 respectively in additive or subtractive entry operations, it actuates means (described in the aforementioned parent application) provided for oscillating member 511 (FIG. 35) in the adjacent higher order to effect a carry therein. Such a member 511 is elevated momentarily through its lug 516, to rock bellcrank 508 clockwise sufficiently to disengage its depending arm from lug 507 of bellcrank 505 and place stop 525 on the arm into the path of lug 507. Hence, bellcrank 505 is free to turn clockwise about its pivotal connection with link 506 under the influence of spring 509, until its lug contacts stop 525, as shown in FIG. 36. At the same time, spring 509 slides rack member 504 rearwardly on rod 494 one step, thereby turning the entrained dial to indicate a "1" carry, as limited by bellcrank 505 blocked by stop 525. Through bellcrank 508, the rack member may also move member 511 rearwardly, the slot 512 thereon limiting the movement of member 511. Bellcrank 508 (FIG. 36) is held in this first operated position against return spring 515 by bellcrank 505. Hence, on the return downward stroke of member 511, under the influence of spring 514, its stop 513 disengages from bellcrank lug 510, and spring 514 then pulls the member forwardly to rest position, as limited by rod 494 and slot 512. Stop 525 blocks clockwise movement of bellcrank 505, whereby bellcrank 505 holds rack 504 in its first carry operated position. The arrangement is such that when member 511 is in rest position and bellcrank 508 is in its first operated position, bellcrank lug 510 overlies the uppermost face of member 511. Thus, elevation again of member 511 (FIG. 37) in response to the dial in the adjacent lower order passing through tens carry a second time in one entry cycle of operations, will rock bellcrank 508 clockwise to disengage its stop 525 from lug 507 of bellcrank 505 which, under influence of spring 509, turns clockwise about its pivotal connection with link 506. This second clockwise movement of bellcrank 505 moves rack member 504 rearwardly one step, as limited by rod 494 and slot 503, to turn the entrained dial to indicate another carry of "1." The need for a third carry in a single entry cycle of operations does not occur. Return or forward movement of rack member 504 (FIG. 35) by bail 518 causes bellcrank 505 to turn counter-clockwise to rest position whereupon bellcrank 508 is returned by spring 515.

Toward its rearward end each rack member 504 (FIG. 24) is formed with elongated slot 526 and is bifurcated, with rack teeth formed on the internal faces of the furcations, 527 and 528. Movable transverse rod 529 is passed through slots 526 for supporting rack members 504 in additive or subtractive entry position. The rack member is illustrated in additive position, in which furcation 527 is meshed with gear 530 rotatable on the aforedescribed support unit shaft 263. Gear 530 is secured to gear 531 of larger diameter, which meshes with the carriage borne gear 532 (FIG. 17) in engaging relation therewith, when the support unit is elevated, as previously described. In each order of the product register, a gear 532, rotatable on shaft 533 fixed on the carriage frame, is meshed with gear 534 to which dial 8 is secured, the dial and gear 534 being rotatable on shaft 535 fixed on the carriage frame. The arrangement is such that 10 steps of movement of rack member 504 (FIG. 24) effects a 90-degree turning of gear 532 (FIG. 17) and therethrough a 360-degree revolution of dial 8, the ratio between gears 532 and 534 being 4 to 1.

For subtractive entry of products, rod 529 is moved downwardly, as will be described, sufficiently to engage furcation 528 (FIG. 24) with gear 530 and to disengage furcation 527 therefrom, with one partially engaging the gear 530 before the other is fully disengaged therefrom. The upward or additive and the downward or subtractive positions of rod 529 are defined by slots 536, FIG. 16, one on each support unit member 200 and 261, FIG. 20, through which the rod extends. At its right end, rod 529 (shown in add position) is secured to the generally horizontal arm of bellcrank 537 which is pivotally mounted on support unit member 261. The depending arm of bellcrank 537 is connected by link 538 to the upright arm of lever 539 which is secured to transverse shaft 540 journaled on the machine frame. Correspondingly, the left end of rod 529 (shown in subtract position in FIG. 17) is secured to the generally horizontal arm of bellcrank 541 pivoted on support unit member 200, and link 542 connects the depending arm of bellcrank 541 to upright lever 543 secured to the shaft 540. Counterclockwise turning of shaft 540, as when viewed in FIG. 20, effects downward movement of transverse rod 529 to condition the entry mechanism for subtractive operations. Normally, rod 529 is held in its uppermost position for additive operations through the clockwise influence of torsion spring 544 on lever 539, which is fastened to the lever and to the machine frame.

The following means is provided for turning shaft 540 to effect subtractive entries: The depending arm of lever 539 has swiveled thereon hook 545 which, rearward in the machine, is held in rest or normal position by link 546 connected thereto and to the free forward end of lever 547 which is pivotally mounted on manually rockable lever 548 pivoted on stud 549 on the machine frame. The forward end of lever 547 is formed with lateral lug 550 which normally underlies the shank of subtract key 17, against which it is held by spring 551, fastened to lever 547 and stud 549. In this position of lever 547, depression of key 17 rocks lever 547 counter-clockwise, lowering hook 545 into the path of lever 552 rotatable on shaft 521, so that upon clockwise rotation of lever 552 its lateral lug 553 engages with hook 545 and moves the hook rearwardly to turn shaft 540 counter-clockwise, thereby moving rod 529 in its slot 536 to subtractive position, as set forth. By moving key-lever 548 counter-clockwise to a predetermined position, as explained in the aforementioned parent application, lever 547 is shifted forwardly so that its lug 550 underlies add key 16 instead of subtract key 17, alternating the character of these keys for convenience at the discretion of the operator. With lever 547 shifted to its forward position, means actuated automatically in each multiplying cycle of operations rocks lever 547 counter-clockwise for subtractive entry of each product, as described in the parent application.

For subtractive entries during division, lever 547 is moved downwardly by stud 554 extending over lever 547. Stud 554 is secured on the free end of lever 555 which is secured to sleeve 556 turnable on fixed shaft 557. The other end of the sleeve has secured thereto depending lever 558 carrying stud 559 which is received between the furcation on lever 182. Lever 182 and journaled shaft 181 to which the lever is secured, are rocked counter-clockwise by the divide key triggered conditioning mechanism, as will be recalled by referring to FIGS. 13 and 15. Therefore, hook 545 (FIG. 20) is lowered and held in the path of lever 552 until the division computation is completed. Lever 552 is held yieldably against lug 560 on lever 561 by torsion spring 562 fastened to the levers. Lever 561 and multi-armed lever 563 (FIG. 38) are secured to the ends of sleeve 564 fixed to shaft 521 which is journaled on the machine frame.

A pair of generally diametrically opposed arms of lever 563 are connected by links 565 and 566 to cam follower 567 oppositely at generally diametrically opposed locations thereon. Follower 567, pivotally mounted on shaft 422, carries roller 568 which overlies the periphery of multiplying power unit cam 217, and is held against the cam under the influence of torsion spring 569, fastened to the follower and the machine frame. Early in its clockwise revolution, cam 217 moves follower 567 counter-clockwise for turning lever 563 clockwise as through the rearward pull force on link 566, and then cam 217 holds the moved parts in operated position until the final phase of its revolution. When all entry and carry operations are completed, roller 570 mounted on cam 217 engages arm 571 of follower 567 then standing in the path of the roller and swings the follower clockwise, back to rest position. This clockwise movement of the follower pulls link 565 for swinging lever 563 counter-clockwise positively, back to normal position. Various mechanisms connected with lever 563 are thus actuated, as disclosed in the parent application, including the moving of rod 529 (FIG. 20) from its additive to subtractive position and back again to additive position in each multiplying cycle of operations, as set forth, when the machine is set for subtractive entries of products. Through link 450 (FIG. 38) connected to lever 563, lever 444 (FIG. 30) is actuated to set positive multiplier stop 426, FIG. 31, as disclosed.

Referring to FIG. 25, it will be recalled that lever 398 is part of the multiplier bail which is moved angularly to a predetermined position against a positive stop for each multiplier 1 to 9. Lateral lug 572 on lever 398 (FIG. 39) stands in the path of clockwise movement of multiplier entry control member 573 which is pivotally mounted on stud 574 on the machine frame. The lug-contacting face of member 573 is formed with nine stepped stops 581 to 589, inclusive, one stop for each angular position of lug 572. The arrangement is such that when lug 572 is moved to each of the multiplier value positions 1 to 9, the lug 572 stands in the path of the respective one of the stops 581 to 589, as the case may be. The aligned stepped stop contacts lug 572 upon a swing of member 573 of as many steps clockwise as the value of the multiplier. Thus, for example, when the multiplier is 9, lug 572 stands in the path of stop 589, which contacts the lug upon nine steps of turning of member 573.

Lever 590, pivoted on shaft 493, is connected by link 591 to member 573 so that lever 590 turns clockwise together with member 573. The forward end of dial actuating rack member 592 (shown also in FIG. 40) is pivotally connected to lever 590 so that clockwise turning of lever 590 moves the rack member rearwardly. Lever 593, pivotally mounted on shaft 493 between lever 590 and the right arm of the product entry mechanism actuating bail 518, carries two lateral lugs 594 and 595, extending in opposite directions. Lug 594 is held yieldably in contact with lever 590 under the influence of spring 596, fastened to lever 593 and rack member 592 so that, when lever 593 is turned counter-clockwise, lever 590 turns therewith to pull rack member 592 forwardly to rest or zero position. Lug 595 normally is against bail 518 so as to prevent clockwise turning of lever 593 in advance of the bail. The arrangement is such that when bail 518 is rocked rearwardly for effecting product entries, as previously described, levers 593 and 590 and member 573 are free to turn clockwise under the influence of spring 597, which is fastened to member 573 and the machine frame, and which is of lesser tension than spring 596. Thus, rack member 592 is normally moved rearwardly step-wise until member 573 is stopped by lug 572. In the event, as for example when a dividend is being entered, the multiplier is not to be entered into the register therefor, key 21 is depressed simultaneously as with add key 16, as explained in the afore mentioned parent application. The shank of key 21 overlies lateral lug 598 of spring restrained lever 599 pivoted on fixed shaft 316. Depression of key 21 rocks lever 599 downwardly so that its forward edge 600 stands in the path of stud 601 on lever 590, thereby to block lever 590 and the connected rack member 592 from moving rearwardly. Thus, at such times, the multiplier is not entered into the dial entrained with rack 592. Bail 518 moves rearwardly away from lug 595 of lever 593 which is stopped by its lug 594 against the blocked lever 590.

At its rearward end, rack member 592 (FIG. 40) is furcated and is slidably supported on stud 602 which extends through elongated slot 603 formed on the rack member. The inner faces of the furcations 604 and 605 are formed with teeth for meshing with gear 606 rotatable on rod 607 fixed on support means of which a fragment of member 261 is shown. Normally rack member 592 is in additive position, as illustrated, with furcation 604 meshing with gear 606 and furcation 605 disengaged therefrom. Gear 606 is secured to gear 608 of larger diameter, which is meshed wtih pinion gear 609 fixed to rod 610 journaled on the support means. Leftward, a gear 611, similar to gear 609, is secured to rod 610 so that elevation of the support means (previously described) engages gear 611 with gear 612 of the carriage borne gear train for the lowest order inboard dial 7. Gear 612 in each order is rotatable on shaft 613 fixed on the carriage frame, and is meshed with gear 614 which is secured to dial 7, the gear 614 and dial being rotatable on shaft 615, also fixed on the carriage frame. The arrangement is such that for each step of movement of rack member 592, the entrained dial 7 with numerals 0–9 about its periphery, is turned counter-clockwise in additive operations to display the appropriate multiplier numeral through a suitable aperture on the carriage cover.

For subtractive entry operations, rack member 592 is elevated by stud 602 sufficiently to engage furcation 605 with gear 606 and disengage furcation 604 therefrom. Thus, the direction of turning of gear 606 and therethrough to the entrained dial 7 is reversed, with the dial turning clockwise. As constructed and arranged, one furcation partially engages the gear 606, before the other fully disengages therefrom.

Stud 602 is secured on the rearward arm of lever 616 pivoted on support member 261, and is supported in rest or additive position by member 261 (FIG. 20) in generally vertical slot 617. Slot 617 permits stud 602 to be moved upwardly, relative member 261, to elevate rack member 592 (FIG. 40) from additive to subtractive position. A manually rockable key lever 618 on fixed shaft 316 is formed with a lateral lug 619 which, in normal or add position of key lever 618, is free from engagement with the forward arm of lever 616. Thus, when the support means is moved upwardly lever 616, member 261 and rack member 592 move upwardly together. Rocking key 618 counter-clockwise to a predetermined subtract position, places its lug 619 into the path of upward movement of the forward arm of lever 616. Then, as member 261 is moving upwardly, lug 619 causes lever 616 to turn counterclockwise about its pivotal mounting as limited by its stud 602 moving to the upper end of slot 617. Thus, the stud carries rack 592 upwardly relative support member 261, disengaging furcation 604 and engaging furcation 605 with gear 606 for reversed or subtracting operations. Carry means are provided for performing carry operations in dials 7 of register 2, FIG. 1, disclosed in the parent application.

(8) CARRIAGE POWER UNIT AND STOP-START MEANS

Carriage power unit 70 (FIG. 5) comprises sleeve 620 with cams 106 (at left end), 621 and 622, stop-start means 623 and gear 624 (at right end) secured to the sleeve, and with beveled left traverse drive gear 625 and beveled right traverse drive gear 626 rotatably mounted thereon, as also seen in FIG. 46. Change-direction member 627 is mounted on splines 628 of sleeve 620 for rotation therewith and is slidable thereon for coupling either one or the other of gears 625, 626. Sleeve 620 is rotatably supported by sleeve 629 which is rotatably mounted on journaled drive shaft 59. At its left end, sleeve 629 has gear 630 secured thereto, which is meshed with differential 2, and at its right end sleeve 629 has the spider or carrier of differential 73 secured thereto. Gear 624 secured to sleeve 620 is meshed with differential 73 for receiving rotative forces therefrom for carriage shift operations.

Carriage power unit 70 is urged to rotate counter-clockwise, as when viewing its stop-start means 623 in FIG. 42. Normally, rotation of the unit is prevented by its stop-start means being held by lever 631 which is secured to journaled shaft 102. Stop-start means 623 comprises members 632 and 633. Member 632 is secured to sleeve 620 for rotation therewith, and is formed with a pair of diametrically located ears 634. The adjacent disc member 633 is provided with a pair of lost motion slots 635, and a pair of diametrically situated elongated openings 636 to correspond with the ears 634. Member 633 is coaxial with member 632 and is rockable relative to member 632. Studs 637 on member 632 extend through the slots 635 on member 633, and the studs are formed so as to prevent axial displacement of member 633. One end of each opening 636 is adjacent an ear 634 of member 632, and the configuration at the opposite end of each opening forms an ear 638. A spring 639 is inserted in each opening and is seated on the opposingly situated ears 634, 638. Springs 639 constantly tend to turn disc 633 and member 632 oppositely of each other to normal position, as limited by studs 637 contacting the faces about the clockwise ends of slots 635. In order to start a shift operation, it is required only to swing lever 631 clockwise sufficiently to disengage its lateral lug 640 from nib 641 on disc 633, with which the lug is normally engaged. For stopping a shift operation at on ordinal position of the carriage, lever 631 is returned counter-clockwise to where its lug 640 rides the periphery of disc 633 to intercept nib 641. As will be described herein, for each 360-degree revolution of the power unit, the carriage is shifted one ordinal step. When disc 633 is stopped, driven member 632 may continue its counter-clockwise turning slightly and only to the limit allowed by its lost motion connection with the disc. During such turning of member 632, springs 639 are compressed, their resistance serving to cushion the stopping of the power unit. Thereafter, the distorted springs resume their original shape, positioning the power unit at its stop-start position, as shown.

Three levers, 289, 642 and 643, are secured to journaled shaft 102 for rotating therewith for effecting initiation of shift operations upon rocking of any one of the levers. Referring to FIG. 13, it will be recalled that lever 289 is rocked automatically to effect an ordinal shift of the carriage during multiplying and division computations. Lever 642 (FIG. 42) is rocked clockwise in response to depression of the zero multiplier key 5, FIG. 1, and lever 643 (FIG. 42) is rocked clockwise in response to depression of carriage return key 13 (FIG. 1) and carriage shift keys 20, 644, 645, and 646, as described in the parent application. Immediately upon release of the operated one of the lever 289 (FIG. 42), 642, 643, the unit formed of these levers, shaft 102 and arrester lever 631 is returned to normal or arresting position of its lever 631 by torsion spring 647, fastened to lever 631 and follower 104 which is pivoted on shaft 102. Spring 647 influences lever 631 (FIG. 9) clockwise to its arresting position with integral lug 640 against the periphery of disc 633, and influences follower 104 counter-clockwise so that roller 105 thereon rides the periphery of cam 106. In the final phase of each ordinal shift operation cam 106 rocks the follower 104 clockwise. It will be recalled that during division cycling, such actuation of the follower effects initiation of the division power unit.

(9) CARRIAGE TRAVERSING MECHANISM

Referring to FIG. 46 it will be noted that each end of slidable member 627 has a single-step face and that the adjacent faces of the bevel gears 625, 626 are formed to receive the respective ends of member 627 for positive drive coupling therewith. For each 360-degree revolution of member 627, the carriage is shifted one ordinal step, as will be described, either leftward or rightward, depending on the drive gear with which the member is coupled. Normally, member 627 is coupled with drive gear 625. A change direction shift of member 627, by either manual or automatic means provided therefor, is possible only when the stepped faces of the bevel gears 625, 626 are in mutual alignment. During a change shift operation, member 627 is partially coupled with one drive gear before it is fully uncoupled from the other gear. In other words, the change shift member 627 operates to transfer its coupled relation from one to the other of the two gears 625, 626 without losing the correspondence between the angular position of the member and the ordinal position of the carriage.

The carriage shifting or traversing mechanism is supported on frame member 648, shown in one preferred form as a casting, which is fixed at its rearward end on rod 649 and its forward end on bar 33. Both the rod and bar are fixed to the machine frame. Drive gear 625 is meshed with beveled gear 650 which is fixed to scroll gear 651 rotatably mounted on stud 652 on frame 648. Scroll gear 651 (FIG. 45) is meshed with a corresponding scroll gear 653 which is secured to a square portion on shaft 654 journaled on frame 648, FIG. 46. Drive gear 626 is meshed with bevel gear 655 which is secured to a scroll gear 656 rotatably mounted on stud 657 on frame 648. Scroll gear 656 is meshed with a corresponding scroll gear 658 which also is secured to shaft 654. The arrangement is such that when drive gear 625 is coupled and rotated by member 627, shaft 654 turns clockwise, but when drive gear 626 is coupled and rotated by member 627, shaft 654 turns counter-clockwise. The drive gear which is not coupled with member 627 rotates freely in the reverse direction from that in which it rotates when it is coupled.

Gear 659 is fixed to the forward end of shaft 654, and meshed gears 660 and 661, rotatable respectively on studs 662 and 663 on frame 648, entrain gear 659 with gear 664 which is fixed on shaft 665 journaled on frame 648. The ratios of the gear trains (left traverse train 625, 650, 651, 653, 659, 660, 661 and 664, and right traverse train 626, 655, 656, 658, 659, 660, 661 and 664) are such that for each 360-degree revolution of drive gear 625 or of drive gear 626 shaft 665 turn 180 degrees for shifting the carriage one ordinal step respectively leftward or rightward.

A lever 666 (see also FIG. 44) is secured to the forward end of shaft 665. Each arm of the lever has mounted thereon a roller 667. These rollers are received in ordinally disposed slots 668 (FIG. 41) on feed bar 47 which, as described, is secured to the carriage frame. The arrangement is such that shaft 665 turns 180 degrees, one of the rollers 667 will act on the bar to shift the carriage one ordinal step and the companion roller will enter the next consecutive slot. When the carriage stands at its leftmost position, one of the rollers 667 (shown in phantom) is seated in recess 669 on bar 47, which is formed to block clockwise turning of lever 666. Hence, the right traverse mechanism is at such times inoperable and the carriage power unit will not operate in response to initiation for shifting the carriage further rightward. A shift beyond the leftmost position is also blocked in a similar manner. With the carriage in the leftmost position, stepped projection 670 on lever 666 is in contact with angle plate 671 which is fixed to bar 47. The plate blocks the lever from turning counter-clockwise, thereby preventing operation of the left traverse mechanism and of the carriage power unit for shifting the carriage further leftward.

Referring again to FIG. 45, the meshed scroll gears of each gear train is a change-ratio drive means. At the start of each cycle for shifting the carriage from one position to the next, a low drive ratio is effected by the scroll gears which, in turning, change progressively to provide higher drive ratios until the cycle is completed. Thus, greater power is obtained during the initial phase of each ordinal shift and thereafter, during the latter phase, higher speeds are attained with corresponding reduction in power until the ordinal shift is completed.

The carriage may be shifted a plurality of steps uninterruptedly. At such times the traversing mechanism and the carriage power unit may tend to operate at accelerated speeds. A centrifugally responsive governing means 672 on shaft 654, FIG. 44, as described in the aforementioned parent application, is provided for preventing the carriage power unit and the mechanisms actuated thereby from operating at speeds above a certain magnitude.

Lateral link 673 (FIG. 47) is formed with a forward extension 674 (FIG. 48) which is bifurcated to embrace slidable change-shift member 627 in an annular groove 675 thereon so that rightward movement of the link shifts member 627 to clutch right traverse drive gear 626, FIG. 46, and that the return or leftward movement of the link shifts member 627 back to clutch left traverse drive gear 625, as shown. The left end of link 673 (FIG. 47) is pivotally connected to depending lever 676 and the right end carries a stud 677 which is received in lost motion slot 678 on the depending arm of bellcrank 679. Lever 676 and bellcrank 679 are pivotally mounted on plate 680 which, inset a suitable opening on frame 24, is secured to the rear ends of plates 29 and 30. Spring 681, fastened to lever 676 and the depending arm of bellcrank 679, urges lever 676 counter-clockwise and bellcrank 679 clockwise so as to normally yieldably hold stud 677 of the link in contact with the bellcrank at the right end of the slot 678 thereon. Through spring 681, link 673 is moved rightward to effect coupling of member 627 (FIG. 46) with gear 626 for shift of the carriage in that direction when bellcrank 679 (FIG. 47) is rocked counter-clockwise. Bellcrank 679 is turned more than enough to effect such coupling, the excess turning being taken up in lost motion slot 678. The slot also allows turning of bellcrank 679 when the stepped faces of drive gear 625 and 626 (FIG. 46) are not in mutual alignment at which time member 627 is not shiftable, as previously explained. A spring 682 (FIG. 47) of lesser tension than spring 681 is fastened to lever 676 and to plate 680 so as to urge the lever clockwise for normally holding (through link 673) member 627 (FIG. 46) engaged with the left traverse drive gear 625. The other arm of bellcrank 679 (FIG. 47) extends rightward and has formed on its free end a lug 683 by which the bellcrank is turned counter-clockwise or upward. The shanks of right shift keys 20 (FIG. 43) and 644 overlie the forward arm of lever 684, pivoted on shaft 324, and the rearward arm of the lever underlies the lug 683 (shown in phantom) of bellcrank 679. Depression of either key rocks lever 684 counter-clockwise to effect shift initiation, as described in the parent application, and to elevate bellcrank 679 for effecting rightward shift of the carriage.

In FIG. 49 a rearwardly extending lever 685, pivoted on shaft 250, carries roller 686 which overlies the periphery of cam 222 of the multiplying power unit, and on its free end under the lug 683, the lever has an upwardly extending member 687 fulcrumed thereon. One end of link 688 is pivotally connected to member 687 and the other end has a lost motion slot 689 in which stud 690 on the depending arm of bellcrank 691 is received. Bellcrank 691 is pivoted on shaft 324 and its other arm extends generally forwardly where integral lug 692 underlies the shank of right direction key 12. Torsion spring 693, fastened to bellcrank 691 and the machine frame, urges the bellcrank clockwise against the key shank. Spring 694 of lesser tension than spring 693 is fastened to the generally depending end of member 687 and to any suitable stationary member so as to hold roller 686 in contact with cam 222 and to influence member 687 clockwise as limited by the slot and stud connection of link 688 with bellcrank 691. The arrangement is such that when key 12 is in normal or up position, member 687 is canted forwardly of lug 683 on bellcrank 679, as illustrated, and that when key 12 is depressed, bellcrank 691 rocks counter-clockwise allowing spring 694 to turn member 687 clockwise to a generally vertical position under the lug 683. Then, and only then, elevation of lever 685 will also elevate bellcrank 679. Cam 222 is so contoured that in each 360-degree clockwise revolution it elevates lever 685 sufficiently to effect the rightward shift coupling operation (when member 687 is in its vertical position), before the previously described automatic shift initiating operation occurs. Cam 222 allows lever 685 to return to its normal position after the stepped faces of member 627 (FIG. 46) and of the disengaged drive gear 625 are displaced angularly from each other so as to prevent re-engagement with each other until the ordinal shift is completed. Lever 685 (FIG. 49) is also elevated by lever 695 in response to each depression of the "0" multiplier key which in effect is a shift initiating key. Lever 695, pivoted on shaft 250 and formed with lug 696 which underlies lever 685, is turned counter-clockwise by means actuated by the "0" multiplier key, as described in the parent application.

Thus, with key 12 in its up position, the ordinal shift of the carriage for multiplying will be leftward, and with key 12 in depressed position the ordinal shift will be rightward. However, when the machine is cycled for division, the carriage is shifted leftward even though key 12 may be in depressed position. The rearward movement of link 688, in response to depression of key 12, carries stud 697 on the link into the path of forward movement of finger 698 on slide 699 which is slidably mounted at its rearward end on stud 700 on the machine frame, and which is pivotally mounted at its forward end on lever 701, fulcrumed on shaft 250. Link 702 is pivotally connected to lever 701 and to lever 183 (FIG. 15) of the division conditioning mechanism, previously described. Lever 183, it will be recalled, is rocked counter-clockwise when division is started. Thus, link 702, lever 701, FIG. 49, and slide 699 are moved forwardly with slide finger 698 engaging stud 697 for moving link 688 forwardly sufficiently to recant member 687. With key 12 being locked in operated position, the forward movement of link 688 is taken up in slot 689. Slide 699 is returned automatically to its normal position when the division computation is completed, allowing spring influenced member 687 to move to its vertical position again.

Normally, when key 12 is depressed, key 10 (FIG. 50) is in its up or normal position and, conversely, when key 10 is depressed, key 12 (FIG. 49) is in its normal position. Key 10 (FIG. 50) controls the direction of the shift initiated by the carriage return key so that the carriage will shift in the direction opposite to that in which it shifts for multiplication computations. The shank of key 10 overlies lateral lug 703 on bellcrank 704 which is fulcrumed on shaft 324 and is influenced clockwise against the key shank by torsion spring 705 fastened to the bellcrank and the machine frame. Stud 706 on the depending arm of the bellcrank slidably supports the forward end of link 707 in slot 708 thereon. The rearward end of link 707 is pivotally connected to member 709 which is fulcrumed on the free end of the rearwardly extending arm of bellcrank 710 pivoted on shaft 250. Torsion spring 711 of lesser tension than spring 705 is fastened to member 709 and bellcrank 710 for turning the member clockwise from canted to generally vertical position to situate beneath the lug 683 when bellcrank 704 is rocked counterclockwise by key 10. Member 709 is canted forwardly of lug 683, as illustrated, when key 10 is in normal or up position. Bellcrank 710, as described in the parent application, is elevated in response to depression of the carriage return key 13, FIG. 1 at such times, when member 709 (FIG. 50) is in canted position, the carriage shifts leftward, and when 709 is in vertical position, bellcrank 679 is elevated to effect rightward shifting. The carriage return key is not depressable during division cycling, as previously explained.

Since keys 10 and 12 (FIG. 49) may be operated at operator option, means are provided for preventing members 687 and 709 (FIG. 50) from rocking from canted to vertical position, or vice versa, while the members are in elevated position. A generally stationary member 712 (FIG. 49) formed with lateral lug 713 which extends rightward over links 688 and 707 (FIG. 50). Link 707 is formed with an upright finger 714 and link 688 (FIG. 49) with upstanding finger 714a. Fingers 714 and 714a terminate slightly below lug 713 when the respective link is in its normal down position. Fingers 714 and 714a situate immediately forward and rearward of lug 713 when the related members are respectively in their canted and vertical positions. In elevated position of a link, lug 713 stands in the path of the respective finger 714 or 714a so as to block the link from shifting in the direction opposite to that in which it last moved. If, for example, one of the links is in operated position and the depressed key is returned to its normal position while the link is in elevated position, lug 713 will hold the link and therethrough the related bellcrank 704 or 691 (FIG. 49) in operated position until the link is lowered again. If one of the links is in its forward position and the related key is depressed while the link is in elevated position, lug 713 holds the link while the related bellcrank moves freely, its stud 690 or 706 (FIG. 50) sliding in the slot of the link, and after the spring tensioned link is lowered, it moves to its rearward position. The end of each finger 714 and 714a and the under edge of lug 713 is beveled so that in the event a key is partially depressed at the time respective link is elevated, the beveled faces as shown coact to move the link positively to either its forward of rearward position.

The shanks of the setup keys (left direction 10, FIG. 23, non-shift 11 and right direction 12) are slidably mounted on the keyboard frame and each is provided with return spring 715. The strokes of the keys are limited by bar 716 which is passed through suitable slots on the shanks and is removably fixed to the keyboard frame. A spring tensioned, rockably mounted latch 717 is right adjacent to the key shanks which are so contoured that depression of a key effects oscillation of the latch, and that the latch holds the key in depressed position. If one of the keys is locked in depressed position and another of the keys is depressed, the oscillation of the latch permits the initially depressed key to be returned by its spring. Finger 718 of the latch extends upwardly through a suitable slot on the frame for manual oscillation of the latch in the event it is desired to have all the keys in the up position. Normally, however, when one key is in depressed position the other two key are in their up position.

(10) TABULATION

In the exemplary embodiment herein shown, provision is made for ten ordinal positions of the carriage, two end or extreme positions and eight intermediate positions. The tabulating mechanism automatically causes the carriage stop-start means to arrest the carriage power unit whenever the carriage shifts to an end position, and the mechanism may also be selectively conditioned and rendered operable to cause stopping of the carriage at any ordinal position between the extremes.

Eight keys 14 (FIG. 1) are provided for conditioning the mechanism. Each key, reading from left to right, has a numeral 2 to 9 on its face, which represents the ordinal position of the carriage for which the mechanism will be conditioned upon depression of that key. Even through the tabulating mechanism is in its conditioned state, it is normally inoperable until the same is rendered effective or operable by means operated automatically by the carriage power unit when cycling is initiated by carriage return key 13, right and left keys 644, 645, or divide tabulation key 19, as will be described presentlly.

Keys 14 (FIG. 56) are pivotally mounted on shaft 719 of the keyboard dials 9, which is journaled on frame members 34 and 39, FIG. 51. These keys are locked down automatically upon depression and are held in depressed position until released by depression of either of the two clearing keys 15, one situated at each end of the row of keys 14. Directly under each key 14 is a latch-pawl 720 (FIG. 56) formed of any suitable flexible material and secured to shaft 721 which is journaled on frames 34 and 38, FIG. 51. A member 722 of relatively non-flexible material is fixed to shaft 721 towards each end thereof. The free end of each member 722 underlies one of the clearing keys 15 (FIG. 55) so that upon depression of one of the keys 15, the unit formed of the parts 722, 721 and 720 (FIG. 56) swings counter-clockwise against the tension of a pair of torsion springs 723, FIG. 55, each of which is fastened to a member 722 and to a member 724. Member 724 is journaled on shaft 719 and is held stationary by its depending arm which is bifurcated to embrace fixed shaft 316 of the keyboard mechanism frame.

In normal position, each latch-pawl 720 (FIG. 56) is flexibly pressed against the rounded rearward face on hook 725 formed under the forward end of the shank of the related key 14, thereby to cam the key upwardly to normal position, against the overlying cover plate 726. When a key is depressed sufficiently, its flexed latch 720 snaps clockwise into the recess formation of hook 725, thereby to hold the key in depressed position. The latching action of one latch 720 does not expend the flexure of the other latches, which are individually flexible. Hence, more than one key 14 may be depressed and locked to condition the tabulating mechanism for as many tabular positions of the carriage. Depression of either clearing key 15 (FIG. 55) rocks the aforedescribed unit of parts 722, 721 and 720 (FIG. 56) counter-clockwise to disengage latches 720 from hooks 725 of depressed keys, whereupon the keys are returned by their respective springs which will be described presently.

Adjacent each key 14, an ordinal member 727 is fulcrumed on shaft 719. Stop initiating members 728, one for each ordinal member 727, are pivoted on shaft 729 which is journaled on frame members 34 and 39, FIG. 51. Each stop member 728 (FIG. 56) is formed with a recess on its forward end for receiving lateral extension 730 on the rear extremity of its related member 727 so that actuation of member 727 will rock stop member 728. U- shaped bail 731 is secured to shaft 719 toward the ends thereof, FIG. 51, and a generally depending lever 732 is also secured to the shaft at its right end. Torsion spring 733, fastened to frame member 39 and lever 732, urges the unit formed of parts 719, 731 and 732 (FIG. 14) clockwise to normal position with bail 731 (FIG. 54) contacting a suitable stop, such as surface 734 on frame 38 as viewed from the right. The bail stands in the path of clockwise movement of generally upright arms 735 (FIG. 56) of members 727. Hence, in its normal position bail 731 holds members 727 in a counter-clockwise position at which the stop members 728 coupled therewith are held out of the path of compressible cylinder 53 carried by the carriage. In this state the tabulating mechanism is referred to as being inoperable or ineffective.

A torsion spring 736 is situated between each member 727 and the rearwardly extending lever arm of key 14 and is fastened respectively to each to maintain the rearward extension of the key arm in contact with lateral lug 737 of member 727. Depression of a key 14 increases the tension of its spring 736 which serves to return the key and/or to turn the associated member 727 clockwise when bail 731 is swung clockwise, as will be described. Such turning of member 727 rocks the coupled stop member 728 counter-clockwise into the path of cylinder 53 for axial actuation of said stop member 728 by the cylinder, also to be described. With a stop member 728 in the path of the cylinder, the tabulating mechanism is in its operable state.

Referring to FIG. 14, the forward end of link 738 is pivotally connected to lever 732, and the other end of the link carries stud 739 which is received in cam slot 740 on depending lever 741. The lever 741 and a follower 742 which carries a roller 743, are secured to the opposite ends of a sleeve 744 to form a unit rockable on shaft 102 for movement of 741 with 742. Hook member 745, fulcrumed on stud 739, has a lateral lug 746 which overlies the link for limiting counter-clockwise turning of the hook, thereby to form a unit of the hook and link rockable counter-clockwise about the link's pivot on lever 732. Tensioned spring 747, fastened to lever 741 and hook 745, tends to elevate the link-hook unit, but the unit is normally held in a depressed position as limited by the stud 739 contacting lever 741 at the downward end of slot 740. In this position of the parts, stud 739 holds the lever 741 in a counter-clockwise position so that the roller 743 is free from contact with the periphery of cam 621 of the carriage power unit, as shown.

Link 738 is held in its normal, depressed position by lever 748, pivoted on shaft 324. The rearward arm of lever 748 overlies lateral lug 749 on link 738, and the forward arm of the lever is formed with lateral lug 750 which is embraced by the bifurcated end portion on the generally upright arm of spring tensioned bellcrank 197. Spring 199 influences bellcrank 197 counter-clockwise and the lever 748 clockwise for holding link 738 in normal position against the tension of spring 747. Lever 748 is turned counter-clockwise in response to depression of shift keys 644 (FIG. 1), 645 and return shift key 13, as described in the aforementioned parent application. It will be recalled that lever 195 (FIG. 14) of the division conditioning mechanism is turned counter-clockwise when dividing is instituted by the division tabulation key 19. Thus bellcrank 197 is rocked clockwise, turning lever 748 counter-clockwise sufficiently to allow spring 747 to elevate the hook-link unit to a predetermined position as limited by slot 740. Stud 739 of the unit moving upwardly in cam slot 740 cooperates with the slot to rock the lever 741 clockwise sufficiently to effect engagement of roller 743 with a minor radius portion of cam 621. Then, in the initial phase of the first cycle of the carriage power unit, cam 621 rocks follower 742 (and the unit formed therewith) counter-clockwise to pull the link-hook unit rearwardly sufficiently to turn shaft 719 counter-clockwise for rendering the tabulating mechanism operable.

Fixed stud 751 on frame 30 stands in the path of upturned formation 752 on the rearward end of hook 745. While the hook is moving upwardly, its upturn contacts stud 751, causing the hook to rock clockwise about its pivot 739. Consequently, when the hook-link is moved rearwardly sufficiently to move 752 beyond stud 751, spring 747 will rock the hook counter-clockwise about its pivot 739 to latch it onto the stud. In latched position, hook 745 holds the parts connected therewith in operated position until the division computation is terminated or, when the machine is cycled only for shift operations, until the shift initiating key is returned. When this occurs, lever 748 is returned by spring 199 to depress the link-hook unit. Consequently, hook 745 disengages from stud 751 and spring 733 turns lever 732 clockwise, thereby to return the link-hook unit forwardly to normal position and to render the tabulating mechanism inoperable again.

Referring to FIG. 51 again, a stop member 753 is provided for each extreme position of the carriage. These members, supported on shaft 729, are similar to members 728. Lugs 754 (FIG. 55) of stationary members 724 support the extreme members 733, at all times holding members 753 in the path of cylinder 53. Stop members 728 (FIG. 51) and 753 are mounted on shaft 729 at spaced locations corresponding to the ordinal positions of the carriage. The members may be mounted in any well known manner so as to prevent their lateral displacement on the shaft in response to the axial thrust by cylinder 53. Instead, the shaft is journaled for axial movement so as to respond to the endwise actuation of a stop member by the cylinder. Such endwise movements of the shaft are limited, as by split rings 755 mounted thereon in annular grooves. The rings butt against the faces of the respective shaft journals 756 secured on frames 34 and 39.

The relationship between cylinder 53, carried on shaft 51 of the carriage, and the stop initiating members is such that when the carriage is at an ordinal position (assuming that the stop member of that position is not in the path of the cylinder), the cylinder overlies the stop member of thta position and is generally midway between the adjacent stop members, and the respective faces of the cylinder are generally equidistant from those members. For example, assuming that the 4th ordinal stop member 728 is in the path of the cylinder and the carriage is traversing either leftward from the 3rd ordinal position or rightward from the 5th position, the respective left or right face of the cylinder engages the 4th ordinal stop member early in the current cycle of operations and shifts the shaft 729 in the respective direction.

Ring 755 limited axial movement of shaft 729 is completed before the carriage completes its shift to the respective ordinal position. Accordingly, cylinder 53 is provided with yieldable or lost motion means to allow the carriage to complete its shift. Referring to FIG. 52, two bearing members 757 are slidably mounted on rail shaft 51 between a pair of split rings 758 mounted in annular grooves on the shaft. Spring 759 is placed between the bearings so as to urge the bearings apart axially, against rings 758. The casing of cylinder 53 is slidably supported by the bearings and it is rolled over on its ends sufficiently to embrace the bearings so as to prevent random sliding of the casing. If, for example, the carriage is moving leftward and the cylinder shifts the left extreme stop 753 (FIG. 53) leftward its limited extent, then the casing and the left bearing 757 are arrested by the stop, but the right bearing 757 continues to move leftward with the carriage for the remainder of the shift and compresses the spring 759.

Whenever the carriage is at an extreme position, the cylinder remains in its compressed state until the carriage is moved in the opposite direction, away from non-rockable or fixed stop 753. Then spring 759 restores the cylinder to its normal state, FIG. 52. If compression of the cylinder is effected by a stop member 728, FIG. 56, the cylinder is restored to its normal state when the stop is swung out of the path of the cylinder consequent the return stroke of bail 731. The bail is returned at or about the end of the cycle in which termination of the shift occurs, as previously described. Moving the cylinder away from stop 753, FIG. 55, or rocking the effective stop 728 (FIG. 56) out of the path of the cylinder allows shaft 729 to be returned axially to its normal position by spring means described in the parent application. In its normal state and at an intermediate position, cylinder 53 (FIG. 51) overlies the stop member 728 of that position. That stop cannot be swung into the path of the cylinder until the carriage has been shifted to an adjacent position. In the event that more than one stop 728 is swung into the path of cylinder 53, shift or division computation termination will occur when the carriage shifts to the position corresponding to the first obstructing stop. If a subsequent shift cycle is initiated by return key 13, FIG. 1, left key 645 or right key 644 (providing the shift is again in the same direction and that, if one of the latter two keys is used, it is held depressed indefinitely as described in the parent application), cycling will terminate when the carriage shifts to the position corresponding to the next obstructing member 728, FIG. 51.

Disc 760, secured to the right end of shaft 729, the left and right operated positions of which are shown in phantom, actuates means for effecting termination of shift operations and release of locked cycling keys, as disclosed in the parent application. Arrester lever 631 FIG. 42, disengaged from disc 633 during shifting operations, is reengaged with the disc, when shaft 729 (FIG. 51) is shifted to stop the carriage power unit at the completion of that revolution in which the shaft 729 is shifted by cylinder 53, as set forth.

Disc 761, secured to the left end of shaft 729, operates the division terminating means, as will be described, when the shaft is shifted leftward (the only direction in which it is shifted) during dividing operations.

(11) TERMINATION OF THE DIVISION PROCESS

Previously it had been explained that at about the end of each cycle of operations for an ordinal shift of the carriage during division, the carriage shifting mechanism automatically initiates operation of the dividing mechanism. The division process is thus continued for obtaining the next quotient digit. Since continuance of the division process depends on the operation of the shift mechanism, preventing the initiation of the shift operation automatically stops the process.

Shift operation for division is initiated, it will be recalled, by swinging the lever 289, FIG. 42, and the unit formed therewith clockwise. Member 284, FIG. 13, pivotally mounted on lever 280, normally has its arm 287 in contact with lug 288 of lever 289 for rocking the lever counter-clockwise, when lever 280 is so moved subsequent either a normal reduction of the dividend or the occurrence of a 0 quotient. To stop the division process, member 284 is turned counter-clockwise about its pivot, as described, so as to disengage its arm 287 from the lug 288 and to engage its hook 290 with lug 298 of lever 175. Then lever 175 instead of lever 289 is rocked counter-clockwise upon actuation of lever 280, whereby a shift cycle is not initiated, but, as previously explained, return to normal of the division conditioning mechanism is effected.

During division cycling of the machine, the depending end of spring-tensioned hook 293 is coupled with stud 292 on member 284, as previously described, so that upward movement of the hook will rock the member 284 counter-clockwise. The upper-end of hook 293 is pivotally connected at 294 to member 762 which is secured to one end of sleeve 763 turnable on shaft 764 fixed on the machine frame. The other end of sleeve 763 has secured thereto a generally horizontal lever 765 for movement of 765 with 763. The free end of lever 765 carries a lateral lug 766. A bellcrank 767 (also see FIG. 13a) is pivotally mounted on bracket 768, secured to frame member 27, so that the generally horizontal transverse arm 769 of the bellcrank overlies lateral lug 766 and that the generally upright arm of the bellcrank stands in the path of leftward shift of disc 761 on shaft 729. It will be recalled that the tabulating mechanism shaft 729 is moved leftward in the machine a predetermined extent by the carriage as the carriage shifts to the leftmost ordinal position, or to a preselected ordinal position as when a limited number of quotient digits are desired. At such times the disc 761 rocks bellcrank 767 so that its arm 769 moves downwardly sufficiently to turn the unit of parts 765, 763 and 762 counter-clockwise to effect disengagement of member 284 from lever 289 and engagement of the member with lever 175. Then, during the subsequent cycle of operations after the next quotient digit is obtained, actuation of lever 280 will cause the division conditioning mechanism to return to normal instead of instituting another shift cycle of operations. Thereafter, the division process terminates automatically, as previously explained.

The terminating mechanism is also actuated by the eliminated dividend device to effect termination of the division process when the dividend is reduced to 0. Generally upright member 770, FIG. 57, is pivotally mounted on follower 771 and is notched at its upper end to engage stud 772 on lever 773 which is pivoted on stud 774 on the machine frame. Member 770 is normally held in engagement with stud 772 by spring 775, fastened to the member and the machine frame. Follower 771, pivoted on shaft 422, is influenced clockwise by spring 776, fastened thereto and the machine frame, so that roller 777 on the free end of the follower rides the periphery of cam 223 of the multiplying power unit. Cam 223 is so contoured as to effect reciprocation of member 770 once after each entry and carry operation in inboard orders of the product register, before initiation of shift operations occurs. Thus, through lever 773 and member 778, pivotally connected thereto, a carry mechanism is motivated for performing carry operations in outboard orders of the product register, all as described in the parent application. However, carry operations in outboard orders of the product-dividend register need never be performed during division computations. Member 770, in normal position stands in the path of forward movement of lug 779 on member 699 of the conditioning mechanism, member 699 (FIG. 49) having been explained hereinbefore in connection with overruling of a right shift setup. Hence, when division is initiated member 699 (FIG. 57) swings member 770 counter-clockwise, disengaging it from stud 772 and latching it on stud 780 on lever 781 pivoted on stud 774. Thus, instead of the carry mechanism for outboard register orders being actuated, lever 781 is rocked counter-clockwise and returned immediately after each reduction of the dividend. Lever 782, also pivoted on stud 774, is held against lateral lug 783 on lever 781 by torsion spring 784 fastened to levers 781, 782. Link 785 is connected to lever 782 and to generally depending arm of bail 786 which is turnably mounted on the machine frame on studs 787 and 788, FIG. 13. Spring 789, FIG. 57, fastened to bail 786 and the machine frame influences the bail counter-clockwise and through link 785, influences levers 781 and 782 clockwise to rest position as limited by lever 782 contacting fixed stud 790 on the machine frame. Bail 786, as will be explained, is free to turn clockwise when all inboard dividend dials stand at "0," but such turning of the bail is blocked when an inboard dividend dial stands at other than "0." Accordingly, when the dividend is reduced to "0," the downward stroke of member 770 is effective to turn bail 786 clockwise, but when an inboard dial indicates a number other than "0," turning of the bail and lever 782 is blocked, whereupon spring 784 yields.

In FIG. 13 such turning of the bail 786 is counter-clockwise. The depending arm of the bail carries stud 791 which is received in slot 792 on the rearward end of link 793, the forward end of which is pivotally connected to the depending arm of bellcrank 794 fulcrumed on shaft 764, so that the bellcrank turns counter-clockwise when the bail is so moved. Torsion spring 795, fastened to bellcrank 794 and the machine frame, urges the bellcrank clockwise to rest position as limited by the forward end of slot 792 contacting stud 791 on the bail. The other arm of bellcrank 794 has a lateral lug 796 which underlies finger 797 on lever 762 to hold the lever and hook 293 in rest position and to elevate them when it is turned counter-clockwise. Elevation of hook 293, it will be recalled, effects termination of division.

Oscillation of bail 786 is completed before bellcrank 280 is turned counter-clockwise for normally initiating a shift cycle of operations. Hence, detaining means is provided for at such times holding the terminating mechanism in operated position so that subsequent actuation of bellcrank 280 will effect return of the conditioning mechanism, as described, instead of initiating shift operations. Slot 792 permits bail 786 to return while the terminating mechanism is held in operated position.

Detent 798, pivotally mounted on stud 799 on the machine frame, is urged counter-clockwise by torsion spring 800, fastened thereto and to the machine frame. Lug 796 normally stands in the path of counter-clockwise swing of the upper portion of detent 798. The depending portion of detent 798 contacts lateral lug 801 on lever 802 which normally holds the detent clockwise of the lug 796. Lever 802, as will be described, is a part of the multiplying power unit actuated means which, among other operations, effects actuation of lever 280 in each cycle of multiplying operations for normal division. Lever 802 is moved clockwise about its pivot, fixed stud 803, whereupon spring-tensioned detent 798 is free to turn counter-clockwise against the lug 796. Then when bell-crank 794 is turned counter-clockwise, detent 798 moves further counter-clockwise, under the lug 796 to hold bellcrank 794, lever 762 and hook 293 in operated position until after lever 280 is operated. Thereafter, the counter-clockwise return stroke of lever 802 disengages detent 798 from lug 796 whereupon the terminating mechanism returns to normal ineffective position. It will be recalled that in effective or operated position of the terminating mechanism, lever 280 is coupled with lever 175 instead of lever 289. Accordingly, lever 175 is actuated for effecting restoration of the conditioning mechanism and shift initiating lever 289 is not actuated, whereby all cycling of the machine terminates, as described.

Referring now to FIG. 58, bail 786 carries a plurality of ordinally disposed depending sensing finger means 804, each corresponding to an order of the product register carry sensing mechanism. In each order of the entry and carry mechanism, except in the highest and lowest inboard orders, carry sensing means is provided, including levers 805 (FIG. 60) and 806 (FIG. 62) pivoted respectively on transverse shafts 202 and 807 of the entry and carry mechanism support means. Lever 806 has pivotally mounted thereon spring held sensing member 808, and is formed with slot 809 for receiving stud 810 of lever 805, FIG. 60. Member 811, FIG. 59, pivotally mounted on lever 805 at 812 is urged clockwise by torsion spring 813, fastened thereto and to the lever, so that the rearward arm of member 811 is held against the overlying lug 814 of lever 805. Parts 805, 806 and 808 are primarily for sensing operations for simultaneous carry and are elevated subsequent each product entry, i.e., lever 806 is turned counter-clockwise by lever 805 which is turned clockwise in response to the upward movement of the transverse rod 815, against which lever 805 is influenced by spring means, all as disclosed in the parent application. When an inboard product dial indicates or stands at "0" position in subtractive operations, as in division, a lateral lug 816 of member 211 (to be described more fully) of the dial mechanism stands in the path of upward movement of the associated sensing member 808 so as to block the upward stroke of levers 805 and 806 at a predetermined position. In the blocked position of lever 805, end face 817 on member 811 is not elevated sufficiently to stand in the path of the associated bail finger 804. Thus, the bail 786 is free to turn counter-clockwise sufficiently to effect termination of division as described. If, however, a dial stands at other than zero, a lug 816 does not stand in the path of sensing member 808. Then levers 805 and 806 move upwardly until stopped by means of lateral lug 818 on forward end of lever 806 contacting the under edge of lever 805. In this operated position of lever 805, face 817 of member 811 stands in the path of the associated bail finger 804, to block bail 786 from turning counter-clockwise, and division termination is not effected.

If an inboard dial stands at "1" when the sensing operation is performed, associated sensing member 808 will stand in the path of clockwise movement of lug 816, of member 211 and, of course, face 817 is then in the path of associated finger 804. At about the time member 808 moves in back of lug 816, a carry operation may occur with the respective dial turning from "1" to "0." At such times, lug 816 moves clockwise one step, rocking sensing member 808 counter-clockwise against the tension of its torsion spring 819 (also see FIG. 62) supported on stud 820 on lever 806. As a result, finger 821 on member 808 engages lug 822 (FIG. 59) on member 811 and turns member 811 counter-clockwise to move its stop face 817 out of the path of the associated bail finger 804. Spring 819 exerts pressure on the underside of member 808 so as to normally yieldably hold the member in its upright, sensing position.

The highest order sensing means comprises lever 823, FIG. 61, rockable on shaft 202 of the carrier means, and a bellcrank sensing member 824 pivoted on the lever. Sensing member 824 is held yieldably in normal position by spring 825 which presses against the underside of the bellcrank and is anchored on the lever so as to normally hold the sensing member in its upright sensing position. A torsion spring 826 is fastened to lever 823 and to any suitable convenient relatively stationary member of the carrier means, for turning lever 823 clockwise or upwardly against the transverse rod 815 so that when the rod is elevated, the lever 823 will also elevate. The arrangement is such that the generally upright arm of bellcrank 824 stands to engage a lug 816 of member 211 of the dial mechanism associated therewith when that dial stands at "0" during division, at which time end face 827 on generally horizontal arm of bellcrank 824 does not situate in the path of the related bail finger 804. The upward stroke of lever 823 is not blocked by a lug 816 when the associated dial is indicating a digit "1" to "9" inclusive, whereupon the lever moves sufficiently to carry face 827 of bellcrank 824 into the path of the related bail finger 804 to stop counter-clockwise turning of the bail. If the highest order dial indicates "1" when the sensing operation is performed, sensing member 824 will stand in the path of clockwise movement of a lug 816 of member 211. A carry operation may occur at about the time member 824 moves in back of a lug 816 with the respective dial turning from "1" to "0." At such times the involved lug 816 moves clockwise one step, rocking sensing member 824 counter-clockwise against tension of its spring 825 sufficiently to move face 827 out of the path of the related bail finger 804.

For the lowest inboard order dial mechanism the sensing means comprises a lever 828 (FIG. 63) pivoted on carrier shaft 202 and extending rearwardly to underlie the rod 815 against which the lever is influenced clockwise by torsion spring 829 tensioned against lug 830 of the lever and against shaft 263 carried by the carrier. In response to elevation of rod 815 spring 829 moves lever 828 clockwise upwardly. When the related dial indicates "0" a lug 816 of the dial mechanism member 211 stands in the path of upward movement of sensing lug 831 carried by lever 828 to limit movement of the lever, and no block is presented to bail 786. If, however, the dial indicates a digit other than "0," a lug 816 will not block lever 828 which will then elevate sufficiently to move its lug 830 into the path of bail finger 804 to block counterclockwise rocking of the bail.

From the above it can be seen that when all the inboard dials of the dividend register indicate "0," actuation of bail 786 is not blocked whereupon termination of division operations is made, there being no further result obtainable and, therefore, no need for further operations; also, that when at least one dial indicates a digit other than "0," actuation of bail 786 is blocked and the division process continues automatically.

(12) QUOTIENT DEVICE

Representations of predetermined quotient integers are provided in a quotient device which is so devised and arranged, that a significant trial quotient may be selected and set up respectively in accordance with the value of the highest order of the divisor set up in the 10th, or highest order, bank of keys 4, FIG. 2, and the value of the registration in the two highest inboard orders of dividend register 3.

In FIG. 64, nine division plates or elements 846 to 849, and 841 to 845, inclusive, are shown in the order of their positions from left to right in the machine. Each element represents that divisor value which is indicated by the last digit of the reference numeral therefor, e.g., element 847 represents the divisor 7. Referring to FIG. 66, elements 846, 848, 849 and 845 are formed as complete rims while the other five elements, in one preferred form are rim-sections, the omitted portions being of no computational or structural utility. The nine elements are juxtaposed axially, as shown in FIG. 64, and they are secured together by rods 850 which are passed therethrough and through the annular spacers 840 therebetween. Left and right end elements 846 and 845 (FIG. 66) are formed with spokes and with hubs for receiving bearing members 851 and 852, respectively. Bearing 851 may be fixed to element 846 by rivets 853. Element 845, pinion gear 854 (FIG. 64) and disc 855 are mounted on the bearing 852 (FIG. 65) and may be secured by rods 856, to bearing flange 857 between the disc 855 and gear 854, FIG. 64. The unit or quotient device thus formed of the elements 841 to 849, gear 854 and disc 855 is rotatably mounted on shaft 858 which is supported on frame plates 26 and 27. It is to be noted that the spacing between elements 841 and 849 is generally twice that of the spacing between other adjacent pairs of elements. A portion of this larger spacing, about midway thereof, corresponds to the normal or "0" value position occupied by the quotient sensing member 859 (FIG. 67). As will be described with more particularity, sensing means 859 is moved laterally from its "0" value position a predetermined extent rightward for each value "1" to "5," inclusive, and similarly leftward for each value "9" to "6" inclusive, in response to depression of that value key 4 (FIG. 2) in the leftmost bank. Hence, the elements are arranged as indicated in FIG. 64, so that the quotient sensing member always aligns with that element which represents the value of the depressed key. Such alignment of the sensing member with an element is maintained during a division process and constitutes selection of the element for sensing of each set up quotient represensation thereon.

Referring to FIG. 66 and as identified on elements 846 and 842, the periphery of each division element is stepped with uniformly descreasing radii to form peripheral portions or sensing stations 860 to 869 inclusive, with station 860 being the most remote from the axis. Each station represents that integer value which is indicated by the last digit of the reference numeral therefor, e.g., stations 860 and 863 represent the values "0" and "3" respectively. The integers 0 to 9 inclusive are quotient values.

With 870 (FIGS. 66 and 67) as the coincident starting location on each element, each successive sector or angular unit of 3.6 degrees counter-clockwise therefrom represents a different dividend value of the arithmetical series "0," "1," "2," "3" . . . These sectors are the sensing or blocking areas on the stations for contact therewith of finger 871 of quotient sensing member 859. The number of sensing areas or sectors on a peripheral portion or station is fixed. Each station 860 to 868, inclusive (FIG. 66), consists of as many sectors as the value of the divisor represented by the respective element. For example, on element 842 each station 860–868 consists of two sectors each, as indicated. The sectors of station 860 on element 842 represent dividend values "0" and "1," and the successive sectors of station 861 represent the values "2" and "3," respectively. The foregoing assignments of dividend, divisor and quotient value to elements, sectors and stations are tabulated below in Table I for easy reference.

Table I

| Quotient Values → | 0 | 1 | 2 | 3 | 4 | 5 | 6 | 7 | 8 | 9 |
|---|---|---|---|---|---|---|---|---|---|---|
| Stations | 860 | 861 | 862 | 863 | 864 | 865 | 866 | 867 | 868 | 8699 |
| 841 | 0 | 1 | 2 | 3 | 4 | 5 | 6 | 7 | 8 | 9–19 |
| 842 | 0–1 | 2–3 | 4–5 | 6–7 | 8–9 | 10–11 | 12–13 | 14–15 | 16–17 | 18–29 |
| 843 | 0–2 | 3–5 | 6–8 | 9–11 | 12–14 | 15–17 | 18–20 | 21–23 | 24–26 | 27–39 |
| 844 | 0–3 | 4–7 | 8–11 | 12–15 | 16–19 | 20–23 | 24–27 | 28–31 | 32–35 | 36–49 |
| 845 | 0–4 | 5–9 | 10–14 | 15–19 | 20–24 | 25–29 | 30–34 | 35–39 | 40–44 | 45–59 |
| 846 | 0–5 | 6–11 | 12–17 | 18–23 | 24–29 | 30–35 | 36–41 | 42–47 | 48–53 | 54–69 |
| 847 | 0–6 | 7–13 | 14–20 | 21–27 | 28–34 | 35–41 | 42–48 | 49–55 | 56–62 | 63–79 |
| 848 | 0–7 | 8–15 | 16–23 | 24–31 | 32–39 | 40–47 | 48–55 | 56–63 | 64–71 | 72–89 |
| 849 | 0–8 | 9–17 | 18–26 | 27–35 | 36–44 | 45–53 | 54–62 | 63–71 | 72–80 | 81–99 |

Divisor Values ↑

Section Dividend Values ↑

In Table I it is shown that a station of an element represents that integer which is the quotient value of the dividend value represented by a sector of that station, divided by the divisor value of that element. To further illustrate this: Element 846 (FIG. 66) represents the divisor 6, station 865 thereon consists of sectors representing dividend values 30–35 (also see Table I), and the station represents the digit 5 which is the quotient integer of 6 divided into any one of the numbers 30–35.

From the foregoing it will be understood that to set up a significant quotient station on a selected element, it is necessary only to turn the quotient device clockwise (FIG. 67) so as to align with the quotient sensing finger 871 that sector which represents the value in the two highest order inboard dividend dials. This is accomplished, as will be described, by limiting the turning of the quotient device to an angular extent of generally as many sectors or angular units as the value of the dividend in such orders.

First, however, it will be noted in the rightmost column of Table I that each station 869 consists of 10 more sectors than the other stations on the respective element. The purpose for such extension of the 9 value stations is to provide the quotient of 9 for instances occasioned by the divisor being higher in value than the value of the dividend in the orders being compared. The example of 298402÷299 as "solved" by this machine will serve to clearly illustrate the utility of a 12-section station 869 on element 842. The example:

*Table II*

TWO HIGHEST ORDER INBOARD DIALS 8

```
                       0 8
  2(99))  0298402   (1998—Appearing as 0998 in dials 7
  299×1    − 299
           ─────
            9999   —Overdraft
           ═════
          298402   —Registration restored; ordinally shifted
  299−9   −2691
           ─────
           029302  —Remainder
           ═════
           29302   —Ordinally shifted
  299×9   −2691
           ─────
           02392   —Remainder
           ═════
            2392   —Ordinally shifted
  299×9   −2691
           ─────
            9701   —Overdraft
           ═════
            2392   —Registration restored
  299×8    2392
           ─────
            0000   —Operation terminated
```

The dividend 298402 is set up in register 3 (FIG. 2) with the 2 appearing in the dial right adjacent the highest inboard dial, i.e., in the 19th dial 8 which is aligned with the leftmost bank of keys 4. Thus the registration appears as 0298402. The divisor 299 is entered on keys 4 with the 2 thereof in the leftmost bank and, as will be described, the quotient sensing member 859 (FIG. 67) is shifted to align with element 842 in accordance with the set up "2." This selection is made for the duration of the division process. The dividend value 02 (of the highest orders) is sensed, as will be described, and the quotient device is turned so as to align with sensing finger 871 (FIG. 67) that sector which represents 02. Hence, the 1 value station 861 (FIG. 66) is set up and sensed. The machine then subtracts the product of 1 times 299 from 298 of the dividend. This, of course, results in an overdraft. Consequently, the trial quotient is reduced to 0, the registration 298 is restored and the carriage is shifted leftward one ordinal position. Hence, 29 is the registration in the two highest inboard dials. Accordingly, in the subsequent operation of the division mechanism, the quotient device will be turned so as to align the sector representing 29 with the quotient sensing member. Therefore, for instances such as the one just pointed out, station 869 on element 842 consists of 12 sectors, one sector for each of the values 18–29. Similar conditions, of course, may also occur with the other divisor values 1, and 3–9. Accordingly, the 9 value stations on the elements for those divisors are also extended so as to provide comparison with a dividend value of 9 more than 10 times the divisor digit. The need for comparing a divisor digit to a dividend greater than 9 more than 10 times the divisor will never occur.

Continuing with the solution of the above problem in Table II: The selected, set up station 869 is sensed. Then the machine is caused to subtract 2691, the product of 9×299, from 2984 of the dividend. The remainder becomes 029302, and after the customary ordinal leftward shift of the carriage, 29 becomes the controlling value. Consequently, the trial quotient 9 is set up again and the remainder is reduced to 02392. In the next cycle of operations, sensing of 23 causes the quotient 9 to be set up once more. Subsequent subtraction of the product 2691, however, results in an overdraft. Hence, the machine is caused to reduce the trial quotient by 1, restore the remainder and to subtract therefrom the product of 8×299. This reduces the remainder in all orders to 0, whereupon the eliminated dividend device effects termination of all operations of the machine.

Turning of the quotient device clockwise (FIG. 67) for setting up quotient stations and counter-clockwise for returning it to normal position is performed by the following means: A depending gear segment 872, pivotally mounted on shaft 873, is engaged with pinion gear 854 secured to the quotient device. Shaft 873 is fixed on frame plate 26 and 27, FIG. 64. Tensioned torsion spring 874, fastened to segment 872 and the machine frame, serves to swing segment 872 (FIG. 68) counter-clockwise sufficiently to rotate the quotient device clockwise generally one revolution.

Gear segment 872 is normally restrained clockwise, as will be described, to urge the quotient device counter-clockwise so that its disc 855 (FIG. 67) contacts stop rod 875 secured on companion members 876 and 877. As may be seen in FIG. 65, member 876 is pivoted on bearing flange 857 and member 877 is pivoted on shaft 858 with disc 855 situated between the members. Companion members 876 and 877 are formed respectively with arms 878 and 879 which extend forwardly in the machine and are secured together by rod 880 beyond the maximum radial extent of the periphery of disc 855. Thus a unit is formed of the companison members, which at times is turned clockwise by the quotient device. Return torsion spring 881, FIG. 64, fastened to the arm 879 and to plate 27, influences the companion members 876 and 877 counter-clockwise (FIG. 67) to normal position, as shown, with lateral lug 882, formed on the upper portion of member 877, against stationary stop stud 883 on plate 27. Thus, the rod 875 serves to stop the quotient device in normal rest position. Other functions of the companion members 876 and 877 pertain to limiting the extent of clockwise turning of the quotient device, as will be described later.

The clockwise restraint on gear segment 872 and liberation of the segment for its counter-clockwise spring actuated stroke is performed by the following means: A link 884 is pivotally connected to the segment and to upright arm of bellcrank 885 (FIG. 68) which is adjacent to cam follower lever 886. Both the bellcrank and cam follower are pivotally mounted on fixed shaft 75. Roller 887 on the rearward arm of lever 886 contacts the periphery of cam 60 of the division power unit, and the forward arm of the follower lever carries lateral lug 888 which overlies the forward arm of bellcrank 885. Torsion spring 889, fastened to follower 886 and bellcrank 885 tends to turn the follower and bellcrank so as to influence the lug 888 toward contact with the bellcrank. The tension of spring 889 exceeds the tension of spring 874 sufficiently to prevent bellcrank 885 from turning independently of follower lever 886 in response to the influence of spring 874 while the follower lever is blocked from turning clockwise by the cam. Parts 885 and 886 swing clockwise as a unit in response to spring 874 when the follower is allowed to turn clockwise by the contoured periphery of the cam. In order to restrain segment 872 clockwise so as to positively hold the quotient device in normal position, follower lever 886 is moved counter-clockwise sufficiently by the major radius periphery of cam 60 to move lug 888 away from the forward arm of bellcrank 885 against the tension of spring 889.

Early in the clockwise revolution of cam 60, degenerating portion 890 of its periphery allows follower 886 to turn clockwise under the influence of spring 889 until lug 888 contacts the forward arm of bellcrank 885 and then spring 874 turns segment 872 counter-clockwise for turning the quotient device to set-up a quotient station. Portion 981 of the cam's periphery returns the follower 886 counter-clockwise to normal position again, whereby the quotient device is also returned to normal or rest position. This occurs subsequent to sensing of the set-up quotient station.

(13) QUOTIENT SET-UP CONTROLS AND DIVIDEND SENSING MEANS

In order to set up the pertinent quotient station on the divisor selected division element settable high and low order controls are provided for limiting the extent of turning of the quotient device to as many angular units or sectors as the value of the dividend in the two highest inboard dividend dials.

The periphery of disc 855 (FIG. 65) of the quotient device is stepped, with uniformly increased radii, at each 36 degrees or tenth part of its periphery. The steps ascend counter-clockwise about the periphery and the riser of each step is formed as a concave recess, 900 to 909 inclusive. Thus the angular displacement between any two consecutive risers is equal to the sum of the angles of ten consecutive sectors on the division element. Similar concave recesses or notches 910 to 919, inclusive, are formed on the rearward edges of the afore mentioned companion members 876 and 877. The notches 910-919 are spaced radially with respect to axis of shaft 858 so as to correspond radially respectively with the disc recesses 900-909. Each notch and its corresponding recess represents that value 0 to 9 as denoted by the last digit of the reference numeral therefor. Member 920 and stud 921 thereon are part of the high order (or tens digit) control which will be described with more particularity later. At present it will suffice to say that member 920 is movable forwardly arcuately relative shaft 858, and that it is elevatable by a high order sensing device so as to position stud 921 in the path of that recessed riser and in front of the corresponding notch on the companion members, which represent the value of the registration in the highest order inboard dial. Normally, stud 921 is in 0 position, interposed between the notched riser 900 and recesses 910, and it is elevated from that position only when the registration is other than 0. As will be described, the elevation of the high order control and sensing of the dividend registration occur concurrently. Thereafter, the previously described turning of the quotient device occurs, during which disc 855 engages the stud 921 by the selected recess which moves the stud against the respective companion notches. The arrangement is such that at the time the stud 921 contacts the notches on the companion members, the quotient device will have turned substantially an extent of 10 times as many angular units as the value represented by the contacted notches, and that, at the time contact occurs, on the selected divisor element the sector representing 10 times the dividend registration in the highest inboard dial is in sensing alignment with finger 871 (FIG. 67) of the quotient sensing member 859.

Referring to FIG. 69, companion members 876 and 877, as previously explained, are spring-held in normal position, and when the members are contacted by stud 921 and the stud is moved further forwardly, the members also turn with the quotient device. It can be seen then, that stopping of the companion members will also stop movement of the quotient device. Accordingly, rotation of the companion members is limited to as many angular units as the value of the registration in the lower of the two highest order inboard dials. This is accomplished by the low order (or units digit) control 922 which is pivotally mounted on fixed shaft 873 and depends adjacent the reverse face of member 977. A lateral lug 923 on member 877 overlies the lower portion of control 922 which is formed with 10 digital stops, 930 to 939 (FIG. 67) each stop representing that value 0-9 as denoted by the last digit of the reference numeral therefor. A low order sensing means (to be described) is provided for sensing the registration in the lower of the two highest order inboard dials and for concurrently turning control 922 clockwise a different extent for each registration 1-9. The arrangement of the stops 931 to 939, inclusive, is such that at each extent of turning of control 922, the stop representing the value of the sensed registration is situated in the path of lug 923. Control 922 (FIG. 69) is normally held in 0 position under the counter-clockwise influence of torsion spring 940 fastened to the rearward arm of the control and to the machine frame. In normal or 0 position of control 922 its rearward arm contacts stop stud 941 fixed on the machine frame, and its digital stop 930 is in the path of lug 923 so as to block clockwise movement of the companion members 876 and 877. Each of the other stops 931-939, when in the path of the lug 923, blocks movement of the companion members upon clockwise turning thereof of as many angular units (3.6 degrees) as the value represented by the blocking stop. Thus, the quotient device is arrested upon turning thereof of as many angular units (3.6 degrees) as the value of the registration in the two highest inboard dials. In each of such arrested positions, the sector (on the divisor selected element) representing the registration in the two highest order inboard dials is in sensing alignment with finger 871 (FIG. 67) of the quotient sensing member 859. Thus, the quotient station comprising such a sector is set up for sensing by the sensing member. Assuming, for example, that the registration in the two highest inboard dials is 35. Stud 921 (FIG. 69) of the high order control is elevated into the path of disc recess 903 and in front of corresponding companion notches 913. At the same time, as will be described, low order control 922 is turned clockwise so that its stop 935 (FIG. 67) stands in the path of lug 923. The quotient device is then turned clockwise. Consequently, recess 903 (FIG. 69) engages stud 921 which is then carried against notches 913 to turn the companion members clockwise until stopped by lug 923 contacting stop 935, FIG. 67. At the time the notches 913 (FIG. 69) are engaged by the stud 921, the quotient device will have turned 3×10 angular units and thereafter it turns 5 more angular units with the companion members. Therefore, the quotient device turns a total of 35 angular units, and the sector representing 35 on the divisor selected element is then in sensing or blocking alignment with finger 871 (FIG. 67) of the quotient sensing member 859. If, for example, the selected element were 846, FIG. 66, station 865 would be the one set up for sensing. The value of station 865 is 5, the quotient of 35 divided by 6.

In this exemplary embodiment means are provided to reduce the impact between lug 923 (FIG. 67) and the stops on control 922. Generally, the spring driven quotient device will drive the companion members with increasing velocity as the extent of its turn increases. Hence, the impact between the lug 923 and the effective stop would be greatest when the device turns generally 99 angular units and the least when it turns in accordance with a 00 registration. In the latter instance, the quotient device will turn only sufficiently to take up the lost motion provided for operational clearance between the stud 921 of the high order control and the 0 value recess 900 and notches 910. The impact reducing means is provided as follows:

A bellcrank 942 is pivotally mounted at 943 on the upper portion of member 877. The depending arm of bellcrank 942 situates in the path of forward movement of the stud 921 and the other arm extends forwardly in the machine, generally parallelly with the companion member arms 878 and 879. A suitable conventional dashpot 944, preferably air type, is swiveled on rod 880 between the companion arms. Its piston rod 945 is connected by a clevis joint 946 to the parallel bellcrank arm. Counter-clockwise movement of the bellcrank about its pivot 943 pulls the rod 945 outwardly of the dashpot, creating compression in the dash pot in accordance with the velocity of the bellcrank. A spring 947 is fastened to the arm 878 and bellcrank 942 to influence the bellcrank clockwise for returning the piston rod to retracted position, as shown. The arrangement between the depending bellcrank arm and the stud 921 is such that the stud will engage the arm before it contacts the companion notches. It will also be noted that as the high order control is elevated to higher value positions, the distance between the stud 921 and fulcrum 943 of the bellcrank diminishes. Therefore, the bellcrank will be turned counter-clockwise proportionally faster by stud 921 in a high value position than when it is turned by the stud in a lower value position. Consequently, the speed with which bellcrank 942 is moved, is magnified beyond the afore mentioned possible increases in velocity of the quotient device. The resistance offered by the compression developed in the dashpot retards the approach of the stud 921 to the companion members between the time the stud 921 contacts bellcrank 942 and the quotient device is arrested. In the event the companion members 876 and 877 begin their clockwise turning as soon as the stud 921 engages bellcrank 942, the force of the impact between the lug 923 and the effective digit stop will depend only on the mass and velocity of the companion members. Thereupon, lug 921 turns bellcrank 942 counterclockwise causing the dash pot 944 to cushion the stopping of the quotient device.

The afore mentioned high order control comprises parts 948 (FIG. 69), 949 and 920. Member 948, pivotally mounted on stud 950 on the machine frame, extends forwardly toward the disc 855 and overlies stop stud 951 which is also fixed on the frame. Torsion spring 952 is fastened to member 948 and the machine frame for turning the member clockwise to rest position, against stud 951. Generally upright arm 949 is pivotally mounted on the forward portion of member 948. At times arm 949 is turned clockwise against tension of its torsion spring 953, situated between the arm and member 948 and fastened to each. The spring serves to return the arm counter-clockwise to normal position, as limited by integral lateral lug 954 which underlies the forward end of member 948. Member 920 is swiveled on the upper end of arm 949 and extends generally forwardly. In normal position of member 920, as shown, its rearward end is against overlying lug 955 on arm 949. Torsion spring 956, mounted between the member and the arm and fastened to each, serves to yieldably hold the member in normal position. The forward end of member 920 carries the stud 921.

In the just described normal position of parts 948, 949, and 920, the stud 921 is at 0 position, interposed between recess 900 and notches 910, as previously described. In order to position the stud 921 in the path of the appropriate disc recess in accordance with the value indicated in the highest inboard order dividend dial, member 948 is turned counter-clockwise a predetermined different extent for each value 1 to 9 inclusive, by high order sensing means, as will be described later herein. The pivotal connection between member 948 and arm 949 permits clockwise movement of the arm, and the connection between the arm and member 920 permits the latter to move counter-clockwise. Thus, an arcuate forward movement can be made by member 920 when the stud 921 is clamped to and moved by disc 855.

The dividend sensing means provided for sensing the dividend registration in the two highest inboard orders of the dividend register and for concurrently setting the high and low order controls in accordance with the registration, will now be described.

Transverse shaft 957 (FIG. 70) is journaled on a pair of forwardly extending flanges on bracket 958 which is inset a suitable opening on frame member 24 and is secured to the rear edge of each of the frame members 27 and 28. Levers 959 and 960 are secured to the right and left ends respectively of shaft 957, forming the turnable low order sensing device. The forward or free end of lever 960 (FIG. 69) is adjacent the rearward arm of low order control 922 and carries roller 961 which extends transversely under the arm of 922 but does not normally contact the arm. The lost motion thus provided between the low order sensing device and the related control permits a single step counter-clockwise movement of the sensing device for sensing a 0 registration without effecting elevation of the low order control. The forward end of lever 959 terminates beneath the lower of the two highest inboard orders of the dividend dial mechanism and carries a generally upright sensing finger 962 which stands in alignment with dividend element 963 secured to the respective dial 8 for turning there with on shaft 535.

Each dial 8 that may become the lower of the two highest inboard dials is provided with an element 963. In this embodiment, those dials being the 10th to 19th orders inclusive, FIG. 2. Each element 963 (FIG. 69) is formed with 10 digital steps, 970 to 979 inclusive, about its periphery, and each step represents that digit which is the last digit of the reference numeral therefor. The arrangement is such that the step representing the digit being indicated by the respective dial through its aperture is in position for sensing by finger 962, i.e., the step is in the path of the finger to limit the counter-clockwise swing of the low order sensing device. Each step 971–979 limits such movement of the low order sensing device to that angular extent which will cause the device to effect turning of the low order control 922 clockwise sufficiently to position the corresponding value stop thereon in the path of the lug 923. When step 970 is sensed, the sensing device is stopped upon that extent of movement at which roller 961 only contacts the arm of control 922. As previously explained, the 0 value stop 930 on the control is normally in the path of lug 923. Hence, movement of control 922 is not necessary when a 0 registration is sensed.

The high order sensing device is formed of levers 980 and 981 secured respectively to the right and left ends of sleeve 982 which is mounted turnably on shaft 957, between the levers 959 and 960. Lever 980, similar to the lever 959, is disposed to extend under the highest order inboard dividend dial mechanism so that the generally upright finger 962 on its forward end stands in sensing alignment with the dividend element attached to the related dial. The forward end of lever 981 situates adjacent to member 948 of the high order control and carries a roller 983 which extends transversely under the member, but normally does not contact the member. The lost motion thus provided between the high order sensing device and the related control 948 permits a single step of counter-clockwise movement of the sensing device for sensing a 0 registration in the associated dial 8, without effecting turning of control 948 from its normal 0 value position.

In start-division position of the carriage, the 20th and 19th dials 8 (FIG. 2) are the two highest order inboard dials. Of these dials, the 20th is the high order dial and the 19th is the low order dial. The highest order dividend digit is always entered in the 19th dial: therefore, the 20th or inboard overflow order dial will only exhibit 0. Accordingly, the dividend element 984 (FIG. 69) secured to the 20th dial 8 is merely a disc, the periphery of which is at the same radius with respect to the axis of shaft 535 as the 0 value step 970 on a dividend element 963. The high order control 948 normally stands at 0 value position, as described. In the first cycle of operations the high order sensing device senses the 0 value element 984. For each subsequent cycle of operations, the carriage is shifted ordinarily whereby the successive lower order element 963 is brought into sensing position with the high order sensing device. Steps 971 to 979 on an element 963 standing in sensing position with the high order sensing device, will limit the counter-clockwise turning of the device to that angular extent which will cause the device to effect turning of control 948 counter-clockwise sufficiently to move stud 921 thereof in the path of the corresponding value recess on disc 855.

Tensioned torsion springs 985 and 986 are fastened respectively to levers 959 and 980 and to bracket 958, FIG. 70, each for turning the respective low and high order sensing devices counter-clockwise, as when viewed in FIG. 69. Normally, both sensing devices are held in a clockwise position, such that their fingers 962 are out of the path of transverse movement of the dividend elements as they move with the carriage. The sensing devices are so held by bellcrank 987 which is pivotally mounted on shaft 957 between the levers 960 and 981.

One arm of bellcrank 987 extends forwardly and carries lateral lugs 988 and 989 which respectively overlie levers 960 and 981. Spring 990, fastened to the bellcrank 987 and to the machine frame, FIG. 70, influences bellcrank 987 (FIG. 69) counter-clockwise so that roller 991 on the depending arm of the bellcrank contacts and rides the periphery of cam 63 of the division power unit. At the stop-start position cam 63 holds bellcrank 987 in a clockwise position, whereat the bellcrank holds the sensing devices out of the path of the carriage borne parts. Early in the clockwise revolution of the cam peripheral portion 992 allows bellcrank 987 to swing counter-clockwise under the influence of its spring 990 and, shortly thereafter, peripheral portion 993 rocks bellcrank 987 clockwise to return the sensing devices. The counter-clockwise movement of bellcrank 987 allows springs 985 and 986 to turn the respective sensing devices to contact the dividend element digital steps then in their path and at the same time to set up the related quotient controls in accordance with the sensed dividend values, as set forth.

At about the time bellcrank 987 has swung sufficiently to have permitted the sensing devices to sense a 9 value step on the dividend elements, lug 989 of the bellcrank contacts lateral lug 994 of latch 995 and rocks the latch counter-clockwise. Latch 995 is a part of the means provided for locking the high and low order controls in their operated positions until the set up quotient is sensed. Latch 995 is pivotally mounted on shaft 957, adjacent bellcrank 987. Torsion spring 996 is fastened to latch 995 and to support bracket 958 (FIG. 70) for urging the latch clockwise (as viewed in FIG. 69) to normal position against stud 997 on the machine frame, which it overlies. In normal position of latch 995, the forward free end of the latch, which is formed as a hook, is latched onto lateral lug 998 of rockable detent 999 for holding the detent against the clockwise influence of torsion spring 1000 fastened to the detent and to stud 941. Detent 999 is pivotally mounted on stud 1001 on the machine frame. Lug 1002 on the upper arm of detent 999 extends forwardly towards a series of ten V-notches 1003 formed on the rear extremity of the low order control 922, and lug 1004 on the depending arm of the detent extends rearwardly towards a series of ten V-notches 1005 formed on the high order control member 948. The leading edge of each lug 1002–1004 is beveled to conform with the related notches, which are so disposed that a different notch is presented to the related lug in each position of the respective control for each of the values 0–9. Accordingly, when the detent 999 is liberated to rock clockwise, the lugs engage the V-notches aligned therewith, thereby to hold the controls in their then current positions and to accurately adjust the elevation of the controls. Immediately after the controls are locked, the sensing devices 959–960 and 980–981 are returned to their normal positions by depression of follower 987, as set forth.

It will be noted in FIG. 68 that link 884 carries a lug 1006 which normally is in contact with lug 998 of detent 999 (FIG. 69) so as to hold the detent counter-clockwise, free of the V-notches. Previously it was described that link 884 (FIG. 68) is moved forwardly for effecting turning of the quotient device for set up of a quotient, and that the link is stroked rearwardly for returning the quotient device to rest position. The quotient set-up operation is instituted after the dividend sensing operation has been in progress sufficiently to insure that the high and low controls are moved to their appropriate positions by the dividend sensing means before the controls are contacted by the quotient device. Accordingly, the link 884 will have moved forward sufficiently to permit detent 999 (FIG. 69) to swing clockwise to lock the controls when latch 995 is disengaged from detent lug 998. The return to rest position of the high and low order dividend sensing means and of the latch 995 is then effected by bellcrank 987 while the quotient sensing operation is in progress. Upon completion of the quotient sensing, the quotient device is returned to rest position. Consequently, lug 1006 (FIG. 68) on link 884 engages detent lug 998 to rock the detent counter-clockwise sufficiently to reengage lug 998 (FIG. 69) with latch 995. The lugs 1002 and 1004 are then retracted from the related V-notches and the dividend controls are returned to rest position by their respective return springs, as described.

(14) DIVISOR CONTROLLED QUOTIENT SENSING MEANS; MULTIPLICATION OR CARRIAGE SHIFT INITIATION

Previously it was stated that the quotient sensing member 859 (FIG. 67) is shiftable axially to align it with that divisor element, 841–849, FIG. 64, which represents the value of the key 4 (FIG. 2) depressed in the highest order bank. After the appropriate quotient station on such a selected element is set up, as described, member 859 (FIG. 67) is turned clockwise until it is stopped by the set up station. Simultaneously, with the turning of member 859 and under the control thereof, the multiplying mechanism is conditioned for the performance of a multiplication by the value of the sensed quotient station, providing that value is greater than 0. When the sensed quotient value is 1 to 9, operation of the multiplying mechanism is instituted, but when the value is 0, an ordinal shift of the carriage is initiated instead. The means by which the foregoing are accomplished will now be described.

Sensing member 859 (FIG. 73) is slidably and turnably mounted on journaled shaft 485 between members 1007 and 1008 which also are pivoted on shaft 485 but are fixed against axial movement therealong. Members 1007 and 1008, disposed leftward and rightward respectively of member 859, are secured together as a bail or cage unit by means of rods 1009 and 1010 which are parallel with shaft 485. Arm 1011 on sensing member 859 extends rearwardly and under rod 1009 and is formed with a curved ear 1012 for embracing the rod so that at all times the bail unit and member 859 turn together, but that the member may be slid axially independently of the bail unit. Torsion spring 1013, fastened to member 1007 and the machine frame influences the cage unit and member 859 counter-clockwise to rest or normal position with member 1007 against stop stud 1014 on the machine frame. Sensing finger 871 (FIG. 67) on the upper extremity of member 859 extends forwardly in the machine toward the quotient device for contacting a set up quotient station on a selected element, when member 859 is turned clockwise, as will be described. Thus, member 859 together with the bail unit turns angularly predetermined extents or steps for each quotient value "0" to "9" inclusive.

Depending portion 1015 (FIG. 73) of member 859 is received in slot 1016 on transverse link 1017, the slot being so disposed that turning of member 859 will not affect the link, but that lateral movement of link 1017 will slide the member along shaft 485. Link 1017 is mounted for generally rectilinear movement with its left end (FIG. 71) being pivoted on the free end of lever 1018, and its rightward end being pivotally connected to rearwardly extending arm of bellcrank 1019, which arm is generally parallel with lever 1018. Both the lever and the bellcrank are in a plane parallel with bottom frame member 23 and are pivoted thereon respectively at 1020 and 1021. The other or lateral arm of bellcrank 1019 has link 1022 pivotally connected thereto, which link extends forwardly in the machine and is connected to the depending arm of lever 374 (FIG. 29) of the mechanism operated by the highest order bank of keys 4. As previously explained, lever 374 is turned a different extent from its normal or 0 value position clockwise for each value 1–5 and counter-clockwise for each value 9–6 (in the order given in the scale), in response to depression of that value key 4 in the related bank. Consequently, through link 1022, bellcrank 1019 (FIG. 71) is turned a different extent clockwise for each value 1–5 and counter-clockwise for each value 9–6, whereby through link 1017, sensing member 859 is moved predetermined extents respectively rightward for values 1–5, and leftward for values 9–6, as indicated by the scale at the top of FIG. 71. The elements 841–849 FIG. 64, each representing a different digit 1–9, are so disposed that at each extent of movement of member 859, (FIG. 73) the member aligns with the element representing the value of the key depressed. This alignment with, or selection of, an element occurs when the divisor is setup on the keyboard. Then, when the machine is cycled for division, the appropriate quotient station on the selected element is set up as previously described, and member 859 is turned clockwise to sense the set up station.

Member 859 is turned clockwise by counter-clockwise rocking of lever 1023 which is pivoted on shaft 75 and carries on its forward free end lateral extension 1024 which extends under the arm 1011. Extension 1024 carries eight generally upright lugs 1032 to 1039 inclusive, FIG. 72, which are so disposed laterally that a different lug is in contact alignment with the sensing member arm 1011 in each of its positions for divisor values 2 to 9. Lugs 1033 to 1039, inclusive, are individual respectively to the 3 to 9 value positions, and lug 1032 is of sufficient width to accommodate contact with arm 1011 when it is in the 1 and 2 value positions.

Referring to FIG. 66, it will be recalled that the quotient device is turned generally at least 9, 18, 27, 36, 45, 54, 63, 72 and 81 angular units to set up the 9 value station 869 on divisor elements 841 to 849, respectively. Hence, member 859 (FIG. 67) may be turned proportionally faster for sensing stations on successively lower value divisor elements. Accordingly, each lug 1032–1039 is situated at a different radius location from its axis, shaft 75. Lug 1032 is the furthest away and each successive lug 1033 to 1039 is nearer the axis predetermined extents. The closer a lug is to shaft 75, the further its point of contact with arm 1011 is from the arm's axis, shaft 485. The different leverage ratios thus provided for turning member 859 are such that the lug 1032 in the 1 and 2 divisor value positions turns member 859 at the fastest rate of speed and that each successive lug turns the member at proportionally slower rates of speed. Contact of the lugs with arm 1011 occur at substanitally the same counter-clockwise angular position of lever 1023 and occurs at the time the quotient device has been turned sufficiently to have the "0" value stations 860 thereon in sensing position. The arrangement is such that the effective lug so synchronizes the turning of member 859 with the turning of the quotient device that an appropriate station on the selected element is set up at the sensing position just prior to contact of the member 859 therewith. Both member 859 and lever 1023 stop turning when the member contacts a set up station.

Lever 1023 (FIG. 73) is rocked in the following manner: Follower lever 1040 is fulcrumed on shaft 75 adjacent lever 1023, and its forward arm is formed with lateral lug 1041 which overlies lever 1023. The free end of the rearward arm of lever 1040 carries roller 1042 which overlies the periphery of cam 62 of the division power unit. A torsion spring 1043, fastened to lever 1923 and to follower 1040, yieldably holds lever 1923 against lug 1041 so that the lever will turn counter-clockwise with the follower until the lever is arrested, whereupon spring 1043 yields to allow the follower to complete its fixed stroke. Spring 1044, fastened to lug 1041 and the machine frame, influences follower 1040 and lever 1023 clockwise to normal position, as limited by lever 1023 contacting stud 1045 (FIG. 67) on frame member 27. In this position of lever 1023, lugs 1032–1039 are free from contact with arm 1011 so that member 859 may be shifted from one position to another without interference by the lugs. Referring to FIG. 73, the peripheral portion 1046 of cam 62 is such that upon clockwise rotation of the cam, it rocks fololwer 1040 counter-clockwise shortly after turning of the quotient device is started. Later in the cycle, peripheral portion 1047 of the cam allows the follower 1040 and the lever 1023 to be returned to rest position by spring 1044. Follower 1040 is thus moved counter-clockwise sufficiently to cause turning of member 859 to sense a setup station and immediately thereafter to operate means provided for initiating operation of the multiplying mechanism, as will now be described.

Member 1048, pivoted on shaft 75 adjacent lever 1023, extends forwardly and underlies lug 1041 of follower 1040. Torsion spring 1049, fastened to member 1048 and lever 1023, influences member 1048 counter-clockwise against lug 1041 so that the member turns with follower 1040. Therefore, both member 1048 and lever 1023 turn together with follower 1040 until the lever 1023 is arrested. Thereafter member 1048 continues to turn with the follower, but only for a limited angular extent. A bellcrank 1050 is pivotally mounted on lever 1023 at 1051. The forwardly extending arm of the bellcrank is connected to member 1048 by link 1052 so that the counter-clockwise movement of member 1048, after lever 1023 is stopped, will rock bellcrank 1050 counter-clockwise until its upright arm contacts stud 1053 on lever 1023. The upright arm of bellcrank 1050 carries roller 1054, in the counter-clockwise path of which stands depending finger 1055 on latch 1056. Rearward of finger 1055, latch 1056 is pivotally connected to lever 1057 which is rockable on shaft 75, and the forward portion of the latch is supported by lateral lug 1058 on the forward arm of multi-arm member 1059, which will be described later with more particularity. At present it will suffice to say that the member 1059 normally holds latch 1056 (FIG. 74) in a counter-clockwise position so that the hook on the free end of the latch is held disengaged from lug 1060 on depending lever 1061, and that only when the value of a sensed quotient station is greater than "0" member 1059 is turned clockwise sufficiently to allow latch 1056 to engage the lug 1060, under the clockwise influence of spring 1062 which is fastened to the latch and the machine frame. Spring 1062 also exerts a forward pull on latch 1056 to hold the finger 1055 thereof against roller 1054, FIG. 73. Through the roller and finger, counter-clockwise rocking of bellcrank 1050, immediately upon sensing of a set up quotient station, strokes latch 1056 rearward, and, if, at such times the latch is engaged with lever 1061, the lever is turned clockwise to initiate a multiplying cycle of operations.

Lever 1061 is secured to journaled transverse shaft 260, which in a rightward section of the machine has fixed thereto lever 259 (FIG. 19) which carries link 258. Turning of shaft 260, subsequent a quotient sensing operation, effects forward movement of link 258 which triggers multiplying initiating mechanism, as previously described. When the value of the sensed quotient station is 0, member 1059 (FIG. 74) remains in its normal position, thereby to hold the latch 1056 disengaged from lever 1061. Therefore, rearward movement of latch 1056, at such times, will not trigger the multiplying initiating mechanism. Instead, means are provided for initiating a shift cycle.

Referring to FIG. 13, it will be recalled that initiation of a shift cycle is effected by counter-clockwise rocking of lever 289, secured to journaled shaft 102. Lever 280, turnable on shaft 102, carries pivoted member 284 on its depending arm. Arm 287 of member 284 is normally engaged with lug 288 of lever 289, as described, so that counter-clockwise movement of 280 will also rock 289 counter-clockwise. Such actuation of lever 280, when a "0" quotient is obtained, is performed by latch 302 pivotally connected to 280 at its depending end. Lug 1063 (FIG. 10) on the forward end of latch 302, overlies the generally depending arm of member 1059. Spring 300, fastened to latch 302 and to fixed stud 301, tensions the latch clockwise to hold it in contact with the member 1059. In normal or 0 quotient value position of member 1059, FIG. 74, hook 1064 of latch 302 is coupled with lug 1065 of rockable lever 1066 so as to be pulled forwardly consequent counter-clockwise rocking of the lever. In response to a sensed quotient value of 1 to 9, member 1059 turns clockwise, elevating latch 302 sufficiently to disengage it from lever 1066. Hence, forward movement of latch 302 for initiating a shift cycle is effected by lever 1066 only when the sensed quotient value is 0. When hook 290 (FIG. 10) of member 284 is engaged with lug 298 of lever 175 and finger 287 of the member is disengaged from lever 289, as previously described, the forward stroke of latch 302 effects termination of division operations.

Lever 1066, pivoted on shaft 1067 which is secured on the machine frame, is rocked counter-clockwise once during each revolution of the division power unit. Lateral lug 1065 on the depending arm of the lever extends rightward in the machine through an opening on adjacent frame 27 and is coupled by the latch 302 as set forth. Torsion spring 1068, fastened to lever 1066 and to the machine frame, holds the lever clockwise in normal position with lug 1065 against stop face 1069 on frame 27. Lug 1070 on the upper arm of lever 1066 is disposed in the path of depending arm of member 1071, pivoted on shaft 75, so that clockwise movement of 1071 will rock the lever counterclockwise. The upper arm portion of member 1071 is situated adjacent cam 63 and the rearward edge 1072 of the member is in the path of clockwise swing of roller 167 carried by the cam. In its clockwise sweep, the roller 167 engages edge 1072 to rock member 1071 clockwise and thereby swing the lever 1066 counter-clockwise against tension of its return spring 1068 which is of lesser tension than return spring 1073 for lever 1071. Actuation of lever 1066 is synchronized so as to occur after the quotient sensing is completed. Thus, if the sensed quotient value is greater than 0, latch 302 is uncoupled from lever 1066, as set forth, and shift initiation is not effected. If the sensed quotient value is 0, latch 302 remains in coupled relation with the lever 1066, whereby the lever moves the latch forwardly to initiate a shift cycle for an ordinal shift of the carriage or to terminate division operations, as described.

Conditioning of the multiplying mechanism in accordance with the value (1–9) of the sensed quotient station is performed simultaneously with the sensing operation, therefore, it is completed by the time the above described multiplication initiating operation takes place. The means by which such conditioning is performed will now be given.

Member 1074 (FIG. 73) is secured to journaled shaft 485, adjacent member 1008 of the quotient sensing bail unit. Rightward in the machine, member, 487 is also secured to shaft 485, and lever 484, adjacent member 487, is pivotally mounted on the shaft. Torsion spring 488, fastened to the member 487 and lever 484, yieldably holds the lever against lug 486 on the member, so that lever 484 will turn clockwise together with member 487, and that the member may continue its clockwise movement when clockwise movement of lever 484 is arrested. Referring to FIG. 32, it will be recalled that lever 484 is connected by link 483 to upright arm 479 on member 476 for turning the same to set control member 460 when the sensed quotient is 1 to 4, and that member 487 turns control 461 only when the quotient is 5 to 9. The unit formed of parts 476, 483 (FIG. 73), 484, 485, 487 and 1074 is held in its rest or 0 quotient value position, as limited by member 1074 contacting stud 1075 fixed on the machine frame, through the counter-clockwise influence of torsion spring 1076 fastened to member 484 and the machine frame. Member 1074 is in the path of lug 1077 on upright arm of member 1008 with respect to clockwise movement of member 1008. Lost motion is provided between lug 1077 (FIG. 67) and the member 1074 so that the lug will contact member 1074 upon "0" value angular movement of sensing member 859.

Hence the quotient sensing bail turns member 1074 and the unit formed therewith clockwise only when a quotient value 1–9 is sensed by member 859. It can be readily understood that momentum forces may tend to over rotate member 1074 when turning of the quotient sensing bail unit is arrested by the set up quotient station. Therefore, means are provided for locking the member 1074 to the bail unit, whereby member 1074 and the unit formed therewith cannot rotate forwardly or clockwise of lug 1077 of the quotient sensing bail unit. Latch 1078, pivotally mounted on rod 1009 of the bail unit, is formed with a hook on its forward end for latching lateral lug 1079 on member 1074. Spring 1080 is fastened to latch 1078 and to member 1008 for turning the latch clockwise so as to couple it with lug 1079 when the latch is liberated. In rest position of member 1023, stud 1081 thereon overlies the rearward arm of latch 1078 to normally hold the latch in a counter-clockwise position, disengaged from lug 1079. The arrangement is such that when member 1023 (FIG. 67) is turned counter-clockwise sufficiently to contact one of its lugs 1032–1039 with arm 1011 of member 859, spring tensionsed latch 1078 is allowed to turn clockwise sufficiently to contact lug 1079. At first, the latch rests on lug 1079; then, upon clockwise movement of the bail unit, sufficient to contact its lug 1077 with member 1074, the latch is slid forwardly on lug 1079 sufficiently to snap into locking engagement therewith, as illustrated in FIG. 75.

Member 1074 (FIG. 73) is thus locked to the sensing bail unit to turn clockwise therewith a different predetermined extent for each quotient value 1 to 9, as limited by the set-up quotient station. Means are provided, as will be described presently, to hold member 1074 and the unit formed therewith at any one of the quotient value (1–9) positions. After the multiplying or the shift operations (as the case may be) are initiated, member 1023 is returned clockwise to rest position, as previously described, and in the early phase of this return stroke, stud 1081 rocks latch 1078 counter-clockwise to disengage it again from lug 1079. When this occurs, the sensing bail unit is returned to rest position by its spring 1013, and the quotient device (FIG. 67) is also returned to the position illustrated, as described.

(15) NORMAL DIVIDEND REDUCTION AND OVERDRAFT OPERATIONS

An escapement means is provided for holding member 1074 (FIG. 73) and the unit formed therewith at each position to which it is turned for trial quotient values 1 to 9, until the product of the trial quotient times the divisor is subtracted from the dividend, as will now be described.

A U-shaped bail means 1082 (FIG. 76) is pivotally mounted on shaft 1083 which is fixed on frame members 27 and 28. Another U-shaped bail means 1084 is pivoted on shaft 1083 and is inset bail 1082. Spring 1085, FIG. 67, fastened to bail 1082 and to shaft 873, and spring 1086, FIG. 76, fastened to bail 1084 and frame 27, hold the respective bails in normal rest position, against stop 1087 (FIG. 67) on frame 27. Detent 1088, pivoted on shaft 1083 and extending generally forwardly, is spring influenced clockwise so that lateral lug 1089 on its rearward, generally upright arm contacts the left legs of bails 1082 and 1084. A second detent, 1090, extending generally rearwardly and pivoted on shaft 1083, is spring urged counter-clockwise so that lateral lug 1091 on its forward, generally upright arm contacts the left leg of bail 1084. Detents 1088 and 1090 are urged clockwise and counter-clockwise respectively by torsion spring 1092 which is fastened to detent lugs 1089 and 1091. The detent spring is of lesser tension than either bail return spring 1085 and 1086, FIG. 76. As will be described presently, bail 1082 (FIG. 67) is oscillated (first counter-clockwise then clockwise) when reduction of the dividend is normal, i.e., when an overdraft does not occur. When reduction of the dividend results in an overdraft, bail 1084 is oscillated (first counter-clockwise then clockwise) instead of bail 1082. In response to such operation of bail 1082, detent 1088 is rocked counter-clockwise directly by bail 1082 and is returned clockwise with bail 1082 by spring 1092. In response to oscillation of bail 1084, detent 1090 turns counter-clockwise with bail 1084 under the influence of spring 1092, and is returned clockwise directly by bail 1084. At the same time, detent 1088 is rocked counter-clockwise directly by bail 1084 and is returned clockwise with bail 1084 by spring 1092.

The upper portion of member 1074 is formed as an arcuate segment with a series or set of nine notches or teeth 1093 and 1094 on the forward and rearward ends respectively of the segment. In normal position of the parts, lateral lug 1095 on the forward end of detent 1088 overlies the segment forward of the teeth 1093, and lateral lug 1096 on the rearward end of detent 1090 stands upward from the segment and forwardly of teeth 1094. The teeth of each set are spaced angularly to correspond to the difference between the consecutive positions of member 1074 for quotient values 1 to 9 inclusive. The relationship between detent 1088 and teeth 1093 is such that upon clockwise turning of member 1074 to any of its positions for values 1 to 9 inclusive, lug 1095 of spring influenced detent 1088 engages a tooth for holding spring tensioned member 1074 and the unit formed therewith from returning counter-clockwise. Then after completion of a normal reduction of the dividend, through bail 1082 detent 1088 is rocked counter-clockwise so as to disengage its lug 1095 from teeth 1093 to allow member 1074 and the unit formed therewith to return to 0 value rest position.

The relationship between teeth 1094 and lug 1096 of detent 1090 is such that in each position of member 1074 for values 1 to 9 inclusive, counter-clockwise movement of detent 1090 engages its lug 1096 with member 1074 generally midway a pair of teeth 1094 so as to limit return movement of member 1074 to a partial step. When the dividend reduction results in an overdraft, through bail 1084 detent 1088 is oscillated simultaneously with detent 1090 which engages member 1074 before detent 1088 fully disengages therefrom, and the arrangement is also such that on the return strokes of the detents, detent 1090 disengages from teeth 1094 after detent 1088 reengages member 1074. The re-engagement occurs generally midway between a pair of teeth 1093 due to the partial step return of member 1074 as allowed by detent 1090. Through its midway relationship with a pair of teeth 1093, detent 1088 limits return movement of member 1074 to a partial step. Thus, upon counter-clockwise movement of both detents, spring tensioned member 1074 and the unit formed therewith turns counter-clockwise a partial step away from the quotient value position at which it then stands, toward the next lower value position, and upon clockwise movement of both detents, the unit turns further counter-clockwise a partial step to complete a full step of movement to that next lower value position. As a result of this one step return movement of member 1074 and the unit formed therewith, the multiplier control means operated thereby as described, is set for effecting multiplication of the divisor by a multiplier-quotient value reduced by "1."

The right legs of bails 1082 and 1084 (FIG. 73) have pivoted thereon rearwardly extending hooks 1097 and 1098 respectively. Lateral lug 1099 on the rearward or free end of hook 1098 overlies lateral lug 1100 on the free end of hook 1097. A spring 1101 is fastened to bail 1084 and to hook 1098 in proximity to its pivot so as to tension the hook counter-clockwise and thereby always hold its lug 1099 in contact with lug 1100 and through the lugs also influence hook 1097 counter-clockwise to normally latch on stud 1102. The arrangement is such that upon elevation or clockwise turning of hook 1097, which occurs only in response to an overdraft, it unlatches from stud 1102 and, through the engaged lugs, carries hook 1098 upwardly to engage with stud 1102 which is carried on the upper arm of lever 1103, pivoted on the machine frame 28, FIG. 16. Torsion spring 1104, fastened to lever 1103 and the machine frame, urges lever 1103 clockwise to rest position with lateral lug 1105 on its depending arm against stop 1106 on the frame. Lug 1105 stands in the path of forward movement of lug 1107 (FIG. 77) on link means 1108 which is pivotally mounted at its forward end on lever 802. On its rearward end, link 1108 carries stud 1109 which is received in lost motion slot 1110 on the depending arm of lever 1111. Spring 1112, fastened to link 1108 and to lever 1111, tensions the parts so as to yieldably hold stud 1109 against the rearward end of slot 1110. Lever 1111, secured to shaft 1113 journaled on the entry and carry mechanism support unit, carries rod 815 which at its right end is supported on lever 1114, FIG. 20, fixed to journaled shaft 1113. Referring to FIG. 77 again, the depending arm of rockable lever 802 is connected by link 1115 to depending lever 1116 secured to journaled shaft 422. Rightward in the machine follower lever 1117 is secured to shaft 422 and on its free end carries roller 1118 which rides cam 216 of the multiplying power unit under the counter-clockwise influence of spring 1119 fastened to lever 1116 and the machine frame.

In each cycle of multiplying operations, subsequent entry of products, cam 216 effects oscillation of follower 1117 (clockwise then counter-clockwise) to move link means 1108 forwardly and rearwardly for, among other operations, causing certain carry operations as disclosed in the parent application. During the initial phase of the forward stroke of link 1108, lever 1111 is rocked counter-clockwise until rod 815 contacts the upper end of slot 1120 on support unit member 200, through which it extends, and thereafter stud 1109 moves forwardly in slot 1110. Elevation of rod 815, during division cycling, is utilized for eliminated dividend sensing operations, as previously described. In the final phase of the forward stroke of link 1108, lug 1107 engages lug 1105 on lever 1103 and rocks the lever counter-clockwise. This occurs after completion of carry operations during any multiplication cycle of operations, and after completion of carry, eliminated dividend sensing and overdraft operations during division cycling. Consequently, through hook 1097 (FIG. 73) normally engaged with lever 1103, bail 1082 is rocked counter-clockwise, and when hook 1098 is engaged with lever 1103 (only in response to an overdraft in division), bail 1084 is swung counter-clockwise.

Lug 1121 (FIG. 18) on depending member 1122, pivoted on shaft 1083, overlies a forwardly extending extension of the right leg of bail 1082, so that counter-clockwise movement of the bail rocks member 1122 counter-clockwise. Torsion spring 1123 is fastened to member 1122 and the machine frame for tensioning member 1122 clockwise to yieldably hold lug 1121 against bail 1082. Stud 1124 on the forward end of link 1125 is received slidably at the rearward end of lost motion slot 1126 on member 1122. The other end of link 1125 is pivotally connected to detent 268 which holds the entry and carry mechanism and the support unit therefor in operated or register engaging position, as described. The arrangement is such that when bail 1082 is turned counter-clockwise, member 1074 (FIG. 73) is released for full return movement, and through member 1122 (FIG. 18) detent 268 is pulled clockwise whereby disengagement of the entry and carry mechanisms from inboard orders of the carriage borne registers is effected, before the entry mechanisms start their return strokes, and whereby initiation of an ordinal shift of the carriage, as in multiplication and division computations, or termination of division cycling is effected, all as previously described. Lost motion slot 1126 permits member 1122 to return clockwise to rest position when detent 268 and link 1125 have returned to rest position, as shown in FIG. 16.

Referring to FIG. 17, it will be recalled that lateral lug 210 of member 209 of the overdraft control mechanism is moved into the path of clockwise movement of a related member 211 of the highest order inboard dividend dial mechanism during the multiplying phase of each division cycle of operations. A member 211, formed with four quadrately disposed lateral radial lugs 816, is secured to gear 532 in each order dial mechanism that may become an inboard order. Gear 532, meshed with gear 534 which is secured to dial 8, is turned clockwise for subtractive entry of products. (Member 211 is also utilized in eliminated dividend sensing operations as hereinbefore described, and in carry and clearing operations as described in the parent application.) The ratio between gears 532 and 534 is 4 to 1, which is of utility for fast efficient clearing of the related dial 8. The arrangement is such that when dial 8 of the highest inboard order displays "0" during division operations, one of the four lugs 816 is in contact relation with lug 210 of member 209 so that when an overdraft occurs, the one step clockwise turning of member 211 from its "0" to its "9" position moves member 209 rearwardly. Member 209 is pivoted on the upright arm of bellcrank 206 which is rockably mounted on member 200 of the support unit. The generally forwardly extending arm of bellcrank 206 underlies lug 1100 of hook 1097. The rearward movement of member 209 in response to an overdraft rocks bellcrank 206 counter-clockwise sufficiently to disengage hook 1097 (FIG. 78) from stud 1102 and engage hook 1098 with the stud. Then, on the counter-clockwise stroke of lever 1103, bail 1084 is rocked counter-clockwise instead of bail 1082 (FIG. 18) which remains in rest position. With bail 1082 being inoperative, detent 268 is not swung clockwise to its normal position whereby the multiplier quotient entry mechanism (FIG. 40) and the product entry and carry mechanisms (FIG. 24) remain engaged with the respective dial mechanisms, and shift initiation is not effected. Consequently, on the return strokes of the multiplier and product entry mechanisms, the trial quotient which proved to be too high in value and the overdraft producing product are withdrawn from the respective dials. However, before the withdrawal operation is started, bail 1084 (FIG. 73) is rocked counter-clockwise whereby a one-step return movement of member 1074 is effected for reducing the value of the too high quotient by "1" and simultaneously setting the multiplier controls (FIG. 32) for the reduced quotient value, as previously described.

If the too large quotient is any one of the values 2 to 9, the multiplying stop-start means (FIG. 19) is triggered for initiating a cycle of multiplying operations in which the reduced quotient value is the multiplier. A latch means 1127, FIG. 78, pivoted on a depending extension of the right leg of bail 1084, extends rearwardly with its free end overlying lateral lug 1128 on member 1129 which is pivoted on fixed stud 1130 and holds the latch against the counter-clockwise influence of spring 1131 fastened thereto and to bail 1084. Turning of member 1129 clockwise, as will be described presently, allows latch 1127 to turn to predetermined positions. As illustrated in full lines, the latch is in rest or "0" quotient value position and its other two positions (in phantom) successively counter-clockwise therefrom are respectively the "1" and "2" to "9" quotient value positions. In its "2"–"9" positions, that is, when the quotient-multiplier is any value 2 to 9 inclusive, latch 1127 is engaged with lateral lug 1132 on lever 1133 so that on the forward stroke of latch 1127, lever 1133 and journaled shaft 260 to which the lever is secured, turn clockwise sufficiently to effect triggering of the multiplying stop-start means. Such turning of shaft 260 is counter-clockwise in FIG. 19. Thus, the multiplying mechanism is cycled again subsequent completion of the cycle of operations which resulted in an overdraft.

In its "0" and "1" value positions, latch 1127 (FIG. 78) is disengaged from lever 1133. Consequently, when the quotient is "1" and an overdraft occurs, the multiplying stop-start means is not triggered for initiating a subsequent cycle of multiplying operations, such a subsequent cycle being unnecessary since the reduced quotient multiplier is "0." For such instances, means are provided for rocking detent 268 (FIG. 18) clockwise after the product and multiplier entry mechanism have completed their return strokes, thereby to disengage the entry mechanisms from the related carriage-borne dial mechanisms and to initiate an ordinal shift of the carriage or effect termination of division cycling, as the case may be.

Lever 1134, pivotally mounted on stud 269, has a lateral lug 1135 on its depending arm for engaging arm 275 of detent 268 for rocking the detent clockwise when the lever is so moved. In effective or support unit holding position of the detent, its depending arm 275 is in contact with lug 1135. The generally upright arm of lever 1134 has a generally depending link means 1136 pivotally connected thereto, so that downward movement of link 1136 rocks lever 1134 clockwise. The lower portion of link 1136 overlies support roller 1137 on member 1129, FIG. 78. Spring 1138 (FIG. 18) is connected to link 1136 and to lug 1135 for urging the link clockwise against roller 1137 and for urging lever 1134 counter-clockwise so that its rearwardly extending finger 1139 contacts fixed stud 271.

Latch means 1140 is pivotally mounted on the depending end of link 1136 and is influenced counter-clockwise against lug 1141 on the link by torsion spring 1142 which is fastened to the latch and the link. The link-latch unit thus formed is swung counter-clockwise from its "0" value position shown in full lines to a predetermined position by roller 1137 in response to a sensed quotient value of 1 as shown in phantom, and to another position, further counter-clockwise for any sensed quotient value 2 to 9 also in phantom. Subsequent normal reduction of the dividend, member 1129 (FIG. 10) is returned counter-clockwise, as will be described, to its "0" value position in a single uninterrupted swing, but when an overdraft occurs member 1129 is returned one step from its 2–9 value position to its 1 value position only when the quotient reduction is from 2 to 1. Also, in response to reduction of the quotient from 1 to 0, member 1129 is returned one step from its 1 value position to its rest or 0 value position.

The uninterrupted return swing of member 1129 occurs before the return strokes of the entry mechanisms are completed. Hence detent means is provided to hold the link-latch unit 1136, 1140 (FIG. 18) in its 1 value position so that should an overdraft occur, the unit may be stroked downwardly after the entry mechanisms have completed their return strokes. Detent 1143, pivoted on fixed stud 1144, overlies stud 1145 on link 1136. Lateral lug 1146 on detent 1143 overlies an arm of bellcrank 1147 which is also pivoted on stud 1144. One end of link 1148 is connected to the depending arm of bellcrank 1147 and the other end is connected to the afore described member 1122 which is rocked counter-clockwise subsequent each product entry and normal reduction of the dividend, as described. Spring 1149 fastened to lug 1146 and the machine frame, influences detent 1143 clockwise to yieldably hold its lug 1146 against the bellcrank arm. In normal position of the parts, depending ear 1150 on the forward end of detent 1143 is in the path of the stud 1145 so that on counter-clockwise movement of link 1136, the ear cooperates with the stud to effect oscillation of the detent. Hence, detent 1143 then stands in the path of stud 1145 to block clockwise movement of the link-latch unit from its 1 value position.

When link-latch unit 1136, 1140 is in its 1 value position, the depending end of latch 1140 stands in the path of upward movement of stud 1151 on lever 1152 which is pivotally mounted on journaled shaft 521. Lever 1152 (FIG. 80) is connected by link 1153 to lever 1154 which is secured to one end of sleeve 1155 turnable on fixed shaft 1156. Lever 1157, secured to the other end of sleeve 1155, is connected by link 1158 to lever 1159 which is secured to shaft 521. Referring to FIG. 38 it will be recalled that shaft 521 is turned clockwise in the initial phase of each multiplying cycle of operations and is returned counter-clockwise during the final phase of each cycle after the entry mechanisms have been returned to rest position. Hence, as viewed in FIG. 80, shaft 521 first turns counter-clockwise and then clockwise, and through parts 1159, 1158, 1157, 1155, 1154 and 1153, lever 1152 is rocked clockwise and is returned counter-clockwise. The arrangement is such that on the clockwise swing of lever 1152, its stud 1151 (FIG. 18) cooperates with the free end of latch 1140 in "1" value position to effect oscillation of the latch so that the latch stands in the path of downward movement of the stud as indicated in broken lines. If the subsequent reduction of the dividend is normal, member 1122 is rocked counter-clockwise for, among other operations, elevating detent 1143 sufficiently to disengage it from stud 1145, whereupon link-latch unit 1136, 1140 is returned to its "0" value position by spring 1138. Thus latch 1140 is not in the path of downward movement of stud 1151 when lever 1152 is returned counter-clockwise subsequently. If, however, an overdraft occurs, detent 1143 is not elevated. Thus, latch 1140 remains in the path of stud 1151, and on the return stroke of lever 1152, link-latch unit 1136, 1140, is pulled downwardly to effect disengagement of the entry mechanisms and initiate a shift cycle or terminate division operations, as set forth. Stud 1160, fixed on the machine frame stands in the path of downward movement of lateral lug 1161 on latch 1140 so that toward the end of the downward stroke, lug 1161 contacts stud 1160, causing latch 1140 to rock clockwise sufficiently to disengage from stud 1151. Thereupon, the link-latch unit is returned to normal position by spring 1138.

In the 2-9 value position of the link-latch unit, latch 1140 is out of the path of movement of stud 1151, as illustrated. If, at such times, an overdraft occurs when 2 is the too large trial quotient, stud 1151 in elevated position will block clockwise movement of the link-latch unit in response to the one step return movement of roller 1137 until the lever 1152 returns to rest position. Then the link-latch unit returns one step where it is held by detent 1143 until released during the subsequent multiplication cycle of 1 times the divisor. Also during normal dividend reduction operations, stud 1151 will block the return movement of the link-latch unit from its 2-9 position, until lever 1152 is returned. Detent 1143 will then hold the link-latch in the 1 value position, and during the ensuing operation of the division mechanism, the link-latch unit will be moved either to the 2-9 position or it will remain in the 1 value position, depending on the value of the sensed quotient. Should the division process terminate while the link-latch unit is detained in the 1 value position, during the first ensuing operation of the multiplying mechanism, as for purposes other than division, the unit will be returned to normal position upon rocking of member 1122, as explained.

Referring to FIG. 10, the free end of lateral extension 1162 on support member 1129 is secured to support member 1059. The secured members form a support unit turntable on stud 1130 fixed on the machine frame. Extension 1162 overlies lug 1163 on the rearwardly extending arm of bellcrank 1164 which is pivoted on the shaft 485. The arrangement is such that clockwise movement of the bellcrank 1164 rocks the support unit clockwise. Torsion spring 1165 is fastened to member 1129 and to frame 27 (FIG. 79) for urging the unit counter-clockwise to hold extension 1162 in contact with lug 1163. Lateral lug 1166 on the upright arm of bellcrank 1164 extends through suitable opening on frame 27 and contacts member 1074. Torsion spring 1167 is fastened to member 1074 and to bellcrank 1164 for yieldably holding the bellcrank to the member 1074 so that the bellcrank will turn clockwise with the member. It will be recalled that member 1074 is turned clockwise from its rest or 0 value position a different extent for each sensed quotient value 1-9. Bellcrank 1164, however, can turn clockwise with member 1074 only the 1 and 2 value extents. At the 2 value extent of movement, lug 1166 contacts stop surface 1168 on frame 27. Thus, the bellcrank is arrested at the 2 value position even though member 1074 is turned further clockwise to positions for values 3 to 9. Bellcrank 1164 at such times, is held in the 2 value position by tensioned spring 1167 until member 1074 returns sufficiently to again contact lug 1166. Thereafter the bellcrank returns together with member 1074. From the foregoing it can be seen that in response to sensing of a quotient value of 1, the support unit 1059, 1129 is turned clockwise a predetermined angular extent, and in response to sensing of any of the quotient values 2-9 the unit is turned a further extent clockwise to a predetermined position. Members 1059 and 1129 of this unit, as described, serve to condition the machine for initiation of a shift cycle or a multiplication cycle after each quotient sensing operation depending on the value of the sensed quotient; for initiation of a shift cycle or division termination after normal reduction of the dividend, and for initiation of a multiplication cycle or a shift cycle in accordance with the value of the reduced quotient subsequent occurrence of an overdraft. A summary of the control exercised by the support unit in its 0, 1, and 2-9 quotient value positions follows:

(1) When 0 value quotient is sensed, the support unit 1129, 1059 remains in rest or 0 value position, and latch 302 (FIG. 10) supported thereby remains coupled with lever 1066 which is rocked counter-clockwise after each quotient sensing operation for, at such times, to pull the latch forwardly to effect initiation of a shift cycle on termination of division.

(2) Upon turning of the support unit 1059, 1129 clockwise of at least one step in response to a sensed quotient value of 1-9, latch 302 (FIG. 74) is disengaged from lever 1066 and latch 1056 is engaged with lever 1061. Then, actuation of lever 1066 will not initiate a shift cycle, but reciprocation of latch 1056 (performed after each quotient sensing operation) will actuate lever 1061 to effect initiation of a multiplication cycle of operations, as set forth.

(3) In only the 2-9 position of the support unit 1059, 1129, latch 1127 (FIG. 78) is coupled with lever 1133. Latch 1127 is reciprocated after each occurrence of an overdraft to actuate lever 1133 to effect initiation of a subsequent cycle of multiplying operations. First, however, the too large quotient is reduced, and in the subsequent multiplying operations the product of the reduced quotient times the divisor is subtracted from the dividend.

(4) Whenever the support unit 1059, 1129 (FIG. 10) is turned only to the 1 value position in response to a sensed quotient of "1" or is returned to the 1 value position consequent upon reduction of a 2 quotient to 1, the link-latch unit 1136, 1140 (FIG. 18) is in position to couple with the stud 1151 of member 1152. If the dividend reduction is normal, the link-latch unit is returned from coupling position, but, if an overdraft occurs, the link-latch remains in position for coupling with stud 1151. Then after the dividend is restored and the quotient is reduced to 0, member 1152 turns to pull the link-latch unit downwardly, thereby to effect initiation of a shift cycle or division termination.

What is claimed is:

1. A division plate device for representing a divisor and supported for rotation about an axis, said plate device being stepped to comprise ten distinct consecutive sensable peripheral portions disposed radially differentially relative to said axis for each representing a different one of the ten digits zero to nine, with the peripheral portion which is most remote radially from said axis being the initial peripheral portion and representing said digit zero, each peripheral portion including equiangular sectors equal in number to the value of said divisor, the first sector of said initial peripheral portion and each successive sector on said plate device representing respectively dividends conforming serially to the arithmetical progression "0," "1," "2" . . . , and each of said digits being the common quotient value of the dividend value of each said sector in the respective peripheral portion divided by the divisor represented by the plate device.

2. The construction according to claim 1 wherein said peripheral portion representing said nine quotient additionally includes ten more said equiangular sectors than the value of said divisor represented by said plate device for representing ten additional possible successive dividends, whereby said last mentioned peripheral portion also affords representation of the quotient digit nine for any of said additional ten possible successive dividends divided by said divisor.

3. A quotient device for a calculating machine having a frame, said quotient device comprising a shaft supported on said frame, a plurality of individually different plate means secured together and rotatably mounted on said shaft for rotation in unison differentially from a normal position to a dividend representing computation serving position, each plate means representing a divisor different from each of the others of said plate means, and each plate means being stepped to comprise ten distinct consecutive sensable peripheral portions located radially differentially relative to the axis of said quotient device for each representing a different one of the ten integers, zero to nine, each peripheral portion including equiangular sectors equal in number to the divisor value of the respective plate means, said sectors of said plate means representing dividends, each dividend different from each other, and each of said integers being the common quotient value of the dividend value of each said sector in the respective said peripheral portion divided by the divisor value of the respective said plate means.

4. A quotient device for a calculating machine having a frame, said quotient device comprising a shaft supported on said frame, nine individually different plate means secured together and rotatably mounted on said shaft for rotation in unison differentially from a normal position to a dividend representing computation serving position, each plate means representing a different one of the divisors one to nine inclusive, and each plate means being stepped to comprise ten distinct consecutive sensable peripheral portions disposed radially differentially relative to the axis of said shaft for each representing a different one of the ten digits zero to nine, each peripheral portion including equiangular sectors equal in number to the divisor value of the respective plate means, the first sector of the first said peripheral portion of a said plate means and each successive sector on said plate means representing respectively a different dividend conforming serially to the arithmetical progression "0," "1," "2," "3," . . . , and each of said digits being the common quotient integer value of the dividend value of each said sector in the respective said peripheral portion divided by the divisor value of the respective said plate means.

5. The construction according to claim 4 wherein said peripheral portion representing said nine quotient of each said plate means additionally includes ten more said sectors than said divisor value of the respective said plate means for representing ten additional possible successive dividends, so that said last mentioned peripheral portion also affords representation of the quotient integer nine for any of the additional ten possible successive dividends divided by said divisor, whereby said one-divisor plate means includes sectors for dividends "0" to "19" inclusive, and each successive higher value plate means includes ten more sectors than the next lower value plate means, so that said nine-divisor plate means includes sectors for dividends "0" to "99" inclusive.

6. The construction according to claim 5 and including a disc means secured to said quotient device for rotation therewith, said disc means being formed with ten steps about its periphery disposed differentially radially relative to said shaft axis, and formed with a riser connecting between adjacent steps, each riser representing a different one of the ten digits zero to nine, and the angular displacement between any two consecutive risers being equal to the sum of the angles of ten said sectors, a lever means rotatable on said shaft, an extensible high order dividend digit first control means supported on said frame for being movable differentially radially relative to said axis selectively into the path of movement of any one of said risers, said first control means being engageable and movable extensibly by the selected said riser along a generally concentric path relative to said shaft axis for engaging and rotating said lever means in unison with said quotient device upon rotation of said quotient device in a first direction, said engagement between said first control means and said lever means occurring upon said rotation of said quotient device through an angular extent equal to the sum of the angles of as many said sectors as the value of the selected riser multiplied ten-fold, and a lower order dividend digit second control means comprising a series of ten stepped stop faces disposed equiangularly and differentially generally radially relative to said shaft axis, the angular displacement between any two consecutive stop faces being equal angularly to a said sector, and each stop face representing a different one of the ten digits zero to nine, said second control means being supported on said frame for movement differentially generally radially relative to said shaft axis for setting up said stop faces individually selectively into the path of movement of said lever means, the set-up stop face arresting said lever means upon rotation of said lever means through an angular extent equal to the sum of the angles of as many said sectors as the value represented by said set-up stop face, whereby said quotient device is arrested upon rotation thereof through an angular extent equal to the sum of the angles of as many said sectors as the value of the dividend, "0" through "99" inclusive, represented jointly by said riser selected by said high order dividend digit first control means and said set-up stop face of said low order dividend digit second control means, and whereby the peripheral portion of each plate means comprising said sector related to said jointly represented dividend, is set-up at said computation serving position.

7. The construction according to claim 6, wherein said first control means is normally located at rest position individual thereto, at which position it is in the path of movement of said zero-value riser on said disc, and said second control means is normally at rest position individual to said second control means, at which position said lever means is normally in engagement with said zero-value stop face, whereby the necessary possible said differential movement of said first control means from its said rest position is confined to a maximum of nine steps of movement for said selection of said risers for values one to nine, and whereby the necessary possible said differential movement of said second control means from its said rest position is confined to a maximum of nine steps for set-up of said stop faces for values one to nine.

8. The construction according to claim 6 and including a rest position fixed stop element on said frame in stopping disposition relative to said lever means, and spring means connected to said lever means and said frame for yieldably holding said lever means at rest position, in contact with said fixed stop element.

9. The construction according to claim 6, including an actuating means for rotating said quotient device in said first direction until said quotient device is arrested by said second control means as aforesaid, said actuating means comprising a gear means secured to said quotient device for rotation therewith, a pivoted gear segment meshed with said gear means, and spring means connected to said gear segment and said frame for exerting resilient bias therebetween for swinging said gear segment for said rotation of said quotient device in said first direction.

10. The construction according to claim 6, said disc means being disposed intermediate said quotient device and said lever means and spaced axially from said quotient device and said lever means, a bearing means rotatable on said shaft and secured at one of its ends to said quotient device and at the other of its ends to said disc means for supporting said quotient device and said disc means, a second lever means rotatable on said bearing means intermediate said disc means and said quotient device, said second lever means and said first mentioned lever means each comprising a first arm and a second arm generally perpendicular thereto and joined to said first arm at the pivoted end of said first arm, a first stud means secured to said first arms substantially remote from said shaft axis and a second stud means secured to the distal ends of said second arms, said first and second stud means connecting said second lever means to said first mentioned lever means for movement of both said lever means in unison, said first arms being engageable and movable concurrently by said first control means upon actuation of said first control means by said disc means as aforesaid, a lateral lug on said first arm of said first mentioned lever means for said engagement of said first mentioned lever means with the set-up stop face on said second control means, a stop stud on said frame in engaging relation with said first mentioned lever means for arresting said first and second lever means at rest position, a first spring means connected to said first lever means and said frame for returning said first and second lever means to said rest position, a stop shoulder on said disc means in engaging disposition with said first stud means for arresting said disc means and said quotient device at said normal position upon rotation of said quotient device in a second direction, opposite said first direction, a bellcrank member pivoted on the distal end portion of said first arm of said first mentioned lever means and comprising first and second bellcrank arms, said first bellcrank arm being parallel and adjacent to said afore said first arm and normally in said concentric path of movement of said first control means for being rotated at times by said first control means in unison with said first mentioned lever means about said axis and for being rocked relative to said first mentioned lever means by said first control means whenever said lateral lug contacts the set-up stop face on said second control means, said second bellcrank arm being generally parallel with said second arms and spaced from said second arms, a dashpot pivotally mounted on said second stud means and comprising a normally retracted piston pivotally connected to said second bellcrank arm for being moved outwardly by said bellcrank member when said bellcrank member is rocked relative to said lever means as aforesaid, whereupon said dashpot acts to dampen said stopping of said quotient device by said second control means, and a second spring means connected to said second bellcrank arm and said second arm of said second lever means yieldably holding said piston and said bellcrank member in their respective normal positions, and for restoring them thereto from operated positions.

11. The construction according to claim 6 wherein said lever means comprises a first lever arm pivoted at one end on said shaft and a second lever arm generally perpendicular and joined to said first lever arm at said pivoted end, said first lever arm being in operative relation with said first and said second control means as aforesaid, a bellcrank member pivoted on the distal end portion of said first lever arm and comprising first and second bellcrank arms, said first bellcrank arm being generally parallel and adjacent to said first lever arm and normally in said concentric path of movement of said first control means for being rotated at times by said first control means in unison with said lever means about said shaft axis and for being rocked relative to said lever means by said first control means whenever said lever means is arrested by said second control means, said second bellcrank arm being generally parallel with said second lever arm and spaced from said second lever arm, a dashpot pivotally mounted on the distal end of said second lever arm and comprising a normally retracted piston pivotally connected to the distal end of said second bellcrank arm, said bellcrank moving said piston outwardly when said bellcrank is rocked relative to said lever means, whereupon said dashpot acts to dampen said stopping of said quotient device by said second digit control means, and spring means connected to said second lever arm and said second bellcrank arm for yieldably holding said piston and said bellcrank member in their respective normal positions, and for returning them thereto from operated positions.

12. The construction according to claim 11 and comprising, a rest position stop stud on said frame normally contacted by said lever means, return spring means connected to said lever means and said frame for returning said lever means from any operated position to rest position, upon release of displacing force, and for yieldably holding said lever means thereat in said contact with said stop stud, and lateral lug means on said first lever arm for said engagement of said lever means with the set-up stop face on said second control means.

13. The construction according to claim 6 and comprising, a return stop stud carried on said frame, return spring means connected to said lever means and said frame for restoring said lever means and yieldably holding said lever means in contact with said stop stud, a stop shoulder formed on said disc, and a normal position stop stud protruding from said lever means in engaging disposition relative to said stop shoulder for arresting said quotient device at said normal position upon rotation of said quotient device in a second direction, opposite said first direction.

14. The construction according to claim 13, said calculating machine comprising a cyclic operating mechanism comprising a rotatable cam formed with a peripheral portion of substantial radial elevation; actuating means responsive to said cam for rotating said quotient device in said first direction until said quotient device is arrested by said second control means as aforesaid, and for rotating said quotient device in said second direction for returning said quotient device to said rest position, said actuating means comprising a gear means secured to said quotient device for rotating therewith, a gear segment pivoted on said frame and meshed with said gear means, cam follower means pivoted on said frame and normally engaging said cam on said elevated peripheral portion thereof, a lug on and extending laterally from said cam follower means, a lever pivoted coaxially with said cam follower means and normally angularly displaced from said lateral lug, link means interconnecting said gear segment and said lever, a loaded first spring means connected to said cam follower and said lever for biasing said lever against said lateral lug for movement at times of said lever and cam follower in unison, and a loaded second spring means, of lesser tension than said first spring means, connected to said gear segment and said frame for influencing said gear segment for holding said cam follower means in following engagement with the periphery of said rotatable cam, whereby, when said elevated peripheral portion of said cam is rotated out of engagement with said cam follower, said second spring means rocks said gear segment for said rotation of said quotient device in said first direction, and movement of said elevated peripheral portion into engagement again with said cam follower rocks said cam follower to swing said gear segment back, thereby to rotate said quotient device in said opposite direction to said rest position and to reload said second spring means, said lever moving with said cam follower until said quotient device is arrested at said normal position, whereupon said cam follower is advanced relative to said lever for reloading said first spring means and thereby to hold said quotient device at said normal position.

15. A control device for differentially regulating the extent of rotation of a rotary computing device in a calculating machine, according to the value of any two-digit factor from 00 to 99 inclusive, as a step in a computation operation, said calculating machine having differential means settable to represent the units digit and the tens digit values of any said factor, a frame and a shaft carried by said frame for rotatably supporting said computing device; said control device comprising a disc means secured to said computing device for rotation therewith, said disc means being formed with ten peripheral steps disposed differentially radially relative to the axis of said shaft, and formed with a riser connecting between adjacent steps, each riser representing a different one of the ten digits zero to nine with said nine value riser being located the furthest from said axis, the angular displacement between any two consecutive risers including ten equiangular sectors, a lever means rotatable on said shaft adjacent to said disc means, an extensible tens digit stop means normally in the path of movement of said zero value riser and movably responsive to said differential means in discrete steps corresponding in number to the value of the set-up tens digit of the involved factor, said steps of movement of said tens digit stop means being generally radially relative to said axis into the path of movement of the particular said riser relating to said set-up tens digit, thereby selecting that riser, said tens digit stop means being engageable by the selected said riser upon rotation of said computing device and being movable extensibly by said riser along a generally concentric path relative said axis for engaging and thereupon rotating said lever means in unison with said computing device, said tens digit stop means engaging said lever means upon rotation of said computing device through an angular extent equal to the sum of the angles of as many said sectors as the value of the selected riser multiplied ten-fold, a units digit stop means comprising a series of ten stepped stop faces, each stop face representing a different one of the ten digits zero to nine and disposed equiangularly and differentially generally radially relative to said axis, the angular displacement between two consecutive stop faces being equal angularly to one said sector, said units digit stop means being movably responsive to said differential means in discrete steps corresponding in number to the value of the set-up units digit of said involved factor, for setting up in the path of movement of said lever means the particular said stop face relating to said set-up units digit, so that said set-up stop face arrests said lever means upon rotation of said lever means through an angular extent equal to the sum of the angles of as many said sectors as the value of said set-up stop face, whereby said computing device is arrested upon rotation thereof through an angular extent equal to the sum of the angles of as many said sectors as the value of the set-up tens and units digit of said involved factor.

16. The construction according to claim 15, wherein said units digit stop means comprises a lever member pivoted between its ends on said frame and, comprising first and second arms, said first arm being adjacent to said lever means, and an edge portion of said first arm carrying said stop faces, said lever member being rotatable for said differential movement for said set-up of said stop face relative to the set-up units digit, a lateral lug means carried by said lever means for said engagement of said lever means with the set-up faces, a normal position stud means fixed on said frame in stopping disposition relative to said second arm, and spring means connected to said lever member and said frame for yieldably holding said lever member at rest position, at which position said second arm contacts said normal position stud means and said zero value stop face is then in engagement with said lateral lug means.

17. The construction according to claim 15, said tens digit stop means comprising an elongated first carrier lever pivoted at a first end portion on said frame substantially remote from said shaft, the second end portion of said first carrier lever being in close proximity to said disc means, a normal position stud means on said frame in stopping disposition relative to said first carrier lever, a first spring means connected to said first carrier lever and said frame for yieldably holding said first carrier lever in contact with said normal position stud means, said first carrier lever being rotatable for said differential movement to effect said selection of the particular riser on said disc means relating to the set-up tens digit, a second carrier lever pivoted on said second end portion of said first carrier lever, mutually spaced first and second lateral lugs carried by said second carrier lever, a second spring means between said first and second carrier levers for biasing said second carrier lever in a direction toward the axis of said first carrier lever and yieldably holding said second carrier lever normally at a rest position, at which position said first lateral lug engages said first carrier lever and said second carrier lever stands generally normal to said first carrier lever, a third carrier lever pivoted on said second carrier lever and extending adjacent to said disc means, said third carrier lever normally engaging said second lateral lug for being arrested by said second lateral lug in a position generally parallel with said first carrier lever, a stud carried by said third carrier lever for said selection of said risers upon said rotation of said first carrier lever, said stud normally standing in the path of movement of said zero value riser, a third spring means between said second and third carrier levers for yieldably holding said third carrier lever in said engagement with said second lateral lug, said third lever being rockable about its pivotal mounting in a direction away from and generally radially relative to said shaft axis, whereby said second and third carrier levers jointly permit said stud to move concentrically relative to said shaft axis for said engagement and rotation of said lever means by said stud when said stud is moved by the selected riser of said disc means.

18. The construction according to claim 17 wherein said risers are recessed and an edge portion of said lever means is oriented in a direction opposite to the direction of rotation of said disc means and is formed with a series of ten spaced notches, each notch being individual to a different recessed riser, and each recessed riser and the related notch being displaced equally radially relative to said shaft axis, and so that said stud on said third carrier lever is positively clasped against radial displacement jointly by the selected recessed riser and the related notch on said lever means when said disc means is rotated.

19. A control means for differentially controlling the extent of rotation of a rotary computing device in a calculating machine according to the value of any two-digit factor 00 to 99 inclusive, as a step in a computation cycle of operations, said calculating machine having a frame, and a shaft carried by said frame for rotatably supporting said computing device; rotatably mounted units digit and tens digit wheels, each wheel comprising ten peripheral steps disposed equiangularly and differentially radially relative to the axis of said wheel, each step representing a different one of the ten digits 0 to 9, with said zero-value step being the outermost step and normally located at a sensing position, actuating means operable differentially for rotating said wheels to set-up at said sensing position said steps representing the tens and units digits of a said factor; said control means comprising a tens sensing lever means and a units sensing lever means pivotally mounted on said frame in operative relation respectively with said tens digit wheel and said units digit wheel and normally at rest position, a roller and a sensing finger carried by each said sensing lever means for rotation therewith, each said sensing finger being retracted with said sensing lever means from the related digit wheel at said rest position of the respective sensing lever means, and, upon rotation of said sensing lever means, said sensing fingers contacting the set-up step on said related digit wheel for thereupon being arrested by said step, said steps limiting said rotation of the related said sensing lever means to a different angular extent for each of the ten digits 0 to 9, a disc means secured to said computing device for rotation therewith, said disc means being formed with steps located about its periphery differentially radially relative to the axis of said shaft and being formed with a riser connecting between adjacent steps, each riser being recessed and representing a different one of the ten digits 0 to 9 with said nine value riser being radially located the furthest from said shaft axis, the angular displacement between two consecutive risers comprising ten equiangular sectors, a lever means rotatable on said shaft adjacent to said disc means, said lever means having an edge portion facing in a direction opposite to the direction of rotation of said disc means, said edge portion being formed with a series of ten radially spaced notches, each notch being individual to a different one of said recessed risers, each recessed riser and the related notch being displaced equally radially from said shaft axis, a lateral lug carried by said lever means for rotation therewith, a tens digit stop means including an elongated first carrier lever pivoted at a first end portion on said frame substantially remote from said shaft and the second end portion thereof being in close proximity to said disc means, a normal position first stud on said frame in contact disposition with said first carrier lever, a first spring means connected to said first carrier lever and said frame for yieldably holding said first carrier lever in contact with said first stud, a second carrier lever pivoted on said second end portion of said first carrier lever, mutually spaced first and second lug projections carried by said second carrier lever, a second spring means connected to said first and second carrier levers for biasing said second carrier lever in a direction away from said disc, and yieldably holding said second carrier lever normally at rest position, at which position said first lug projection engages said first carrier lever and said second carrier lever stands generally perpendicular to said first carrier lever, a third carrier lever pivoted on said second carrier lever and extending adjacent to said disc means, said third carrier lever normally engaging said second lug projection in a position generally parallel with said first carrier lever, a third spring means connected to said second and third carrier levers for yieldably holding said third carrier lever in said contact with said second lug projection, said third carrier lever being rockable about its pivotal mounting on said second carrier lever generally radially relative to said shaft axis, a lateral stud carried by said third carrier lever normally located in the path of movement of said zero-value riser between said zero-value riser on said disc means and said related notch on said lever means, said first carrier lever being in operative relation with said roller of said tens sensing lever means for being engaged and rotated said differential extents for values 1 to 9 by said roller for moving said lateral stud into the path of movement of the particular riser relating to the set-up tens digit, thereby selecting that riser, said roller and said sensing finger of said tens digit sensing means being correspondingly displaced angularly from said first carrier lever and said tens digit wheel respectively, so that said roller contacts said first carrier lever without moving said lever whenever said sensing finger is arrested by the respective said zero-value step, the selected said recessed riser engaging and moving said lateral stud into positive clutched engagement with said related notch for rotating said lever means only after said disc means has been rotated through the angular extent of as many said sectors as the set-up tens digit multiplied ten-fold, said pivotal mountings of said second and third carrier levers permitting said lateral stud to move concentrically relative said shaft axis, a units digit stop lever pivoted on said frame and including first and second arms, a normal position second stud on said frame in contact disposition with said second arm, a fourth spring means connected to said stop lever and said frame for normally yieldably holding said second arm in contact with said second stud, said first arm being adjacent said lever means and formed with a series of ten stop faces disposed equiangularly and differentially radially relative to the axis of said stop lever, the radial displacement between any two consecutive stop faces being oriented relative to said shaft axis and equal angularly to a said sector, each said stop face representing a different one of the ten digits 0 to 9, said lateral lug on said lever means normally engaging said zero-value stop face, said second arm being in operative relation with said roller of said units sensing lever means for being engaged and rotated said differential extents for values 1 to 9 by said roller for setting up in the path of movement of said lateral lug the particular stop face relating to the set-up units digit, said roller and said sensing finger of said units sensing lever means being correspondingly displaced angularly from said second arm and said units digit wheel respectively, so that said roller contacts said second arm without moving said arm when said sensing finger is arrested by the respective said zero-value step, whereby the necessary movement of said tens digit stop means and of said units digit stop lever from their respective normal positions is reduced to a maximum of nine steps of movement, and said units digit stop lever arrests said computing device upon rotation of said computing device through an angular extent equal to the sum of the angles of as many said sectors as corresponds to the involved factor.

20. The construction according to claim 19 wherein said units sensing lever means comprises a rod journaled on said frame, and spaced first and second units levers secured to said rod for rotation therewith, the distal end of said first units lever carrying a first of said sensing fingers and the distal end of said second units lever having a first of said rollers mounted thereon, said tens sensing lever means comprising a sleeve rotatable on said rod between said first and second units levers, a first tens lever secured to the end of said sleeve nearest said first units lever for movement with said sleeve, and a second tens lever secured to the opposite end of said sleeve and nearest said second units lever for movement with said sleeve, the distal end of said first tens lever carrying the other of said sensing fingers and the distal end of said second tens lever having the other of said rollers mounted thereon.

21. The construction according to claim 19 wherein said pivotal mountings of said units digit stop lever and of said first carrier lever are at spaced locations on said frame, and said second arm and said first carrier lever extend in opposite directions generally toward each other, a detent lever rockably pivoted intermediate its ends on said frame and formed with a first V-shaped projection at a first of its said ends and a second V-shaped projection at the other of its said ends, a first series of ten V-notches formed on said first carrier lever in engageable relation with said first V-shaped projection, a second series of ten V-notches formed on said second arm in engageable relation with said second V-shaped projection, said first and second V-notches being disposed angularly so that at each position of adjustment of said first carrier lever by said tens sensing lever means and of said second arm by said units sensing lever means, one of said first series of V-notches and one of said second series of V-notches are engaged by the related said V-shaped projections upon rocking of said detent lever for locking said tens digit stop means and said units digit stop lever at their respective said positions.

22. The construction according to claim 21 comprising a fifth spring means connected to said detent lever and said frame for biasing said detent lever toward said engagement with said first and second series of V-notches, a latch means pivoted on said frame and normally engaged with said detent lever for holding said detent lever retracted from engagement with said first and second series of V-notches, a sixth spring means for influencing said latch means to engage said detent lever, and motivating means for rotating said tens and units sensing lever means and for thereafter rocking said latch means to disengage said latch means from said detent lever.

23. The construction according to claim 22 wherein said machine comprises a cyclic operating mechanism having a rotatable cam formed with a major radius peripheral portion and with a minor radius peripheral portion of lesser radial elevation than said major radius portion, said tens and units sensing lever means and said latch means being coaxial, and said motivating means comprises a seventh spring means and an eighth spring means connected respectively to said tens and units sensing lever means and to said frame for biasing the respective sensing lever means to rotate in a first direction to contact its related digit wheel as aforesaid, a follower means pivoted coaxially with said sensing lever means and said latch means, a roller on said follower means normally engaging said major radius peripheral portion of said cam, lateral extension means carried by said follower means and normally engaging each said sensing lever means for at times holding said sensing lever means at said retracted position against the influence of the respective seventh and eighth spring means, said lateral extension means being in operative relation with said latch means, a ninth spring means connected to said follower means and said frame for urging said follower means in said first direction to always hold said roller in following contact with the periphery of said cam, and so that, when said cam is rotated through a complete revolution, said minor radius peripheral portion permits said follower means to rotate in said first direction and said major radius peripheral portion rocks said follower means in a direction opposite said first direction back again to normal position, said tens and units sensing lever means rotating in said first direction in unison with said follower means until each sensing lever means is arrested by the related digit wheel, and thereafter said lateral extension means engages and rocks said latch means out of said engagement with said detent lever.

24. In a calculating machine having a frame; means to set-up any one of the numbers 00 to 99 inclusive, said means comprising a tens digit wheel and a units digit wheel mounted coaxially, each wheel comprising equiangular peripheral steps, each step being individual to a different one of the ten digits 0 to 9, and disposed differentially radially relative to the axis of said wheel with said nine-value step being the innermost step and said zero-value step being the outermost step and normally located at a sensing position, digit wheel actuating means operable responsive to the set up means for rotating said wheels to set-up at said sensing position said steps relating to the tens and units digits of any said number; cyclic operating mechanism including rotatable first and second cams secured together for rotating 360 degrees simultaneously, said first cam comprising a first major radius peripheral portion, and said second cam comprising a second major radius peripheral portion; a rod supported on said frame, a tens sensing lever means and a units sensing lever means rotatably mounted on said rod in operative relation with the set-up steps on said tens and units digit wheels respectively, a first spring means connected to said tens sensing lever means and said frame and second spring means connected to said units sensing lever means and said frame, said first and second spring means rotating its related sensing lever means from a retracted rest position until said sensing lever means is arrested by the set-up step on the related digit wheel, a first follower member pivoted on said rod and normally engaging said first major radius peripheral portion, a third spring means connected to said first follower member and said frame for biasing said follower member to followingly contact the periphery of said first cam, lateral extension means carried by said follower member normally engaging said tens and units sensing lever means for holding both said sensing lever means at said retracted rest position against the influence of said first and second spring means, whereby when, in response to one revolution of said first cam, said first major radius peripheral portion moves out of and into contact with said first follower member, said first follower member is oscillated, thereby permitting both said sensing lever means to rotate to contact the respective digit wheels as aforesaid and thereafter restoring both said sensing lever means to said retracted position; a shaft supported on said frame, a computing device rotatably mounted on said shaft, control means for differentially limiting the extent of rotation in a first direction of said computing device according to a set-up number, as a step in a computation cycle of operations; said control means comprising a disc means secured to said computing device for rotation therewith, said disc means being stepped about its periphery differentially radially relative the axis of said shaft and formed with a riser connecting between each of the adjacent steps, each riser being recessed and representing a different one of the ten digits 0 to 9, said zero-value riser and said nine-value riser being respectively the nearest to and the furthest from said shaft axis, the angular displacement between two consecutive risers comprising ten equiangular sectors, a first stop stud on said frame, a lever means rotatable on said shaft adjacent said disc means and normally engaging said stop stud at rest position, a first lateral stud on said lever means in engaging disposition with said disc means for arresting said disc means at rest position upon rotation of said disc means in a second direction opposite said first direction, said lever means comprising an edge portion oriented in a direction opposite to said first direction of rotation of said disc means, said edge portion being formed with a series of ten radially spaced notches, each notch being individual to a different one of said recessed risers, and each recessed riser and the related notch being displaced equally radially relative said shaft axis, a tens digit stop means including a first carrier lever pivoted on said frame substantially remote from said shaft and extending generally toward said disc means and normally standing at rest position, a second carrier lever pivoted on said first carrier lever and formed with first and second lug projections, said first lug projection normally engaging said first carrier lever for limiting rotation of said second carrier lever in a direction away from said disc means and arresting said second carrier lever at a position generally perpendicular to said first carrier lever, a third carrier lever pivoted on said second carrier lever and engaging said second lug projection for being arrested by said second lug projection in a position generally parallel with said first carrier lever, said third carrier lever extending adjacent said disc means and being rockable about its pivotal mounting on said second carrier lever in a direction radially relative and away from said shaft axis, a second lateral stud carried by said third carrier lever normally in the path of rotation of said zero-value recessed riser intermediate said zero-value recessed riser and said related notch, said first carrier lever being in operative relation with said tens sensing lever means for being engaged and rotated differential extents by said tens sensing lever means for values 1 to 9 for moving said second lateral stud into the path of rotation of the said recessed riser relating to the value of the set-up tens digit, thereby selecting that recessed riser, the selected recessed riser engaging and moving said second lateral stud into positive clutched engagement with said related notch for rotating said lever means only after said computing device has been rotated in said first direction through an angular extent equal to the sum of the angles of as many said sectors as the set-up tens digit multiplied ten-fold, a units digit stop lever pivoted on said frame and including first and second arms, said first arm being adjacent said lever means and formed with a series of ten stepped stop faces disposed equiangularly and differentially radially relative to the axis of said stop lever, the radial displacement between two consecutive stop faces being angularly oriented relative to said shaft axis and equal angularly to one said sector, each stop face representing a different one of the ten digits 0 to 9, said zero-valve stop face normally engaging said lever means, said second arm being in operative relation with said units sensing lever means for being engaged and rotated differential extents by said units sensing lever means for values 1 to 9 for setting up in the path of movement of said lever means the stop face relating to the set-up units digit, said set-up stop face arresting said lever means upon rotation of said lever means through an angular extent of as many said sectors as the set-up units digit whereby said computing device is arrested upon rotation of said computing device in said first direction through an angular extent equal to the sum of the angles of as many said sectors as said set-up number; motivating means responsive to said second cam for rotating said computing device in said first direction until said computing device is arrested by said units digit stop lever, as aforesaid, and for rotating said computing device in said second direction, for returning said computing device to said rest position; said motivating means comprising a pinion gear secured to said computing device, a gear segment pivoted on said frame and meshed with said pinion gear, a fourth spring means connected to said gear segment and said frame for biasing said gear segment to effect said rotation of said computing device in said first direction, a lever pivoted on said frame, a link connecting said lever and said gear segment, a second follower member pivoted coaxially with said lever and normally engaging said second major radius peripheral portion of said second cam, a lateral lug on said second follower member normally angularly displaced from said lever, a fifth spring means of greater tension then said fourth spring means, connected to said second follower member and said lever for influencing said second follower member to contact said lateral lug with said lever, so that when, during one revolution of said second cam, said second major radius peripheral portion is moved out of contact with said second follower member, said second follower member is free to rock under the influence of said fifth spring means to engage said lever as aforesaid and to rock in unison with said lever under the influence of said fourth spring means until said computing device is arrested by said units stop lever as aforesaid, and so that when said second major radius portion is moved into contact again with said second follower member, said second major radius portion rocks said second follower member in the opposite direction for swinging said gear segment, to reload said fourth spring means and to rotate said computing device in said second direction to rest position, whereupon said second follower member is advanced relative to said lever, against the tension of said fifth spring means for said angular displacement of said lateral lug from said lever, thereby to hold said computing device at said rest position in contact with said first lateral stud; a detent member pivoted on said frame and formed with V-shaped projection means, a series of ten V-notches formed on said first carrier lever and a series of ten V-notches formed on said units digit stop lever in cooperative relation with said V-shaped projection means, each series of V-notches being disposed angularly so that at each position of adjustment of said first carrier lever by said tens sensing lever means, and of said units digit stop lever by said units sensing lever means, one of the related said V-notches is engageable by said V-shaped projection means upon rocking of said detent member for locking said tens digit stop means and said units digit stop lever, each at its respective position, a sixth spring means connected to said detent member and said frame for rocking said detent member to engage said tens digit stop means and said units digit stop lever, a spring biased latch means pivoted on said rod and normally engaged with said detent member for holding said detent member retracted from said V-notches of said tens digit stop means and of said units digit stop lever, said latch means being in operative relation with said lateral extension means of said first follower member for being rocked by said lateral extension means to disengage from said detent member upon rocking of said first follower member by a predetermined extent, sufficient to permit contact of the nine-value steps on said digit wheels by said units and tens sensing levers, a lateral extension portion carried by said detent member and engaged with said link for rocking of said detent member by said link to retract said detent member from said V-notches and reengage said detent member with said latch means during the final phase of said second direction rotation of said computing device, said first and second major radius peripheral portions being disposed in mutual angularly spaced relationship, so that said second cam initiates rocking of said second follower member for starting said rotation of said computing device in said first direction before said first cam permits said first follower member to complete said predetermined extent of movement and rock said latch means, whereby the combined operating time for rotating said computing device in said first direction and adjusting said tens digit stop means and said units digit stop lever in accordance with the tens and units digit values of the set-up number, is substantially minimized, and whereby said lateral extension portion on said detent member is freed by said link to permit said rocking of said detent member by said sixth spring means subsequent said disengagement of said latch means from said detent member.

25. In a calculating machine having a frame, setup means for initially setting up any dividend 0 to 99, inclusive, and a bank of selectively operable keys, each representing a different one of the divisors 1 to 9 inclusive; a quotient device comprising a first shaft supported on said frame, nine individually different plate means secured together and rotatably mounted on said first shaft for being rotated in unison, each plate means representing a different one of said divisors, and each plate means being stepped to comprise ten distinct consecutive sensable peripheral portions, each peripheral portion including equiangular sectors equal in number to the divisor value of the respective plate means, and the tenth peripheral portion of each plate means additionally including ten more said equiangular sectors than said divisor value of the respective said plate means, the first sector of the first said peripheral portion of a said plate means and each successive sector on said plate means representing respectively a different dividend conforming serially to the arithmetical progression "0", "1", "2", "3" . . . , whereby the one value plate means comprises sectors for dividends "0" to "19" inclusive, and each successive higher value plate means comprises ten more sectors than the next lower value plate means, so that the nine value plate means comprises sectors for dividends "0" to "99" inclusive, said peripheral portions of each said plate means being disposed radially differentially relative to the axis of said first shaft for representing a different one of the ten digits zero to nine, each said digit being the common quotient integer of the dividend value of each said sector in the respective said peripheral portion divided by the divisor value of the respective said plate means; actuating means operatively responsive to said setup means for rotating said quotient device an angular extent equal to the sum of the angles of as many said sectors as the value of the set-up dividend for setting up said sectors related to said set up dividend, each at a sensing position individual axially to the respective plate means; a normal position stop means on said frame; a quotient sensing means comprising a second shaft parallel to said first shaft and supported on said frame, a cage means rockable on said second shaft and fixed against axial displacement therealong, spring means between said cage means and said frame for influencing said cage means in a direction away from said quotient device and yieldably holding said cage means at normal position in contact with said stop means, said cage means being formed of spaced cage arms pivoted on said second shaft and first and second rods securing them together, said rods being parallel with said second shaft and spaced therefrom, with said second rod being the most remote from said second shaft, a sensing member mounted on said second shaft between said cage arms for pivotal movement and for axial movement within said cage means, said sensing member being formed with a first arm and a second arm, said second arm being bifurcated for slidably embracing said second rod so that said sensing member and said cage rock together, a sensing finger extending from said first arm and being retracted from contact with said quotient device when at said normal position of said cage means; and means responsive to actuation of any of said keys for shifting said sensing member selectively axially into alignment with the said plate means related to the actuated said key, for sensing contact with said peripheral portion including said set-up sector on the involved said plate means upon rocking of said sensing means and said cage means a different angular increment for and representative of each said quotient integer 0 to 9.

26. In a calculating machine having a frame, set-up means for initially setting up a dividend, and a plurality of selectively operable keys, each key representing a divisor differing from each other; a predetermined quotient device comprising a first shaft mounted on said frame, a plurality of individually different plate means secured together and rotatably mounted on said first shaft for being rotated in unison, each plate means representing a different said divsor and each plate means being stepped to comprise ten distinct consecutive sensible peripheral portions, each said peripheral portion including equiangular sectors equal in number to the divisor value of the respective plate means, said sectors of said plate means representing dividends differing from each other, said peripheral portions being disposed radially differentially relative to the axis of said quotient device for each representing a different one of the ten integers zero to nine, each said integer being the common quotient of the dividend value of each said sector in the respective said peripheral portion divided by the divisor value of the respective said plate means, actuating means operatively responsive to said setup means for rotating said quotient device through an angular extent equal to the sum of the angles of as many said sectors as the value of the set-up dividend for setting up said sectors related to said set-up dividend; a quotient sensing means comprising a second shaft parallel to said first shaft and supported on said frame, a cage means rockable on said second shaft and fixed against axial displacement therealong, a sensing member slidably coupled to said cage means and mounted on said second shaft for rockable movement with said cage means and for axial movement within said cage means, and a sensing finger extending from said sensing means and normally retracted from contact with said quotient device; and means movable responsive to operation of any of said keys for shifting said sensing member selectively axially into alignment with said plate means which is related to the operated said key, for sensing contact with said set-up sector on the involved said plate means upon rocking of said sensing means and said cage means a different angular extent for each of said quotient integers, as limited by the involved set-up said peripheral portion.

27. In a calculating machine having a frame, set-up means for setting up dividends, and a plurality of selectively operable keys, each key representing a divisor differing from each other; a predetermined quotient device comprising a first shaft mounted on said frame, a plurality of individually different plate means secured together and rotatably mounted on said first shaft for rotation in unison, each plate means representing a different said divisor, and each plate means being stepped to comprise ten distinct consecutive sensible peripheral portions, each peripheral portion including equiangular sectors equal in number to the divisor value of the respective plate means, said sectors of said plate means representing dividends, each differing from each other, said peripheral portions being located radially differentially relative to the axis of said quotient device for each representing a different one of the ten integers zero to nine, each said integer being the common quotient of the dividend value of each said sector in the respective said peripheral portion divided by the divisor value of the respective said plate means; actuating means opratively responsive to said set-up means for rotating said quotient device an angular extent equal to the sum of the angles of as many said sectors as the value of the set-up dividend for setting up said sectors relating to said set-up dividend; a quotient sensing means comprising a second shaft parallel to said first shaft and supported on said frame, a sensing member slidably and rockably mounted on said second shaft and normally retracted from contact with said quotient device; motivating means coupled to said sensing member and movable responsive to operation of any of said keys for sliding said sensing member selectively axially into alignment with said plate means which is related to the operated said key, and actuating means engageable with said sensing member for rocking said sensing member to contact with said set-up sector on the involved said plate means, said sensing member rocking a different angular extent for each of said quotient integers, as limited by the involved set-up of said peripheral portion.

28. The construction according to claim 27 wherein said sensing member comprises a projection extending from the pivoted end portion of said sensing member, and said motivating means comprises a pair of mutually parallel support lever means pivotally mounted at spaced locations on said frame, remote from said second shaft, the distal ends of said support lever means being in close proximity to said second shaft, a link means parallel to said second shaft and pivotally connected to both said support lever means for rectilinear movement relative to said second shaft upon rocking of a first of said support lever means according to said key operation, an extension carried by said link means for movement with said link means and formed with a slot perpendicular to the longitudinal length of said link means, said sensing member projection extending into said slot for engaging said link means in its said slot for said axial aligning movement of said sensing member by said link means, said slot permitting said rocking of said sensing member for said angular extents of movement of said sensing member.

27. The construction according to claim 27, said calculating machine including a cyclic operating mechanism comprising a rotatable cam formed with a major radius periphreal portion and a minor radius peripheral portion of lesser radial extent than said major radius peripheral portion, said actuating means comprising a lever means pivoted on said frame remote from and extending toward said second shaft, a cam follower means pivoted coaxially with said lever means and normally engaging said minor radius periphral portion of said cam for being rocked by said major radius peripheral portion upon rotation of said cam, a first spring means connected to said cam follower and said frame for holding said cam follower in following engagement with the periphery of said cam, a lateral lug on said cam follower normally engaging said lever means, a second spring means connected to said cam follower means and said lever means for biasing said lever means against said lateral lug for rocking, at times, of said lever with said cam follower, a series of eight lug projections on said lever means, a first of said lug projections being of a width sufficient for being disposed in alignment with said one and two value plate means, and each of the others of said lug projections being disposed in alignment with a different one of each of others of said plate means, said lug projections being disposed differentially radially relative to the axis of said lever means, with the said lug projection which is related to said nine value plate means being the nearest to said axis of said lever means and the most remote from said second shaft, an arm extending from the pivoted end of said sensing member toward said axis of said lever means for being engaged and rocked by the lug projection related to the selected said plate means, upon said rocking of said lever means, said lug projections being displaced equally angularly relative to said arm and engaging said arm differentially radially relative to the axis of said sensing member whereby said sensing member is rocked at a predetermined rate of speed when sensing said nine value plate means and at a proportionally faster rate of speed when sensing each lower value plate means respectively.

30. In a calculating machine; a shiftable carriage; a multiorder dividend register on said carriage and means for initially entering successive digits of a dividend in predetermined mutually adjacent orders of said register, right adjacent to the highest order of said register, said highest order being usable cooperatively as an overflow order; a dividend sensing device comprising a high order and a low order register sensing means for sensing the dividend digits respectively in said highest order and adjacent lower order of said register associated with said sensing device; a quotient device comprising nine different predetermined quotient plate means, one plate means for each divisor digit 1 to 9 inclusive, said plate means being secured together and supported for rotation together about a common axis thereof, each plate means being stepped to comprise ten sensable surface portions disposed radially differentially, each said surface portion of a plate means representing a different quotient integer 0 to 9 inclusive, each integer 0–9 being the quotient of the involved divisor digit divided into dividends of the arithmetical series from zero to a number which is nine more than said involved divisor digit multiplied ten-fold, said dividends being represented by mutually adjacent equiangular sectors of said surface portions, and each surface portion for quotient values 0 to 8 inclusive including sectors equal in number to the divisor value of the respective plate means; a plurality of ordinal banks of digit keys for setting up the successive digits of a divisor in mutually adjacent banks, with the leftmost divisor digit from 1 to 9 inclusive being in the highest order bank, said lower order of said register being in cooperative ordinal relation with said highest order bank; a quotient sensing means comprising a sensing member movable axially, relative to said quotient device in response to actuation of any key for values 1 to 9 inclusive in said highest order bank, into sensing relation with that one of said plate means which represents the value of the operated said key, and said sensing means being movable generally radially relative to said quotient device axis until said sensing member contacts the then involved said plate means; two-digit control means responsive to said high and low order register sensing means for limiting rotation of said quotient device differentially according to the sensed dividend value, so as to set-up in the path of said radial movement of said quotient sensing means that surface portion which represents the quotient integer of the said sensed dividend value divided by the divisor value of the respective said plate means; each said portion cooperating, when thus set up, for limiting said radial movement of said quotient sensing means to a different extent representative of the respective quotient integer; trial quotient set-up means operable differentially by said quotient sensing means according to the sensed quotient value; multiplying means operatively responsive to the operated said keys and to said trial quotient set-up means for multiplying the divisor, set-up on said keys, by the sensed quotient digit and subtractively entering the digits of the product in successive orders of said register, reducing the dividend therein; a first motivating means comprising means for operating said dividend sensing device, means for rotating said quotient device and means for moving said quotient sensing means for said radial movement respectively, in timed sequence in successive cycles of operation; a second motivating means for operating said multiplying means in successive cycles of operation; and a shift means for shifting said carriage for bringing into said cooperative association successive adjacent orders of said register with said dividend sensing device in successive cycles of operation.

31. The construction according to claim 30 and comprising division initiating means operable for initiating operation of said first motivating means, multiplication initiating means operable for initiating operation of said second motivating means, shift initiating means operable for initiating operation of said shift means, divide key means operable for initially actuating said division initiating means; first actuating means operative responsive to said quotient sensing means moving means, consequent to sensing of any of the quotient values 1 to 9 inclusive, by said quotient sensing member, for operating said multiplication initiating means; a normally operative second actuating means actuated at times by said second motivating means, subsequent to entry of a product in said register by said multiplying means, for operating said shift initiating means; a division initiating means third actuating means operative only consequent to actuation of said divide key means and operable by said shift means subsequent to any ordinal shift of said carriage for operating said division initiating means; a normally inoperative fourth actuating means distinct from said first actuating means, said fourth actuating means being actuatable at times by said second motivating means subsequent to entry of a product, for operating said multiplication initiating means; quotient reducing means operable responsive to said fourth actuating means for operating said trial quotient set up means to reduce a trial quotient by 1, and means responsive to an overdraft in said highest order of said register for disabling said second actuating means and for rendering said fourth actuating means operable by said second motivating means.

32. The construction according to claim 30 wherein said trial quotient set-up means comprises a journaled shaft, a motion transmitting member secured to said shaft, and linkage means connecting said shaft and said multiplying means; said quotient sensing means comprising a bail means rotatable on said shaft, with said sensing member being slidably carried on said shaft for said axial movement within the limits of said bail means for said selection of said plate means by alignment therewith and being rotatable on said shaft for said contact with a said involved plate means, said sensing member being slidably coupled to said bail means for rotation of said bail means together with said sensing member; said bail means engaging said motion transmitting member upon rotation of said bail means through an angular extent representative of zero quotient for rotating said trial quotient set-up means a different extent for each sensed quotient 1 to 9 inclusive for therethrough entering the involved trial quotient in said multiplying means.

33. The construction according to claim 32 wherein said motion transmitting member of said trial quotient set-up means is formed with a plurality of spaced teeth disposed equiangularly about the axis of said member to correspond respectively to the extents of rotation of said motion transmitting member for each quotient value 1 to 9 inclusive, spring means engaging said trial quotient set-up means for returning the same from any operated position to normal position, resiliently biased detent means cooperating with said teeth for blocking return of said trial quotient set-up means from an operated position to normal position, and means actuated by said second motivating means subsequent to reduction of said dividend in said register for disengaging said detent means from the involved said tooth to permit said trial quotient set-up means to be returned to normal position under the influence of said spring means.

34. The construction according to claim 32 wherein said motion transmitting member of said trial quotient set-up means is formed with a first and a second set of spaced teeth, said teeth of a set being disposed equiangularly about the axis of said member to correspond respectively to the extents of rotation of said motion transmitting member for quotient values 1 to 9 inclusive, spring means engaging said trial quotient set-up means for influencing the same to return from any operated position to normal position, an escapement means comprising a first rockable detent means cooperatingly engageable with said first set of teeth for holding said trial quotient set-up means in operated position and oscillatable to disengage from said first set of teeth for releasing said trial quotient setup means and to re-engage with said first set of teeth upon the return to normal position of said quotient set-up means, and a normally inoperative second rockable detent means normally disengaged from said second set of teeth and oscillatable concurrently with said first detent means to engage with and then disengage again from said second teeth when said first detent means disengages and then reengages respectively with said first teeth, said second detent means when in engaged position limiting return movement of said trial quotient set-up means to a partial extent to the next lower value position, and said first detent means when in the last mentioned re-engaged position with said teeth limiting return movement of said trial quotient set-up means to said next lower value position, means actuated by said second motivating means for operating said escapement means, and an overdraft sensing means responsive to an overdraft in the involved said highest order of said register for enabling said second detent means.

35. The construction according to claim 32 wherein there are mutually spaced first and second series of teeth carried by said motion transmitting member of said trial quotient set-up means, said teeth of each series being disposed equiangularly about the axis of said member to correspond respectively to the extents of rotation of said motion transmitting member for quotient values 1 to 9 inclusive, a first spring means engaging said trial quotient set-up means for influencing the same to return from any operated position to normal position; an escapement means comprising a first and a second rock member pivoted coaxially and each rockable individually in first direction from rest position, second and third spring means engaging said first and second rock members respectively for influencing the related rock member in a second direction to said rest position, first and second detent means pivoted coaxially with said rock members, said first detent means cooperating with said first series of teeth for holding said quotient set-up means in operated position and engaging said first and second rock members for being rocked by the rock member actuated in said first direction to disengage said first detent means from said first series of teeth, said second detent means engaging said second rock member for being held by said second rock member normally retracted from said second series of teeth, biasing means engaging said first and second detent means for influencing said first detent means to rock in said second direction together with said actuated rock member, and for influencing said second detent means to rock in said first direction together with said second rock member for engaging said second series of teeth when said first detent means is disengaged from said first teeth by said second rock member, said second detent means limiting said return movement of said quotient set-up means to a partial extent to the next lower value position, said second rock member rocking said second detent means in said second direction to disengage from said second series of teeth when said first detent means re-engages with said first series of teeth, said first detent means then limiting return movement of said trial quotient set-up means to said next lower value position, a pivoted actuating lever means, a first hook means pivoted on said first rock member and normally coupled with said actuating lever means for said rocking of said first rock member in said first direction by said actuating lever means, a second hook means pivoted on said second rock member and normally uncoupled from said actuating lever means, said second hook means being engageable with said second rock member for rocking of said second rock member in said first direction; overdraft means responsive to an overdraft in the involved said highest order of said register for disengaging said first hook means and thereupon engaging said second hook means with said actuating lever means, and means actuated by said second motivating means for operating said actuating lever means subsequent to reduction of said dividend in said register.

36. The construction according to claim 32 wherein said first motivating means comprises a first rotatable cam means, said means for moving said quotient sensing means comprising a pivoted cam follower means engaging said first cam means for being rocked thereby, a first lever means pivoted coaxially with and normally engaging said cam follower means, spring means for yieldably holding said first lever means in said engagement with said cam follower means for rotation of said first lever means together with said cam follower means until said first lever means is stopped, said first lever means engaging and rocking said quotient sensing means until said sensing member contacts the involved plate means, whereupon said spring means yields.

37. The construction according to claim 36 wherein said first lever means is normally retracted out of contact with said quotient sensing means, a latch means pivoted on said bail means for coupling said motion transmitting member to said bail means, said first lever means normally engaging said latch means for holding said latch means disengaged from said motion transmitting member, and spring means connected to said latch means and said bail means for rocking said latch means for said encouplement when said first lever means is rocked through said displacement extent to engage and subsequently rock said quotient sensing means and said motion transmitting member as aforesaid whereupon said latch means prevents any rotation of said trial quotient set-up means in advance of said quotient sensing means.

38. The construction according to claim 36 and comprising multiplication initiating means operable for initiating operation of said second motivating means, said initiating means comprising a rockable second lever means for the multiplication initiation; a first operating means for actuating said initiating means upon said sensing of a quotient value 1 to 9 inclusive, said first operating means comprising a third lever means coaxial with and engaging said cam follower means, resilient means for yieldably holding said third lever means in said engagement with said follower means for rotation of said third lever means with said follower means, a bellcrank pivoted on said first lever means, link means connecting said third lever means with a first arm of said bellcrank means, whereby said third lever means swings said bellcrank means when said first lever means is stopped upon sensing of a quotient value by said sensing means as aforesaid, a fourth lever means coaxial with said follower means, a latch means pivoted on said fourth lever means and normally disengaged from said second lever means, a projection on said latch means disposed in the path of movement of a second arm of said bellcrank means, biasing means influencing said latch means to engage with said second lever means and to hold said projection in contact with said second arm, said actuation of said bellcrank means moving said latch means generally rectilinearly, and a quotient value control means operable responsive to said rotation of said motion transmitting member for permitting said latch means to engage with said second lever means for rocking said second lever for said multiplication initiation immediately subsequent sensing of any quotient 1 to 9 inclusive.

39. In a calculating machine; a shiftable carriage; a multiorder register on said carriage and means for initially entering successive digits of a dividend in said register; key means for setting up successive digits of a divisor; dividing means for computing the trial quotient integer of the dividend value in successive orders of said register associated with said dividing means, divided by the highest order of the set-up divisor; trial quotient set-up means comprising a motion transmitting member movable stepwise differentially by said dividing means according to the derived quotient integer 1 to 9 inclusive; multiplying means operable responsive to said trial quotient set-up means and said key means for computing the product of said set-up divisor multiplied by the set-up trial quotient integer and subtractively entering the product in successive highest orders of said register for reducing the dividend therein; overdraft sensing means operatively responsive to an overdraft in the highest order of said register associated with said dividing means; said motion transmitting member comprising mutually spaced first and second series of recesses, said recesses of each of said series being spaced angularly about the axis of said motion transmitting member to correspond to said extents of stepwise movement of said members for values 1 to 9 inclusive; a first spring means engaging said motion transmitting member for returning said quotient set-up means from operated to rest position; and an escapement means cooperating with said first series of recesses for holding said quotient set-up means in any operated position and operable subsequent to said reduction of said dividend for releasing said quotient set-up means for said return movement to rest position, said escapement means being operable responsive to said overdraft sensing means to cooperate alternatingly with said first and second series of recesses respectively for permitting only a single step return movement of said quotient set-up means thereby to reduce the too large trial quotient by 1.

40. In a calculating machine; a shiftable carriage; a multiorder register on said carriage and means for initially entering successive digits of a dividend in said register; key means for setting up successive digits of a divisor; dividing means for computing the trial quotient integer of the dividend value in successive orders of said register associated with said dividing means, divided by the highest order of the set-up divisor; trial quotient set-up means comprising a motion transmitting member movable stepwise differentially by said dividing means according to the computed quotient integer 1 to 9 inclusive; multiplying means operable responsive to said trial quotient set-up means and said key means for obtaining the product of said set-up divisor multiplied by the set-up trial quotient integer and for subtractively entering the product in successive highest orders of said register for reducing the dividend therein; overdraft sensing means operatively responsive to an overdraft in the highest order of said register associated with said dividing means; said motion transmitting member comprising mutually spaced first and second series of projections, said projections of a series being spaced angularly about the axis of said member to correspond to said extents of stepwise movement of said member for values 1 to 9 inclusive; a first spring means engaging said motion transmitting member for returning said quotient set-up means from operated to normal position; an escapement means cooperating with said first series of projections for holding said trial quotient set-up means in operated position and operable subsequent to said reduction of said dividend for releasing said quotient set-up means for said movement to rest position, said escapement means being operable responsive to said overdraft sensing means to cooperate alternatingly with said first and second series of projections respectively for permitting only a one step return movement of said quotient set-up means thereby to reduce the too large trial quotient by 1; a first motivating means for operating said dividing means in successive cycles of operation, and a division initiating means operable for instituting operation of said first motivating means; divide key means for initially actuating said division initiating means; a second motivatng means for operating said multiplying means in successive cycles of operation, and a multiplication initiating means operable for instituting operation of said second motivating means; shift means for ordinally shifting said carriage for bringing into cooperative association successive adjacent orders of said register with said dividing and multiplying means in successive cycles of operation, and shift initating means operable for instituting operation of said shift means.

41. The construction according to claim 40 wherein said escapement means comprises first and second rock members pivoted coaxially and each operable individually from rest position in a first direction, second and third spring means individual to said first and second rock members respectively for influencing the related rock member in a second direction, opposite to said first direction, toward its said rest position, first and second detent means pivoted coaxially with said rock members, said first detent means normally engaging with said first series of projections for said holding of said trial quotient set-up means in operated position, said first detent means normally contacting said first and second rock members for being rocked by the rock member actuated in said first direction to disengage said first detent means from said first projections, said rocking of said first detent means by said first rock member permitting said trial quotient set-up means to be moved to said normal position by said first spring means, said second detent means contacting said second rock member for being hold by said second rock member normally retracted from engagement with said second projections biasing means engaging said first and second detent means for influencing said first detent means to rock in said second direction with the operated rock member to re-engage with said first projections and for influencing said second detent means to rock in said first direction together with said second rock member to engage said second projections when said second rock member disengages said first detent means from said first projections whereupon said second detent means limits the return movement of said trial quotient set-up means to a partial step toward the next lower value position, so that said second rock member then disengages said second detent means from said second projections when said first detent means re-engages said first projections, and so that thereupon said first detent means limits the extent of return movement of said trial quotient set-up means to the remainder of said partial step to said lower value position, a pivoted actuating lever means, a first hook means pivoted on said first rock member and normally hooked with said actuating lever means for said rocking of said first rock member in said first direction by said actuating lever means, a second hook means pivoted on said second rock member and normally unhooked from said actuating lever means, means actuated by said overdraft sensing means for disengaging said first hook means and for thereupon engaging said second hook means with said actuating lever means, and means actuated by said second motivating means subsequent to said reduction of said dividend in said register for rocking said actuating lever means.

42. The construction according to claim 41 wherein a first lug is carried on the distal end of said first hook means and a second lug is carried on the distal end of said second hook means, said second lug contacting said first lug so that movement of said first hook means to disengage from said actuating lever means swings said second hook means to thereupon engage with said actuating lever means, and a fourth spring means connected to said second hook means and said second rock member for yieldably holding said second hook means disengaged from said actuating lever means and said first hook means engaged with said actuating lever means.

43. The construction according to claim 42 wherein said register comprises a plurality of rotatable gear means one in each order and lug means carried by each said gear means for movement therewith, said multiplying means comprising ordinal register operating means engageable with said gear means of the related orders of said register for rotating said gear means for said subtractive entry of the product upon actuation of said register operating means, a carrier means for supporting said register operating means and for moving said register operating means into said engagement with said gear means, a stud on said carrier means, said overdraft sensing means comprising a first lever pivoted on said carrier means and formed with first and second lever arms, said first lever arm normally contacting said carrier means for movement of said first lever together with said carrier means, whereupon said second lever arm is carried into contact with the operated said divide key means for rocking of said lever relative to said carrier means by said divide key upon said movement of said carrier means, a bellcrank pivoted on said carrier means and formed with first and second bellcrank arms, said first bellcrank arm normally contacting said stud for movement of said bellcrank together with said carrier means whereby said first bellcrank arm is moved into contact relation with said first lug of said first hook means, a latch means pivoted on said second bellcrank arm and contacting said first lever arm for being swung by said first lever into the path of movement of said lug means on the highest order engaged gear means, a fifth spring means connected to said first lever and said latch means for yieldably holding said first lever in said contact with said carrier means, for holding said bellcrank in said contact with said stud and for holding said latch means in contact with said first lever, said lug means engaging and moving said latch means rectilinearly for rocking said bellcrank to effect said disengagement of said first hook means from said actuating lever means and thereupon to effect said engagement of said second hook means with said actuating lever means when said gear means is rotated through an overdraft.

44. The construction according to claim 41 wherein said multiplication initiating means comprises a first lever means rockable for actuation of said multiplication initiating means, a first latch normally retracted from engagement with said first lever means and reciprocatable by said first motivating means subsequent to positioning of said motion transmitting member by said dividing means, a quotient value control means responsive to movement of said motion transmitting member for engaging said first latch with said first lever means when said motion transmitting member stands at any one of its said positions for values 1 to 9 inclusive, said shift initiating means comprising a second lever means rockable for actuation of said shift initiating means, means operated by said first rock member for rocking said second lever means for actuating said shift initiating means subsequent to reduction of said dividend, said shift means comprising a first lever member oscillated by said shift means upon each ordinal shift of said carriage, said division initiating means comprising a rockable second latch means reciprocatable for actuation of said division initiating means and normally retracted from engagement with said first lever member, and means actuatable by said divide key means for rocking said second latch means into engagement with said first lever means.

45. The construction according to claim 44 and comprising a second lever member oscillatable by said first motivating means subsequent to positioning of said trial quotient set-up means according to the derived quotient, a third latch means pivotally carried on said second lever means and normally coupled with said second lever member for rocking of said second lever means by said second lever member for actuation of said shift initiating means, said quotient value control means engaging said third latch means for disengaging said third latch means from said second lever member when said trial quotient set-up means is moved for any of the quotient values 1 to 9 inclusive, said multiplying means comprising ordinal register operating means engageable with related orders of said register for coacting with the engaged register orders for said subtractive entry of the product upon movement of said register operating means in a first direction and for restoring the product amount in said register additively upon movement of said register operating means in a second direction opposite to said first direction; said means operated by said first rock member comprising a rockable detent member resiliently biased for engaging with and holding said register operating means in register engaging position, first linkage means coupled to said first rock member and said detent member for disengaging said detent member from said register operating means in response to actuation of said first rock member whereupon said register operating means disengages from said register prior to movement of said register operating means in said opposite direction, and second linkage means coupled to said second lever means and engageable by said detent member for rocking said second lever means by said detent member for shift initiation subsequent to said disengagement of said register operating means; a fourth latch means pivoted on said second rock member for being reciprocated by said second rock member and normally being retracted from engagement with said first lever means, said quotient value control means contacting said fourth latch means for engaging said fourth latch means with said first lever means when said motion transmitting member stands at any one of its positions for values 2 to 9, a rockable fifth latch means coacting with said detent member for disengaging said detent member from said register operating means upon reciprocation of said fifth latch means, a third lever member oscillatable by said second motivating means subsequent to movement of said register operating means in said opposite direction, said fifth latch means normally being retracted from engagement with said third lever member and contacting said quotient value control means for being rocked by said quotient value control means into engagement with said third lever member when said motion transmitting means stands at 1 value position, spring biased detent means for holding said fifth latch means in engagement with said third lever member, and means actuated by said first rock member for disengaging said detent means from said fifth latch means.

46. In a calculating machine comprising a first plurality of multiplier cycling number keys, each of which represents a different multiplier digit 1 to 4 inclusive, and a second plurality of multiplier cycling number keys, each of which represents a different multiplier digit 5 to 9 inclusive; partial product element set-up means movable for setting up products relative to the numerical value of any operated said number key, said set-up means being movable from a neutral position a predetermined different extent in one direction for and responsive to actuation of each of said first plurality of number keys and in the opposite direction for and responsive to actuation of each of said second plurality of number keys, each predetermined said extent in said one direction corresponding with a different one of said extents in said opposite direction; pivoted set-up stop means rotatable angularly on its axis at one of its ends in response to operation of said keys and comprising oppositely oriented interspaced first and second series of angularly spaced stop portions, each stop portion of said first series of stop portions being related to a different one of said first plurality of number keys and being spaced differentially radially in a direction away from said axis of said stop means, each stop portion of said second series of stop portions being related to a different one of said second plurality of number keys and spaced differentially radially in a direction toward said axis; stop portion engaging means carried by said product set-up means for movement therewith in said interspace of said stop means and normally being intermediate said opposite series of stop portions for engagement with a stop portion of said first series upon movement of said set-up means one of said predetermined extents in said one direction thereagainst, and for engagement with a stop portion of said second series upon movement of said set-up means one of said predetermined extents in said opposite direction thereagainst; pivoted first stepped stop means comprising a plurality of first stop faces disposed angularly and radially differentially relative to the pivot of said stepped stop means, each first stop face representing a different one of said number key values 5 to 9 inclusive and each of certain of said first stop faces representing a different one of said number key values 1 to 4, said stepped stop means being angularly positionable responsive to number key operation for placing the stop face representing the operated said number key in the path of said angular movement of said set-up stop means for arresting said set-up stop means at that angular position in which its said stop portion representing and relating to the operated said number key stands in the path of movement of said stop portion engaging means; a reversably operable actuating device operable responsive to said keys for normally moving said set-up means in said one direction and being selectively reversable for moving said set-up means in said opposite direction; an actuating device reversing means operable for effecting reverse operation of said actuating device; means operative responsive to actuation of any said number keys for values 5 to 9 inclusive for actuating said reversing means; a normally inoperable second stepped stop means pivoted coaxially with said first stepped stop means for angular movement normally oppositely of the direction of said angular movement of said first stepped stop means; said second stepped stop means comprising differentially located second stop faces oriented angularly and radially relative to said pivot of said stepped stop means and each corresponding with a different first stop face of said first stepped stop means for being representable of digit values five to nine inclusive, for accordingly limiting said angular movement of said set-up stop means; dividing means for computing trial quotient integers, trial quotient set-up means movable stepwise by said dividing means in accordance with a derived quotient value 1 to 9 inclusive, said trial quotient set-up means comprising yieldable linkage means for angularly moving said first stepped stop means in accordance with a quotient integer one to four inclusive, for utilizing certain of said first stop faces thereon for being representable of said certain values only, and for actuating said reversing means whenever the quotient integer is greater than four, and means for angularly oppositely moving said second stepped stop means in accordance with a quotient integer five to nine inclusive, for utilization of said second stop faces thereon for said digit values.

47. The construction according to claim 46 wherein said partial product element set-up means comprises a member movable therewith said predetermined extents in said one direction and said opposite direction, a blocking lug means carried by said member for movement therewith said predetermined extents, a pivoted stop element rotatable to stopping contact with said blocking lug means, said stop element comprising stop surfaces disposed differentially angularly and radially relative to its axis so that at each position of said blocking lug means a different one of said stop surfaces will contact said blocking lug means upon a predetermined angular movement individual to the multiplier value entered into the computation, a rotatable numeral dial, and dial rotating means actuatable for rotating said dial to suitably exhibit a number, linkage means connecting said stop element and said dial rotating means so that upon rotation of said stop element consequent upon operation of a said number key or computation of a quotient digit by said dividing means, said dial is rotated to exhibit a number corresponding to the value of the involved multiplier.

48. In a calculating machine; a shiftable carriage; a multiorder register comprising a rotatable first gear means in each order on said carriage and means for initially entering successive digits of a dividend in said register; number key means for setting up successive digits of a divisor; dividing means for computing the trial quotient integer of the dividend value in successive orders of said register associated with said dividend means, divided by the highest order of the set-up divisor; trial quotient set-up means comprising a motion transmitting member movable stepwise by said dividing means different extents according to the computed quotient integer 1 to 9 inclusive; multiplying means operable responsive to said trial quotient set-up means and said key means for computing the product of said set-up divisor multiplied by the set up trial quotient integer and for entering the digits of the computed product subtractively in successive orders of said register for reducing the dividend therein; a first motivating means for operating said dividing means in successive cycles of operation, and a division initiating means operable for instituting operation of said first motivating means; divide key means for initially actuating said division initiating means; a second motivating means for operating said multiplying means in successive cycles of operation, and a multiplication initiating means operable for instituting operation of said second motivating means; shifting means for shifting said carriage ordinally for bringing successive adjacent orders of said register into cooperative association with said dividing and multiplying means in successive cycles of operation, and shift initiating means operable for instituting operation of said shifting means; said multiplying means comprising ordinal register operating means comprising a rotatable second gear means in each order engageable with the associated said first gear means, a rockable and reciprocatable rack means for each second gear means, each rack means comprising a first rack normally engaged with said second gear means and a second rack engageable with said second gear means and normally out of engagement therewith, said first racks rotating said second gear means so as to normally enter a computed product additively in the engaged register order upon endwise movement of said rack means, and said second racks, when engaged with said second gear means, rotating said second gear means so as to effect said subtractive entry of a computed product in the engaged register order upon endwise movement of said rack means, rockable means common to and engaging all said rack means for rocking said rack means to disengage said first racks and to engage said second racks with said second gear means upon rocking of said rockable means, a lever means oscillated by said second motivating means, said rockable means comprising a pivoted latch means normally uncoupled from said lever means and reciprocatable for rocking said rockable means, and means operatively responsive to said divide key means for rocking said latch means to engage with said lever means.

49. In a calculating machine comprising a plurality of banks of factor keys for setting up a multi-digit factor, an ordinally shiftable carriage, shift means for shifting said carriage in successive cycles of operation, shift initiating means operable for instituting operation of said shift means, a multiorder register carried on said carriage, partial product multiplying means for computing the product of a multiorder multiplicand set up on said factor keys multiplied by each digit of a multiorder multiplier and entering the product in said register additively or subtractively in successive cycles of operation, said multiplying means comprising ordinal register operating means having first and second positions of adjustment for at said first position to normally operate associated register orders additively and at said second position to operate associated register orders subtractively for said product entry, means operated by said multiplying means subsequent to entry of a product for normally actuating said shift initiating means, multiplication initiating means operable for instituting a cycle of operations of said multiplying means, key means for actuating said multiplication initiating means for operation of said multiplying means to enter into said register a multi-digit dividend set-up on said factor keys, dividing means operable cyclically for computing the quotient digit of predetermined orders of the dividend in said register divided by the highest order digit of the divisor set-up on said factor keys, division initiating means operable for instituting a cycle of operation of said dividing means, means operable by said dividing means for operating said multiplication initiating means for operation of said multiplying means to compute the product of the set-up said divisor multiplied by the computed quotient digit; divide key means comprising a movable divide key having a shank, a pivoted first lever means engaging said shank for being rotated by movement of said divide key, a spring biased pivoted member, a rockable first detent means releasably engaging said pivoted member for holding said member at rest position against said spring bias, a latch means pivoted on said first lever means for engaging and rocking said first detent means to disengage said detent means from said pivoted member, a second lever means coaxial with said pivoted member and rockable by said member to an operated position, a second detent means coaxial with said first detent means and engageable with said second lever means when said second lever means is moved to operated position for holding said second lever means at said operated position, means comprising a lever member oscillatable by said shift means subsequent to each ordinal shift of said carriage, said division initiating means comprising hook means reciprocatable for operation of said initiating means and rockable into engagement with said lever member for being reciprocated by said lever member, and means connected for actuation by said second lever means for initially operating said division initiating means, for engaging said hook means with said oscillated means, and for effecting said adjustment of said ordinal register operating means from said first position to said second position.

50. The construction according to claim 49 wherein said latch means when in operated position stands in the path of movement of said pivoted member for being rocked by said member to disengage from said first detent means for permitting said first detent means to reengage with said member when said member is returned to rest position, and means operated by said dividing means for returning said pivoted member to its said rest position in the initial cycle of operations of said dividing means.

51. The construction according to claim 50 wherein said first lever means comprises an arm engageable by said second lever means for being held in operated position by said second lever means so that said divide key which is coupled to said first lever means is also held in operated position, and means rendered operative responsive to reduction of the dividend in said register to zero for disengaging said second detent means from said second lever means, whereby all machine operations are terminated.

52. The construction according to claim 50 wherein said first lever means comprises an arm engageable by said second lever means for being held in operated position by said second lever means so that said divide key which is coupled to said first lever means is also held in operated position, and means rendered operative responsive to ordinal movement of said carriage into its end-most ordinal position for disengaging said second detent means from said second lever means upon reduction of the divided in the said subsequent successive cycle of operations, whereby all machine operations are terminated.

53. In a calculating machine comprising a plurality of banks of factor keys for setting up a multi-digit factor, an ordinally shiftable carriage, a multiorder register carried on said carriage, partial product multiplying means for computing the product of a multiorder multiplicand set up by said factor keys multiplied by each of the digits of a multiorder multiplier in successive cycles of operation, said multiplying means comprising ordinal register operating means having first and second adjustment positions and being engageable with associated orders of said register for at said first adjustment position to normally operate said register orders to enter the computed product additively in successive cycles of operation and at said second adjustment position to operate said register orders to enter the computed product subtractively instead, in successive cycles of operation, rockable support means for said register operating means operable for engaging said register operating means with the associated orders of said register upon rocking of said support means, spring biased first detent means for engaging and holding said rockable support means in operated position, means operable subsequent to entry of a product for disengaging said first detent means from said support means and thereby to disengage said register operating means from said register, carriage shift means for shifting said carriage ordinally for positionally associating successive orders of said register with said register actuating means in successive cycles of operations, shift initiating means operable for instituting operation of said carriage shift means, and comprising a first lever means rockable for actuation of said shift initiating means, linkage means connected between said first detent means and said shift initiating means, said linkage means comprising a second lever means coaxial with said first lever means, a multi-arm member formed of at least three integral arms and pivoted on said second lever with a first of its said arms normally engaging said first lever means for rocking of said first lever means by said second lever means upon rocking of said second lever means, a third lever means coaxial with and rockable by said detent means, a first latch means pivoted on said third lever means and normally coupled with said second lever means for rocking of said second lever means by said third lever means, optionally operable key means for preventing ordinal shift of said carriage and comprising a depressible key, link means movable endwise by said key, a fourth rockable lever means engaging said first latch means and having lost motion coupling with said link means for actuation of said fourth lever means by said link means to disengage said latch means from said second lever means so that rocking of said third lever means is rendered then ineffective for actuating said shift initiating means, multiplication initiating means operable for instituting a cycle of operations of said multiplying means, key means for actuating said multiplication initiating means for operation of said multiplying means to enter into said register a multidigit dividend as set-up by said factor keys, dividing means operable cyclically for computing the quotient digit of predetermined orders of the dividend in said register dividend by the highest order digit of the divisor set-up by said factor keys, division initiating means operable for instituting a cycle of operation of said dividing means, means operable by said dividing means for operating said multiplication initiating means for operation of said multiplying means to compute the product of the set-up said divisor multiplied by the computed quotient digit; divide key means comprising a movable divide key having a shank, a pivoted fifth lever means engaged by said shank for being rotated by movement of said divide key, a spring biased pivoted member, a rockable second detent means releasably engaging said pivoted member for holding said member at rest position against said spring bias, a second latch means pivoted on said fifth lever means for engaging and rocking said second detent means to disengage said second detent means from said pivoted member, said second latch means when in operated position standing in the path of movement of said pivoted member for being rocked by said member to disengage from said second detent means for freeing said second detent means to reengage with said pivoted member when said member is returned to rest position, means operated by said dividing means for returning said pivoted member to its said rest position during the initial cycle of operations of said dividing means, a sixth lever means coaxial with said pivoted member and rockable by said member to operated position, said fifth lever means comprising an arm engageable by said sixth lever means for being held in operated position by said sixth lever means whereby said divide key to which said fifth lever means is coupled is also held in operated position, a third detent means coaxial with said second detent means and engageable with said sixth lever means when said sixth lever means is moved to operated position for holding said sixth lever means at operated position, a lever member oscillatable by said shift means subsequent to each ordinal shift of said carriage, said division initiating means comprising hook means reciprocatable for operation of said division initiating means and rockable into engagement with said lever member for being reciprocated by said lever member, and means connected for actuation by said sixth lever means for initially operating said division initiating means, for engaging said hook means with said oscillated lever member, for effecting said adjustment of said ordinal register operating means from said first position to said second position, and for rocking said fourth lever means relative to said link means to rest position when said fourth lever means is standing at operated position whereby said first latch means reengages with said second lever means, a seventh lever means coaxial with said second lever means and connected to said third detent means for rocking said third detent means to disengage from said sixth lever means, said multi-arm member pivoted on said second lever means having its second integral arm normally disengaged from said seventh lever means, terminating means comprising a third latch means movable endwisely responsive selectively to reduction of the dividend in said register to zero and to shifting of said carriage into the end ordinal position, whichever occurs first, said latch means being rockable by said means, connected for actuation by said sixth lever means, to engage with a third of said arms of said multi-arm member so that reciprocation of said third latch means rocks said multi-arm member to engage its second arm with said seventh lever means and disengage its first arm from said first lever means of said shift initiating means, whereby subsequent actuation of said second lever means rocks said seventh lever means to effect said disengagement of said third detent means from said sixth lever means thereby terminating machine operation by permitting said sixth lever means to return to rest position.

54. The combination according to claim 53 wherein said terminating means comprises a rockable second lever member pivotally engaging said third latch means for said endwise movement of said third latch means upon rocking of said second lever member, and a first bellcrank means coaxial with said second lever member for rocking said second lever member; eliminated dividend sensing means comprising a plurality of sensing levers, each sensing lever being associated with a different register order, each sensing lever being rotatable from rest position to a first operated position subsequent to each reduction of the dividend in said register, a rotatable gear means in each register order, a lug carried by said gear means into the path of movement of the associated sensing lever for stopping said sensing lever at a second position between said rest position and first position, when the dividend in the respective register order is reduced to zero, a transverse rockable bail means comprising integral ordinal sensing fingers, each finger being associated with a different one of said sensing levers; means for rocking said bail means subsequent to said rotation of said sensing levers and prior to actuation of said first detent means, a stop face on each said sensing lever standing out of the path of movement of the associated sensing finger when said sensing lever is standing at said second position, and said stop face standing in the path of movement of the associated sensing finger when said sensing lever is standing at said first position, whereby, when in any associated register order the dividend is not reduced to zero, rocking of said bail means is blocked, and when the dividend in all associated register orders is reduced to zero, said bail means is unblocked and free to move, a link connecting said bail means with said first bellcrank for rocking said first bellcrank, a spring tensioned fourth detent means for holding said first bellcrank in operated position for effecting termination of all operations as aforesaid, and means for disengaging said fourth detent means from said first bellcrank subsequent to actuation of said first detent means.

55. The combination of claim 54 and comprising a slidably mounted transverse rod means, means carried by said rod means for cooperating with said carriage to shift said rod means transversely with said carriage when said carriage is shifted into said end ordinal position, and a second pivoted bellcrank comprising first and second bellcrank arms, said first bellcrank arm engaging said rod means for being rotated from a rest position to an operated position by said rod means when said rod means is shifted transversely, and said second bellcrank arm engaging said first bellcrank for rotating said first bellcrank to its said operated position whereby subsequent reduction of the dividend in the said subsequent successive cycle of operations, actuation of said first detent means effects termination of all operations as aforesaid.

56. The combination according to claim 55 and comprising a plurality of ordinal members pivoted on said rod means relative to the successive ordinal positions of said carriage for being rotatable individually into cooperative relation with said carriage for shifting of said rod means by said carriage when said carriage is shifted into the related ordinal position, a plurality of selectively settable ordinal key means, each ordinal key means being representative of a different one of said ordinal positions of said carriage and cooperatively related to the respective ordinal member, and means operable during each ordinal shift of said carriage responsive to any preset ordinal key means for rotating the related ordinal means into cooperative relation with said carriage, whereby said subsequent actuation of said first detent means terminates all operations as aforesaid thereby obtaining a predetermined limited number of orders of quotient digits in accordance with the preset ordinal key.

57. In a calculating device, a quotient register operable for indicating quotients, a dividend representing means operable for representing dividend numbers and thereafter operable for representing remainders of the dividend numbers, a divisor representing means for receiving and representing divisor numbers, a predetermined quotient means comprising predetermined quotient representations of said dividend numbers divided by said divisor numbers, divisor connection means for selecting said quotient representations in said quotient means corresponding to the divisor in accordance with and under control of said divisor representing means, dividend connection means operable under control of said dividend representing means for accordingly selecting in said quotient means the quotient representation corresponding to the quotient of the number in said dividend representing means from among the divisor selected quotient representations, negative multiplication means operable in accordance with and under control of said quotient means according to the dividend selected quotient representation and also in accordance with and under control of said divisor representing means according to the represented divisor for operating said quotient register to indicate the quotient and for operating said dividend representing means to represent said remainder, combined operation and program control means operable for operating said dividend connection means for selecting the quotient and for operating said multiplication means to indicate the quotient in said register and to operate said dividend representing means to represent the remainder, and initiating means for initiating operation of said operation and program control means.

58. In a calculating device, a quotient register operable for indicating quotients, a dividend representing means operable for representing dividend numbers and thereafter operable for representing remainders of the dividend numbers, a divisor representing means for receiving and representing divisor numbers, a predetermined quotient means comprising predetermined quotient representations of said dividend numbers divided by said divisor numbers, divisor connection means for selecting said quotient representations in said quotient means that correspond to the divisor in accordance with and under control of said divisor representing means, dividend connection means operable under control of said dividend representing means for accordingly selecting in said quotient means the quotient of the number in said dividend representing means from among the divisor selected quotient representations, negative multiplication means operable in accordance with and under control of said quotient means according to the selected quotient and also in accordance with and under control of said divisor representing means according to the represented divisor for operating said quotient register to indicate the quotient and for operating said dividend representing means to represent said remainder, and combined operation and program control means for operating said dividend connection means and for operating said multiplication means as aforesaid.

59. In a calculating device, a dividend representing means operable for representing dividend numbers and thereafter operable for representing remainders of the dividend numbers, a divisor representing means for receiving and representing divisor numbers, a predetermined quotient means comprising a plurality of predetermined quotient representations certain ones of which correspond respectively to the quotients of each of said divisor numbers and certain ones of which correspond respectively to the quotients of each of said dividend numbers, divisor connection means for selecting said quotient representations in said quotient means corresponding to the divisor in accordance with and under control of said divisor representing means, dividend connection means under control of said dividend representing means for accordingly selecting in said quotient means the quotient representation corresponding to the quotient of the number in said dividend representing means from among the divisor selected quotient representations, negative multiplication means operable in accordance with and under control of said quotient representation means according to the selected quotient and also in accordance with an under control of said divisor representing means according to the represented divisor for operating said dividend representing means to represent said remainder, combined operation and program control means operable for selecting said quotient and operating said multiplication means as aforesaid, and initiating means for initiating operation of said operation and program control means.

60. In a calculating device, a dividend representing means operable for representing dividend numbers and thereafter operable for representing remainders of the dividend numbers, a divisor representing means for receiving and representing divisor numbers, a predetermined quotient means comprising predetermined quotient representations of said dividend numbers divided by said divisor numbers, divisor connection means for selecting said quotient representations in said quotient means corresponding to the divisor in accordance with and under control of said divisor representing means, dividend connection means operable under control of said dividend representing means for accordingly selecting in said quotient means the quotient representation corresponding to the quotient of the number in said dividend representing means from among the divisor selected quotient representations, negative multiplication means operable in accordance with and under control of said quotient means according to the selected quotient representation and also in accordance with and under control of said divisor representing means according to the represented divisor for operating said dividend representing means to represent said remainder, and combined operation and program control means for operating said dividend connection means and said multiplication means as aforesaid.

61. In a calculating device, a dividend representing means operable for representing dividend numbers and thereafter operable for representing remainders of the dividend numbers, a divisor representing means for receiving and representing divisor numbers, a predetermined quotient means comprising predetermined quotient representations of said dividend numbers divided by said divisor numbers, divisor connection means for selecting said quotient representations in said quotient means corresponding to the divisor in accordance with and under control of said divisor representing means, dividend connection means operable under control of said dividend representing means for accordingly selecting in said quotient means the quotient representation corresponding to the quotient of the number in said dividend representing means from among the divisor selected quotient representations, and negative multiplication means operable in accordance with and under control of said quotient means according to the selected quotient representation and also in accordance with and under control of said divisor representing means according to the represented divisor for operating said dividend representing means to represent said remainder.

62. In a calculating device, a dividend representing means operable for representing dividend numbers and thereafter operable for representing remainders of the dividend numbers, a divisor representing means for receiving and representing divisor numbers, a predetermined quotient means comprising a plurality of predetermined quotient representations certain ones of which correspond respectively to the quotients of each of said divisor numbers and certain ones of which correspond respectively to the quotients of each of said dividend numbers, divisor connection means for selecting said quotient representations in said quotient means corresponding to the divisor in accordance with and under control of said divisor representing means, and dividend connection means operable under control of said dividend representing means for accordingly selecting in said quotient means the quotient representation corresponding to the quotient of the number in said dividend representing means from among the divisor selected quotient representations.

63. In a calculating machine having a register, means for initially entering a dividend in said register, a divisor set-up mechanism, a quotient member having a plurality of consecutive positions representing integer values varying by increments of one, quotient computing means controlled jointly by said register and said divisor set-up mechanism for selecting the pre-estimated value of the quotient of the dividend entered in said register divided by the divisor set up in said divisor set-up mechanism and moving said quotient member to the one of said positions corresponding to the selected pre-estimated value, computing means jointly responsive to said quotient member and said divisor set-up mechanism for multiplying said divisor by said pre-estimated quotient and negatively entering the product thereof in said register; control means for variously restoring said quotient member, including means normally operative for completely restoring said quotient member when the pre-estimated integer is the true quotient integer and means, normally inoperative, for partially restoring said quotient member by one increment to the next lower value position when the pre-estimated integer is greater than the true quotient integer; mechanism operated by said multiplying computing means following the negative entry for operating said complete restoring means or said partial restoring means, which ever is in operative relation therewith; overdraft means operated by said register in response to a negative entry greater than the dividend therein for rendering said complete restoring means inoperatve and said partial restoring means operative to effect the movement of said quotient member one increment to the next lower position representing a quotient value of one less than the pre-estimated integer; means operated by said partial restoring means for causing said multiplying computing means to withdraw the product entry and thereby restore the dividend, and then to multiply, under the joint control of said divisor set-up mechanism and said repositioned quotient member, the set-up divisor by the reduced quotient integer and to negatively enter the product thereof in said register.

64. In a calculating machine having a shiftable multi-order register and means for initially entering successive digits of a dividend therein; a divisor set-up mechanism, sensing means for sensing the digits entered in a plurality of adjacent orders of said register in sensing relation therewith; a quotient member having a plurality of positions representing digits 1 to 9, quotient computing means having pre-estimated quotients and means controlled jointly by said sensing means and said divisor set-up mechanism for selecting the quotient which corresponds approximately to the quotient of the dividend digits sensed, divided by the divisor set up in said divisor set-up mechanism and for moving said quotient member to the one of said positions which corresponds to the selected quotient value; operating mechanism for operating said sensing means and said quotient computing means; computing means jointly responsive to said quotient member and said divisor set-up mechanism for multiplying said divisor by said pre-estimated quotient digit and negatively entering the product thereof in said register; shifting means for shifting said register to successively associate a predetermined lower group of orders thereof with said sensing means; control means for variously restoring said quotient member, including means normally operative for completely restoring said quotient member when the pre-estimated digit is the true quotient and means, normally inoperative, for partially restoring said quotient member by one increment when the pre-estimated digit is greater than the true quotient digit; mechanism operated by said multiplying computing means following the negative entry for operating said complete restoring means or said partial restoring means, which ever is in operative relation therewith; overdraft means operated by said register in response to a negative entry greater than the dividend therein for rendering said complete restoring means inoperative and said partial restoring means operative to effect the movement of said quotient member one increment to the next lower position representing a value of one less than the pre-estimated quotient digit; means operated by said partial restoring means for causing said multiplying computing means to withdraw the product entry and thereby restore the dividend, and then to multiply, under the joint control of said divisor set-up mechanism and said repositioned quotient member, the set-up divisor by the reduced quotient digit and to negatively enter the product thereof in said register; shift initiating means operated by said complete restoring means for effecting operation of said shifting means so as to associate the successively lower group of orders of said register with said sensing means; and division initiating means operable by said shifting means in response to a shift operation for successively initiating the operation of said operating mechanism.

65. In a calculating machine as set forth in claim 64, with shift initiating means controlled by said quotient member and operative in response to the setting thereof for a pre-estimated value of zero for sequentially effecting operation of said shifting means.

66. In a calculating machine having a shiftable multi-order register and means for initially entering successive digits of a dividend therein; a divisor set-up mechanism; sensing means for sensing the digits entered in a plurality of adjacent orders of said register in sensing relation therewith; a quotient member having a plurality of positions representing digits 1 to 9, quotient computing means having pre-estimated quotients and means controlled jointly by said sensing means and said divisor set-up mechanism for selecting the quotient which corresponds approximately to the quotient of the dividend digits sensed, divided by the divisor set up in said divisor set-up mechanism and for moving said quotient member to the one of said positions which corresponds to the selected quotient value; operating mechanism for operating said sensing means and said quotient computing means; computing means jointly responsive to said quotient member and said divisor set-up mechanism for multiplying said divisor by said pre-estimated quotient digit and negatively entering the product thereof in said register; multiplying initiating means operable by said quotient computing mechanism following the selection of said pre-estimated quotient for sequentially effecting operation of said multiplying computing mechanism; shifting means for shifting said register to successively associate a predetermined lower group of orders thereof with said sensing means; control means for variously restoring said quotient member, including means normally operative for completely restoring said quotient member when the pre-estimated digit is the true quotient and means, normally inoperative, for partially restoring said quotient member by one increment when the pre-estimated digit is greater than the true quotient digit; shift initiating means operable by said complete restoring means for effecting operation of said shifting means so as to associate the successively lower group of orders of said register with said sensing means; division initiating means operable by said shifting means in response to a shift operation for successively initiating the operation of said operating mechanism; mechanism operated by said multiplying computing means following the negative entry for operating said complete restoring means or said partial restoring means, which ever is in operative relation therewith; overdraft means operative in response to a negative entry greater than the dividend therein for rendering said complete restoring means inoperative and said partial restoring means operative to effect the movement of said quotient member one increment to the next lower position representing a value of one less than the pre-estimated quotient digit; means operated by said partial restoring means for causing said multiplying computing means to withdraw the product entry and thereby restore the dividend, and a device actuatable by said partial restoring means for operating said multiplying initiating means to effect operation of said multiplying computing means, when the reduced quotient is greater than zero, to multiply, under the joint control of said divisor set-up mechanism and said repositioned quotient member, the set-up divisor by the reduced quotient digit and to negatively enter the product thereof in said register; means actuatable by said multiplying computing means following the restoration of the dividend for operating said shift initiating means to effect the operation of said shifting means when the quotient is reduced to zero; and control mechanism controlled by said quotient member and responsive to the setting thereof for a value greater than zero for rendering said device effective for operating said multiplying initiating means and said last mentioned means ineffective for operating said shift initiating means, and which control mechanism is responsive to the setting of said quotient member for zero for rendering said device ineffective for operating said multiplying initiating means and said last mentioned means effective for operating said shift initiating means, whereby when the reduced quotient is greater than zero said multiplying computing means is caused to re-operate but when the reduced quotient is zero said shifting means is caused to associate the next lower group of orders of said register with said sensing means.

67. In a calculating machine having a multiorder dividend register and a multiorder quotient register, means for initially entering successive digits of a dividend in said dividend register with the highest order of the dividend in a predetermined high order of said dividend register; a divisor set-up mechanism; quotient computing means controlled jointly by a plurality of orders of said dividend register and by said divisor set-up mechanism for estimating the quotient digit of the value in said orders divided by the divisor set up in said divisor set-up mechanism; multiplying computing means for multiplying the divisor in said divisor set-up mechanism by said estimated quotient digit and negatively entering the product thereof in said dividend register and entering said quotient digit in said quotent register; a shiftable coordinating means shiftable for coordinating orders of said dividend register with said quotient computing means and for coordinating said quotient register with said multiplying computing means; a shifting means operable initially for shifting said coordinating means so as to associate the highest predetermined group of orders, including the aforesaid high order, of said dividend register with said quotient computing means and to associate the highest order of said quotient register with said multiplying computing means, and said shifting means operable for shifting said coordinating means ordinally to associate successively lower groups of dividend register orders with said quotient computing means and to associate successively lower orders of said quotient register with said multiplying computing means; means operative in response to the estimation of a quotient digit by said quotient computing means for effecting the operation of said multiplying computing means to multiply the divisor by the estimated quotient digit; shift initiating means operated by said multiplying computing means following said product and quotient digit entries in the respective registers for initiating the operation of said shifting means to effect said ordinal shifting of said coordinating means; division initiating means operable by said shifting means in response to a shift operation for initiating the operation of said quotient computing means; and zero responsive means controlled by said multiplying computing means and operative in response to the reduction of all of the dividend digits to zero in said dividend register orders after a negative entry therein and prior to the operation of said shift initiating means for rendering said shift initiating means inoperative for the actuation thereof by said multiplying computing means, whereby all operations of shifting, quotient digit computing and multiplying are thereupon terminated.

68. In a calculating machine having a multiorder dividend register and a multiorder quotent register, means for initially entering successive digits of a dividend in said dividend register with the highest order of the dividend in a predetermined high order of said dividend register; a divisor set-up mechanism; quotient computing means controlled jointly by a plurality of orders of said dividend register and by said divisor set-up mechanism for estimating the quotient digit of the value in said orders divided by the divisor set up in said divisor set-up mechanism; multiplying computing means for multiplying the divisor in said divisor set-up mechanism by said estimated quotent digit and negatively entering the product thereof in said dividend register and entering said quotient digit in said quotient register; a shiftable coordinating means shiftable for coordinating orders of said dividend register with said quotient computing means and for coordinating said quotient register with said multiplying computing means; a shifting means operable initially for shifting said coordinating means so as to associate the highest predetermined group of orders, including the aforesaid high order, of said dividend register with said quotient computing means and to associate the highest order of said quotient register with said multiplying computing means, and said shifting means operable for shifting said coordinating means ordinally to associate successively lower groups of dividend register orders with said quotient computing means and to associate successively lower orders of said quotient register with said multiplying computing means; initiating means one for each said quotient computing means, said multiplying computing means and for said shifting means for initiating the respective operation of each; a first actuating means controlled by said quotient computing means and responsive to a quotient estimation thereby for actuating the multiplying initiating means, a second actuating means operated by said multiplying computing means following said entry operations and normally engaged with for actuating said shifting initiating means and a third actuating means operated by said shifting means in response to a shift operation for actuating said quotient initiating means to effect the operation of said quotient computing means; disengaging means operable for disengaging said second actuating means from said shift initiating means to prevent the actuation of said shift initiating means, thereby effecting the termination of all operations by breaking the continuity of the aforesaid initiated operations; and a tabulating mechanism for operating said disengaging means to prevent actuation of said shift initiating means after the entry of a predetermined number of quotient digits in said quotient register, including selectively adjustable means having a plurality of positions corresponding to orders of said quotient register and to the ordinal positions of said coordinating means when coordinating those orders, said adjustable means selectively adjustable in any one of said positions into cooperative relation with for actuation by said coordinating means, when said coordinating means is shifted into the preselected one of said positions, to operate said disengaging means so as to prevent the operation of said shift initiating means after the entry of the quotient digit in the currently coordinated quotient register order, whereby when the final quotient digit of the selectively predetermined number of quotient digits is entered in said quotient register, the broken continuity of operation between said multiplying computing means and said shifting means effects the termination of all operations.

69. In a calculating machine having a multiorder dividend register and a multiorder quotient register, means for initially entering successive digits of a dividend in said dividend register with the highest order of the dividend in a predetermined high order of said dividend register; a divisor set-up mechanism; quotient computing means controlled jointly by a plurality of orders of said dividend register and by said divisor set-up mechanism for estimating the quotient digit of the value in said orders divided by the divisor set up in said divisor set-up mechanism; multiplying computing means for multiplying the divisor in said divisor set-up mechanism by said estimated quotient digit and negatively entering the product thereof in said dividend register and entering said quotient digit in said quotient register; a shiftable coordinating means shiftable for coordinating orders of said dividend register with said quotient computing means and for coordinating said quotient register with said multiplying computing means; a shifting means operable initially for shifting said coordinating means so as to associate the highest predetermined group of orders, including the aforesaid high order, of said divided register with said quotient computing means and to associate the highest order of said quotient register with said multiplying computing means, and said shifting means operable for shifting said coordinating means ordinally to associate successively lower groups of dividend register orders with said quotient computing means and to associate successively lower orders of said quotient register with said multiplying computing means; initiating means one for each said quotient computing means, said multiplying computing means and for said shifting means for initiating the respective operation of each; a first actuating means controlled by said quotient computing means and responsive to a quotient estimation thereby for actuating the multiplying initiating means, a second actuating means operated by said multiplying computing means following said entry operations and normally engaged with for actuating said shifting initiating means and a third actuating means operated by said shifting means in response to a shift operation for actuating said quotient initiating means to effect the operation of said quotient computing means; disengaging means operable for disengaging said second actuating means from said shift initiating means to prevent the actuation of said shift initiating means, thereby effecting the termination of all operations by breaking the continuity of the aforesaid initiated operations; a zero responsive means controlled by said multiplying computing means and operative in response to the reduction of all of the dividend digits to zero in said dividend register orders after a negative entry therein and prior to the operation of said second actuating means, for operating said disengaging means so as to prevent the actuation of said shift initiating means; selectively adjustable tabulating means for operating said disengaging means to prevent actuation of said shift initiating means after the entry of a predetermined number of quotient digits in said quotient register, said selectively adjustable tabulating means having a plurality of positions corresponding to orders of said quotient register and to the ordinal positions of said coordinating means when coordinating those orders, adjustable selectively in any one of said positions into operative relation with for actuation by said coordinating means, when said coordinating means is shifted into a preselected one of said positions, to operate said disengaging means so as to prevent the operation of said shift initiating means after the entry of the quotient digit in the currently coordinated quotient register order, whereby the actuation of said disengaging means by either said zero responsive means when the dividend is reduced to zero or by said tabulation means selectively adjusted in a position for a predetermined number of quotient digits, which ever occurs first, effects the termination of all operations by breaking the continuity of operation between said multiplying computing means and said shifting means.

70. A computing machine comprising a multiorder register for products and dividends; a second register for multipliers and quotients; a shiftable carriage for supporting said registers; a computing mechanism with respect to which said carriage is ordinally shiftable; said mechanism comprising a plurality of settable elements arranged in ordinal groups, each element supporting a plurality of partial product representing stations, factor set-up means including selector units movable variable extents in different directions for selecting one said element in each group to represent a multiplicand, or a divisor digit and to condition said element to be activated exclusively of other elements of the same group; means including said set-up means for initially entering a multiorder dividend in the first said register; means for selecting one or two of the stations of a conditioned element in each group to represent the product of a given multiplicand/divisor digit times a given multiplier/quotient digit; dividend sensing means arranged and adapted to recognize the numerical value of the two highest orders of the dividend then registered in the first said register, said sensing means being operable to compare that value with the set-up value of the highest order divisor digit then standing in said factor set-up means and in accordance therewith to generate a trial quotient digit; alternatively operable programming devices for determining whether said computing mechanism is to obtain a final product or a final quotient, said programming devices being effective in the first case for enabling the conditioned elements of said computing mechanism to respond to the functioning of said station selecting means according to the input therein of a given multiplier digit, and in the second case for enabling such response to be in accordance with the value of the generated trial quotient digit; means for sensing the tens and units digits of the partial products in each order which derive from the operation of said station selecting means; means controlled by the last mentioned sensing means for integrating the units digit of each order with the tens digit of the next lower order; means for entering the resultant integrations with incidental carries in said first register, the entry being subtractive in the case of division; means simultaneously operative to enter said multiplier or trial quotient in the second register as the case may be; means for automatically cycling the computing machine while giving effect to the derivation of new trial quotients or new multiplier factors as the case may be, and during each cycle to perform the functions above defined; means for detecting an occasional over-subtraction when a generated trial quotient proves to be greater than a true quotient; means for nullifying the effects of an over-subtracted entry and for repeating the function of the entering means with a computation that derives from the reduction of the trial quotient digit by one; and means for automatically shifting the carriage by one ordinal step on completion of each cycle, provided that further steps of computation of the final product or the final quotient are essential.

71. In a calculating machine, a dividend register, a plurality of calculating plates, a plurality of quotient representing stop surface portions arranged on each of said plates, each plate being constructed for representing a corresponding divisor value, the stop surface portions on each said plate constructed and arranged according to a series of different positions on each said plate related to and corresponding with respective dividend values and the said stop surface portion in each said position being for and representing the quotient integer of the corresponding dividend divided by the divisor value of the respective said plate; plate moving means for moving all said plates successively from one to another of a plurality of said positions for at each position situating a stop surface portion on each plate in a computation serving position, and control means controlled by said dividend register for controlling said plate moving means to set up said plates to present thereat the said stop surface portions, which are related to the quotient values of the number set up in said dividend register, in said computation serving position, which set up stop surface portions as so presented represent the quotient integers of the set up dividend divided respectively by each of said divisor values.

72. In a calculating machine, a dividend set-up mechanism operable for representing a dividend factor in a computation, a predetermined quotient device comprising a plurality of quotient stations arranged in groups, each group of said stations representing a corresponding divisor value, the stations of each group being arranged differentially in a series of dividend related positions constituting representations of different dividend values and the station in each position representing the quotient integer of the value of that dividend related position divided by the divisor value of its respective group; motivating means for operating said quotient device and accordingly moving said stations as past a computation serving position, and control means controlled by said dividend set-up mechanism for controlling said motivating means to limit the operation of said quotient device and to thereby set up the stations of that dividend related position which corresponds to the value of the number set up in said dividend set-up mechanism, which set up stations represent the quotient integers of the set up dividend divided respectively by each of said divisor values.

73. In a calculating machine having a multiorder register and actuator means for initially entering a dividend in said register; a plurality of movable elements corresponding respectively with divisor values, each of said elements comprising a series of successive dividend related sectors corresponding with respective dividend values and each said series having a starting location on its respective said element coincident with a corresponding starting location on each of the other of said elements; a plurality of successive quotient stations arranged differentially on each of said elements, each of said quotient stations including a number of said sectors equal in number to the divisor value of the respective element and each of said quotient stations constructed for representing the quotient value of the value of its included dividend related said sectors divided by the divisor value of the respective said element; set-up means connected with all said elements for movement therewith; yieldable motivating means for moving said set-up means and all of said elements simultaneously various extents equal in total number to the greatest number of sectors on any one of said elements; control means controlled by adjacent orders of said register for controlling said set-up means and the said elements to move that predetermined extent which corresponds to the value of the digits in such orders, including a positionable and extendable high order device having a plurality of positions representing the digit values zero to nine, a low order device having a plurality of positions representing the digit values zero to nine, and sensing means controlled by adjacent orders of said register in sensing relation therewith for positioning said high order device in that position which corresponds to a digit entered in the higher order of said adjacent orders and for positioning said low order device in that position which corresponds to a digit entered in the adjacent lower order; said set-up means movable for setting up the successive dividend related said stations of each said series of sectors on said elements and adapted to engage said high order device upon a predetermined different extent of movement for each position of said high order device and thereafter to extend said high order device; and an intermediate member movable by said high order device while said high order device is being extended, which member controlled by said low order device to move a predetermined different extent for each position of said low order device controls the extent of the extension of said high order device and thereby controls the extent of movement of said set-up means and the connected said elements, which predetermined extending movement integral with the predetermined engaging movement corresponds to the value of the digits entered into said adjacent register orders for setting up at a designated position the stations of said sectors which correspond to the value of said entered adjacent digits, and which stations represent the quotient integers that correspond to the quotient integers of the dividend entered in said register divided respectively by each of the divisor values represented by the said elements.

74. In a calculating machine, a quotient device for representing predetermined quotient integers and comprising a plurality of selectable elements, each element representing a related divisor value and each element having quotient stations arranged in a series of sectors thereon constituting representations of different dividend values and the quotient station at each sector representing the quotient integer of the dividend value of that sector divided by the respective divisor value, divisor control means for selecting the divisor related element corresponding with a divisor value from among said selectable elements, a set-up means for selecting the dividend related quotient station, at the said sector corresponding to the dividend, from among the quotient stations on the divisor selected element, and a sensing means for sensing the selected quotient station.

75. In a calculating machine having a multiorder dividend register, and a divisor set-up mechanism; a quotient computing device including a plurality of selectable elements, each element representing a related divisor value and each element having quotient stations arranged in a series of sectors thereon constituting representations of different dividend values and the quotient station at each sector representing the quotient integer of the dividend value of that sector divided by the respective divisor value, a quotient sensing means adjustable by said divisor set-up mechanism into cooperative relation with the one of said elements which corresponds to the divisor set up in said divisor set-up mechanism for selecting the one of said elements which corresponds to the divisor value and thereafter operable for sensing a quotient station on the divisor selected one of said elements, a dividend set-up mechanism operable under control of a plurality of orders of said register for setting up, in a computation serving position in sensing registration with said sensing means, the quotient station of that sector on the divisor selected one of said elements, which sector corresponds to the value in those register orders, and motivating means for sequentially operating said dividend set-up mechanism and said quotient sensing means, in that order, to set up the dividend related quotient station on the divisor selected element and to sense the set up quotient station, respectively, as aforesaid; a quotient member settable differentially in a plurality of positions and situated in alignment with said sensing means for movement thereby to the one of said plurality of positions corresponding with the sensed quotient station; computing means having gradient control connections with said quotient member and said divisor set-up mechanism for multiplying the divisor set up in said divisor set-up mechanism by the quotient integer represented by the position of said quotient member and negatively entering the product thereof in said register; initiating means connected with said motivating means for operation thereby and responsive to sensing of a quotient station by said quotient sensing means for causing said computing means to multiply as aforesaid; and detent means in releasable engaging relation with said quotient member for normally holding said quotient member upon movement thereof to any one of its quotient representing positions and having reciprocally operable releasing means controlled by said computing means for releasing said quotient member following the entry of said product.

76. In a calculating machine having a multiorder dividend register, and a divisor set-up mechanism; a quotient computing device including a plurality of selectable elements, each element representing a related divisor value and each element having quotient stations arranged in a series of sectors thereon constituting representations of different dividend values and the quotient station at each sector representing the quotient integer of the dividend value of that sector divided by the respective divisor value, a quotient sensing means adjustable by said divisor set-up mechanism into cooperative relation with the one of said elements which corresponds to the divisor set up in said divisor set-up mechanism for selecting the one of said elements which corresponds to the divisor value and thereafter operable for sensing a quotient station on the divisor selected one of said elements, a dividend set-up mechanism operable under control of a plurality of orders of said register for setting up, in a computation serving position in sensing registration with said sensing means, the quotient station of that sector on the divisor selected one of said elements which sector corresponds to the value in those register orders, and motivating means for sequentially operating said dividend set-up mechanism and said quotient sensing means, in that order, to set up the dividend related quotient station on the divisor selected element and to sense the set up quotient station, respectively, as aforesaid; a quotient member settable differentially in a plurality of positions and situated in alignment with said sensing means for movement thereby to the one of said plurality of positions corresponding with the sensed quotient station; multiplying computing means having gradient control connections with said quotient member and said divisor set-up mechanism for multiplying the divisor set up in said divisor set-up mechanism by the quotient integer represented by the position of said quotient member and negatively entering the product thereof in said register; initiating means connected with said motivating means for operation thereby and responsive to sensing of a quotient station by said quotient sensing means for causing said multiplying computing means to multiply as aforesaid; control means in engaging relation with for holding said quotient member in any one of its differential positions and for variously restoring said quotient member, including normally operative complete restoring means for completely restoring said quotient member when the determined integer is the true quotient integer and partial restoring means, normally inoperative, for partially restoring said quotient member by one increment when the determined integer is greater than the true quotient integer; oscillating mechanism operated by said multiplying computing means, following the negative entry of said product, for operating said complete restoring means or said partial restoring means, whichever is in operative relation therewith; and over-draft control mechanism operated by said register in response to a negative product entry greater than the dividend therein for rendering said complete restoring means inoperative and said partial restoring means operative, whereby said quotient member is moved one increment to the next lower-value position representing a quotient integer of one less than the initially sensed quotient value.

77. A calculating machine comprising calculating means for performing successive division computation operations and exhibiting corresponding successive quotient digits, a normally ineffective tabulating means for terminating all computation operations of said calculating means upon completion of a predetermined number of operations of said calculating means and prior to the full successive quotient digit exhibiting capacity of said calculating means, a selectively operable first division initiating means operable for initiating the operations of said calculating means whereby said calculating means may operate to its full capacity, and a selectively operable second division initiating means operable for rendering said tabulating means effective and initiating the operations of said calculating means whereby said calculating means operates to exhibit a predetermined number of quotient digits as controlled by said tabulating means.

78. A calculating machine comprising calculating means for performing successive division computation operations and exhibiting corresponding successive quotient digits, a normally ineffective tabulating means for terminating all computation operations of said calculating means upon completion of a predetermined number of operations of said calculating means and prior to the full successive quotient digit exhibiting capacity of said calculating means, and division initiating means operable for rendering said tabulating means effective and initiating the operations of said calculating means whereby said calculating means operates to exhibit a predetermined number of quotient digits as controlled by said tabulating means.

79. A calculating machine comprising a calculating means for performing a number of successive division computation operations and exhibiting a corresponding number of successive quotient digits, a normally ineffective differentially adjustable tabulating means for terminating all computation operations of said calculating means upon completion of a predetermined number of said computation operations, presettable tabulating key means for adjusting said tabulating means to determine said number of said computation operations, and a division initiating means operable for rendering said tabulating means effective and initiating the operations of said calculating means whereby said calculating means performs the number of successive division computation operations as controlled by the adjusted said tabulating means.

80. In a calculating machine having a multiorder dividend register and a divisor set-up mechanism, computing means controlled jointly by said dividend register and by said divisor set-up mechanism for determining successive quotient digits and for successively multiplying the divisor in said divisor set-up mechanism by each successive quotient digit and negatively entering the products thereof in said dividend register, a shiftable coordinating means shiftable for coordinating orders of said dividend register with said computing means, a shifting means operable for shifting said coordinating means ordinally to associate successively lower groups of orders of said dividend register with said computing means, shift initiating means operated by said computing means following each product entry for initiating the operation of said shifting means to effect the ordinal said shifting of said coordinating means, division initating means operable by said shifting means in response to a shift operation for initiating the operation of said computing means, and zero responsive means controlled by said computing means and operative in response to the reduction of the dividend digits in said multiorder dividend register to zero after a negative entry therein and prior to the operation of said shift initiating means for rendering said shift initiating means inoperative for the actuation thereof by said computing means, whereby all further operations of shifting and computing are thereupon terminated.

81. In a calculating machine having a multiorder dividend register and a divisor set-up mechanism, computing means controlled jointly by said dividend register and by said divisor set-up mechanism for determining successive quotient digits and for successively operating said dividend register to reduce the dividend therein, a shiftable coordinating means shiftable for coordinating orders of said dividend register with said computing means, a shifting means operable for shifting said coordinating means ordinally to associate successively lower groups of orders of said dividend register with said computing means, initiating means operated by said computing means following each dividend reducing operation for initiating the operation of said shifting means to effect the ordinal said shifting of said coordinating means and operable by said shifting means in response to a shift operation for initiating the operation of said computing means, and zero responsive means controlled by said computing means and operative in response to the reduction of the dividend in said dividend register to zero for rendering said initiating means ineffective for initiating an ensuing operation of said shifting means as aforesaid, whereby further operations of shifting and consequent computing are thereupon terminated.

82. In a calculating machine having a dividend register and a divisor set-up mechanism, computing means controlled jointly by said dividend register and by said divisor set-up mechanism for determining successive quotient digits and for successively operating said dividend register to reduce the dividend in said dividend register according to the products of the successive quotient digits and the divisor in said divisor set-up mechanism, a first division initiating means operable from a normal ineffective position to operated position for initiating initial operation of said computing means, a latch means for releasably holding said first division initiating means in operated position, a shiftable coordinating means shiftable for coordinating orders of said dividend register with said computing means, a shifting means operable for shifting said coordinating means ordinally to associate successively lower groups of orders of said dividend register with said computing means, shift initiating means operated by said computing means following each dividend reducing operation for initiating sequential operation of said shifting means to effect the ordinal said shifting of said coordinating means, a second division initiating means operable by said shifting means in response to a shift operation for initiating sequential operation of said computing means, and zero responsive means controlled by said computing means following each dividend reducing operation and prior to the operation of said shift initiating means and operative in response to the reduction of all of the dividend digits to zero in said dividend register for rendering said shift initiating means inoperative for the actuation thereof by said computing means and for connecting said latch means with said computing means for operation of said latch means to release said first division initiating means from operated position, whereby further shifting of said coordinating means and consequent computing operations are terminated and said first division initiating means is released from its operated position upon elimination of the dividend and remainders thereof.

References Cited in the file of this patent

UNITED STATES PATENTS

| 1,292,513 | Rechnitzer | Jan. 28, 1919 |
| 2,088,974 | Pott | Aug. 3, 1937 |
| 2,343,273 | Avery | Mar. 7, 1944 |
| 2,536,906 | Brand | Jan. 2, 1951 |
| 2,567,120 | Nolde | Sept. 4, 1951 |
| 2,611,538 | Hatton | Sept. 23, 1952 |
| 2,689,085 | Avery | Sept. 14, 1954 |
| 2,753,114 | Ellerbeck | July 3, 1956 |

FOREIGN PATENTS

| 459,579 | Canada | Sept. 13, 1949 |